(12) United States Patent
Tolmachev

(10) Patent No.: US 10,468,699 B2
(45) Date of Patent: Nov. 5, 2019

(54) ELECTRIC POWER PRODUCTION USING AQUEOUS MULTI-ELECTRON OXIDANTS

(71) Applicant: Ftorion, Inc., Boston, MA (US)

(72) Inventor: Yuriy Vyacheslalovovich Tolmachev, Boston, MA (US)

(73) Assignee: Ftorian, Inc., Boston, MA (US)

( * ) Notice: Subject to any disclaimer, the term of this patent is extended or adjusted under 35 U.S.C. 154(b) by 40 days.

(21) Appl. No.: 15/847,951

(22) Filed: Dec. 20, 2017

(65) Prior Publication Data

US 2018/0138532 A1    May 17, 2018

Related U.S. Application Data

(63) Continuation of application No. 14/184,702, filed on Feb. 19, 2014, now abandoned, which is a continuation-in-part of application No. 13/969,597, filed on Aug. 18, 2013, now abandoned.

(60) Provisional application No. 61/684,805, filed on Aug. 19, 2012.

(51) Int. Cl.
| | |
|---|---|
| *H01M 8/0656* | (2016.01) |
| *H01M 8/08* | (2016.01) |
| *H01M 8/18* | (2006.01) |
| *H01M 8/20* | (2006.01) |
| *H01M 8/22* | (2006.01) |

(52) U.S. Cl.
CPC ........... *H01M 8/0656* (2013.01); *H01M 8/08* (2013.01); *H01M 8/188* (2013.01); *H01M 8/20* (2013.01); *H01M 8/22* (2013.01); *Y02E 60/528* (2013.01)

(58) Field of Classification Search
CPC ...... H01M 8/0656; H01M 8/20; H01M 8/188; H01M 8/08; H01M 8/22
See application file for complete search history.

(56) References Cited

U.S. PATENT DOCUMENTS

| | | | | |
|---|---|---|---|---|
| 5,041,197 A | * | 8/1991 | Gelb | C25B 1/26 204/DIG. 4 |
| 5,833,834 A | * | 11/1998 | Hanrahan | C01B 7/093 205/637 |
| 6,841,294 B1 | * | 1/2005 | Morrissey | H01M 8/04186 429/105 |

(Continued)

*Primary Examiner* — Ula C Ruddock
*Assistant Examiner* — Matthew W Van Oudenaren
(74) *Attorney, Agent, or Firm* — Ashok Tankha

(57) ABSTRACT

A method for producing electric power and regenerating an aqueous multi-electron oxidant (AMO) and a reducer in an energy storage cycle is provided. A discharge system includes a discharge unit, an acidification reactor, and a neutralization reactor. The acidification reactor converts an oxidant fluid including the AMO into an acidic oxidant fluid. The discharge unit generates electric power and a discharge fluid by transferring electrons from a positive electrode of an electrolyte-electrode assembly (EEA) to the AMO and from a reducer to a negative electrode of the EEA. The neutralization reactor neutralizes the discharge fluid to produce a neutral discharge fluid. The regeneration system splits an alkaline discharge fluid into a reducer and an intermediate oxidant in a splitting-disproportionation reactor and releases the reducer and a base, while producing the AMO by disproportionating the intermediate oxidant. The regenerated AMO and reducer are supplied to the discharge unit for power generation.

14 Claims, 38 Drawing Sheets

(56) References Cited

U.S. PATENT DOCUMENTS

2011/0253553 A1* 10/2011 Bergstein Freiberg ...................... H01M 10/365
205/619

* cited by examiner

| CHEMISTRY | THEORETICAL PERFORMANCE | | | OXIDANT SOLUBILITY | MAX ED | EXCHANGE CURRENT | ENERGY EFFICIENCY | MAX ED*EF |
|---|---|---|---|---|---|---|---|---|
| | A*h/kg | EEq, V | Wh/kg | W/W % | Wh/kg | mA/cm² | % | Wh/kg |
| INTERNAL COMBUSTION ENGINE | | | 12,000 | | 0 | | | 4,000 |
| PEM FC | | | | | | | | |
| $Pb+PbO_2+2H_2SO_4=2PbSO_4+2H_2O$ | 83.4 | 2.107 | 176 | 100 | | HIGH | | 35 |
| $LiC_6+FePO_4=LiFePO_4$ | 116.6 | 3.3 | 385 | 100 | 385 | HIGH | 80 | 200 |
| $VO_2^+ + 2H^+ +V^{2+} = VO^{2+} +V^{3+} +H_2O$ | | 1.41 | | | | | 70 | 30 |
| $H_2 + 0.5O_2$ (AIR) $= H_2O$ | 26,801 | 1.2 | 32,161 | 100 | 32161 | LOW | 60 | 19,300 |
| $H_2 + 0.5O_2$ (ON BOARD) $= H_2O$ | 2,978 | 1.23 | 3,660 | 100 | 3660 | LOW | 65 | 2,379 |
| $H_2+F_2= 2HF$ | 1,340 | 3.05 | 4,087 | 100 | 4087 | LOW | 20 | 817 |
| $H_2+Cl_2= 2HCl$ | 735.3 | 1.35 | 993 | 100 | 993 | MEDIUM | 70 | 695 |
| $H_2+Br_2= 2HBr$ | 331.3 | 1.07 | 353 | 100 | 353 | HIGH | 90 | 318 |
| $H_2+I_2= 2HI$ | 209.5 | 0.54 | 113 | 100 | 113 | HIGH | 100 | 113 |

FIG. 5A

| CHEMISTRY | THEORETICAL PERFORMANCE | | | OXIDANT SOLUBILITY | MAX ED | EXCHANGE CURRENT | ENERGY EFFICIENCY | MAX. ED*EF |
|---|---|---|---|---|---|---|---|---|
| | A*h/kg | EEq, V | Wh/kg | w/w % | Wh/kg | mA/cm² | % | Wh/kg |
| $4H_2 + HIO_4 = HI + 4H_2O$ | 1072.2 | 1.64 | 1,758 | | 0 | | 33 | 0 |
| $4H_2 + H_5IO_6 = HI + 6H_2O$ | 916.3 | 1.4 | 1,283 | 100 | 1283 | HIGH | 39 | 495 |
| $3H_2 + HIO_3 = 3H_2O + HI$ | 1217.5 | 1.19 | 1,449 | 73 | 1058 | HIGH | 45 | 480 |
| $4H_2 + HBrO_4 = HBr + 4H_2O$ | 1411 | 2.2 | 3,104 | 55 | 1707.2 | HIGH | 49 | 830 |
| $3H_2 + HBrO_3 = HBr + 3H_2O$ | 1200.5 | 1.42 | 1,705 | 55 | 937.75 | HIGH | 75 | 707 |
| $4H_2 + HClO_4 = HCl + 4H_2O$ | 1,975 | 1.41 | 2,785 | 72.5 | 2018.9 | LOW | 96 | 1,933 |
| $3H_2 + HClO_3 = HCl + 3H_2O$ | 1,777 | 1.45 | 2,577 | 40 | 1030.7 | LOW | 93 | 960 |
| $2H_2 + HClO_2 = HCl + 2H_2O$ | 1,479 | 1.56 | 2,307 | DISPR. | | MEDIUM | 87 | |
| $H_2 + HClO = HCl + H_2O$ | 984 | 1.5 | 1,476 | 66 | 974.2 | MEDIUM | 90 | 877 |
| $HNO_3 + 3/2H_2 = NO + 2H_2O$ | 1,217.5 | 0.96 | 1,169 | 68 | 794.9 | LOW | 50 | 397 |
| $HNO_3 + 4H_2 = NH_3 + 3H_2O$ | 3,017 | 1 | 3,017 | 68 | 2051.6 | LOW | 50 | 1,026 |

FIG. 5B

ELECTRIC POWER PRODUCTION USING AQUEOUS MULTI-ELECTRON OXIDANTS

CROSS REFERENCE TO RELATED APPLICATIONS

This application is a continuation application of non-provisional patent application Ser. No. 14/184,702 titled "Flow Battery And Regeneration System With Improved Safety", filed in the United States Patent and Trademark Office on Feb. 19, 2014, which is a continuation-in-part application of non-provisional patent application Ser. No. 13/969,597 titled "Flow Battery And Regeneration System", filed in the United States Patent and Trademark Office on Aug. 18, 2013, which claims priority to and the benefit of provisional patent application No. 61/684,805 titled "Fluid Battery With Water-compatible Oxidants", filed in the United States Patent and Trademark Office on Aug. 19, 2012. The specifications of the above referenced patent applications are incorporated herein by reference in their entirety.

BACKGROUND

The first widely commercialized automobiles at the dawn of the last century were electric and powered by lead acid batteries. Lead acid batteries are currently used in cars for starting, lighting, and ignition purposes. Lead acid batteries cost, for example, about 170 dollars/kilowatt hour (kWh) and are cheaper than many other rechargeable batteries known. However, the energy content of lead acid batteries is rather low. The specific energy of lead acid batteries is, for example, about 35 watt hour (Wh)/kilogram (Kg) or about 20% of their theoretical value. This is notably reflected in the short driving range provided by the lead acid batteries, for example, of about 30 km in fully electric vehicles. A long recharge time, for example, of about 2 hours required for lead acid batteries necessitates in many applications, a cumbersome mechanical swap of a discharged battery by a charged battery.

By the year 1910, improvements in the performance of an internal combustion engine, the development of mechanical transmission, combined with a wide availability of liquid hydrocarbon fossils, resulted in the displacement of electric vehicles by gasoline vehicles in the terrestrial transportation market. Gasoline power systems provide high energy content, for example, about 4,000 Wh/kg at wheels, that is, about 500 kilometres driving range, and a quick mechanical refill. This provided gasoline power systems an advantage over batteries with solid electroactive materials (SEAM). Gasoline cars were widely used even through the oil crises of the 1970s. The oil crisis provoked a concern about the availability of hydrocarbon resources and promoted a short lasting interest in electric battery and hydrogen vehicles.

The current interest in electric cars started in 1990 with the passage of the zero-emissions vehicle mandate by the California Air Resources Board. Nickel-metal hydride batteries, commercialized around this time, were considered briefly for automotive applications. Although nickel-metal hydride batteries provided better performance than the lead acid batteries, for example, a driving range of about 60 km, a specific energy of about 60 Wh/Kg to about 90 Wh/Kg, an energy density of about 200 Wh/L-300 Wh/L, a specific power of about 200 W/kg, and an electric recharge of about 3 hours, albeit at a higher cost of about $1,000/kWh, the nickel-metal hydride batteries were not an acceptable replacement for gasoline from the customer's perspective.

By the year 1990, hydrogen fuelled polymer electrolyte membrane fuel cells (PEMFCs), which were originally developed within American and Soviet space exploration programs, became the leading contender among power sources for electric vehicles. The interest in PEMFCs was due to the following factors: the perceived availability of hydrogen fuel, a high specific energy, for example, of about 33.39 kWh/Kg for the low heating value of hydrogen ($H_2$), a high specific power of PEMFCs, for example, about 0.7 $W/cm^2$ at about 60% efficiency and about 0.35 kW/Kg and about 0.35 kW/L at the stack level, a competitive system energy density, for example, about 1,000 Wh/L for a 700 bar gas, and about 1200 Wh/L for 1 atmospheric pressure (atm) liquid $H_2$ allowing for a 600 km driving range, as well as a good energy efficiency, for example, about 60% for PEMFCs versus about 13% for an internal combustion engine.

In the following 20 years, the idea of hydrogen economy and automotive fuel cells received a significant political and economic impetus which was justified by the concerns with the rising atmospheric carbon dioxide ($CO_2$) levels and an unstable supply of liquid hydrocarbons. This was reflected in the statement by President G. W. Bush in his 2003 State of the Union address: "a child born today will be driving a car, as his or her first car, which will be powered by hydrogen and pollution free."." In 2004 General Motors was spending more than a quarter of its research budget on fuel cell vehicles and Larry Burns, GM's Vice President for R&D and Planning, said in February 2004 that the company will have a commercially viable fuel cell vehicle by 2010. In 2004, the State of California said it would build a hydrogen highway, with hydrogen fueling stations every 20 miles along major highways in the next few years. Despite the dedicated work of many scientists and engineers worldwide, the hydrogen fuelled polymer electrolyte membrane fuel cell (PEMFC) technology did not result in a market success of electric vehicles. The reasons are as follows: to achieve practically useful power density on the positive electrode, high platinum (Pt) loading is required which increases the cost of the PEMFCs; the dissolution of a Pt catalyst at positive potentials makes the positive electrode less durable; the lack of an inexpensive, sustainable, and a clean hydrogen source; and the lack of a hydrogen manufacturing and distribution infrastructure. Hence, there is a need for a technology that avoids the macro scale infrastructure required for hydrogen production and distribution and also reduces the amount of Pt required for on-board electricity generation.

Several revolutionary developments also occurred in the field of batteries with solid electroactive materials (SEAM). The advantages of a lithium (Li) metal anode, for example, a low equivalent weight, very negative redox potential, and a small cation size, allowing for an easy intercalation into cathode materials, were realized in the early 1970s. However, the first lithium batteries had a poor cycle life since the electronically insulating surface film formed on metallic lithium leads to dendritic Li plating during recharge. In 1981, researchers from Sony Corporation demonstrated a rechargeable lithium ion battery (LIB) with a graphite intercalation cathode. This lead to the commercialization of lithium batteries with a carbon anode in portable applications, within one decade. Since LIBs have a high energy density when compared to other commercialized room temperature batteries, LIBs have been used in commercial electric vehicles since the year 2010 despite a somewhat high cost, for example, of about $400/kW.

However, fully electric vehicles, unlike plug-in hybrids, based on lithium ion batteries (LIBs) did not achieve a widespread commercial success, primarily due to a low energy content, that is, a low driving range, and a high total cost of ownership of the batteries. For example, Nissan Leaf® of Nissan Jidosha Kabushiki Kaisha DBA Nissan Motor Co. Ltd., has a battery that weighs about 20% of the total car weight with about 200 Wh/Kg, that is, about 53% of the theoretical value, and about 230 Wh/L, and provides about 60 Km to about 100 Km driving range depending on whether the air conditioner is on or off. A larger sport utility vehicle (SUV), for example, Toyota RAV4® EV of Toyota Jidosha Kabushiki Kaisha TA Toyota Motor Corporation, also shows a similar performance. The often quoted statistics that 60% of daily car trips in the United States are less than 60 Km is apparently not helping the sales of lithium-ion battery powered cars as most drivers need the capability to make longer trips. Apart from the low driving range, the LIBs also have a low electric recharge rate, for example, the Nissan Leaf® takes about 30 minutes for a charge of about 80% of full capacity, and the construction of a large scale battery swapping infrastructure is not justified due to the lack of a sizable LIB electric vehicle market, as illustrated by a recent bankruptcy of Better Place. Also, the capital cost of the LIBs needs to be reduced in the long term, for example, from about $500/kWh to $125/kWh and from about $30/kW to $8/kW at 250 Wh/kg, 400 Wh/L, and 2 kW/kg.

The scientists at General Motors (GM) arrived at the same conclusion, that is, the battery electric vehicles based on current and targeted Li ion battery technology will be limited to small vehicle, low mileage-per-day applications due to relatively low specific energy and long recharge time constraints, and it is possible that fundamental physical limitations may prevent pure Li ion based battery electric vehicles (BEVs) from delivering the freedom of providing long trips, with intermittent quick refills, that consumers currently receive from their cars. According to Toyota spokesman John Hanson "We don't think that lithium-ion batteries are going to help us get to a point where we can dramatically increase volume and really call it a mass market. We're going to have a more significant breakthrough and probably go into some other area of battery chemistry." MIT's Yet-Ming Chiang concurs: "It is clear that long-term vehicle electrification especially affordable 200 mile all-electric range—will require batteries with approximately three times greater energy densities at about one third the cost per kWh than that of LIBs." Kevin See, analyst for Boston-based Lux Research, said "It is not realistic or feasible for automakers to significantly cut the price of lithium-ion batteries. There is going to be incremental improvement, but we don't believe it will be enough to spur the huge adjustment everyone was hoping for." Tesla Motors has conceded that new technologies will eventually be required. According to Steve Visco, the founder of Polyplus: "What has happened over the past couple of years is the growing realization that lithium-ion chemistry will not take EVs to a mass adoption vehicle. It is just too expensive and they're too heavy."

Numerous attempts to commercialize lithium ion batteries (LIBs) for use in fully electric vehicles in the last 5 years failed as eloquently illustrated by the mismatch of large production capacities and negligible sales by all 9 award recipients of the August 2009 $1.5 billion Department of Energy's (DOE) "Electric Vehicle Battery and Component Manufacturing Initiative" who had a primary focus on electric vehicle (EV) batteries including Dow Kokam, Johnson Controls, A123 Systems, Compact Power, EnerDel, General Motors, SAFT America, and LG Chem. The public's lack of appetite for battery-powered cars persuaded the Obama's administration in January of 2013 to back away from its aggressive goal to put 1 million electric cars on U.S. roads by 2015. According to Takeshi Uchiyamada, Toyota's Vice Chairman, "the current capabilities of electric vehicles", based on fuel cells or lithium ion batteries, "do not meet society's needs, whether it may be the distance the cars can run, or the costs, or the long time to charge. Because of its shortcomings, that is, driving range, cost, and recharging time, the battery or fuel cell electric vehicle is not a viable replacement for most conventional cars. We need something entirely new". Thus, there is a need for a solution that departs from the currently available technologies and differs from others under investigation in the electric vehicle battery field. More specifically, there is a need for a power source for electric vehicles that provides a longer driving range, lower total cost of ownership, and allows for a quick recharge or refill than lithium-ion batteries.

The history of technology teaches that if the show stopping part in any device is identified and replaced with another part, then this may change the device from a non-functional device to a functional device, though the performance in one or more parameters may have to be sacrificed. In the case of lithium batteries, the aforementioned abandonment of the metallic lithium electrode in favor of lithium intercalated into graphite resulted in about 30% decrease in the theoretical energy density but created a marketable battery with a long cycle life. Flow systems such as fuel cells (FCs) and redox flow batteries (RFBs) allow an independent scaling on energy and power, and are thus better suited for transportation than batteries with solid electroactive materials (SEAMs). Other advantages of flow systems, when compared to SEAM batteries, are a higher system energy density, if the reactants are not too dilute, a quick refill time, an intrinsic fluid heat management, and a simple cell balancing. The advantages of redox flow batteries over fuel cells are: electric regeneration that does not require a construction of a new fuel distribution infrastructure, for example, a hydrogen distribution infrastructure, higher efficiency, and in general, a lower cost. Conventional redox flow batteries such as vanadium redox flow batteries have a low energy density that translates into a short driving range, because the components have low solubilities and a large amount of an otherwise useless solvent which has to be carried on-board to keep the components in the fluid state. For this reason, flow batteries have been considered mostly for stationary storage applications rather than for electric vehicles.

A Massachusetts based start-up, 24M, proposed a method that retains the advantages of flow batteries while overcoming drawbacks of traditional solution chemistry, by developing a slurry flow battery based on the $C_6$—$LiFePO_4$ chemistry used by A123 Systems for batteries with solid electroactive materials (SEAM) or SEAM batteries. However, such a battery in an electric vehicle such as the Nissan Leaf® or the Toyota RAV4® would provide only from about 90 Km to about 150 Km driving range, even if the battery reaches, for example, about 80% of its theoretical energy density. Improvements in packing factor, that is the ratio of practical to theoretical energy density, by using, for example, binder free SEAM batteries with a soluble mediator or a soluble redox couple or metal containing ionic liquid flow batteries or protected Li metal anode, run into the fundamental limitation that the intrinsic energy densities of known battery chemistries are not sufficiently high for fully electric vehicle applications. Also, the cost of such batteries is likely to stay above the mid-term target of about $100/kWh and about $30/kW, or about $2,250/car with about 100 horsepower. Hence, there is an unmet need for flow batteries with higher energy content and a lower cost in order to gain market acceptance of fully electric vehicles.

Polymer electrolyte membrane (PEM) fuel cells have high power and energy density at low operating temperatures as well as a flow design which makes the PEM fuel cells well suited for automotive applications. Furthermore, fuel cells provide for a very high system energy density since the oxidant, that is, $O_2$ is not carried on-board. However, the fundamental problems related to the slow kinetics of the oxygen electrode result in high cost and poor durability of PEM fuel cells due to the necessity of high Pt loading in the case of near ambient temperature fuel cells. Another problem with fuel cells, in general, is the source of the fuel, for example, hydrogen. Hence, there is a need for a discharge flow battery that ensures a high energy density, high energy efficiency, generates a high electric power by replacing the free oxygen from air with a high energy density and kinetically fast on-board fluid oxidant, and allows for the regeneration of a fuel and an oxidant from the exhaust products.

Flow batteries use electrochemical power cells similar to fuel cells. How batteries also use fluid reactants, for example, liquid, gaseous, or suspended reactants to store energy and to generate electric power. However, instead of oxygen or air, a different oxidant or a solution of an oxidant can be employed. Due to the carrying of an on-board oxidant, the flow battery typically entails a lower system energy density than a fuel cell. The reasons for using the on-board oxidant method comprise, for example, increasing the efficiency of energy conversion, reduction in the amount of precious metal catalysts, potential to change the operating temperature of the electrochemical power cell, improved heat management, the possibilities of electric recharge and of mechanical refill, etc. When compared to batteries with solid electroactive materials (SEAM) or SEAM batteries, for example, lithium ion batteries, flow batteries offer an independent scaling of energy and power, a higher ratio of practical to theoretical energy density that is, packing factor for systems with a sufficiently long discharge time, a possibility of quick mechanical recharge, intrinsic liquid cooling, etc. Commercialized redox flow batteries, such as Vanadium Redox Flow Batteries have low energy densities because of the use of redox couples with low solubilities and with a low number of redox-active electrons per electroactive atom. Paul Zigouras, Director of New Business Development at EPC Corporation, eloquently summarizes the status quo as: "Flow batteries are a great idea, but unfortunately, no fluid currently exists that will hold a decent amount of energy. Even the best experimental fluids have about $\frac{1}{5}^{th}$ the energy density of the required value. I am hopeful, but also doubtful that a fluid will ever be developed that can effectively do this".

Hydrogen-halogen flow batteries employ fluid reagents and products, and thus, may avoid the aforementioned energy density dilution by a solvent. In the series from fluorine ($F_2$) to iodine ($I_2$), the theoretical energy density decreases while the efficiency, cathode power, and exchange current increases. As a result, $F_2$ has poor cycle efficiency, in addition to material compatibility issues, whereas $I_2$ has a low energy density in addition to solubility problems. Hence, only bromine ($Br_2$) and chlorine ($Cl_2$) may be of interest for transportation applications. However, the chorine cells use an expensive ruthenium (Ru)-containing catalyst and provide poor energy efficiency. The theoretical energy density of hydrogen-bromine cells is only marginally better than that of lithium-ion batteries. The energy density becomes even lower if bromine is used as an aqueous solution with hydrogen bromide (HBr) to reduce the oxidant's cross over through membrane via the formation of $Br_3^-$ anions and to lower the pressure of the $Br_2$ vapour. Hydrogen-bromine cells are therefore considered at present mostly for grid storage rather than for electric vehicles.

There is a need for resolving the aforementioned TRIZ contradiction between energy density and energy efficiency of halogens, for example, by introducing a new dimension to the choice of oxidants, for example, by adding a second dimension of oxocompounds such as oxides and oxoacids to the one dimensional space of elements such as halogens. Although hydrogen-oxoacid flow batteries such as $H_2$—$HNO_3$ have been considered in the past, these flow batteries have poor discharge efficiency and lack the ability of electrical recharge or regeneration of the reagents. The direct electroreduction of halogen oxoacids is highly irreversible under the polymer electrolyte membrane fuel cell (PEMFC) conditions. There is a need to overcome this problem, for example, by performing a slow reduction of an oxocompound in a solution, that is, in three dimensions rather than on an electrode, that is, two dimensional.

Transition metal ion catalyzed electroreduction of oxoanions has been known for over 100 years. However, such reactions did not find applications in energy storage and conversion, mostly due to their poor reversibility. A more useful way to facilitate the electroreduction of halogen oxoanions is to employ a preceding homogeneous reaction such as comproportionation with a halide product as exemplary demonstrated for a halate by the equations below:

$$XO_3^- + 6e^- + 6H^+ = X^- + 3H_2O \text{ on the electrode, slow.} \quad (1)$$

$$XO_3^- + 5X^- + 6H^+ = 3X_2 + 3H_2O \text{ in solution, fast.} \quad (2)$$

$$X_2 + 2e^- = 2X^- \text{ on the electrode, fast.} \quad (3)$$

where X=Cl, Br, I.

In practice, reaction (3) may precede reaction (1) during the initial stage of the cycle. Furthermore, at high concentrations of halogen oxoanion and of an acid and for a thick diffusion layer, the steady-state limiting current, determined by the balance of the rate of halogen, that is, $X_2$ intermediate formation via comproportionation (2) and by the rate of halogen loss into the solution bulk, can reach enormous values over 1 A/cm$^2$.

The reverse process of oxidation of halides is generally believed to follow the same pathway. For example, the oxidation of the halides such as iodide, bromide, and chloride at alkaline pH shows that the reverse of the chemical reaction indicated by equation (2) occurs through the formation of an intermediate hypohalate via a homogeneous disproportionation: Here, R is a base:

$$2X_2 + 2H_2O + 2R^- = 2HXO + 2X^- + 2RH \quad (4)$$

followed by another homogeneous disproportionation:

$$5HOX \text{ (hypohalous acid)} = 4X^- + XO_3^- + H^+ + 2H_2O \quad (5)$$

or (4) and (5) combined $$3X_2 + 3H_2O + 6R^- = XO_3^- + 5X^- + 6RH \quad (6)$$

Thus, disproportionation, for example, reaction (6), can be used to regenerate a halogen oxoanion from a halide present in the discharge fluid via an intermediate halogen produced by one or several routes of oxidation of halide.

The occurrence of homogeneous disproportionation reactions (4), (5), (6), and a comproportionation reaction (2) facilitates discharge and regeneration processes respectively in the energy cycle. The occurrence of these reactions allows for a high power, high efficiency operation based on a fast electrode reaction ($X_2+2e^-=2X^-$) while performing slower steps such as reduction of the oxoanion with the electrogenerated halide in the three dimensional bulk of the solution which can accommodate a higher reaction rate than the two dimensional electrode surface. Although the use of a mediator leads in theory to reduced energy efficiency compared to a direct electrode reaction, this thermodynamic loss of energy efficiency is often smaller than the kinetic loss associated with electrode over-voltage at the same power using oxidants such as oxygen or using direct electroreduction of the oxoanions.

The chemical methods of producing halogen oxoacids are used on an industrial scale. In the case of bromic acid, this chemical method consists of solution-phase disproportionation of bromine in $Ba(OH)_2$, followed by $Ba^{2+}$ precipitation with sulfuric acid and by evaporation of the excess water. However, this process irreversibly consumes $Ba(OH)_2$, $H_2SO_4$ and generates $BaSO_4$ waste. Also, this process does not co-produce a stoichiometric amount of hydrogen, which is required for the complete energy cycle of discharge and regeneration. Thus, this precipitation route does not meet the application requirements. An alternative method for preparing up to 40%-50% bromic acid via the electrooxidation of aqueous bromine solutions uses a lead dioxide anode at the current density of 10-20 mA/cm$^2$ and a potential of +2.1 to +2.2 V versus a normal hydrogen electrode. Although this method is chemical and waste free, this method has poor energy efficiency and a low throughput.

Sunlight is a clean and carbon dioxide ($CO_2$) free energy source and the sun's energy can be harvested thermally, photoelectrically, photochemically, or photoelectrochemically. While about 120,000 terawatts (TW) of sunlight, year averaged power, reaches the earth, the current total energy consumption of human civilization is only about 13 TW. Currently, with a wide scale utilization of solar technologies, there is a TRIZ contradiction between cost and efficiency intrinsic to all commercialized means of sunlight energy conversion. For example, semiconductor based photovoltaic solar panels, for example, polycrystalline silicon photovoltaic solar panels, multilayer photovoltaic solar panels, InxGa (1-x) Se2, etc., are either inefficient or too expensive. Photoelectrochemical water splitting into hydrogen ($H_2$) and oxygen ($O_2$) using anatase $TiO_2$ nanoparticles also suffers from a low efficiency due to the high over voltage of the oxygen production centers. Hence, there is a need for a method for converting sunlight energy into chemical energy or electric energy at low cost and without producing any chemical waste.

Hence, there is a long felt but unresolved need for an electrochemical flow battery that provides for a high energy density, that is, a long driving range, a high energy efficiency and power at a low operational and manufacturing cost, and requires a short refill time. Moreover, there is a need for a method and a system that regenerates an oxidant and a fuel simultaneously from a discharge fluid, in stoichiometric amounts, without consumption of extra chemicals and without generating chemical waste and by using electric or solar energy as the primary energy source. Furthermore, there is a need for an electrochemical flow battery that provides better safety and stability by storing on-board and off-board a stable form of the oxidant.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The method and the discharge system disclosed herein address the above stated needs for a mechanically refillable, electrochemical flow battery that provides a high energy density, a high energy efficiency, and a high electric power at a low cost, requires a short refill time, reduces or completely eliminates usage of platinum and other precious materials in the electrodes, and reduces the size or completely eliminates the humidification system. The method and the discharge system disclosed herein produce electric power from two fluids, namely, a reducer fluid also referred to as a "fuel", and an oxidant fluid comprising an aqueous multi-electron oxidant (AMO), and release one or more discharge fluids. The oxidant is an element or a compound in a reduction-oxidation reaction that receives one or more electrons from another species or from an electrode. The aqueous multi-electron oxidant (AMO) is an oxidant that, in at least one of its forms such as an acid form, has a high solubility in water, for example, over 0.5 M, and that transfers in a solution-phase redox reaction or in an electrochemical reaction more than 1 mole of electrons per 1 mole of the AMO. The AMO can be present in one or more of a salt form, an acid form, and other forms, and unless specified otherwise, the term "AMO" used herein refers to all these forms. The reducer is an element or a compound in a reduction-oxidation reaction that donates one or more electrons to another species or to an electrode. The methods and the systems disclosed herein use an aqueous multi-electron oxidant selected from oxides and oxoacids of non-metals such as halogens, for example, chlorine, bromine, and iodine in the form of gases, liquids, melts, low melting point solids, liquid solutions or suspensions.

Moreover, the method and the regeneration system disclosed herein regenerate an aqueous multi-electron oxidant in a salt form or other form and a reducer simultaneously from a discharge fluid in a salt form or other form simultaneously, in stoichiometric amounts, without consumption of extra chemicals and without generating chemical waste. As used herein, the term "discharge fluid" refers to an exhaust fluid obtained as a result of an electrochemical discharge process, that is, electric power generation, in a flow battery or in a discharge system. In an embodiment, the regeneration process consumes, for example, electric energy, solar energy, thermal energy, radiolytic energy, or any combination thereof. In another embodiment, the regeneration process comprises one or more of an electrochemical process, photoelectrolysis, photolysis, thermolysis, radiolysis, etc. In another embodiment, the regeneration process is performed via chemical processes. In an embodiment, the method and the regeneration system disclosed herein regenerate a reducer and an aqueous multi-electron oxidant in one or more forms simultaneously and in stoichiometric amounts from a discharge fluid by means of, for example, electrolysis, photoelectrolysis, homogeneous solution phase reaction, disproportionation, pH change, ion exchange, heterogeneous ion exchange such as using resins, homogeneous ion-exchange such as via an orthogonal ion migration across laminar flow (OIMALF) process, and if desired, concentration performed, for example, by evaporation or reverse osmosis. As used herein, the term "laminar flow" refers to a type of fluid flow in which directions and magnitudes of fluid velocity vectors in different points within a fluid do not change randomly in time and in space. Also, as used herein, the term, "migration" refers to a movement of an electrically charged object, such as an ion, due to the action of an external electric field. Disproportionation is a redox reaction in which an element, free or in a compound, is reduced and oxidized in the same reaction to form different products. For example, an element with an oxidation state A, not necessarily A=0, on disproportionation, is distributed between several species with different oxidation states B, C, etc., which differ from the element's initial oxidation state A, so that B>A>C. As used herein, the term "orthogonal" in the phrase "OIMALF", implies that the vectors of the laminar flow velocity and of the electric field are not parallel and not anti-parallel. In an embodiment, the methods and the systems disclosed herein facilitate halogen oxoanion/halide conversion in both directions by means of electrochemical reactions or other reactions and pH-dependent homogeneous reactions. Disclosed herein is also a complete energy cycle comprising a method for generating electric power and a discharge fluid from one or more forms of an aqueous multi-electron oxidant and a reducer using the discharge system, and a regeneration of the aqueous multi-electron oxidant and the reducer from the discharge fluid using the regeneration system and electric or other energy input. In the methods and systems disclosed herein, multi-electron redox couples with high solubilities of reagents and products are used to overcome low energy densities of known flow batteries.

Disclosed herein is a discharge system comprising an oxidant fluid stored in an oxidant fluid tank, a reducer fluid stored in a reducer fluid tank, and a discharge unit. The discharge unit is also referred to as a "flow battery". The oxidant fluid is a chemical or a mixture of chemicals that accepts electrons during a discharge process in a discharge mode of operation of the discharge unit. As used herein, the term "the discharge mode of operation" refers to a process of releasing the chemical energy stored in the discharge system in the form of sustainable electric current and voltage. The acid form of the oxidant fluid comprises one or more forms of an aqueous multi-electron oxidant (AMO), water, other solvents, an extra acid, and a buffer in their acid forms. The other solvent is, for example, a liquid other than water. The AMO is one or a combination of an oxide of an element such as a halogen, an oxoanion of an element such as a halogen, etc. The buffer in the acid form is, for example, one or more of phosphoric acid, a dihydrogen phosphate of lithium, a dihydrogen phosphate of another cation, a substituted phosphonic acid, buffering agents such as Good's buffers, and any combination thereof, capable of maintaining pH of the oxidant fluid at a value, for example, below 4. In an embodiment, the buffer is in acid form during discharge with a pH≤7. The extra acid is a strong acid such as sulfuric acid, triflic acid, another sulfonic acid, halogen oxoacid, halic acid, etc. In an embodiment, the acid form of the AMO serves as the extra acid. The AMO can be pre-mixed with the buffer in the oxidant fluid. In an embodiment, the AMO is an oxide or an oxoacid of an element, for example, nitrogen, xenon, sulfur, etc. In another embodiment, the AMO is selected from a group consisting of a halogen compound such as a halogen oxide, a halogen oxoacid, etc., an interhalogen compound, a nitrogen compound, an oxide of nitrogen, a nitrogen oxoacid, an oxide of xenon, an oxoacid of xenon, an oxide of a chalcogen such as an oxide of sulfur, an oxide of nitrogen or another pnictogen, an oxoacid of nitrogen or another pnictogen, a volatile oxide of an element, a fluid oxide of an element, a soluble oxide of an element, a volatile oxoacid of an element, a fluid oxoacid of an element, a soluble oxoacid of an element, etc., any combination thereof.

The methods and the systems disclosed herein expand the choice of oxidants from one dimensional series of elements into a multidimensional matrix of compounds, and more specifically, into oxides of and oxoacids of a halogen, nitrogen and other pnictogens, sulfur and other chalcogens, and xenon. That is, the methods and the systems disclosed herein expand the one dimensional series of elements such as halogens into a multidimensional matrix of oxocompounds such as oxides and oxoacids. The oxide is a compound containing oxygen and another element. The halogen oxoacid is a compound having a formula $H_pX_qO_r$, where X is one of multiple halogens in particular Cl, Br, and I, O is oxygen, and $1 \le p, q, r \le 6$. In one embodiment, the acid form of the aqueous multi-electron oxidant (AMO) is halogen oxoacid, for example, $HBrO_3$. The reagents, products, and intermediates of the halogen oxoacid reduction are either gases or liquids or are soluble in water. If the reagents and products are anions, their cross over through a cation exchange membrane is minimal. In an embodiment, the oxoacid is a compound having a formula $H_pXO_r$, where X is a halogen (Cl, Br, I), $1 \le p \le 6$, and $1 \le r \le 6$. In an embodiment, the oxoacid is a compound having a formula $HXO_r$, where X is a halogen, for example, Cl, Br, I, and $1 \le r \le 4$.

In an embodiment, the aqueous multi-electron oxidant (AMO) is a nitrogen oxide having a formula $N_xO_n$, where x=1 or 2 and $1 \le n \le 5$. In another embodiment, the AMO is a nitrogen oxoacid having a formula $H_kN_lO_m$, where $1 \le k$, l, $m \le 3$. In another embodiment, the nitrogen oxoacid is a compound having a formula $HNO_n$, where $1 \le n \le 3$. In an embodiment, the oxoacid is a compound having a formula $H_pX_qO_r$, where X is one of multiple halogens, nitrogen, other pnictogens, chalcogens, xenon, or other element, and where $1 \le p, q, r \le 6$. In an embodiment, the acid form of the AMO is chloric acid which forms an aqueous room temperature solution, for example, up to about 40% w/w. In an embodiment, the acid form of the AMO is bromic acid which forms an aqueous room temperature solution, for example, up to about 55% w/w. In another embodiment, the acid form of the AMO is iodic acid which forms an aqueous room temperature solution, for example, up to about 74% w/w. In another embodiment, the acid form of the AMO is perchloric acid which forms an atmospheric aqueous azeotrope, for example, about 72.5% w/w. In another embodiment, the AMO is nitric acid which forms an atmospheric aqueous azeotrope with, for example, about 68.4% w/w. Halogen oxoacids allow for energy-efficient and waste-free routes to their regeneration from the discharge fluid.

The reducer fluid, also referred herein as a "fuel", is a chemical that donates electrons during the discharge process. The reducer is, for example, hydrogen. In an embodiment, the reducer is selected from a group consisting of ammonia, hydrazine, hydroxylamine, phosphine, methane, a hydrocarbon, an alcohol such as methanol, ethanol, etc., an aldehyde, a carbohydrate, a hydride, an oxide, a sulfide, another organic and inorganic compound, or any combination thereof, with each other, with water, or with another solvent. A hydrogen reducer is used herein because the hydrogen reducer can be regenerated from the discharge fluid along with the aqueous multi-electron oxidant (AMO) with a high efficiency and without irreversible consumption of other chemical and without generating chemical waste.

The discharge unit of the discharge system comprises a stack of multiple electrolytic cells also referred to as an "electrolytic cell stack". Each electrolytic cell comprises a 5-layer electrolyte-electrode assembly and half of a bipolar plate/1 endplate. The 5-layer electrolyte-electrode assembly is flanked on each side by a bipolar plate or an endplate. The 5-layer electrolyte-electrode assembly comprises a 3-layer electrolyte-electrode assembly flanked by a negative diffusion layer on the negative electrode side and a positive diffusion layer on the positive electrode side. The 3-layer electrolyte-electrode assembly comprises an electrolyte layer interposed between or flanked by a positive electrode layer and a negative electrode layer. The 3-layer electrolyte-electrode assembly and/or the 5-layer electrolyte-electrode assembly are herein referred to as an "electrolyte-electrode assembly".

In an embodiment, the electrolytic cell stack is configured as a planar cell stack comprising planar electrolytic cells. The planar electrolytic cells in the planar cell stack are connected electrically in series so that the voltage of the electrolytic cell stack is the sum of the voltages of the electrolytic cells. Each planar electrolytic cell shares one bipolar plate with an adjacent planar electrolytic cell. One side of a bipolar plate contacts a positive side of one planar electrolytic cell and another side of the bipolar plate contacts a negative side of the adjacent planar electrolytic cell. The bipolar plates and the endplates are equipped with channels for delivering reagents, that is, the oxidant fluid and the reducer fluid to the electrolyte-electrode assemblies in the electrolytic cell stack and for removing the products, that is, one or more discharge fluids. The planar cell stack is further flanked by a pair of endplates. The endplates are further equipped with ports for the oxidant fluid, the reducer fluid, and the discharge fluid, and electric connections.

In an embodiment, the electrolyte layer of the electrolyte-electrode assembly is composed of a material capable of ionic conduction, for example, protonic conduction but not electronic conduction. In another embodiment, the electrolyte layer of the electrolyte-electrode assembly is composed of an ionomer, a solid ion conductor, a solid proton conductor, or a liquid under laminar flow. The electrolyte is compatible with water, the aqueous multi-electron oxidant (AMO), the reducer, and the products. In another embodiment, the electrolyte layer of the electrolyte-electrode assembly is composed of a material comprising a chemical moiety selected from a group consisting of one or more proton donor moiety or proton acceptor moiety. In an embodiment, the electrolyte material is a cation-conductive polymer, for example, a polyperfluorosulfonic acid such as Nafion® of E. I. du Pont de Nemours and Company Corporation, Hyflon Ion of Ausimont S.R.L. Corporation, Aciplex® of Asaki Kasei, Flemion® of AsahiGlass, Aquivion® of Solvay-Solexis, etc. In another embodiment, the electrolyte layer in the electrolyte-electrode assembly is made of a composite material such as Gore-Select® of W. L. Gore and Associates, Inc., or of an ionically conducting liquid retained in the pores of a solid matrix. In another embodiment, the electrolyte layer of the electrolyte-electrode assembly comprises a material with a cationic conduction exceeding an anionic conduction of the material. Such cation-selective conductivity of the electrolyte is beneficial for both discharge and regeneration systems since electrolyte reduces the crossover of the AMO and of its reduction products and intermediates to the negative electrode.

In the discharge unit, during the discharge mode of operation, the positive electrodes of the electrolyte-electrode assemblies are supplied with the oxidant fluid containing one or more forms of the aqueous multi-electron oxidant and the negative electrodes of the electrolyte-electrode assemblies are supplied with the reducer fluid containing the reducer during the discharge mode of operation. The bipolar plate provides an electron pathway from one electrolytic cell in the electrolytic cell stack to the next electrolytic cell. The bipolar plates also supply reactants to the 5-layer electrolyte-electrode assemblies and remove the products. The endplates flank the electrolytic cell stack. The inner sides of the endplates operate in a manner similar to the bipolar plates. The endplates comprise inlet ports for adding reagents, outlet ports for removing products, and electric connections to an external electric circuit. The endplates provide electric connections and flow connections from the electrolytic cell stack to the other components of the discharge system.

During the discharge mode of operation, the reagents, that is, the oxidant fluid and the reducer fluid in the discharge system are converted into products to produce electric current through the electrolytic cell stack and through the external electric circuit. More specifically, the reagents in the oxidant fluid and in the reducer fluid are converted into products to produce an electric current through the external circuit and through the bipolar plates and an ionic current through the electrolyte layers. The oxidant fluid and the reducer fluid are supplied from their respective tanks which are periodically filled from an external source, for example, the regeneration system. The discharge system disclosed herein operates with an external electric circuit operably connected to the electrolytic cell stack of the discharge unit. During the discharge mode of operation, the external electric circuit comprising, for example, an electric engine connected to the discharge unit consumes the electric power generated by the discharge unit. In the discharge unit, the reducer is configured to donate the electrons to the negative electrodes, and the aqueous multi-electron oxidant (AMO) is configured to accept the electrons at the positive electrodes for producing an electric current in the external electric circuit that connects the positive endplate and the negative endplate, and for simultaneously producing an ionic current through the electrolyte layer of an electrolytic cell or the electrolyte layers of the electrolytic cells of the electrolytic cell stack of the discharge unit. In an embodiment, a solution-phase reaction facilitates one or more discharge reactions on the positive electrode of the electrolyte-electrode assembly. In an embodiment, the solution-phase reaction disclosed herein is, for example, a pH-dependent solution-phase comproportionation, a solution-phase redox mediated catalysis, etc. As used herein, the term "comproportionation" is a redox reaction in which an element, free or in compounds, with oxidation states A and C, is converted into another substance or substances in which the element's oxidation states are B, such that A>B>C. In an embodiment, the rate of the solution-phase comproportionation depends on the pH of the solution.

The power generation in the discharge unit may benefit from a catalyst, a redox mediator, etc., for facilitating a charge transfer between the electrodes of the electrolyte-electrode assembly and the aqueous multi-electron oxidant (AMO) and the reducer. In an embodiment, a halide mediator, for example, a bromide mediator or a chloride mediator facilitates one or more discharge reactions on the positive electrode of the electrolyte-electrode assembly. For example, a redox mediator such as a halogen/halide couple facilitates a charge transfer between the positive electrode of the electrolyte-electrode assembly and the AMO. In another embodiment, multiple immobilized heterogeneous mediators, immobilized heterogeneous catalysts, homogeneous mediators, or homogeneous catalysts facilitate a charge transfer between the positive electrode of the electrolyte-electrode assembly and the AMO. In another embodiment, a catalyst selected from a group consisting of a homogeneous catalyst, a heterogeneous catalyst, a redox mediator catalyst, or any combination thereof, facilitates one or more discharge reactions on the positive electrode of the electrolyte-electrode assembly. In another embodiment, one or more forms of a redox mediator, a product of an electrode reaction, an acid, or any combination thereof accelerates a rate of discharge of the AMO during one or more discharge reactions via a solution-phase reaction. In an embodiment, a product of the discharge reaction facilitates the discharge reaction via comproportionation. In another embodiment, a catalyst, for example, ruthenium dioxide ($RuO_2$), lead dioxide ($PbO_2$), or a platinoid electrocatalyst facilitates one or more electrochemical reactions on the positive electrode of the electrolyte-electrode assembly. In another embodiment, a platinoid electrocatalyst facilitates one or more electrochemical reactions on the negative electrode of the electrolyte-electrode assembly. The discharge system stores the energy in reducer and oxidant fluid tanks or containers and produces electric power on demand using the discharge unit, for stationary, mobile, and portable devices that require electrical power.

In an embodiment, the discharge unit disclosed herein operates in a regenerative mode or electric recharge mode or as a secondary flow battery. In the regenerative mode of operation, one or more of reagents and intermediates are regenerated within the discharge unit, by applying a voltage of the polarity opposite to the polarity observed during the discharge mode of operation to the terminals of the external electric circuit. For example, an intermediate such as bromine can be regenerated from bromide present in the discharge fluid using the discharge unit, if the discharge unit is operated under reverse polarity.

Also, disclosed herein is a regeneration system configured to regenerate one or more forms of the oxidant fluid and the reducer in stoichiometric amounts from the discharge fluid produced by the discharge unit using electric power. The regeneration system comprises, for example, an electrolysis-disproportionation (ED) reactor, storage tanks such as a regenerated oxidant fluid tank and a regenerated reducer fluid tank for storing the regenerated oxidant fluid and the regenerated reducer fluid respectively, optionally a neutralization reactor, for example, an ion exchange reactor such as an orthogonal ion migration across laminar flow (OIMALF) reactor, one or more separation reactors, and a concentrating reactor. In an embodiment, the neutralization reactor comprises a mixing reactor. In an embodiment, the regeneration system is configured for a batch mode of operation. In another embodiment, the regeneration system is configured for a flow mode of operation. In another embodiment, the regeneration system is configured for a cyclic flow mode of operation. In another embodiment, the ED reactor is configured for a cascade flow mode of operation and comprises a stack of regeneration flow cells. The ED reactor performs either electrolysis or electrolysis and a solution phase reaction, for example, disproportionation, in one or more sub-reactors. The sub-reactors are also referred herein as individual cells of a stack or regeneration flow cells or cells. The separation reactors of the regeneration system are gas-liquid separators and are used to separate gases from the liquids during a regeneration process.

In an embodiment, the electrolysis-disproportionation (ED) reactor comprises, for example, an electrolysis unit or an electrolyzer and a disproportionation unit. In another embodiment, both electrolysis and disproportionation are performed within a single ED flow cell which does not comprise separable electrolysis and disproportionation units. Various configurations of the ED reactor can be operated in a batch mode, a cascade flow mode, a cyclic flow mode, and any combination thereof. In an embodiment, the configuration of the ED reactor is similar to that of a polymer membrane fuel cell stack with a modification of a graded catalytic layer on the negative electrode which prevents the electroreduction of relevant forms of the aqueous multi-electron oxidant (AMO) while allowing for the hydrogen evolution reaction and alkalization to proceed and to the electrolytic cell or of the electrolytic cell stack of the discharge unit. The ED reactor comprises a number of flow cells connected, for example, electrically in series and flow-wise in parallel. Such stack-type ED reactor can be operated in a cyclic flow mode, a cascade flow mode, a batch mode, and any combination thereof. The ED reactor can be further configured for an AMO-on-negative electrode mode of operation, also referred to as an "AMO-on-negative mode of operation", wherein the negative electrode comprises a multilayer or a graded catalytic layer configured to prevent the electroreduction of relevant forms of the AMO while allowing for the hydrogen evolution reaction and alkalization to proceed, or for a no-AMO-on-negative electrode mode of operation, also referred to as a "no-AMO-on-negative mode of operation", wherein the base produced on the negative electrode is mixed with one or more forms of oxidant fluid or discharge fluid without bringing the AMO in contact with the negative electrode.

In an electrolysis-disproportionation (ED) reactor configured for the aqueous multi-electron oxidant (AMO)-on-negative mode of operation in the cascade flow mode of operation, one or a mixture of a regenerated solution and the discharge fluid passes through a cascade or a series or stack of electrolysis-disproportionation (ED) reactors, that is, through the negative electrode of the first cell with a graded catalytic layer to allow for the hydrogen evolution reaction and the buffer alkalization to proceed while suppressing the electroreduction of all forms of the AMO, to the separator that removes $H_2$ from the regenerated fluid, to the positive electrode of the first cell, wherein the process of electrolysis-disproportionation leading to one or more forms of the AMO takes place, then to the negative electrode of the second cell, then to the positive electrode of the second cell, and so on. The reducer and the base generated at the negative electrode of each of the ED reactors are separated in the separation reactor, where the base is returned into the mixing reactor preceding this ED reactor and the reducer is collected in a reducer container.

In the cyclic flow mode, as few as one regeneration flow cell can be used with an alternating flow between the negative and positive electrodes through the valves while releasing the produced $H_2$ or other fuel through the separator. In another embodiment, referred herein as an aqueous multi-electron oxidant (AMO)-on-negative mode of operation, the problem of aqueous multi-electron oxidant (AMO) reduction on the negative electrode or electrodes in the electrolysis-disproportionation (ED) reactor is avoided by generating a base solution by passing a fluid such as pure water free of the AMO through the negative electrode. In this case, the base formed at the negative electrode via $H_2O+e^-+M^+=\frac{1}{2}H_2+MOH$, where M is a cation, for example, Li, is mixed in one or more mixing reactors with the fluid produced at the positive electrode allowing the disproportionation to occur. This process can be performed in a batch mode of operation, a cascade flow mode of operation, and a cyclic flow mode of operation. This process avoids the possibility of AMO reduction on the negative electrode but requires removal of the excess water from the regenerated AMO. The water is dragged though the membrane along with $M^+$ from the positive electrode to the negative electrode and causes the dilution of the stock AMO solution such as $LiBrO_3$ solution. The water removal process can be performed by evaporation, reverse osmosis, and other methods. In an embodiment, the water removal process is performed in a concentrating reactor.

In the cyclic flow mode, a regenerated solution or the discharge fluid is cycled between the mixing reactor and the electrolysis-disproportionation (ED) reactor until the desired degree of conversion is achieved. An ED reactor configured for the cyclic flow mode has a lower capital cost but requires a longer regeneration time. The ED reactor(s) configured for the cascade flow mode has a higher capital cost but is capable of a faster regeneration. Multiple combinations of cyclic and cascade flow modes are implemented for a hardware combination that involves more than one series of neutralization reactors, ED reactors, and separation reactors of one series connected to the neutralization reactor of the same or the next series. The concentrating reactor concentrates a solution of the aqueous multi-electron oxidant (AMO) in a salt form or other forms to remove water or other solvents from a dilute fluid that enters the concentrating reactor and releases a concentrated fluid and water or another solvent.

Also, disclosed herein is a method for producing electric power from the reducer and the oxidant fluid comprising the aqueous multi-electron oxidant (AMO) and for simultaneously generating the discharge fluid. The method disclosed herein provides the discharge system comprising the oxidant fluid, the reducer fluid, and the discharge unit. The method for producing electric power facilitates electrochemical reactions in the discharge unit. Discharge occurs by transferring electrons, either directly or via a mediator, from the positive electrode of the 5-layer electrolyte-electrode assembly to the AMO and from the reducer to the negative electrode of the 5-layer electrolyte-electrode assembly to produce electric power, that is, a sustainable electric current and a sustainable electric voltage in the external electric circuit connected to the terminals of the discharge unit accompanied by electric current of ions through the electrolyte layer by electrochemical reactions on the electrodes. The discharge is facilitated on the positive electrode of the 5-layer electrolyte-electrode assembly, for example, by one or more of an electron transfer, electrolysis, electrocatalysis, a solution-phase chemical reaction, a solution-phase comproportionation, a solution-phase redox catalysis, an acid-base catalysis, lowering the solution pH, and any combination thereof.

The discharge unit consumes the aqueous multi-electron oxidant (AMO) and the reducer to produce electric power and to generate the discharge fluid. The discharge fluid comprises, for example, one or more of water, one or more forms of the buffer, a halogen, one or more halogen oxoanions, hydrogen ions, halide ions, a halogen oxoacid, a salt of halogen oxoacid, an extra acid, a counter cation, or any combination thereof. Since the discharge fluid coming out of the discharge unit is not water or not only water, the discharge fluid is not disposed into the surrounding environment but collected in a discharge container to be regenerated later into the reducer fluid and an oxidant fluid comprising the AMO. In an embodiment, a certain amount of intermediate oxidant is regenerated on the positive electrode in the discharge unit, for example, $Br^- - 1e = \frac{1}{2} Br_2$ from the discharge fluid by reversing a polarity of an electric current flowing through the discharge unit during discharge of the discharge unit. This process is useful for regenerative breaking.

Also, disclosed herein is a method for regenerating the aqueous multi-electron oxidant (AMO) and the reducer in stoichiometric amounts from the discharge fluid using an external energy source. The method disclosed herein reuses all the required chemicals in the complete discharge-regeneration cycle, does not consume stoichiometric amounts of external chemicals, and does not generate stoichiometric amounts of chemical waste. The regeneration system is capable of performing the required electrochemical and chemical reactions for the conversion of the discharge fluid from the discharge unit back into the oxidant fluid and the reducer fluid. The regeneration system neutralizes, if necessary, the discharge fluid with an excess of a base form of a buffer in the neutralization reactor to produce a solution of a salt form of the discharge fluid. The regeneration system performs decomposition of one or more forms of the discharge fluid comprising, for example, water and bromide anion, into a reducer such as $H_2$ and an intermediate oxidant such as $Br_2$. The decomposition can be performed by means of one or more of the following: electrolysis, photoelectrolysis, photolysis, thermolysis, radiolysis, etc. In an embodiment, the regeneration system electrolyzes one or more forms of the discharge fluid comprising, for example, bromide, yielding an intermediate oxidant such as bromine at a positive electrode in the electrolysis-disproportionation (ED) reactor. The decomposition process also releases the reducer such as $H_2$ and a base such as hydroxide MOH of the buffer's cation $M^+$ or the basic form of the buffer, for example, $M_2HPO_4$. In the case where the decomposition is by electrolysis, the reducer and the base are released at the negative electrode of the ED reactor. The reducer and the base are separated in the separation reactor. In the no-AMO-on-negative mode of operation, the base is sent to the first mixing reactor or the neutralization reactor to neutralize the incoming discharge fluid to produce an alkaline discharge fluid. At the positive electrode of the ED reactor, the electrolysis process releases an intermediate oxidant, such as $Br_2$, which reacts with the excess of the base to produce the salt form of the AMO such as $MBrO_3$. The conversion of the intermediate oxidant, for example, bromine into the original aqueous multi-electron oxidant (AMO) in the salt form such as bromate at the positive electrode of the ED reactor can be facilitated not only by disproportionation but also by a mediated oxidation using a solution phase mediator such as a chlorine/chloride couple, or electrocatalysts such as those comprising one or more of the following: lead dioxide, ruthenium dioxide, dimensionally stable anode materials, perovskites, graphite, glassy carbon, conductive diamond, other carbonaceous materials, etc. All these methods of facilitation can be used together.

The aqueous multi-electron oxidant (AMO) is regenerated via an electron transfer at the positive electrode followed by disproportionation of the intermediate oxidant and the reducer is regenerated via an electron transfer at the negative electrode of the electrolysis-disproportionation (ED) reactor. The buffer maintains the pH of the discharge fluid in the optimal range, for example, between pH 7 and 9 for disproportionation. The base component of the buffer is selected, for example, from a group comprising hydroxide, hydrogen phosphate, one or more forms of one or more of Good's buffers, an amine, a tertiary amine, a nitrogen heterocycle, a substituted phosphonate, and any combination thereof. The cation component of the buffer, if necessary, is selected, for example, from a group comprising lithium, sodium, other alkali metal cations, alkali earth metal cations, other inorganic cations, organic cations, etc.

In an embodiment, the oxidant fluid produced in the regeneration system, for example, comprising $LiBrO_3$, is further concentrated via the removal of water within the regeneration system to produce oxidant fluid for future use in the discharge system. The removal of water from the ionic components of the oxidant fluid, also referred herein as concentrating, is performed by one or a combination of the following: evaporation, pervaporation, reverse osmosis, dialysis, and other methods known in the art.

In an embodiment, the regeneration of the aqueous multi-electron oxidant (AMO) and/or the reducer is facilitated, for example, by an electrocatalyst, a solution-phase redox mediator, a pH-dependent solution-phase disproportionation, etc., or any combination thereof. The conversion of the salt form of the AMO into the acid form of the AMO in the acidification reactor, also referred herein as the "ion exchange reactor" is facilitated by an acid, a buffer, hydrogen electrooxidation, other proton-releasing electrooxidation, electrochemical hydrogen evolution, ion-exchange on solids, ion exchange in solution, orthogonal ion migration across laminar flow, or any combination thereof.

In an embodiment, a mediator such as chlorine facilitates regeneration of the aqueous multi-electron oxidant (AMO) from one or more forms of discharge fluid in the electrolysis-disproportionation (ED) reactor. The ED reactor or the ED reactors are configured to operate in one of multiple modes comprising, for example, a batch mode, a single pass mode, a cyclic flow mode, and a combination thereof. If an orthogonal ion migration across laminar flow (OIMALF) reactor is used as ion exchange reactor or as an acidification-neutralization reactor, the regeneration system is configured to support the operation of the OIMALF reactor in a flow through mode, for example, using additional storage tanks. An OIMALF reactor can work simultaneously as one or more OIMALF reactors are operated in a single pass flow-through mode or a cyclic flow-through mode but not in the batch mode, although an OIMALF reactor working in one of the flow modes can be used in combination with an ED reactor working in a batch mode.

In other embodiments, one or more forms of the aqueous multi-electron oxidant (AMO) and/or the reducer are regenerated, for example, using electrolysis, an ion exchange on solids, an ion exchange in a liquid, ion exchange in the discharge fluid or in an intermediate regenerated solution, pH-dependent solution-phase disproportionation, or any combination thereof. Ion exchange in a liquid such as water with a dissolved salt form of the AMO and the dissolved salt form of the buffer is performed, for example, by an electric field driven orthogonal ion migration across laminar flow (OIMALF) process which is substantially similar to eluent suppression in anion chromatography. The ion exchange process occurs before and/or after and outside of any series of the neutralization-electrolysis-disproportionation loops. The regeneration of the AMO from the discharge fluid or from the intermediate regenerated solution comprises neutralizing an acid of the discharge fluid or the intermediate regenerated solution with a base to obtain an alkaline discharge fluid. The required base is produced, for example, at the negative electrode(s) of one or many electrolysis-disproportionation (ED) reactors. The regeneration system then converts the alkaline discharge fluid to the neutral oxidant fluid, that is, a liquid comprising water, the AMO, and one or more forms of the buffer, for example, via electrolysis, pH dependent solution phase disproportionation and orthogonal ion migration across laminar flow processes.

The reducer, for example, hydrogen, is co-produced in a stoichiometric amount with one or more forms of the aqueous multi-electron oxidant (AMO) in the electrolysis-disproportionation (ED) reactor. The conversion of the salt form of the AMO into the acid form of the AMO is performed using an acidification reactor such as the ion exchange reactor. If the ion exchange reactor is, for example, an orthogonal ion migration across laminar flow (OIMALF) reactor, the conversion comprises consuming electric power and recycling the hydrogen released on one or more negative electrodes of the OIMALF reactor and electro-oxidized on one or more positive electrodes of the OIMALF reactor. In an embodiment, the hydrogen produced in an ED reactor is flown through the flow field of the positive electrode of one or many OIMALF reactors and combined with the hydrogen produced at a negative electrode of one or many OIMALF reactors either before or after one or many OIMALF reactors. The regeneration of the reducer and the oxidant fluid by the ED-OIMALF method occurs by using an external electric energy input and without consumption or generation of external chemicals. Also, disclosed herein is the use of the pH-dependence of the spontaneous homogeneous disproportionation of a halogen and comproportionation of a halide and a halogen oxoanion in order to facilitate the electrode reactions on the positive electrodes during regeneration and discharge. The method disclosed herein facilitates the forward and reverse halogen oxoanion/halide conversion and other redox processes involving oxoanions via pH-dependent homogeneous reactions.

Also, disclosed herein is an embodiment of the discharge system comprising one or more forms of an oxidant fluid comprising one or more forms of an aqueous multi-electron oxidant (AMO), for example, an aqueous solution comprising $LiBrO_3$, stored in an oxidant fluid tank, one or more forms of a reducer fluid comprising one or more forms of a reducer such as hydrogen stored in a reducer fluid tank, an acidification reactor, optionally a neutralization reactor, a discharge unit, and a discharge fluid tank to collect the discharge fluid for future regeneration or disposal. In an embodiment, the acidification reactor and the neutralization reactor are functionally combined as an orthogonal ion migration across laminar flow (OIMALF) reactor. In another embodiment, the neutralization reactor is integrated with the acidification reactor into the OIMALF reactor. In another embodiment, the neutralization reactor is an OIMALF reactor. In this embodiment, the acidification process, for example, an ion exchange process is performed on-board in the discharge system rather than off-board, in order to improve the stability and safety of the systems disclosed herein. The discharge system disclosed herein is configured to operate in an electric partial recharge mode for facilitating regenerative breaking when the discharge system powers an electric vehicle. During the partial recharge mode, the reducer is produced on the negative electrode of the electrolyte-electrode assembly and an intermediate oxidant is produced on the positive electrode of the electrolyte-electrode assembly.

In the embodiment of the discharge system with improved safety, a neutral oxidant fluid comprising, for example, $LiBrO_3$ is stored in the oxidant fluid tank. The discharge system initially converts the aqueous multi-electron oxidant (AMO) in the salt form such as $LiBrO_3$ in the neutral oxidant fluid into the AMO in the acid form such as $HBrO_3$, found in the acidic oxidant fluid, using the acidification reactor. In an embodiment, the conversion of the salt form of the AMO into the acid form of the AMO is performed via an ion exchange process. The ion exchange process can be performed via a multiphase flow process, for example, based on ion-exchange resins or via a single-phase flow process such as an electric field driven orthogonal ion migration across laminar flow (OIMALF) process in the OIMALF reactor. In the case where the acidification reactor is an OIMALF reactor, the acidification of the oxidant fluid is accompanied by a simultaneous neutralization of the acidic discharge fluid while recycling the reducer such as $H_2$ produced at one or more negative electrodes of the OIMALF reactor and consumed at one or more positive electrodes of the OIMALF reactor. The OIMALF process is substantially similar to eluent suppression of ion chromatography. The OIMALF reactor converts the neutral oxidant fluid into an acidic oxidant and an acidic discharge fluid into a neutral discharge fluid simultaneously.

The orthogonal ion migration across laminar flow (OIMALF) reactor comprises an OIMALF cell stack which is configured similar to a polymer electrolyte fuel cell (PEFC) stack but with a liquid electrolyte flowing between two ionically conducting membranes. Only the outer sides, which are not in contact with the flowing liquid, of the membranes are coated with catalytic layers. The OIMALF reactor comprises flow cell assemblies, endplates, and bipolar plates. Each flow cell assembly of the OIMALF reactor comprises a couple of ion exchange membranes, an intermembrane flow field, a positive electrode layer and a negative electrode layer, and two porous diffusion layers. The ion exchange membranes are coated with a catalytic layer only on their outer sides which are not in contact with fluids comprising the aqueous multi-electron oxidant (AMO). The intermembrane flow field is interposed between the ion exchange membranes and comprises multiple flow channels. The positive electrode layer and the negative electrode layer flank outer surfaces of the ion exchange membranes. The two porous diffusion layers flank the outer surfaces of the ion exchange membranes and are in an electric contact with the adjacent bipolar plates or endplates. The ion exchange membranes comprise a positive side ion exchange membrane and a negative side ion exchange membrane positioned parallel to each other. The positive electrode layer is configured for hydrogen oxidation reaction and the negative electrode layer is configured for hydrogen evolution reaction. Further variations of the electrode layers, for example, additional macro-porous and micro-porous layers are possible and known in the art of hydrogen polymer electrolyte fuel cell anodes and hydrogen polymer electrolyte water electrolyzer cathodes.

The acidic oxidant fluid comprises one or more of water, one or more forms of the aqueous multi-electron oxidant (AMO), for example, an acid or a salt form or as a combination thereof, an extra acid, and one or more of multiple counter cations. The AMO comprises one or a combination of halogens, halogen oxides, halogen oxoanions, and salts and acids of the halogen oxoanions. The halogen oxoanions comprise, for example, one or more of hypochlorite, chlorite, chlorate, perchlorate, hypobromite, bromite, perbromate, hypoiodite, iodite, iodate, and periodate. In an embodiment, the halogen oxoanion is bromate. The counter cations comprise, for example, alkali metal cations, alkali earth metal cations, and organic cations. In an embodiment, one of the counter cations is lithium. In another embodiment, one of the counter cations is sodium. A buffer may be present in the oxidant fluid if the buffer is carried over from the regeneration process. In an embodiment, the buffer functions as the extra acid. The buffer is in one of its forms, for example, one or more of monohydrogen phosphate, a 3-(N-morpholino)propanesulfonate, a 3-(N-morpholino)ethanesulfonate, a substituted phosphonate, an amine, a tertiary amine, a nitrogen heterocycle, other base with an acid dissociation constant pKa between, for example, 6 and 9. The extra acid is, for example, one or more of a phosphoric acid, a 3-(N-morpholino)propanesulfonic acid, a 3-(N-morpholino)ethanesulfonic acid, a methanesulfonic acid, a triflic acid, a substituted sulfonic acid, a substituted phosphonic acid, a perchloric acid, a sulfuric acid, a molecule comprising sulfonic moieties and phosphonic moieties, and an acid with a pKa<2. The AMO in one or several forms can be pre-mixed with one or several components of the buffer in the oxidant fluid in the storage tank, in the acidification reactor or in both. In an embodiment, the AMO is selected from a group consisting of a halogen compound such as a halogen oxide, a halogen oxoacid, a water-soluble salt of halogen oxoacid, and any combination thereof. The AMO can be stored on-board and off-board in the acid or in one or more salt forms on in a combination thereof. The salt forms of the AMO are considered over the acid form due their better stabilities, provided that they have high solubilities.

In an embodiment, the discharge system also performs complete or partial conversion of a stable form of the aqueous multi-electron oxidant (AMO), such as $LiBrO_3$, into an active form of the AMO, such as $HBrO_3$, using one or more disclosed acidification processes, for example, one or any combination of the following: addition of a stored acid, ion exchange on resins, and the orthogonal ion migration across laminar flow (OIMALF). The acidification process is performed either in a dedicated acidification reactor, which can be an OIMALF reactor, or in a suitably modified other reactor, such as the discharge unit itself or in both. In an embodiment, the discharge system also performs complete or partial conversion of the discharged fluid, such as one containing HBr or another acid, into a less corrosive form, such as LiBr, using one or more disclosed neutralization processes, such addition of a stored base or/and an OIMALF process. The neutralization process is performed in a dedicated reactor such as a neutralization reactor, which can be an OIMALF reactor, or in a suitably modified other reactor, such as discharge unit. In an embodiment, the neutralization reactor comprises a mixing reactor.

Also, disclosed herein is an embodiment of the method for producing electric power from an aqueous multi-electron oxidant (AMO) and a reducer and for simultaneously generating a discharge fluid. The method disclosed herein provides the discharge system comprising one or more forms of a reducer fluid, one or more forms of an oxidant fluid, a discharge unit, and an acidification reactor. The method disclosed herein facilitates discharge of the discharge unit for producing electric power from a neutral oxidant fluid comprising one or more forms of the aqueous multi-electron oxidant, and from the reducer fluid comprising one or more forms of the reducer. The facilitation of the discharge comprises: lowering pH of the neutral oxidant fluid in the acidification reactor for generating an acidic oxidant fluid; transferring electrons from the positive electrode of the electrolyte-electrode assembly to the aqueous multi-electron oxidant in the acidic oxidant fluid; and transferring electrons from the reducer fluid to the negative electrode of the electrolyte-electrode assembly to produce electric power in the external electric circuit operably connected to the terminals of the discharge unit and to generate an acidic discharge fluid on consumption of the acidic oxidant fluid and the reducer fluid. The transfer of the electrons from the positive electrode of the electrolyte-electrode assembly to the aqueous multi-electron oxidant in the acidic oxidant fluid is performed at a high current density and at low flow rates in an ignition mode of operation of the discharge system. A limiting current of the transfer of the electrons from the positive electrode of the electrolyte-electrode assembly to the aqueous multi-electron oxidant in the acidic oxidant fluid in an ignition regime is limited, for example, by a mass-transport of the aqueous multi-electron oxidant, a mass-transport of acidic protons, and a rate of comproportionation. The acidic discharge fluid comprises, for example, one or more of water, a halide, a hydroxonium cation, an extra acid, and one or more counter cations. In an embodiment, the stability of the acidic oxidant fluid is maintained by performing an ignition regime in the discharge system at low acid concentrations in the acidic oxidant fluid. In an embodiment, the method disclosed herein further comprises optionally neutralizing the acidic discharge fluid in the neutralization reactor of the discharge system to produce a neutral discharge fluid. The concentration of one or more forms of the aqueous multi-electron oxidant in the neutral oxidant fluid or the acidic oxidant fluid supplied to the discharge unit is, for example, above 1M, 2M, 5M, or 10M. The concentration of acidic protons in the acidic oxidant fluid supplied to the discharge unit is, for example, below 0.1M, 0.5M, 1M, 2M, 5M, or 10M. The concentration of acidic protons in the acidic oxidant fluid stored in the discharge system is, for example, below 0.1M, 0.5M, 1M, 2M, or 5M. In an embodiment, the method disclosed herein further comprises regenerating a certain amount of an intermediate oxidant and the reducer in the discharge unit from the acidic discharge fluid by applying an electric current of a polarity opposite to a polarity of electric current through the discharge unit during discharge.

In an embodiment, the generation of the acidic oxidant fluid from the neutral oxidant fluid is performed in the acidification reactor via an electric field driven orthogonal ion migration across laminar flow (OIMALF) process. In another embodiment, the generation of the acidic oxidant fluid from the neutral oxidant fluid is performed, for example, by one or more of an ion exchange on solids, an ion exchange in liquids, electrolysis, and adding an extra acid to the neutral oxidant fluid during discharge of the discharge unit. In an embodiment, the discharge is facilitated on the positive electrode of the electrolyte-electrode assembly, for example, by one or more of electrocatalysis, a solution-phase chemical reaction, a solution-phase comproportionation, a solution-phase redox catalysis, a solution-phase redox mediator, an acid-base catalysis, and any combination thereof. In another embodiment, the discharge process is facilitated via a solution-phase comproportionation of the aqueous multi-electron oxidant with a final product of a reduction of the aqueous multi-electron oxidant. In an embodiment, the solution-phase comproportionation is pH-dependent and the discharge is facilitated in the presence of an acid.

Also, disclosed herein is an embodiment of the regeneration system comprising a splitting-disproportionation (SD) reactor, a concentrating reactor, multiple separation reactors, and storage tanks such as a regenerated oxidant fluid tank, a regenerated reducer fluid tank, a discharge fluid tank, and a water tank. In an embodiment, the SD reactor is configured as an electrolysis-disproportionation (ED) reactor comprising sub-reactors, for example, an electrolysis unit or an electrolyzer and a disproportionation unit. In an embodiment, the SD reactor is configured for an aqueous multi-electron oxidant (AMO)-on-negative mode of operation using a multilayer structure on a negative electrode side of the SD reactor. The multilayer structure on the negative electrode side of the SD reactor minimizes reduction of a regenerated AMO in a regenerated oxidant fluid on the negative electrode side while facilitating hydrogen evolution and an increase in pH of the regenerated oxidant fluid. In another embodiment, the SD reactor is configured for the no-AMO-on-negative mode of operation by transferring a base produced on one or more negative electrodes of the SD reactor to a regenerated oxidant fluid produced at one or more positive electrodes of the SD reactor and comprising one or more forms of the AMO and the intermediate oxidant. The SD reactor is configured to operate in multiple modes, for example, a batch mode, a cycle flow mode, a cascade flow mode, and any combination thereof.

The splitting-disproportionation (SD) reactor splits the alkaline discharge fluid into a reducer and an intermediate oxidant. The SD reactor converts the intermediate oxidant produced in the SD reactor into one or more forms of the aqueous multi-electron oxidant via disproportionation of the intermediate oxidant with the base. The splitting process releases a stoichiometric amount of the reducer and the base in the SD reactor. The SD reactor optimizes and stabilizes the pH of the alkaline discharge fluid using a buffer present in one or more forms of the discharge fluid to facilitate disproportionation of the intermediate oxidant into one or more forms of the aqueous multi-electron oxidant. The SD reactor continues the splitting and disproportionation processes in a batch mode of operation, a cyclic flow mode of operation, a cascade flow mode of operation, or a combination thereof, until a desired degree of conversion of a discharge product of the aqueous multi-electron oxidant into one or more forms of the aqueous multi-electron oxidant is achieved. The SD reactor splits one or more forms of the alkaline discharge fluid into the reducer and the intermediate oxidant, for example, via electrolysis, photolysis, photoelectrolysis, radiolysis, thermolysis, or any combination thereof. The process of photolysis and photoelectrolysis of the alkaline discharge fluid is performed in the presence or absence of a light adsorbing facilitator, a semiconductor, a catalyst, and any combination thereof.

In an embodiment, the splitting-disproportionation reactor is configured as an electrolysis-disproportionation (ED) reactor. The ED reactor converts a neutral discharge fluid into an alkaline discharge fluid by using an externally supplied base and/or a base produced at one or more negative electrodes of the ED reactor in an aqueous multi-electron oxidant-on-negative mode of operation, a no-aqueous multi-electron oxidant-on-negative mode of operation, or a combination thereof. The ED reactor splits the alkaline discharge fluid into a reducer and an intermediate oxidant via electrolysis. The process of electrolysis releases a stoichiometric amount of the reducer and the base at one or more negative electrodes of the ED reactor. The ED reactor converts the intermediate oxidant produced at one or more positive electrodes of the ED reactor into one or more forms of the aqueous multi-electron oxidant via disproportionation of the intermediate oxidant produced at one or more positive electrodes with the base. The ED reactor continues the electrolysis and disproportionation process in a batch mode of operation, a cyclic flow mode of operation, a cascade flow mode of operation, or any combination thereof, until a desired degree of conversion of a discharge product of the aqueous multi-electron oxidant (AMO) into one or more forms of the AMO is achieved.

Also, disclosed herein is an embodiment of the method for regenerating an aqueous multi-electron oxidant (AMO) and a reducer in stoichiometric amounts from one or more forms of a neutral discharge fluid using external power. The discharge fluid comprises, for example, one or more of water, a halide, a hydroxonium cation, a buffer, and one or more counter cations. The method disclosed herein comprises converting the neutral discharge fluid into an alkaline discharge fluid by using an externally supplied base and/or a base produced in the splitting-disproportionation (SD) reactor in an aqueous multi-electron oxidant-on-negative mode of operation, a no-aqueous multi-electron oxidant-on-negative mode of operation, or a combination thereof. The pH of the alkaline discharge fluid is, for example, between 6 and 9 or between 4 and 9. The buffer is configured to maintain the pH of the alkaline discharge fluid, for example, between 6 and 9 or between 4 and 9. In an embodiment, the base component of the buffer is selected from a group comprising, for example, a hydroxide ion, hydrogen phosphate, a phosphate ester, a substituted phosphonate, alkylphosphonate, arylphosphonate, a deprotonated form of one or more of Good's buffers, an amine, a nitrogen heterocycle, and any combination thereof. In an embodiment, the cationic component of the buffer comprises a cation of lithium. In another embodiment, the cationic component of the buffer comprises a cation of sodium. In another embodiment, the anionic component of the buffer comprises one or more of ω-(N-morpholino)alkanesulfonate, 2-(N-morpholino)ethanesulfonate, 3-(N-morpholino)propanesulfonate, and 4-(N-morpholino)butanesulfonate. In another embodiment, the anionic component of the buffer is one or more of ω-(N-morpholino)alkanesulfonate, 2-(N-morpholino)ethanesulfonate, 3-(N-morpholino)propanesulfonate, and 4-(N-morpholino)butanesulfonate and the cationic component of the buffer is lithium. In another embodiment, the anionic component of the buffer comprises one or more of an alkylphosphonate or an arylphosphonate. In another embodiment, the anionic component of the buffer comprises one or more of an alkylphosphonate, an arylphosphonate, and a cationic component of the buffer is lithium. In an embodiment, the base component of the buffer is monohydrogen phosphate and a cationic component of the buffer is sodium.

Also, disclosed herein is a method for producing electric power and regenerating an aqueous multi-electron oxidant (AMO) and a reducer in an energy storage cycle. The method disclosed herein provides the discharge system comprising one or more forms of a reducer fluid, one or more forms of an oxidant fluid, the discharge unit, the acidification reactor, optionally the neutralization reactor, and one or several storage tanks. The oxidant fluid comprising the AMO is converted into an acidic oxidant fluid. In an embodiment, the acidification of the oxidant fluid is performed by adding an acid, for example, sulfuric acid, triflic acid, phosphoric acid etc., to the oxidant fluid stored in the oxidant fluid tank before the oxidant fluid enters the discharge unit. In another embodiment, the acidification is performed using an orthogonal ion migration across laminar flow (OIMALF) reactor positioned between the AMO storage tank or the oxidant storage tank and the discharge unit. The method disclosed herein facilitates discharge of the discharge unit for producing electric power from the reducer and the oxidant fluid comprising the AMO, and generates the discharge fluid.

In an embodiment, one or more forms of the aqueous multi-electron oxidant (AMO) undergoes discharge in the ignition mode, that is, under the condition when the time required for the product such as a halide to comproportionate with the AMO such as a halate is shorter than the time required for the product to diffuse away from the electrode. The ignition mode assures a high power density of the discharge unit. For a sufficiently high concentration of the AMO such as provided by a highly soluble $LiBrO_3$, the ignition mode can be observed even when the ratio of the total concentration of acid protons to the total concentration of the AMO is below the stoichiometric number required by the chemical equation of the redox half-reaction. Herein, the total concentration of acid protons is the concentration of acid determined by titration with a strong aqueous base, such as NaOH, below the endpoint at pH 7.0. The AMO reduction can practically proceed in the ignition mode even when the ratio of the total concentration of acid protons to the total concentration of the AMO is below one and can be as low as 0.05 when a high concentration of the AMO, a strong acid, and a thick diffusion boundary layer are employed at the same time.

The use of substoichiometric acid concentration for the electroreduction of the aqueous multi-electron oxidant (AMO) reduces energy and chemical expenses associated with the acidification of the oxidant fluid particularly when performed on-board, reduces system size, and improves safety. Furthermore, experimental data shows that at least in the case of the AMO being $LiBrO_3$, the ignition regime can be observed at low acid concentrations and acidic oxidant fluid remains stable as evidenced by very low $Br_2$ formation for over two weeks. This finding allows the elimination of the on-board acidification process and of the on-board acidification reactor.

The method disclosed herein further comprises optimizing and stabilizing pH of the acidic oxidant fluid in the splitting-disproportionation reactor using an extra acid present in the acidic oxidant fluid to facilitate comproportionation of the aqueous multi-electron oxidant with a final product of a reduction of the aqueous multi-electron oxidant into an intermediate oxidant. The pH of the acidic discharge fluid is, for example, below 0, 1, 2, or 3. The concentration of acidic protons in the acidic discharge fluid is, for example, below 0.1M, 0.5M, 1M, 2M, 5M, or 10 M. The extra acid is one or a combination of a phosphoric acid, a 3-(N-morpholino)propanesulfonic acid, a 3-(N-morpholino)ethanesulfonic acid, another ω-(N-morpholino)propanesulfonic acid, a methanesulfonic acid, a triflic acid, a substituted sulfonic acid, a substituted phosphonic acid, a perchloric acid, a sulfuric acid, a molecule comprising sulfonic moieties and phosphonic acid moieties, and an acid with a pKa<2.

If the acidic oxidant fluid is stored in the discharge system or produced by the addition of an extra acid, for example, $H_2SO_4$, $F_3CSO_3H$, etc., the discharge fluid leaving the discharge unit is in an acid including a partially acid form. In an embodiment, the acidic discharge fluid is neutralized with a base form of a buffer in the neutralization reactor of the discharge system to produce a solution of a neutral form of the discharge fluid. In this scenario, the discharge fluid leaving the discharge system is in a neutralized form including partially-neutralized form. The acidic discharge fluid comprises one or more of hydrogen bromide, hydrogen chloride, hydrogen iodide, and any combination thereof. In an embodiment, the acidic discharge fluid comprises one or more of water, a halide, a hydroxonium cation, and a counter cation. In the orthogonal ion migration across laminar flow (OIMALF) acidification embodiment, the discharge fluid comprises one or more of water, an extra acid, an acid form of the buffer, a discharge acid, a halogen, one or more forms of the aqueous multi-electron oxidant (AMO) such as neutral, acidic or alkaline, and any combination thereof. The OIMALF reactor replaces acidic protons in the outgoing acidic discharge fluid for another cation such as $Li^+$ present in the incoming neutral oxidant fluid, while simultaneously converting an incoming neutral oxidant fluid into an outgoing acidic oxidant fluid and recycling $H_2$ produced on one or more negative electrodes and consumed on one or more positive electrodes.

The aqueous multi-electron oxidant (AMO) and the reducer are regenerated in stoichiometric amounts from the discharge fluid in the regeneration system. The method and the system disclosed herein reduces the amount of electric energy utilized by the acidification reactor, for example, an orthogonal ion migration across laminar flow (OIMALF) reactor, for converting the salt form of the AMO into the acid form of the AMO by adding an extra acid, for example, one or more of triflic acid, sulfuric acid, perchloric acid, nitric acid, and any combination thereof to the oxidant fluid before or during the discharge process. The extra acid facilitates a faster comproportionation, and thus a higher power during discharge, for example, higher than $H_3PO_4$ alone can cause, and reduces the charge required for on board OIMALF. In an embodiment, the acid form of the buffer comprising, for example, a sulfonic acid group, is used as the extra acid. In an embodiment, the acid form of the AMO is used as the extra acid. The regenerated reducer fluid comprising the reducer and the regenerated one or more forms of the oxidant fluid comprising one or more forms of the AMO are supplied to the discharge system for facilitation of the discharge of the discharge unit. In an embodiment, the heat released during the discharge process is used to preheat one or more forms of the oxidant fluid prior to discharge.

In an embodiment, the regeneration system disclosed herein performs regeneration of the oxidant and the fuel from the discharged solution via photolysis, photoelectrolysis, or any combination thereof. The reagents are regenerated photoelectrochemically using sunlight and with semiconductor particles or electrodes. In this embodiment, the splitting-disproportionation reactor is configured as a photoelectrolysis-disproportionation reactor. The photolysis and/or the photoelectrolysis of the alkaline discharge fluid is performed in the presence or absence of a light adsorbing facilitator, a catalyst, and any combination thereof, in the photoelectrolysis-disproportionation reactor. The method disclosed herein induces a splitting of a discharge product, for example, HBr in the photoelectrolysis-disproportionation reactor by irradiating the discharged solution with light. The regeneration system comprising the photoelectrolysis-disproportionation reactor regenerates one or more of the oxidant, for example, the aqueous multi-electron oxidant (AMO) and the fuel from the discharged solution.

Also, disclosed herein is a method for producing electric power and regenerating hydrogen and a neutral oxidant fluid comprising lithium bromate in an energy storage cycle. The method disclosed herein provides the discharge system comprising the discharge unit, the acidification reactor, and optionally the neutralization reactor. The discharge system comprises a neutral oxidant fluid comprising lithium bromate, and hydrogen. In an embodiment, the discharge system comprises one or more forms of a buffer. In another embodiment, the discharge system further comprises one or more forms of a base. In an embodiment, the cationic component of the buffer is lithium and the anionic component of the based form of the buffer is one or more of ω-(N-morpholino)alkanesulfonate, 3-(N-morpholino)methanesulfonate, 3-(N-morpholino)ethanesulfonate, 3-(N-morpholino)propanesulfonate, 3-(N-morpholino)butanesulfonate, methylphosphonate, an alkylphosphonate, an arylphosphonate, and a molecule comprising one or more of phosphonate moieties and sulfonate moieties. In another embodiment, the cationic component of the buffer is sodium, and the anionic component of the base form of the buffer is one or more of ω-(N-morpholino)alkanesulfonate, methylphosphonate, 3-(N-morpholino)ethanesulfonate, 3-(N-morpholino)propanesulfonate, an alkylphosphonate, an arylphosphonate, and a molecule comprising phosphonate moieties and sulfonate moieties. In an embodiment, the discharge system further comprises a deprotonated form of an extra acid comprising, for example, one or more of an aqueous multi-electron oxidant (AMO) in the acid form, bromic acid, sulfuric acid, perchloric acid, triflic acid, a sulfonic acid, molecules comprising phosphonate moieties and sulfonate moieties, and an acid with a pKa≤2. The buffer is in an acid form during discharge with a pH≤4, and the acid form of the buffer comprises one or more of a phosphoric acid derivative, a phosphoric acid ester, one or more substituted phosphonic acids, one or more ω-(N-morpholino)alkanesulfonic acids, molecules comprising both phosphonate and sulfonate moieties, and buffers capable of maintaining pH between 4 and 9.

The concentration of lithium bromate dissolved in the neutral oxidant fluid is, for example, above 1M, 2M, 5M, or 10M. The acidification reactor converts the neutral oxidant fluid into an acidic oxidant fluid. The concentration of acidic protons in the acidic oxidant fluid is, for example, below 0.1M, 0.5M, 1M, 2M, 5M, or 10M. The method disclosed herein facilitates discharge of the discharge unit for producing electric power from the acidic oxidant fluid and from hydrogen and generates an acidic discharge fluid on consumption of the acidic oxidant fluid and hydrogen. The discharge is facilitated via a pH-dependent solution-phase comproportionation of bromate with bromide formed via electroreduction of intermediate bromine. In an embodiment, the neutralization reactor optionally neutralizes the acidic discharge fluid to produce one or more forms of a neutral discharge fluid.

The regeneration system regenerates hydrogen and one or more forms of the oxidant fluid comprising lithium bromate in stoichiometric amounts from one or more forms of the neutral discharge using external power. The regeneration is performed by splitting one or more forms of the neutral discharge fluid into stoichiometric amounts of bromine, hydrogen, and a base form of the buffer using external power in the splitting-disproportionation reactor, and producing lithium bromate via disproportionation of bromine with the base form of the buffer. The splitting process is performed, for example, via electrolysis, photolysis, photoelectrolysis, radiolysis, thermolysis, and other methods know to those skilled in the art. The disproportionation reaction is facilitated by a buffer capable of maintaining a solution pH, for example, between 4 and 9. The splitting-disproportionation reactor continues splitting and disproportionation in a no-aqueous multi-electron oxidant-on-negative mode of operation and an aqueous multi-electron oxidant-on-negative electrode mode of operation until a desired degree of conversion of bromide into bromate is achieved. The splitting-disproportionation reactor is configured for a batch mode, a cyclic flow mode, a cascade flow mode, and any combination thereof. The regeneration system supplies the regenerated one or more forms of the oxidant fluid comprising bromate and the regenerated hydrogen to the discharge system for subsequent generation of electric power on demand.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a structure or a method step referenced by a numeral in a drawing carries over to the description of that structure or method step shown by that same numeral in any subsequent drawing herein.

FIGS. 5A-5B exemplarily illustrate a table showing different reactions used or considered for electrochemical energy storage and energy conversion.

DETAILED DESCRIPTION OF THE INVENTION

Figure 1:
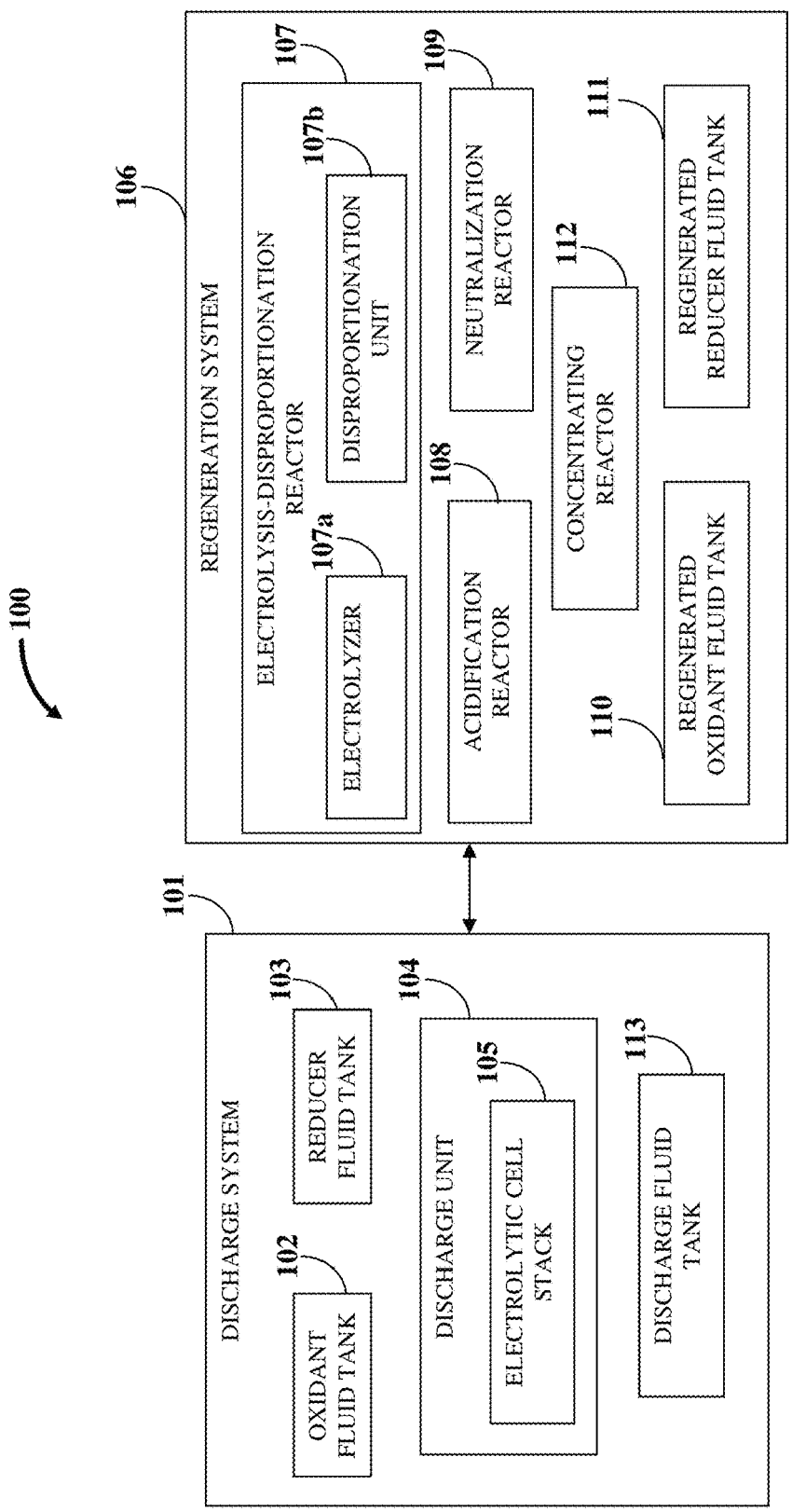
FIG. 1 illustrates a system for generating an electric power and a discharge fluid from an oxidant fluid and a reducer fluid using a discharge system and for regenerating an oxidant and/or a reducer from the discharge fluid using a regeneration system.

FIG. 1 illustrates a system 100 for generating an electric power and a discharge fluid from an oxidant fluid and a reducer fluid using a discharge system 101 and for regenerating an oxidant and/or a reducer from the discharge fluid using a regeneration system 106. The oxidant fluid is a chemical or a mixture of chemicals that accepts electrons during a discharge process in a discharge mode of operation of a discharge unit 104 of the discharge system 101. As used herein, the term "the discharge mode of operation" refers to a process of releasing chemical energy stored in the discharge unit 104 in the form of sustainable electric current and voltage, for example, direct current (DC). The discharge unit 104 disclosed herein is also referred to as a "flow battery". The oxidant fluid comprises one or more forms of an aqueous multi-electron oxidant (AMO), water, other solvents, acids, bases, catalysts, and one or more forms of a buffer or buffers. The AMO may be present at various stages in the methods disclosed herein in one or several forms, for example, acid forms, salt forms such an Li form, etc., differing in composition, concentration, etc. The phrase "aqueous multi-electron oxidant" or "AMO" refers collectively to all such forms and any combination thereof. The other solvent is, for example, a liquid other than water. The reducer fluid, also referred herein as a "fuel", is a chemical that donates electrons during the discharge process. The reducer fluid is, for example, hydrogen gas. The discharge fluid is an exhaust fluid obtained as a result of an electrochemical discharge process. The discharge fluid comprises, for example, water, other solvents, hydrogen cations, lithium cations, other cations, halide anions, one of more forms of the buffer, and the unreacted AMO.

The system 100 disclosed herein comprises the discharge system 101 and the regeneration system 106. The discharge system 101 disclosed herein comprises an oxidant fluid tank 102 comprising oxidant fluid comprising aqueous multi-electron oxidant (AMO), a reducer fluid tank 103 comprising a reducer, a discharge fluid tank 113 for collecting discharge fluid, and a discharge unit 104. The AMO is a chemical that accepts electrons from an electrode during the electrochemical discharge process and acts as an oxidizing agent. The reducer is a chemical that donates electrons to an electrode during the electrochemical discharge process and acts as a reducing agent. The discharge system 101 disclosed herein can be technically classified as a type of a redox flow battery. Unlike conventional redox flow battery systems, the discharge system 101 disclosed herein carries a minimal amount of a solvent and thus provides a higher system energy density. Also, unlike conventional redox flow battery, the discharge unit 104 is not intended for complete regeneration of oxidant fluid and reducer fluid by reversing the flow of electric current and of reagents through the discharge unit 104, although partial regeneration, for example, by producing intermediate oxidant such as $Br_2$ is possible and recommended, for example for regenerative breaking when used in an electric vehicle such as an electric car. Also, unlike conventional fuel cell systems that carry a reducer but not oxidant, the discharge system 101 disclosed herein carries both the reducer and the AMO in reducer fluid tanks 103 and oxidant fluid tanks 102 respectively. In an embodiment, the AMO and the reducer are stored in reagent containers or supplied via multiple oxidant fluid tanks 102 and reducer fluid tanks 103 respectively.

The aqueous multi-electron oxidant (AMO) is an oxidant that, in at least one of its forms such as an acid form or a salt form, for example, a Li salt has a high solubility in water, for example, over 1M, and that transfers in a solution-phase redox reaction or in an electrochemical reaction more than 1 mole of electrons per 1 mole of the AMO. The AMO comprises one or more of halogens, halogen oxoacids, halogen oxoanions, and other oxoanions. The AMO is one or more of an oxide of an element such as a halogen, an oxoacid of an element such as a halogen oxoacid. The halogen is, for example, one or more of chlorine, bromine, and iodine. An oxoanion is an anion comprising one or more oxygen atoms and one or more atoms of another element. An oxoacid is a compound comprising an oxoanion and one or more forms of hydrogen cation. In the energy cycle disclosed herein, the AMO is present in the charged oxidant fluid along with water and one or more forms of a buffer. The buffer in the base form is used during regeneration to maintain pH of the AMO at an appropriate value, for example, greater than 7, while providing sufficient solubility, for example, >1M for the salt form of the AMO. The buffer is chemically compatible with the AMO, the intermediate oxidant, the discharge fluid, the electrolysis process, etc. The buffer in the base form comprises, for example, anions such as $OH^-$, a monohydrogen phosphate, a substituted phosphonate, an amine, a tertiary amine, one or more of a buffering agent described as Good's buffers, etc. Good's buffers comprise about twenty buffering agents for biochemical and biological research selected and described by Norman Good and others. In addition to a group defining its buffering property, the buffer comprises a strong acidic group such as a sulfonate which is beneficial for the buffer as the strong acidic group reduces its crossover throughout the cation exchange membrane during discharge and electrolysis-regeneration.

The cation component of the buffer is one or more of lithium ($Li^+$), other alkali metals, alkali earth elements, other elements, protonated nitrogen bases, quaternary nitrogen cations, quaternary phosphorous cations, etc. $Li^+$ provides a substantially high solubility for bromate and bromide. $Li^+$ does create problems with poor solubility of lithium phosphate which forms upon decomposition and/or precipitation of its base form $Li_2HPO_4$ (=½$Li_3PO_4$+½$LiH_2PO_4$), if hydrogen phosphate is used as the buffer, but since this may happen only during off-board regeneration and only in no-aqueous multi-electron oxidant (AMO)-on-negative electrode mode of operation also referred to as a "no-AMO-on-negative mode of operation", use of $Li^+$ will not create a safety problem. The AMO in one or more forms can be pre-mixed with the buffer. In an embodiment, the AMO is an oxide or an oxoacid of an element, for example, nitrogen, xenon, sulfur, etc. In another embodiment, the AMO is selected from a group consisting of, for example, a halogen compound such as a halogen oxide, a halogen oxoacid, etc., an interhalogen compound, an oxide of nitrogen, a nitrogen oxoacid, an oxide of xenon, an oxoacid of xenon, an oxide of sulfur, an oxoacid of sulfur, an oxide of a chalcogen, an oxoacid of a chalcogen, an oxide of a pnictogen, an oxoacid of a pnictogen, a volatile oxide of an element, a fluid oxide of an element, a soluble oxide of an element, a volatile oxoacid of an element, a fluid oxoacid of an element, a soluble oxoacid of an element, and any combination thereof.

The oxide is a compound having a formula $X_mO_n$, where X is one or more chemical elements, and where O is oxygen, and m and n are integers. In an embodiment, $1 \leq m \leq 2$ and $1 \leq n \leq 7$. For example, the aqueous multi-electron oxidant (AMO) is a halogen oxide having a formula $X_mO_n$, where X is one or more of multiple halogens, O is oxygen, and $1 \leq m \leq 2$, and $1 \leq n \leq 7$. The oxoacid is a compound having a formula $H_pX_qO_r$, where X is one of multiple halogens, nitrogen, chalcogens, xenon, or other element, and $1 \leq p, q, r \leq 6$. In an example, the halogen oxoacid is a compound having a formula $H_pX_qO_r$, where X is one of multiple halogens, O is oxygen, and $1 \leq p, q, r \leq 6$ such as $HBrO_3$ or bromic acid. The reagents, products, and intermediaries of the reduction of halogen oxoacids are either gases, liquids or are soluble in water. If the reagents, intermediates, and products are anions, their cross over through a cation exchange membrane is minimal. In an embodiment, the oxoacid is a compound having a formula $H_pXO_r$, where X is a halogen, H is hydrogen, O is oxygen, $1 \leq p \leq 6$, and $1 \leq r \leq 6$. In an embodiment, the AMO is a nitrogen oxide having a formula $N_xO_n$, where x=1 or 2 and $1 \leq n \leq 5$. In another embodiment, the AMO is a nitrogen oxoacid having a formula $H_kN_lO_m$, where H is hydrogen, N is nitrogen, O is oxygen, and $1 \leq k$, $l, m \leq 3$. In another embodiment, the AMO is a nitrogen oxoacid having a formula $HNO_n$, where H is hydrogen, N is nitrogen, O is oxygen, and $1<n<3$. In another embodiment, the AMO in acid form is chloric acid which forms a stable aqueous room temperature solution, for example, up to about 40% w/w. Chloric acid can be used, for example, for military and aerospace applications where high energy density is needed. In another embodiment, the AMO in acid form is bromic acid ($HBrO_3$) which forms a stable aqueous room temperature solution, for example, up to about 55% w/w. Bromic acid and/or its salt is convenient for the regeneration part of the energy cycle and thus used, for example, in automotive applications. In another embodiment, the AMO in acid form is iodic acid which forms a stable aqueous room temperature solution, for example, up to about 74% w/w. In another embodiment, the AMO is nitric acid which forms an atmospheric aqueous azeotrope with, for example, about 68.4% w/w. The AMO can be used as an aqueous or non-aqueous solution. Other examples of the AMO in acid form are hypochlorous acid, hypobromous acid, perbromic acid, perchloric acid, periodic acid, etc. A subgroup of the AMO comprising oxoacids (and salts of oxoanions) of halogens (Cl, Br, I) is of special interest in energy storage applications since the latter AMOs can be regenerated from discharge fluid with full recycling of all chemicals.

In an embodiment, high energy oxidants rather than oxygen or air are used with the discharge system 101 which is otherwise similar to a polymer electrolyte membrane fuel cell (PEMFC) system, except for a difference in the structures of one or more electrodes. The high energy density aqueous multi-electron oxidant (AMO) and a mediator are components of the oxidant fluid which is stored in the oxidant container or the oxidant fluid tank 102. The reducer is, for example, hydrogen. The use of hydrogen as the reducer imparts a benefit of an efficient regeneration via electric energy, solar energy, etc., in a regeneration system 106 or in the discharge system 101 or in both. In an embodiment, the reducer is selected from a group consisting of, for example, ammonia, hydrazine, hydroxylamine, phosphine, methane, a hydrocarbon, an alcohol such as methanol, ethanol, etc., an aldehyde, a carbohydrate, a hydride, an oxide, a chalcogenide, another organic and inorganic compound and any combination thereof. The oxide is, for example, carbon monoxide (CO), nitrous oxide ($N_2O$), nitric oxide (NO), sulfur dioxide ($SO_2$), etc.

The discharge unit 104 of the discharge system 101 comprises an electrolytic cell stack 105. The electrolytic cell stack 105 comprises multiple electrolytic cells 200. Each electrolytic cell 200 comprises a 5-layer electrolyte-electrode assembly 206 exemplarily illustrated in FIG. 2. The 5-layer electrolyte-electrode assembly 206 comprises a 3-layer electrolyte-electrode assembly 205 flanked by two diffusion layers 201a and 201b exemplarily illustrated in FIG. 2. The 3-layer electrolyte-electrode assembly 205 comprises a positive electrode 205a, a negative electrode 205b, and an electrolyte layer 205c interposed between the positive electrode 205a and the negative electrode 205b. The positive electrode 205a and the negative electrode 205b are herein collectively referred to as "electrodes". The term "electrode" refers to an electronic conductor or a mixed electronic-ionic conductor, the surface of which is in contact with an ionically conducting medium. The 3-layer electrolyte-electrode assembly 205 is flanked by a positive diffusion layer 201a on the positive side and a negative diffusion layer 201b on the negative side forming the 5-layer electrolyte-electrode assembly 206. The S-layer electrolyte-electrode assembly 206 is flanked on each side by a bipolar plate 202 or an endplate 301, exemplarily illustrated in FIG. 3. The electrolytic cell stack 105 with the oxidant fluid tank 102, the reducer fluid tank 103, a discharge fluid tank 113, and connecting lines form the discharge system 101. In an embodiment, the discharge unit 104 comprises the electrolytic cell stack 105, an enclosure, electric leads, gas hoses and/or liquid hoses. In an embodiment, the electrolytic cell stack 105 is configured as a planar cell stack 300 exemplarily illustrated in FIG. 3, comprising electrolytic cells 200 exemplarily illustrated in FIG. 2.

The theoretical standard equilibrium single cell voltages and tanks' energy densities of the discharge system 101 using various combinations of reducers and aqueous multi-electron oxidants as well as of other more commonly used battery materials are exemplarily illustrated in FIGS. 5A-5B. The halogens, the halogen oxoacids, and discharge products, for example, hydrogen halides and water are present as liquids, gases, or liquid solutions, thereby simplifying mass transport processes in the discharge system 101 and the regeneration system 106.

The chemistry of the oxides and oxoacids of halogens, of chalcogens, and of pnictogens may pose problems such as disproportionation of lower oxides and oxoacids, and precipitation of solid phases. Disproportionation is a redox reaction in which an element, free or in a compound, is reduced and oxidized in the same reaction to form different products. For example, an element with an oxidation state A, not necessarily A=0, on disproportionation is distributed between several species with different oxidation states B, C, etc., which differ from the element's initial oxidation state A, so that B>A>C. For example, the formation of $I_2$ may result in phase-segregation such as pore blocking and manifold blocking, when the temperature (T) is low, for example, for iodine below its melting point of about 114° C. To keep all the compounds, for example, $I_2$, in a fluid state, T>120° C. may be desired. The high temperature also benefits ionic conductivity, reaction kinetics, and the rate of heat rejection. However, other factors, for example, startup time, materials corrosion, and pressure limits of the seals may favor a lower temperature for operation, for example, about 60° C. Since the discharge system 101 disclosed herein comprising the oxidant fluid tank 102 and the reducer fluid tank 103, and a discharge unit 104 with the electrolytic cell stack 105 can be enclosed, the operation of the discharge system 101 at such elevated temperatures and/or pressures is relatively easier than in the case of regular fuel cells that use $O_2$ from air.

The fast kinetics on the positive electrode 205a such as bromine-bromide reactions, assures high power density and efficiency of the discharge unit 104 as well as the possibility of partial electric recharge which conventional fuel cells lack. Aqueous multi-electron oxidants (AMOs) with high energy content, for example, above 400 watt-hour (Wh)/kilogram (kg) and above 200 Wh/litre (L) are used to ensure a driving range of about 200-300 kilometres or more. Although the required energy densities can be achieved with many highly soluble or fluid in the pure state and multi-electron redox couples, for example, nitric acid, the requirements for fast reversible kinetics and high faradaic efficiency of both electroreduction on the positive electrode 205a of the discharge unit 104 and electro-oxidation on the positive electrode of the electrolyzer 107a of the regeneration system 106 rules out most of such oxidants. Suitable AMOs must assure that the reagents, products, and intermediates of the reduction of the AMOs are gases, liquids, or are highly soluble and compatible with the entire group consisting of water, electrolyte layer materials, electrode materials, hose materials, and all other materials that come in contact with the oxidant fluid, the discharge fluid, and the reducer. Also, the reagents and the products of the process of reduction or electroreduction of the AMOs can be anions which provide an additional benefit of a reduced crossover if a cation exchange membrane is used as the electrolyte layer 205c.

In an embodiment, the discharge unit 104 disclosed herein operates in the discharge mode. In the discharge mode of operation, the discharge unit 104 produces the electric power in an external electric circuit 203, exemplarily illustrated in FIG. 4, when supplied with the reducer 401 and the aqueous multi-electron oxidant (AMO) 402 from external reducer fluid tanks 103 and oxidant fluid tanks 102 respectively, that can be periodically refilled by pumping the reducer and the AMO from a refueling station or multiple reagent sources into their respective reagent containers or tanks 103 and 102.

In an embodiment, the discharge unit 104 operates in a regenerative mode, also referred herein as an "electric recharge mode". In the electric recharge mode of operation, the discharge unit 104 produces a reducer or an intermediate reducer and an intermediate oxidant which may or may not be the same as the reducer and the aqueous multi-electron oxidant (AMO) used during the discharge. The discharge unit 104 operating in the electric recharge mode produces an oxidant or an intermediate oxidant, for example, a halogen or a halogen compound, and the reducer, for example, hydrogen by consuming a sustainable electric current from an external power source or external electric circuit 203, exemplarily illustrated in FIG. 2, and by splitting the discharge products in the discharge fluid, for example, hydrogen halides. The method of regeneration uses, in combination with other steps or by itself, electrolysis, that is, with consumption of electric energy. In the electric recharge mode or the electric recuperation mode of operation of the discharge unit 104, the reducer or the intermediate reducer is produced on the negative electrode 205b, and the AMO or the intermediate oxidant is generated on the positive electrode 205a, when the electric current is forced through the electrodes 205a and 205b of the discharge unit 104 and/or the 5-layer electrolyte-electrode assembly 206, also referred herein as the discharge cell, in a direction opposite to the direction of the electric current during the discharge mode of operation, provided that proper chemicals, for example, the discharge products are supplied to the respective electrodes 205a and 205b. The electric recharge mode or the electric recuperation mode is useful for regenerative breaking when discharge system 101 is used to power a vehicle.

In an embodiment, a solution-phase reaction facilitates one or more discharge reactions on the positive electrode 205a of the electrolyte-electrode assembly 205. In an embodiment, the solution-phase reaction disclosed herein is, for example, a pH-dependent solution-phase comproportionation, a solution-phase redox catalysis, etc. Comproportionation is a redox reaction in which an element, free or in compounds, with oxidation states A and C is converted into another substance or substances in which the element's oxidation states are B, such that A>B>C. In an embodiment, the rate of the solution-phase comproportionation depends on the pH of the solution. In an embodiment, an electrocatalyst, for example, lead oxide, ruthenium oxide ($RuO_2$) or a platinoid facilitates one or more discharge reactions on the positive electrode 205a of the electrolyte-electrode assembly 205. Such facilitation may occur via a direct electroreduction of an aqueous multi-electron oxidant (AMO) such as bromate, or via electroreduction of an intermediate oxidant such as bromine on the positive electrode 205a. In another embodiment, a platinoid electrocatalyst facilitates one or more discharge reactions on the negative electrode 205b of the electrolyte-electrode assembly 205. In another embodiment, a redox mediator facilitates a charge transfer between the positive electrodes 205a of the electrolyte-electrode assemblies 205 and the AMO. The redox mediator is a halogen/halide couple, for example, $Cl_2/Cl^-$. In another embodiment, a chloride mediator facilitates one or more discharge or regeneration reactions on the positive electrode 205a of the electrolyte-electrode assembly 205, for example via a reaction: $BrO_3^- + 5Cl^- + 6H^+ = BrCl + 2Cl_2 + 3H_2O$.

In another embodiment, one or more of multiple immobilized heterogeneous mediators, immobilized heterogeneous catalysts, electrocatalysts, homogeneous mediators, or homogeneous catalysts facilitate a charge transfer between the positive electrodes 205a of the electrolyte-electrode assemblies 205 and the oxidant fluid. In another embodiment, a catalyst selected from a group consisting of, for example, a homogeneous catalyst, a heterogeneous catalyst, a redox mediator catalyst, or a combination thereof, facilitates one or more discharge or charge reactions on the positive electrodes 205a of the electrolyte-electrode assemblies 205. In another embodiment, a reduced form of a homogeneous solution-phase mediator, a product of an electrode reaction or any combination thereof, accelerates a rate of discharge during one or more discharge reactions via a solution-phase comproportionation, which may or may not be pH-dependent. For example, pH-dependent solution-phase comproportionation of the aqueous multi-electron oxidant (AMO) such as bromate with a final product of a reduction of the AMO such as bromide accelerates the rate of discharge of the discharge unit 104.

The regeneration system 106 of the system 100 disclosed herein is configured to regenerate the aqueous multi-electron oxidant (AMO) and the reducer from the discharge fluid produced by the discharge unit 104. The regeneration system 106 comprises, for example, an electrolysis-disproportionation (ED) reactor 107, an acidification reactor, also referred herein as an "ion exchange reactor" and referenced by the numeral 108, such as an orthogonal ion migration across laminar flow (OIMALF) reactor, a neutralization reactor 109, a concentrating reactor 112, multiple separation reactors 1006, 1007, and 1010 exemplarily illustrated in FIG. 10B, storage tanks such as a regenerated oxidant fluid tank 110 and a regenerated reducer fluid tank 111. The ED reactor 107 comprises sub-reactors, for example, an electrolysis unit or an electrolyzer 107a and a disproportionation unit 107b which can be configured in one ED reactor 107. The configuration of the electrolyzer 107a of the ED reactor 107 is similar to that of an electrolytic cell 200 of the electrolytic cell stack 105 of the discharge unit 104 exemplarily illustrated in FIG. 2. In an embodiment, the electrolyzer 107a and the disproportionation unit 107b as well as the neutralization reactor 109 are physically combined in the same hardware.

The neutralization reactor 109 is configured to neutralize the discharge fluid, for example, hydrogen halide produced by the discharge unit 104 with a base form of a buffer to produce a solution of a neutral or base form of the discharge fluid. In an embodiment, the neutralization reactor 109 comprises a mixing reactor. The neutralization reactor 109 is configured to maintain an optimal pH during the conversion of the discharge fluid into the oxidant fluid. For example, in the case of a halate as the aqueous multi-electron oxidant (AMO), the value of the optimal pH is limited at the low end by the reverse reaction of comproportionation between halate and halide, and the upper end by the stability of the intermediate hypohalate toward further disproportionation. In the case of bromate, the optimal pH range is, for example, between 7 and 9. The electrolysis-disproportionation (ED) reactor 107 is configured to electrolyze the solution of the salt form of the discharge fluid into an intermediate oxidant such as a halogen at a positive electrode of the ED reactor 107 accompanied by a release of the reducer such as hydrogen and a base form of the buffer at a negative electrode of the ED reactor 107, while producing a salt form of the aqueous multi-electron oxidant (AMO) at the positive electrode via disproportionation of the intermediate oxidant produced at the positive electrode with an excess of the base form of the buffer, and simultaneously releasing a stoichiometric amount of the reducer and the base form of the buffer for neutralization. The ED reactor 107 can be configured to operate, for example, in a batch mode, as exemplarily illustrated in FIG. 10A a single pass flow-through cascade mode, and in a multi-pass cyclic flow mode, as exemplarily illustrated in FIG. 10B.

The ED reactor 107 is used in series with the ion exchange reactor 108. The ion exchange reactor 108 is configured to convert the aqueous multi-electron oxidant (AMO) in a salt form such as halate into an acid form of the AMO such as a halic acid. The storage tanks, for example, the regenerated oxidant fluid tank 110, the regenerated reducer fluid tank 111, and a buffer tank (not shown) are used to store the regenerated oxidant, the regenerated reducer, and the buffer respectively. The separation reactors 1006, 1007, and 1010, exemplarily illustrated in FIG. 10B are gas-liquid separators and are used to separate gases from the liquids during the regeneration process.

The electrolysis-disproportionation (ED) reactor 107 or reactors can be operated in a cyclic flow mode or in a cascade flow mode. In the cyclic flow mode, the regenerated solution or the discharge fluid is cycled between a mixing reactor or the neutralization reactor 109, a three-way valve 1004, and another three-way valve 1005 exemplarily illustrated in FIG. 10B, through the ED reactor 107. In the cascade flow mode, the regenerated solution flows through a cascade (not shown) of functionally identical mixing reactors of the neutralization reactor 109 and ED reactors 107, and three-way valves 1004 and 1005. An ED reactor 107 configured for the cyclic flow mode has a lower upfront cost but requires a longer regeneration time. The ED reactor 107 configured for the cascade flow mode has a higher upfront cost but is capable of a faster regeneration or higher throughput.

Figure 10B:
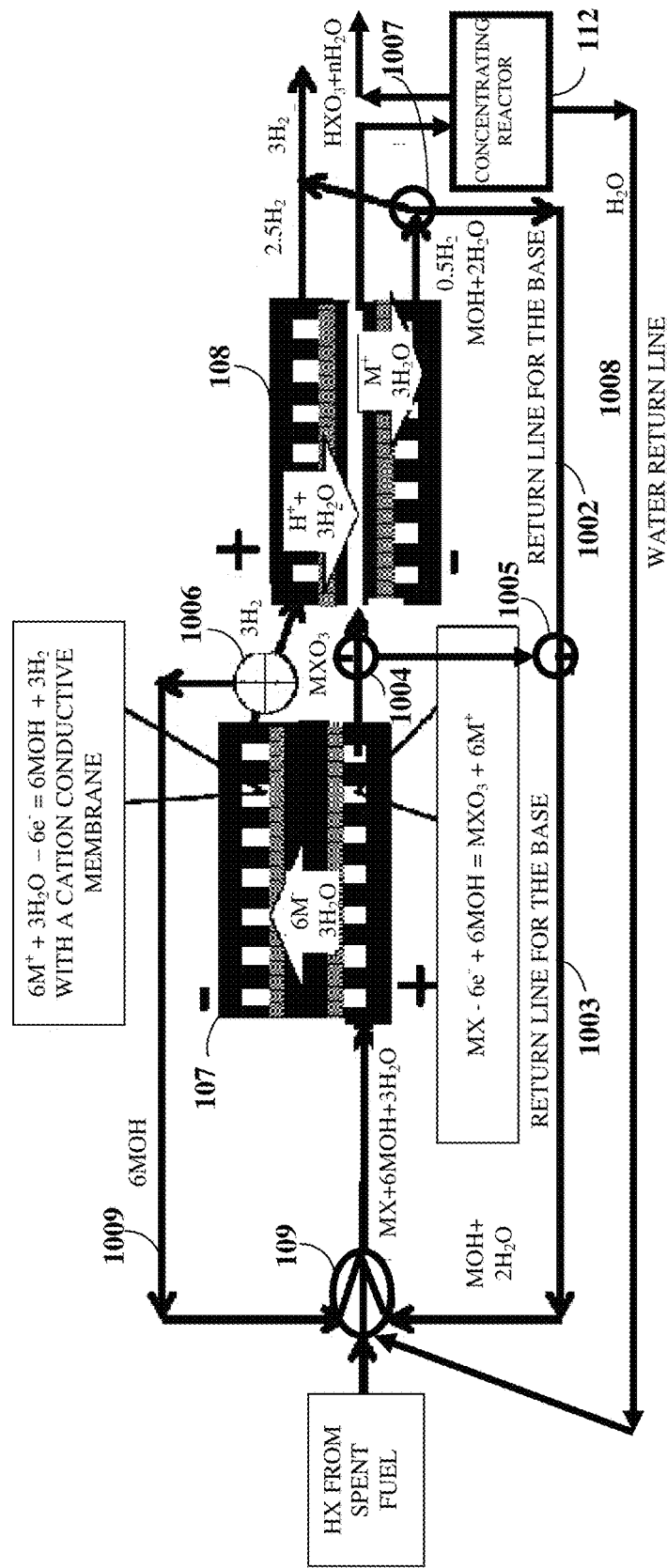
Figure 11A:
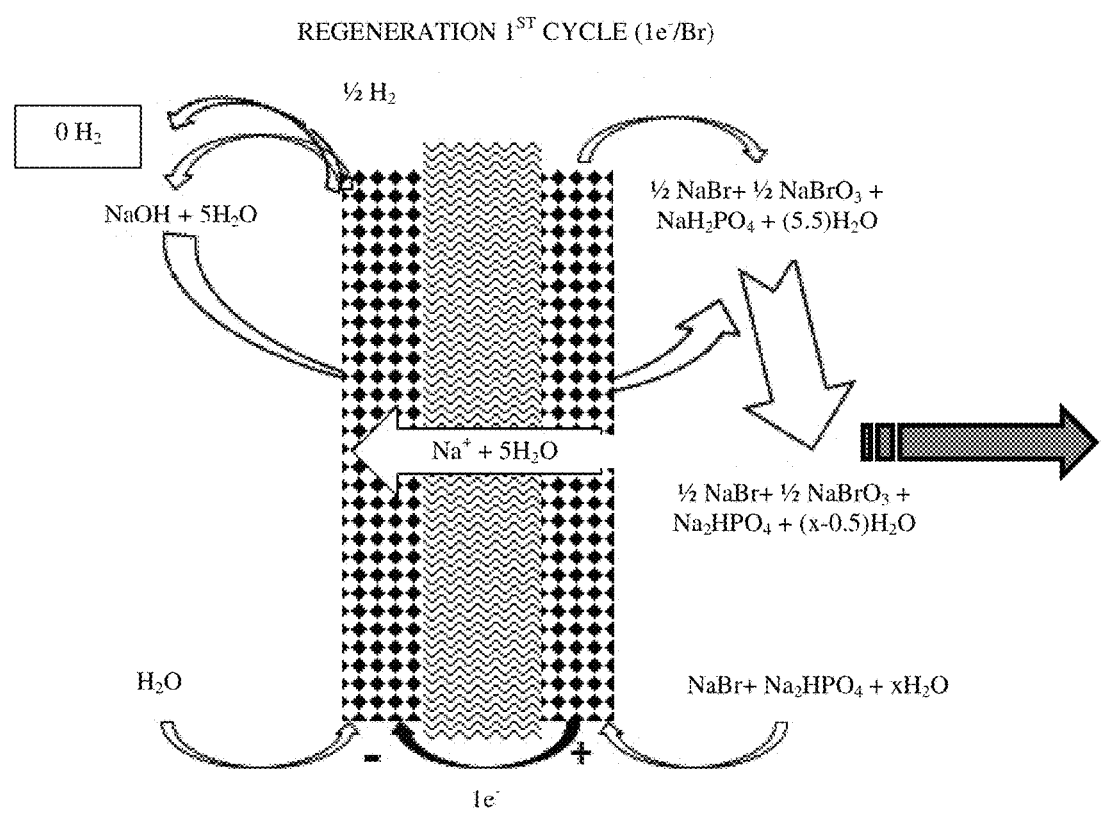
FIGS. 11A-11B exemplary illustrate a cyclic operation of a flow-through electrolysis-disproportionation reactor with bromate as an aqueous multi-electron oxidant, hydrogen phosphate as a base form of a buffer, and sodium as a counter cation.
Figure 11B:
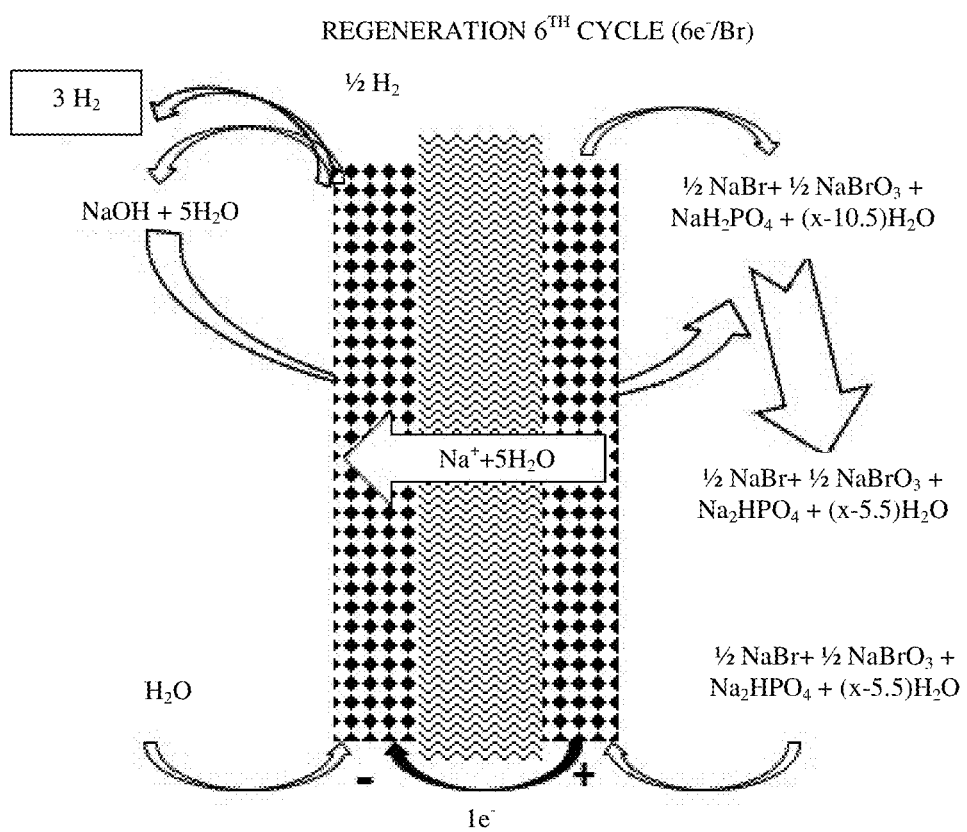

An exemplary operation of the electrolysis-disproportionation (ED) reactor 107 in the cyclic flow mode is disclosed in the detailed description of FIGS. 11A-11B. A loop within the ED step including the ED reactor 107, the ion exchange reactor 108 such as the orthogonal ion migration across laminar flow (OIMALF) reactor, and the mixing reactor or the neutralization reactor 109 is disclosed in the detailed description of FIG. 10B. As used herein, the term "laminar flow" refers to a type of fluid flow, for example, a liquid flow or a gas flow, in which directions and magnitudes of fluid velocity vectors in different points within a fluid do not change randomly in time and in space. Also, as used herein, the term "migration" refers to a movement of an electrically charged object such as an ion due to the action of an external electric field. In the OIMALF process, the vectors of the laminar flow velocity and the electric field are not parallel and not anti-parallel. The concentrating reactor 112 concentrates the acid form of the aqueous multi-electron oxidant (AMO) to remove the excess water produced on the positive electrode 205a during the discharge and to remove water introduced with the buffer during electrolysis-disproportionation. The concentrating reactor 112 removes water or other solvents from a dilute fluid that enters the concentrating reactor 112 and releases a concentrated fluid and water or another solvent. The concentrating reactor 112 performs concentration, for example, by evaporation or reverse osmosis.

The discharge system 101 and the regeneration system 106 can be used together in a complete energy cycle that recycles all the chemicals, does not consume external chemicals, and does not generate chemical waste. The complete energy cycle employs the regeneration system 106 in addition to the discharge system 101. The discharge products such as LiBr and $H_2O$ produced in the discharge unit 104 of the discharge system 101 are converted back to intermediates such as $Br_2$, and/or stable reactants such as $LiBrO_3$ and $H_2$ of the reactants in the ED reactor 107, and to the active form such as $HBrO_3$ in the ion exchange reactor 108, for example, the orthogonal ion migration across laminar flow (OIMALF) reactor.

The reverse transformation of the cathodic discharge product, for example, LiBr, into the aqueous multi-electron oxidant (AMO), for example, $LiBrO_3$ in the regeneration system 106 is accompanied by the release of the reducer, for example, hydrogen in a stoichiometric amount, as exemplified by equations (18)-(21) for a particular lithium bromate-phosphate chemistry. As a result, the regeneration system 106 can produce simultaneously both the AMO and hydrogen, in stoichiometric amounts, which can be used again as reactants during the direct mode of operation of the discharge unit 104 of the discharge system 101. In an embodiment, the regeneration of the AMO from the spent discharge fluid or from the intermediate oxidant is catalyzed by a homogeneous catalyst such as chlorine, polyvalent metal ions, etc., or by a heterogeneous electrocatalyst such as ruthenium dioxide, lead dioxide, and their derivatives. The energy cycle based on the discharge unit 104 and the process of on-site regeneration disclosed herein eliminates the need for a macro scale infrastructure for the production, transportation and storage of the reducer, for example, hydrogen in contrast to applications based on fuel cells.

The discharge unit 104 and the electrolysis-disproportionation (ED) reactor 107 disclosed herein are implemented with aqueous multi-electron oxidants (AMOs) compatible with water and with cation-exchange membranes such as commercially available polyperfluorosulfonic acids. The aqueous multi-electron oxidants are, for example, halogens, halogen oxides, halogen oxoanions, and halogen oxoacids. In an embodiment, the aqueous multi-electron oxidants are, for example, oxides, oxoanions, and oxoacids of chalcogens, of pnictogens, of xenon, etc. The listed compounds can assure a higher theoretical energy density than the elemental halogens and batteries with solid electroactive materials such as lithium ion batteries, but at the expense of lower energy efficiency and lower power density and a higher cost as an expensive catalyst may be required. In this embodiment, homogeneous reactions near the positive electrode 205a are utilized in order to achieve a higher power from the positive electrode 205a. The discharge system 101 disclosed herein circumvents the drawback of lower energy efficiency and power density and of higher cost by using a solution-phase redox mediator. The solution-phase redox mediator is an $Ox_{med}/Red_{med}$ couple which is subject to a rapid and reversible transformation at an electrode and is capable of a quick homogeneous redox reaction with the aqueous multi-electron oxidant. A solution-phase redox mediator is a redox couple dissolved in a solution, for example, in the oxidant fluid, that is capable of relatively fast electron transfer reactions both at the electrode and with a primary aqueous multi-electron oxidant (AMO), for example, bromine/bromide couple. At the same time, the reduced form of the $Ox_{med}/Red_{med}$ couple participates in a rapid redox reaction with the high energy but electrochemically inactive AMO:

$AMO + Red_{med} \rightarrow Red + Ox_{med}$ $Ox_{med} + n_{med}e^- = Red_{med}$ The solution-phase redox mediators help to realize the electrochemical process at a low over-voltage on the electrodes 205a with or without a low amount of platinum (Pt) and other expensive catalyst. The solution-phase redox mediator is stable with respect to side reactions and hence allows the discharge unit 104 to be used for many days or cycles. The solution-phase redox mediator can be present only within the positive electrode space of the discharge unit 104 with minimal cross-over to the negative electrode space. The solution-phase redox-mediator helps to realize a high rate of electron transfer from the principal aqueous multi-electron oxidant (AMO) to the positive electrode 205a on discharge. The reduced form of the solution-phase redox mediator ($Red_{med}$) causes a rapid solution-phase chemical reaction during discharge and can be regenerated from the oxidized form of the solution-phase redox mediator ($Ox_{med}$). In an embodiment, to mediate AMO reduction in the discharge unit 104, a solution-phase mediator, for example, polyoxometallates is used to facilitate the electrode reaction on the positive electrode 205a. In this embodiment, the regenerating couple is suspended or immobilized polyoxometallates which do not cross the membrane and do not discharge at the negative electrode 205b due to their large size, negative charge or a combination thereof. In an embodiment, the regeneration process is based on the redox-mediated catalysis by the redox couple:

$AMO + Red_{med} \rightarrow$ Discharge Product $+ Ox_{med}$
$Red_{med} \rightleftarrows Ox_{med} + n_{med}e$ In an embodiment, the reduced form of the mediator is the final product of the reduction of the aqueous multi-electron oxidant (AMO) and the homogeneous reaction facilitating a discharge of the AMO is a comproportionation reaction.

In a reduction of aqueous multi-electron oxidants (AMOs), a large number of protons are consumed. The discharge unit 104 disclosed herein produces protons at the negative electrode 205b by electro-oxidation of hydrogen or a hydride and transfers the protons to the positive electrode 205a across the electrolyte layer 205c. The hydrogen reducer is automatically co-regenerated with the aqueous multi-electron oxidant (AMO), or an intermediate, $Ox_{med}$, during the regeneration process. Thus, the regeneration system 106 restores back both the components of the oxidant fluid, that is, the AMO, Ox, or the oxidized intermediate, $Ox_{med}$; and the fuel or the reducer such as $H_2$. The discharge unit 104 disclosed herein uses AMOs. A homogeneous redox mediator is added to or generated within the discharge unit 104 to perform the reduction of the AMO during the discharge process in the bulk of the solution rather than on the surface of the electrode 205a where the number of active sites is lower. The homogeneous redox mediators allow for the use of AMOs in electrochemical power sources and resolve the issue of the slow and irreversible direct electrode reactions of the AMO.

The discharge system 101 disclosed herein therefore provides a long driving range, a high energy density, a high power, and a high energy efficiency at a lower cost than proton exchange membrane fuel cells (PEMFCs). The discharge system 101 requires a short refill time and can be operationally combined with the regeneration system 106 to enable an electric energy cycle based on the $H_2$— aqueous multi-electron oxidant (AMO) chemical matter cycle. Other combinations of discharge system 101 with various regeneration systems 106 can use other types of energy, such as solar energy as the input in the chemical cycle. The discharge unit 104 disclosed herein avoids the need for a large amount of platinum or other expensive metals required for the electroreduction of oxygen. Since the discharge unit 104 does not consume oxygen, the discharge system 101 can be used in enclosed environments such as submarines, space ships, etc.

In an embodiment, the discharge unit 104 employs the ultimate reduction product as the reduced form of the intermediate, for example by taking advantage of the homogeneous comproportionation between an oxoanion and a free halide, leading to an electrochemically active halogen on discharge in an ignition type cycle. In the case of bromate ($BrO_3^-$) as an aqueous multi-electron oxidant (AMO):

On the negative electrode $3H_2 - 6e^- = 6H^+$, fast

On the positive electrode $3Br_2 + 6e^- = 6Br^-$, fast

In the catholyte $5Br^- + BrO_3^- + 6H^+ = 3H_2O + 3Br_2 @ pH<4$.

The discharge unit 104 allows for a fast reversible reaction on the 2D surface of an inexpensive electrode such as a carbon-based electrode while performing the slower comproportionation step utilizing the actual energy storing species, for example, the aqueous multi-electron oxidant (AMO) such as bromate or other halogen oxoanion, in the three-dimensional (3D) bulk of the solution where a higher reaction rate can be sustained. The reagent and the product of the discharge are anions which result in their low cross-over from the positive electrode 205a through a cation-exchange membrane 205c to the negative electrode 205b. Among the bromine oxoacids $HBrO_n$, $1 \leq n \leq 4$, bromic acid ($HBrO_3$) presents a useful compromise between the energy density and the energy efficiency. The theoretical energy efficiency of a $H_2$—$HBrO_3$ discharge unit 104 on discharge can be estimated as the ratio of the standard equilibrium potential of the bromine/bromide couple, for example, about 1.07V and the standard equilibrium potential of the bromate/bromide couple, for example, at about 1.42V, measured with respect to the standard hydrogen electrode and is equal to about 75%, which is acceptable for transportation applications. The bromate/bromide direct electroreduction is slower than the iodate/iodide direct electroreduction. At pH 10, the difference between the onset potentials of bromate reduction to bromide and bromide oxidation to bromate on Pt amounts to 0.4 V. In an acidic solution, the reduction of iodate follows the same pathway as the reduction of bromate, that is, via a homogeneous comproportionation to bromine.

The method and the system 100 disclosed herein use halic acids or halate anions as the aqueous multi-electron oxidant (AMO) among halogen oxoacids due to a number of reasons and/or factors. One of the factors is, for example: perhalates are inert kinetically, both in direct reduction on an electrode 205a and in homogeneous comproportionation, whereas halites and hypohalites have lower energy densities. Other factors are considered too. For example: during the discharge, both the efficiency of the halogen electrode kinetics, that is, the halogen/halide exchange current and the ratio of the standard electrode potentials of halogen/halide to oxohalate/halide are important in the overall cycle energy efficiency. Due to the first factor, bromine oxoacids are used instead of chlorine oxoacids and due to the second factor, bromine oxoacids are used instead of iodine oxoacids. The discharge system 101 can be used on-board, for example, a vehicle. The regeneration system 106 can be used on-board or off-board. The structures of the discharge unit 104 or the electrolytic cell stack 105 are based on the corresponding structures in proton exchange membrane fuel cells (PEM-FCs).

In an embodiment, the reagent containers, for example, the reducer fluid tanks 103, and the oxidant fluid tanks 102, exemplarily illustrated in FIG. 1, are refilled by pumping the reducer and the oxidant fluid comprising the aqueous multi-electron oxidant (AMO) from their respective stationary storage facilities such as an off-road fueling station. In an embodiment, the reagent containers, for example, 102 and 103 are located outside the discharge unit 104 and are connected to the electrolytic cell stack 105 via the ports 302 and 303. In another embodiment, the reagent containers, for example, 102 and 103 are refilled by regenerating or partially regenerating the intermediate oxidant and the reducer, for example, by electrolysis, by applying an electric current of a polarity opposite to the polarity of the electric current that the discharge unit 104 generates during the discharge mode of operation, etc. This partially regenerated AMO is useful for regenerative braking while driving an electric vehicle, load leveling, etc.

Figure 2:
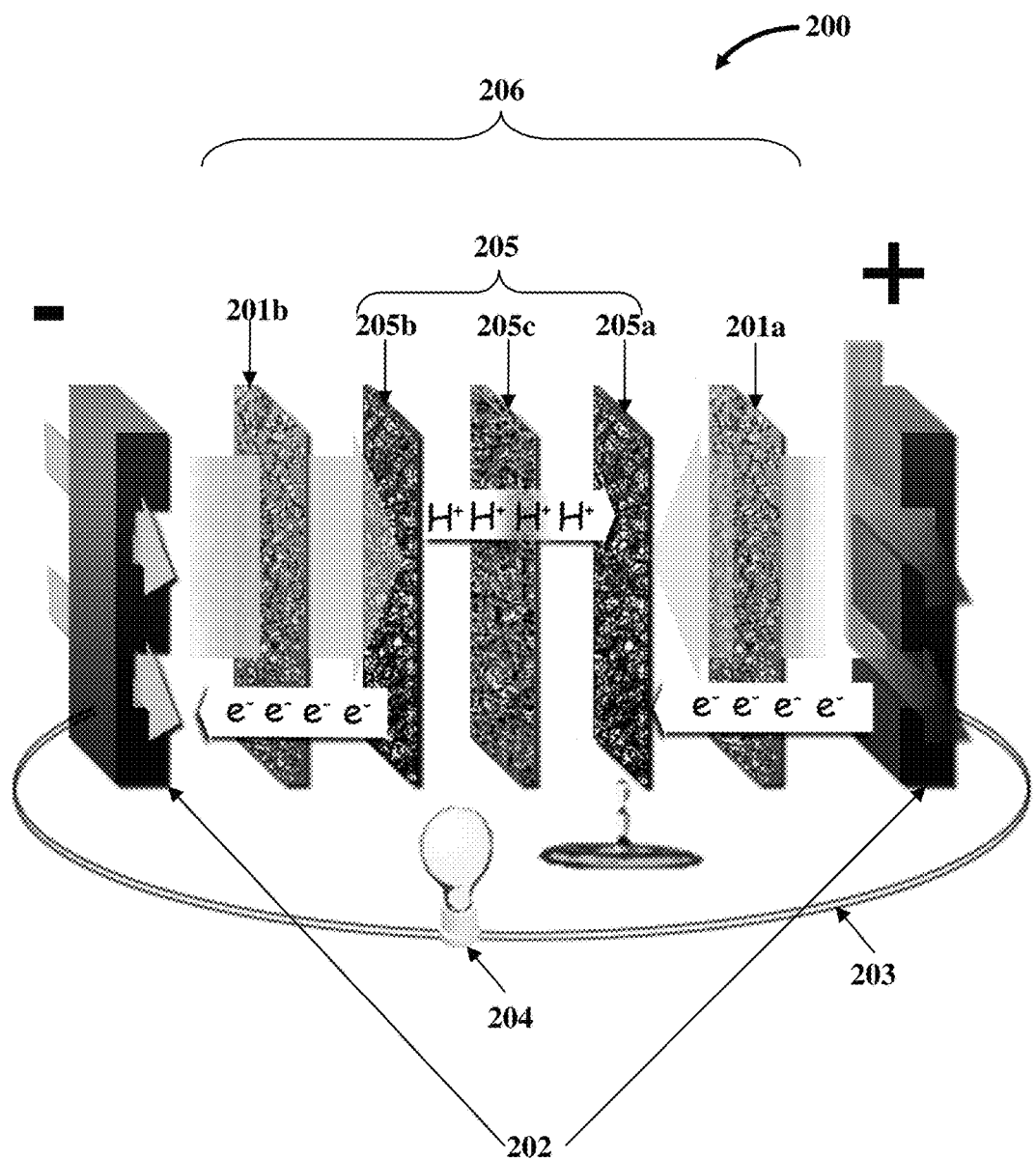
FIG. 2 exemplarily illustrates a perspective view of a dissembled single electrolytic cell of an electrolytic cell stack of a discharge unit of the discharge system and of an electrolyzer of an electrolysis-disproportionation reactor of the regeneration system.

FIG. 2 exemplarily illustrates a perspective view of a dissembled single electrolytic cell 200 of an electrolytic cell stack 105 of the discharge unit 104 of the discharge system 101 and of the electrolyzer 107a of the electrolysis-disproportionation (ED) reactor 107 of the regeneration system 106 exemplarily illustrated in FIG. 1. Each electrolytic cell 200 comprises the 3-layer electrolyte-electrode assembly 205. The 3-layer electrolyte-electrode assembly 205 of the electrolytic cell stack 105 is flanked by pair of diffusion layers 201a and 201b, where the pair of diffusion layers 201a and 201b is flanked by a pair of bipolar plates 202. The diffusion layers 201a and 201b are electronically conducting and porous. The diffusion layers 201a and 201b are sheets capable of gas transport or liquid transport through pores of the diffusion layers 201a and 201b or though the bulk of the diffusion layers 201a and 201b. Moreover, the diffusion layers 201a and 201b are capable of electronic conductivity through their bulk. The diffusion layers 201a and 201b are positioned on either side of the 3-layer electrolyte-electrode assembly 205 in order to facilitate a uniform distribution of the reactants and removal of the discharge products over the areas of the electrodes 205a and 205b. The 3-layer electrolyte-electrode assembly 205 flanked by a negative diffusion layer 201b on the negative electrode side and a positive diffusion layer 201a on the positive electrode side forms a 5-layer electrolyte-electrode assembly 206. The 5-layer electrolyte-electrode assembly 206 flanked by two bipolar plates 202 or a bipolar plate 202 and an endplate 301, exemplarily illustrated in FIG. 3, forms a single electrolytic cell 200. Multiple electrolytic cells 200 connected electrically in series and flanked by endplates 301 form the electrolytic cell stack 105 so that any two adjacent electrolytic cells 200 share a common bipolar plate 202.

The diffusion layers 201a and 201b are made of, for example, porous carbon, composites containing carbon particles and fibers, and carbon cloths such as those used for hydrogen-air proton exchange membrane fuel cells (PEM-FCs) and for redox flow batteries. The bipolar plates 202 comprise flow channels 202a exemplarily illustrated in FIG. 3, for supplying the reducer and the aqueous multi-electron oxidant (AMO) from the storage tanks 103 and 102 respectively, into the electrolytic cell stack 105 and for removing the discharge products from the electrolytic cell stack 105. The bipolar plates 202 are made of, for example, graphite, other carbonaceous materials, carbon-polymer composites, metals, alloys, or electrically conductive ceramic. The 3-layer electrolyte-electrode assembly 205 and/or the 5-layer electrolyte-electrode assembly 206 are hereafter referred to as "electrolyte-electrode assembly".

The 3-layer electrolyte-electrode assembly 205 comprises the electrolyte layer 205c flanked by the positive electrode layer 205a and the negative electrode layer 205b as disclosed in the detailed description of FIG. 2. The positive electrode 205a is supplied with the oxidant fluid comprising the aqueous multi-electron oxidant (AMO) and the negative electrode 205b is supplied with the reducer fluid during the discharge mode of operation of the discharge unit 104. The positive electrode 205a produces the intermediate oxidant such as $Br_2$ and the negative electrode 205b produces the reducer such as $H_2$ on partial recharge, that is, when electric current is forced through the discharge unit 104 in a direction opposite to the direction of the electric current during discharge. A certain amount of the intermediate oxidant in the discharge unit 104 is regenerated from the discharge fluid by reversing a polarity of the electric current flowing through the discharge unit 104 during discharge. In an embodiment, the electrodes 205a and 205b are multiphase systems comprising an electron conducting phase, an ion conducting phase, an electrocatalyst phase that can be functionally combined with an electron conductor, and a reactant/product-transporting porous phase that can be functionally combined with an ion conductor. The discharge unit 104 is a device that converts chemical energy of the reducer and the AMO into electrical energy by means of electrochemical reactions on the two electrodes 205a and 205b and an ion transport through the electrolyte layer 205c.

The electrolyte layer 205c of the electrolyte-electrode assembly 205 in the discharge unit 104 acts as an ion conductor, as well as an electronically non-conducting mechanical barrier separating the negative electrode 205b and the positive electrode 205a of the electrolytic cells 200, thereby precluding an internal electrical and chemical short circuit from being established between the positive electrode 205a and the negative electrode 205b as well as between the aqueous multi-electron oxidant (AMO) and the reducer. In an embodiment, the electrolyte layer 205c of the electrolyte-electrode assembly 205 is composed of a material, for example, a solid, a gel, a liquid, a polymer, an ionomer, a solid ion conductor, or a solid proton conductor or a combination thereof, that is capable of protonic conduction or, more generally, of ionic conduction but not electronic conduction. The electrolyte layer 205c conducts ions but not electrons. The electrolyte layer 205c with a higher permeability and/or conductivity to cations than to anions has an additional advantage of reducing the chemical short-circuiting during discharge via the reduction of the AMO on the negative electrode 205b. The electrolyte layer 205c is compatible with water, with the AMO, with the reducer, with the buffer, and with the discharge products. Furthermore, since durable fluorinated polymer cation selective fuel cell membranes are available commercially, the discharge unit 104 disclosed herein uses such cation-conductive fluorinated polymer electrolytes. In another embodiment, the electrolyte layer 205c of the electrolyte-electrode assembly 205 is composed of a material with a cationic conduction exceeding an anionic conduction of the material. In an embodiment, the electrolyte layer 205c is composed of a material that contains one or more proton donor groups or proton acceptor groups, for example, sulfonic, phosphonic, boronic or nitrogen-base groups. In an embodiment, the electrolyte layer 205c is a solid in which hydrogen ions are mobile. In another embodiment, the electrolyte layer 205c is a liquid or a gel in which hydrogen ions are mobile.

Examples of the electrolytes 205c used in the electrolyte-electrode assembly 205 disclosed herein comprise polymers such as Nafion® of E. I. du Pont de Nemours and Company Corporation, Flemion® series of polymers of Asahi Glass Company, Aciplex® of Asahi Kasei Chemicals Corporation, short-chained trifluorovyniloxy polymers from Dow Chemicals, Hyflon®-Ion of Solvay Specialty Polymers, Aquivion® of Solvay SA Corporation, a polymer with —O—$(CF_2)_4$—$SO_3H$ pendant groups developed by 3M Company, BAM membrane from Ballard Advances Materials Corp., sulfonamide based polymers developed by DesMarteau, reinforced membranes from W. L. Gore & Associates, Inc., polybenzimidazole, and other polymers with acidic groups, basic groups or a combination thereof. The acidic groups comprise, for example, sulfonic, phosphonic, boronic, and carboxylic groups. In an embodiment, the electrolyte 205c is a polymer capable of anionic conduction, for example, polymers with quaternary nitrogen and phosphorus groups such as polymers employed in alkaline membrane fuel cells. Another example of an electrolyte 205c employed in the electrolyte-electrode assembly 205 disclosed herein is an ionically conducting liquid retained in the pores of a solid matrix. Examples of such ionically conducting liquid electrolytes comprise phosphoric acid in a silicon carbide (SiC) matrix, hydroxide melts, and electrolyte solutions comprising, for example, solid oxide matrices, polymer matrices, and a combination thereof. Another example of an electrolyte 205c employed in the electrolyte-electrode assembly 205 disclosed herein is a solid proton conductor such as $CsH_2PO_4$, $CsHSO_4$, and related materials, alkaline-earth cerate- and zirconate-based perovskite materials such as doped $SrCeO_3$, $BaCeO_3$, and $BaZrO_3$, as well as rare-earth niobates, tantalates, and tungstates. Polymer electrolytes are considered due to their mechanical properties. Cation-conductive electrolytes are considered due to their ability to reduce crossover such as self-discharge.

In an embodiment, the electrolyte layer 205c is a porous solid matrix imbibed with a liquid or gel or solid ion conducting material. That is, the electrolyte layer 205c is a composite material comprising an ion conducting liquid or gel or solid within pores of the porous solid matrix. The liquid in the electrolyte layer 205c is, for example, phosphoric acid or an aqueous solution of phosphoric acid, a hydroxide or an aqueous solution of a hydroxide, molten carbonates, molten hydroxides, a molten salt, etc. The conducting ion in the electrolyte layer 205c is, for example, $H^+$, $OH^-$, $F^-$, $Cl^-$, $Br^-$, $I^-$, or a combination thereof. The porous solid matrix is, for example, polytetrafluoroethylene (PTFE), polyvinylidene fluoride (PVDF), a dielectric such as silicon carbide, silicon dioxide, a silicate, other ceramic materials, other polymer materials, etc. The ion conducting liquid is, for example, water, an acid, a base, a salt, a molten electrolyte, an organic solvent, or a combination thereof.

In another embodiment, the electrolyte layer 205c of the electrolyte-electrode assembly 205 is composed of a material, for example, a solid membrane, capable of protonic conduction. The solid membrane is, for example, Nafion® of E. I. du Pont de Nemours and Company Corporation and related sulfonic acid polymers, a sulfonamide polymer, acid doped polybenzimidazole, alkali hydrogen sulfates, phosphates such as cesium hydrogen sulfate ($CsHSO_4$), other solid proton conductors, etc. In an example, the material used as the electrolyte layer 205c is $CsH_2PO_4$, other solid proton conductors, etc., when the reducer used in the discharge unit 104 is hydrogen or a hydride. Although selective ionic conduction of the electrolyte layer 205c is not required, an $H^+$ conducting membrane confers the benefit of a more complete reduction of the aqueous multi-electron oxidant, and higher solubility of the discharge products, that is, of a larger energy density of the discharge unit 104 and the regeneration system 106. In another embodiment, the electrolyte layer 205c is a liquid under laminar flow.

In an embodiment, the electrolyte-electrode assembly 205 of the discharge unit 104 further comprises electrodes or electrode layers 205a and 205b disposed on each of the electrolyte layers 205c. The electrode layers 205a and 205b comprise, for example, catalysts, carbon particles or fibers, a binder, a pore-forming agent, etc. In an embodiment, the catalyst in the electrode layer disposed on the negative hydrogen electrode 205b is platinum (Pt) and Pt nanoparticles on carbon microparticles or on carbon microfibers. In an embodiment, the catalyst in the electrode layer disposed on the positive electrode 205a is one or more carbonaceous materials with or without metals, metal oxides, such as $RuO_2$ and dimensionally stable anodes (DSAs), other metallic and non-metallic materials, etc.

The discharge unit 104 disclosed herein produces, in the discharge mode, an electric power, that is, sustainable electrical current and electric voltage, via an electrochemical reaction using two reactants: the reducer and the aqueous multi-electron oxidant (AMO) on spatially separated electrodes 205a and 205b. During the discharge mode of operation of the discharge unit 104, the negative electrodes 205b are supplied with the reducer, such as $H_2$ and the positive electrodes 205a are supplied with the AMO, such as bromate resulting in a sustainable voltage difference and sustainable electric current between the electrodes 205a and 205b. The discharge mode of operation of the discharge unit 104 is also known as a power generating mode of operation or a direct mode of operation. The discharge unit 104 produces electric potential difference between the electrodes 205a and 205b, which in turn produces an electric potential difference between the diffusion layers 201a and 201b and between the bipolar plates 202, when the reactants are supplied to their respective electrodes 205a and 205b. The reducer donates electrons to the negative electrode 205b and produces ions. The external electric circuit 203 conducts or transfers electrons from the negative electrode 205b to the positive electrode 205a. The aqueous multi-electron oxidant, either directly or via an intermediate, accepts the electrons from the positive electrode 205a for producing the electric current in the external electric circuit 203. The electrolyte layer 205c provides for a movement of the ions between the negative electrode 205b and the positive electrode 205a, thereby maintaining electroneutrality of the electrolyte layer 205c and conservation of charge in the discharge unit 104, and producing a sustainable current and sustainable voltage between the electrodes 205a and 205b and between the bipolar plates 202.

When a load 204, for example, a light bulb, is attached between the terminals of the electrolytic cell 200 or between the endplate terminals of the discharge unit 104, the electric current flows for as long as the reactants are supplied to the electrodes 205a and 205b and the discharge products are removed from the electrodes 205a and 205b. In the discharge mode of operation, the discharge unit 104 consumes the reducer and the aqueous multi-electron oxidant that are produced from the discharge fluid outside the discharge unit 104 or fully or partially regenerated inside the discharge unit 104. As used herein, the term "partially regenerated" refers to the number of electrons donated by the discharge fluid being less the number of electrons lost by the parent oxidant fluid regardless of how these electrons are distributed between various chemical species.

Figure 3:
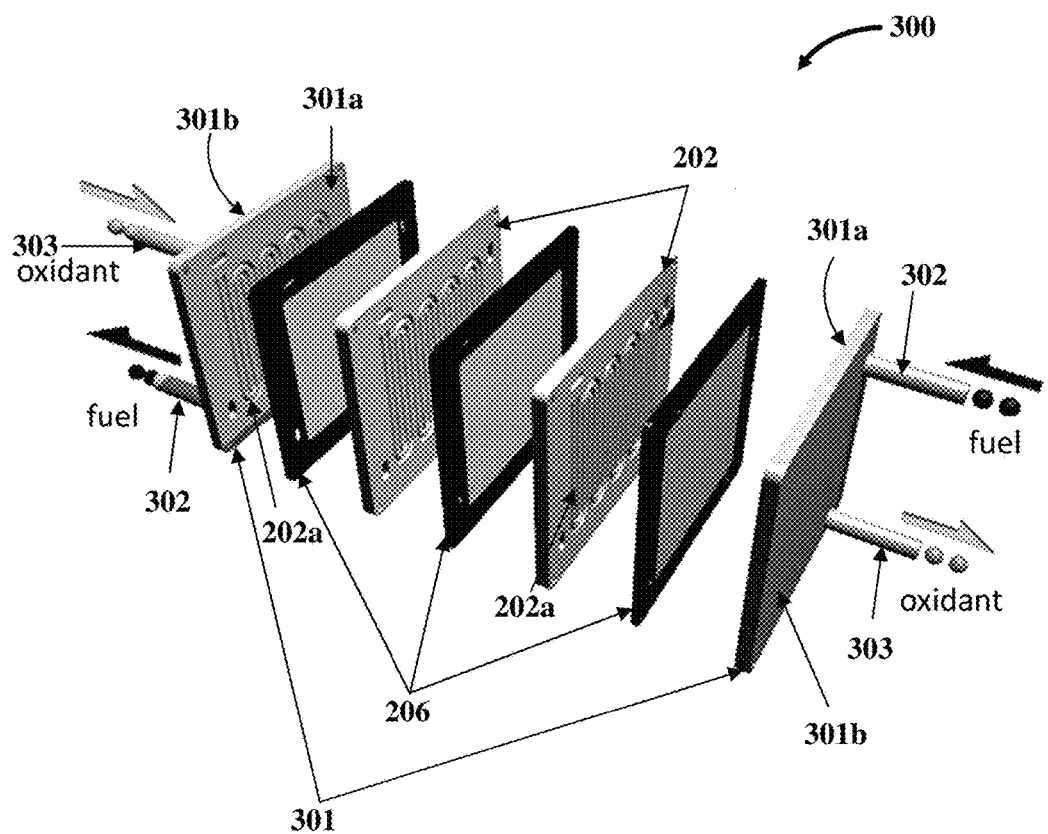
FIG. 3 exemplarily illustrates a perspective view of a planar cell stack of the discharge unit, showing three multi-layered electrolyte-electrode assemblies, two bipolar plates, and two endplates.

FIG. 3 exemplarily illustrates a perspective view of a planar cell stack 300 of the discharge unit 104 exemplarily illustrated in FIG. 1, showing three 5-layer electrolyte-electrode assemblies 206, two bipolar plates 202, and two endplates 301. The planar cell stack 300 comprises multiple electrolytic cells 200 combined electrically in a series combination for delivering a larger electric power than a single electrolytic cell 200 exemplarily illustrated in FIG. 2. When individual electrolytic cells 200 are connected electrically in series, the planar cell stack 300 produces more electric power via a large voltage with about the same current, than the electric power produced by a single electrolytic cell 200. In an embodiment, each 5-layer electrolyte-electrode assembly 206 of the planar cell stack 300 comprises a 3-layer electrolyte-electrode assembly 205 flanked by the diffusion layers 201a and 201b. Each stack in the planar cell stack 300 comprises the 5-layer electrolyte-electrode assembly 206 positioned between two bipolar plates 202 or between a bipolar plate 202 and an endplate 301 that conduct electrons.

The bipolar plates 202 in the planar cell stack 300 comprise flow channels 202a. The flow channels 202a are grooves which allow the reactants to be delivered to the electrodes 205b and 205a and for the discharge products of the electrochemical reaction from the electrodes 205b and 205a through the diffusion layers 201b and 201a to be removed. The flow channels 202a of the bipolar plates 202 allow transport of the reagents and products to and from the electrodes 205b and 205a and to and from the endplates 301. The planar cell stack 300 terminates with the endplates 301. The endplates 301 are similar in structure to the bipolar plates 202 but do not comprise the flow channels 202a on the outer surfaces 301b of the endplates 301. The endplates 301 comprise the flow channels 202a on the inner surfaces 301a of the endplates 301. Moreover, the endplates 301 comprise connecting ports 302 and 303, for example, inlet ports and outlet ports on the outer surfaces 301b of the endplates 301 for facilitating movement of the reducer fluid and the oxidant fluid into the planar cell stack 300 and for the discharge fluid to be moved out of the planar cell stack 300. Furthermore, the endplates 301 comprise electric contacts on the outer surfaces 301b of the endplates 301.

Each electrolytic cell 200 shares one or two bipolar plates 202 with an adjacent electrolytic cell or cells 200. One side of each bipolar plate 202 contacts a positive side of one electrolytic cell 200 and another side of each bipolar plate 202 contacts a negative side of the adjacent electrolytic cell 200. The electrolytic cells 200 in the planar cell stack 300 are stacked electrically in series such that each bipolar plate 202 faces a diffusion layer 201a of the positive electrode 205a of one electrolytic cell 200 on one side and the diffusion layer 201b of the negative electrode 205b of another electrolytic cell 200 on the other side. The individual electrolytic cells 200 are stacked together such that each bipolar plate 202 contacts the negative side of the electrolytic cell 200 at the left of the bipolar plate 202 and contacts the positive side of the electrolytic cell 200 at the right of the bipolar plate 202. The electrolytic cells 200 in the planar cell stack 300 are stacked electrically in series such that each bipolar plate 202 serves as the positive side of one electrolytic cell 200 and as the negative side of the next electrolytic cell 200. Moreover, the bipolar plates 202 are equipped with through channels (not shown) that provide for transport of the reducer, the aqueous multi-electron oxidant (AMO) and the discharge products from the electrolytic cell 200 to the next electrolytic cell 200 in the planar cell stack 300 or to the connecting ports 302 and 303. The number of repeat units or electrolytic cells 200 in the planar cell stack 300 can be adjusted according to the desired power or voltage. The endplates 301 and the bipolar plates 202 are made of chemically inert electronically conducting materials, for example, carbon or carbon composite, and are equipped with flow channels 202a for supplying the reactants and removing the products.

The oxidant fluid and the reducer fluid are stored in reagent containers, for example, the oxidant fluid tanks 102 and the reducer fluid tanks 103 exemplarily illustrated in FIG. 1. The reagent containers or tanks 102 and 103 are connected to the endplates 301 of the planar cell stack 300 via pipes 302 and 303. In a small planar cell stack 300, the reagent containers or tanks 102 and 103 can be placed above the planar cell stack 300 for gravity feeding the reactants to the electrolyte-electrode assembly 205. In an embodiment, in order to overcome the friction in the flowing fluids, pressurized reagent containers are used or pumps are inserted into the connecting lines. In a large planar cell stack 300, the reagent containers or tanks 102 and 103 are placed at some distance from the planar cell stack 300 and may include heat transfer loops (not shown) for cooling or heating the reactants and the discharge products. For purposes of illustration, the detailed description refers to a planar electrolytic cell 200 and planar cell stacks 300; however, the scope of the method and the system 100 disclosed herein is not limited to the planar electrolytic cell 200 or planar cell stacks 300 but may be extended to other configurations of flow batteries and fuel cells known in the art, for example, a tubular stack.

Figure 4:
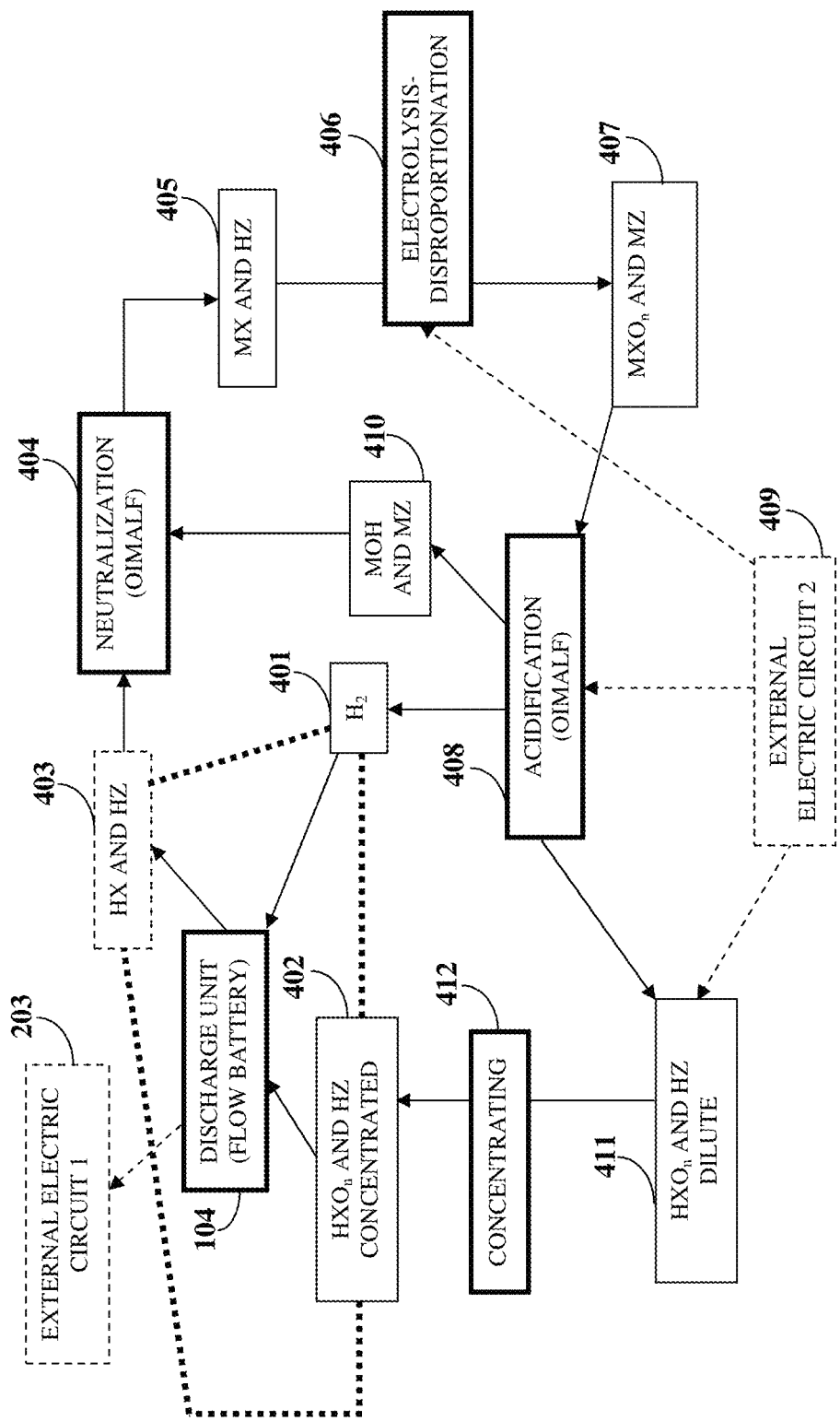
FIG. 4 exemplarily illustrates a discharge and regeneration cycle as flows of energy, materials, and processes, showing the discharge unit with hydrogen as an example of a reducer, an aqueous $HXO_n$ as an example of an aqueous multi-electron oxidant, and a regeneration system using MZ as an example of a buffer in a base form.

FIG. 4 exemplarily illustrates a discharge and regeneration cycle as flows of energy, materials, and processes, showing the discharge unit 104 with hydrogen as an example of the reducer 401, an aqueous $HXO_n$ as an example of an aqueous multi-electron oxidant (AMO), and the regeneration system 106 using MZ as an example of a buffer in a base form. In FIG. 4, $HXO_n$ refers to the AMO in the acid form, $MXO_n$ refers to the AMO in the salt form, HZ refers to the buffer in the acid form, and MZ refers to the buffer in the base form. The flow of materials is represented using solid arrows and the flow of electric energy is represented using dotted arrows. Electric power is used during the process of concentrating 352 by reverse osmosis although other sources, for example, heat can also be used, for example, for evaporation.

The discharge unit 104 is similar to the polymer electrolyte membrane fuel cells (PEMFCs), with a low cost Pt-free porous carbon positive electrode 205a, hydrophilic positive diffusion layer 201a, and with the air feed line replaced by an aqueous multi-electron oxidant (AMO) line, for example, a $HBrO_3$ line. This combination may provide about 1, 200 Ah/kg×1.42 V=1,704 Wh/kg theoretical energy density, and about 426 Wh/kg system-level energy density for about 5% w/w compressed $H_2$, and about 50% w/w aqueous $HBrO_3$. The pH-driven disproportionation reactions allow solution-phase transformation from a high energy bromate to high power bromine during discharge, for example, at a pH<2. The discharge unit 104 also allows for a partial recharge via electrooxidation of bromide into bromine in the discharge fluid which is useful, for example, for regenerative breaking.

During the discharge process, the discharge unit 104 is supplied with the reducer 401, for example, $H_2$, and the acidic oxidant fluid comprising the aqueous multi-electron oxidant (AMO) in acid form $HXO_n$ 402, for example, $HBrO_3$. In an embodiment, the AMO, for example, $HXO_n$ 402 is mixed with a buffer in acid form HZ such as $H_3PO_4$, carried over from the regeneration step. The reducer 401 donates electrons to the negative electrode 205b, also referred to as an "anode", and splits into ions. The reaction at the negative electrode 205b is, for example, $3H_2-6e^-=6H^+$. The external electric circuit 203 conducts and transfers electrons from the negative electrode 205b to the positive electrode 205a. The reaction at the positive electrode 205a, also referred to as a "cathode", is, for example, $3Br_2+6e^-=6\ Br^-$, or when combined with the comproportionation reaction the catholyte, for example, $BrO_3^-+6e^-+6H^+=Br^-+3H_2O$. The aqueous multi-electron oxidant accepts the electrons at the positive electrode 205a for producing the electric current in the external electric circuit 1 203. The discharge unit 104 releases 403 HX, for example, HBr and the buffer HZ in the acidic form, if the buffer HZ is added initially, and generates electric current in the external electric circuit 1 203. The electrolyte layer 205c provides for a movement of the ions between the negative electrode 205b and the positive electrode 205a. At a steady state, the electric current transferred through the discharge unit 104 is equal to the electric current through the external electric circuit 1 203.

The thermodynamics of the discharge process is illustrated herein using the example of $H_2$—$HBrO_3$ reaction. Bromate is a good aqueous multi-electron oxidant (AMO) since it provides a good thermodynamic efficiency (Ebromate/Ebromine) and the corresponding bromine/bromide couple has a fast electrode kinetics even on inexpensive carbonaceous electrodes. Since bromine reacts on the electrode 205a and bromate is the energy storing species in the oxidant fluid tank 102 exemplarily illustrated in FIG. 1, the fraction of the hydrogen-bromate system energy that can actually be converted into electrical energy is less than 100%. To estimate the fraction of energy, that is, the projected energy efficiency, the standard potentials of the couples of interest are used:

$$5Br_2+10e^-=10Br^-\ E°_A=+1.0873\ V \quad (7)$$

$$5Br_2+5H_2=10HBr\ \Delta G°_A=10FE°_A \quad (8)$$

and $$2BrO_3^-+12H^++10e^-=Br_2(l)+6H_2O\ E°_B=+1.48V \quad (9)$$

$$2HBrO_3+5H_2=Br_2(l)+6H_2O\ \Delta G°_B=10FE°_B \quad (10)$$

The energy stored on-board is given by:

$$3H_2+HBrO_3=HBr+3H_2O\ \Delta G°_C=\Delta G°_A/5+\Delta G°_B \quad (11)$$

The electric power produced by the discharge unit 104 is given by equation (8). The ratio of the electric power produced in the discharge unit 104 to the chemical energy of the reagents in the tanks 102 and 103 exemplarily illustrated in FIG. 1, gives the projected discharge efficiency:

$$MDE=\Delta G°_A/\Delta G°_C=\Delta G°_A/(\Delta G°_A/5+\Delta G°_B)=10FE°_A/(2FE°_A+10FE°_B)=E°_A/(E°_B+E°_A/5)=1.0873/(1.0873+1.48/5)=78\%$$

For the homogeneous disproportionation and/or comproportionation:

$$HBrO_3+5HBr=3Br_2+6H_2O$$

$$\Delta G°_D=(\Delta G°_B-\Delta G°_A)/2=5F(E°_B-E°_A)=5F*0.3927V=379\ kJ/mol$$

$$K_C=[Br_2]^3/[H^+]^6[BrO_3^-][Br^-]^5=\exp(-\Delta G°_D/RT)=\exp(-153)=10^{-66.4}$$

The equilibrium constant $K_c$ comprises [H+] and can be used at any pH.

For RT=2.479 kJ/mol, the critical pH at which $[Br_2]^3/[H^+]^6[BrO_3^-][Br^-]^5=1$, is 11. Thus, for the comproportionation reaction to occur, the solution pH can be brought below 11; however due to the formation of an intermediate hypobromite, which is kinetically stable above the acid dissociation constant pKa (HBrO)=8.6, and due to a slow rate of comproportionation at neutral pHs, a lower pH value such as below 3, is used. In acidic solutions in the discharge unit 104, the comproportionation reaction is strongly favored.

Several embodiments of the method of regeneration of the $H_2$-aqueous multi-electron oxidant (AMO) chemistry are disclosed herein. For purposes of illustration, the detailed description refers to a method of regeneration using $HBrO_3$ as the AMO in the acid form, however the scope of the method and the system 100 disclosed herein is not limited to $HBrO_3$ but can be extended to include other AMOs such as $HClO_3$, $HClO_4$, $HBrO_4$, $HIO_3$, $HIO_4$, etc. The regeneration process starts with neutralization 404 of the acid in the discharge fluid with a base, for example, HBr with LiOH or another base such as Li-3-(N-morpholino) propanesulfonic acid (MOPS) in the neutralization reactor 109 of the regeneration system 106 exemplarily illustrated in FIG. 1. Neutralization 404 is a chemical reaction in which a base and an acid react to form a salt. The neutralization 404 of the discharge fluid, HX, with the base, MOH, is performed in the neutralization reactor 109. In an embodiment, some process steps of the energy cycle, for example, neutralization 404, and electrolysis and disproportionation 406 can be combined in a single reactor. The base is regenerated at the negative electrode of the electrolyzer 107 of the regeneration system 106 during the electrolysis process.

The neutralization 404 of the discharge fluid acid with a base, for example, HBr with LiOH or Li-3-(N-morpholino) propanesulfonic acid (MOPS) produces 405 a solution of a salt MX such as LiBr. The solution of a salt such as LiBr and $H_2O$ undergoes electrooxidation into the intermediate oxidant such as $Br_2$ at the positive electrode while $H_2$ and LiOH or $H_2$ and Li-MOPS are produced at the negative electrode. The process of electrolysis 406 is accompanied by the release of the reducer 401, for example, hydrogen in stoichiometric amounts which is used as the reducer 401 in the discharge unit 104. In the case of $Br_2$, if the pH at the positive electrode is maintained near 8, a disproportionation 406 to bromate occurs, for example, with a LiOH base:

$$3Br_2+6LiOH=5LiBr+LiBrO_3+3H_2O \quad (12)$$

Electrolysis 406 of the LiBr+H₂O solution and the disproportionation 406 reactions proceed in a batch mode, a cascade flow mode, or a cyclic flow mode till most of the LiBr is converted into LiBrO₃. The residual LiBr may or may not be removed. In the latter case, the product LiBrO₃ will have some LiBr present. In an embodiment, a provision to remove the residual LiBr is provided. In an embodiment, a buffer is used during the cyclic process in order to maintain the pH at a near constant value which is optimal for the disproportionation 406, for example, 6<pH<10 or near 8. In another embodiment, the buffer comprises hydrogen phosphate and dihydrogen phosphate. In another embodiment, the buffer comprises one or more of Good's buffers, other amines, other tertiary amines, and nitrogen heterocycles. In another embodiment, the buffer comprises a phosphonic acid derivative. In another embodiment, the buffer comprises a lithium counter-cation. $H_2PO_4^{2-}$ has a proper pH for disproportionation and is chemically compatible with the rest of the chemistry throughout the whole energy cycle if, for example, sodium is used as the counter cation.

In the regeneration process, the electrooxidation step or electrolysis 406 is followed by the disproportionation 406 of the intermediate oxidant such as bromine. The disproportionation 406 is the reverse of the comproportionation of the aqueous multi-electron oxidant (AMO) discharge and is favored at a higher pH than the comproportionation of discharge. In the beginning of electrolysis 406 of hydrobromic acid, Br₂ and H₂ are formed in the equal molar amounts:

$$HBr = \tfrac{1}{2}H_2 + \tfrac{1}{2}Br_2 \qquad (13)$$

If there is no buffer present, the anolyte turns acidic due to hydrolysis:

$$Br_2 + H_2O = HBr + HBrO \qquad (14)$$

In a reactor with a cation-selective membrane, the anolyte compartment turns into a solution of HBrO through the equations (13) to (14) route. A further oxidation of HBrO does not proceed on a carbon electrode at low over-voltages; however, a further disproportionation 406 of HBrO can occur in the aqueous phase yielding bromate:

$$3HOBr = 2HBr + HBrO_3 \qquad (15)$$

$$\text{or combined: } 3Br_2 + 6OH^- = 5Br^- + BrO_3^- + 3H_2O \qquad (16)$$

The disproportionation 406 of Br₂ to BrO₃⁻ and Br⁻ is strongly favored thermodynamically at pH above 11, which is equivalent to 1 mM of OH⁻, although this reaction has the maximal rate at pH near 8 due to the formation of an intermediate hypobromite which is stable toward further disproportionation 406 at pH>pKa(HBrO)=8.8. However, even if the HBr produced in equation (15) is consumed in equation (13), one proton per BrO₃⁻ will not get electroreduced due to the lack of an anodic counter-process unless both faradaic and voltage efficiency are sacrificed by running oxygen evolution reactions (OER) or other parasitic process to make O₂ and OH⁻. The resulting pH drop due to the formation of a strong acid HBrO₃ will cause equations (15) and (16) to proceed to the left thus ceasing the regeneration when bromine's average oxidation state is around +1. Thus, a disproportionation 406 of Br₂ to Br (+5) requires an introduction of an external base. In the case of an anionic base with a counter cation, this will result in formation of a bromate salt rather than of bromic acid. The hydroxide generated during hydrogen evolution reaction (HER) on the negative counter electrode can be used as the needed base or to make the needed base. Li⁺ can be used as a counter-cation to achieve high solubilities of the salts involved such as bromide and bromate. A pH buffer comprising, for example, a dissolved phosphonate and/or one or more of Good's buffers is used to prevent spatial and temporal deviations of pH from the value of near 8 within the electrolysis-disproportionation (ED) reactor 107. The resulting product, for example, LiBrO₃, 407 needs to be converted or partially converted to the electrochemically active aqueous multi-electron oxidant (AMO), for example, HBrO₃. This can be accomplished via a solution-phase cation exchange process in the ion exchange reactor 108, for example, the orthogonal ion migration across laminar flow (OIMALF) reactor with a simultaneous conversion of the input discharge fluid into a salt, for example, HBr into LiBr. LiBrO₃ is converted into HBrO₃ using the orthogonal ion migration across laminar flow (OIMALF) or the ion exchange process 408. The buffer is converted from the acid form into a base form simultaneously.

The continuous electrolysis-disproportionation (ED) 406-orthogonal ion migration across laminar flow (OIMALF) process 408 disclosed herein for the regeneration of HBrO₃ from HBr ends with an ion exchange of the base form of the oxidant fluid comprising, for example, LiBrO₃ into the acid form of the oxidant fluid comprising, for example, HBrO₃ in the ion exchange reactor 108 while realizing hydrogen at the negative electrode and consuming hydrogen at the positive electrode as disclosed in the detailed description of FIG. 10B. The principle of OIMALF 408 is identical to ion suppression in anion chromatography. In an embodiment, The OIMALF process 408 generates and consumes H₂ within the OIMALF reactor or the ion exchange reactor 108. The OIMALF process 408 of converting $MXO_n$ into $HXO_n$, for example, LiBrO₃ into HBrO₃ avoids cumbersome chemical separation and ion exchanger regeneration steps. The net reaction of the ion exchange or the OIMALF process 408 is, for example, LiBrO₃+HA=HBrO₃+LiA, where HA is a source of protons, for example, water, phosphoric acid, dihydrogen phosphate, one or more of Good's buffers, etc. The regeneration system 106 is connected to an external electric circuit 2 409 which provides electric power for the OIMALF process 408. The base, for example, MOH or LiA 350 generated as a result of the OIMALF process 408 is used during the process of neutralization 404 of the discharge fluid, for example, HBr. In an embodiment, LiBrO₃ is converted into HBrO₃ using ion exchange on resins. This is followed by electrolysis (E) 406 of LiBr into bromine and, in the same ED reactor 107 or another reactor, by disproportionation (D) 406 of the halogen into halate and halide in a suitable buffer, for example, a lithium hydrogen phosphate buffer, one or more of Good's buffers, or any combination thereof, near pH 8. The electrolysis-disproportionation 406 cycle continues in the same flow or batch ED reactor 107 till [bromide]/[bromate] ratio decreases, for example, below 0.05. The resulting solution can be concentrated 352, for example, using reverse osmosis or evaporation. The concentrated solution, for example, approximately 10M LiBrO₃ solution, the concentration of which is limited by the solubility of LiBrO₃ at the operating temperature, for example, of about 20° C., then goes back into the ion exchange reactor 108 such as the OIMALF reactor, where Li⁺ in LiBrO₃ is exchanged for H⁺ from the incoming HBr, thus producing, for example, a solution comprising 0.5M HBrO₃ and 9.5M LiBrO₃. The hardware components of the hydrogen-bromate energy cycle disclosed herein comprise analytical chemical detectors (not shown) used for process monitoring and control.

The resulting concentrated HBrO₃ solution is used as the aqueous multi-electron oxidant (AMO) for the discharge unit 104. The net result of regeneration for an exemplary combination of the AMO and the buffer LiA is:

HBr+3H$_2$O=(electricity in two places, LiA recycled)=3H$_2$+HBrO$_3$ (17)

The electrolysis-disproportionation (ED) 406-orthogonal ion migration across laminar flow (OIMALF) 408 process has a reasonably high projected energy efficiency of about 70%. The oxidant fluid comprising one or more forms of the aqueous multi-electron oxidant (AMO) may be further concentrated. The commercial process of concentrating 352 HBrO$_3$ uses evaporation, with an estimated energy loss of approximately 10-15% if heat exchangers are used. The evaporation is likely to lead to the loss of volatile bromine species and evaporation may be less energy efficient than reverse osmosis (RO). The reverse osmosis process requires overcoming of the osmotic pressure, for example, of 536 bars, which is possible in a cascade flow mode with commercial supported ion exchange membranes. The minimal energy expense at an infinitely slow filtration rate is 6.6% of the energy content of the product 50% w/w HBrO$_3$ and 3H$_2$. Due to a finite flow rate, the regeneration process disclosed herein uses optimization of the unit size, power, and operating pressure in terms of the energy efficiency and capital cost.

Since the kinetics of all the processes involved in the chemical cycle of the discharge unit 104 and the economic figures for polymer electrolyte membrane fuel cells (PEMFCs) are well known, quantitative predictions on the performance of the discharge unit 104 disclosed herein can be derived. The data for the discharge unit 104 disclosed herein, also referred to as a flow battery or a discharge flow cell, is calculated for a one-dimensional model with a flow-by smooth carbon cathode for a constant solution composition outside of the diffusion boundary layer as well as from the experimental data disclosed in the detailed description of FIG. 13 and using other relevant performance figures from the PEMFCs literature are compared with the Advanced Research Projects Agency-Energy (ARPA-E) targets. The projected performance of the discharge unit 104 and the ARPA-E targets are shown in Table 1 below.

TABLE 1

| Parameter | Units | ARPA-E Target | Projected Value |
|---|---|---|---|
| Manufacturing cost | $/kWh | <100-125 | 140 |
| Effective specific energy | Wh/kg | >150 | 570 |
| Effective energy density | Wh/L | >230 | 900 |
| Effective specific power on discharge, 80% DOD/30 s | W/kg | >300 | 690 |
| Cycle life at 80% depth of discharge (DOD) | cycles | >1000 | 1000 |
| Calendar life | years | >10 | 6 |
| Operating temperature | ° C. | >−30 | −40 |

The discharge unit 104 meets the requirements as the primary power source for electric vehicles (EVs). The one-way discharge efficiency of about 85% at the target power of about 0.05 W/cm$^2$ is found using a precious metal free smooth glassy carbon rotating disk electrode (RDE) as disclosed in the detailed description of FIG. 12, FIG. 13, FIG. 21, and FIG. 25. The discharge unit 104 disclosed herein has a short refueling time in EV applications when combined with off-board regeneration, which is based on the disproportionation 406 of Br$_2$ electrochemically regenerated from the discharged LiBr, HBr, etc.

In Table 1, the projected temperature refers to a cold-start up and is limited by the aqueous multi-electron oxidant (AMO)'s freezing point. The cost figures are calculated based on the design of modern polymer electrolyte membrane fuel cells (PEMFCs) minus the cost of the Pt catalyst on the positive electrode 205*a*. The cost figures do not account for the economy-of-scale discount. The parameters refer to the system 100 exemplarily illustrated in FIG. 1, with H$_2$ storage as a 5% w/w metal hydride and 50% w/w/HBrO$_3$ and 78% discharge efficiency at 0.5 W/cm$^2$ power. The power is calculated for a smooth flow-by carbon cathode on the basis of kinetic parameters reported in the literature and by assuming membrane resistance of 0.1 ohm/cm$^2$ as exemplarily illustrated in FIG. 13. The durability number is the operational life and not the calendar life. The projected durability of the discharge unit 104 is limited by the degradation of Pt on the hydrogen anode accounting for the aqueous multi-electron oxidant cross-over at open circuit potential (OCP) on the basis of relevant data for the PEMFCs. Purging both the electrodes 205*b* and 205*a* with on-board water on shut-downs can increase the projected durability.

The results of system level modeling in the Advanced Research Projects Agency-Energy (APRA-E) metrics show that the most conservative estimate for the energy density of the 5% H$_2$-50% HBrO$_3$ on-board system is 426 Wh/kg, which is 2.8 times larger than the ARPA-E target of 150 Wh/kg and 6.5 times larger than the corresponding number for lithium iron phosphate (LFP) batteries in Tesla Roadster® of Tesla Motors, Inc. The estimate of the specific energy of the discharge system 101 disclosed herein depends on the type of H$_2$ storage and varies from 208 Wh/L for 350 bar gas, 339 Wh/L for 5% w/w metal hydride and 400 Wh/L for liquid H$_2$. For a 150 kWh sport utility vehicle (SUV), the system volume is 750, 970, and 2,000 L for liquid, metal hydride and compressed H$_2$, respectively, of which only 300 L is the aqueous multi-electron oxidant (AMO) tank. These values fall in between the volumes of the combination of a gasoline tank with an internal combustion engine (ICE) and the combination of a lithium ion battery (LIB) with an electric engine. Regardless of the H$_2$ storage method, the system-level energy density of the discharge system 101 meets the ARPA-E target of 230 Wh/L.

The energy and material cycle exemplarily illustrated in FIG. 4 incorporates an affordable method to regenerate both the reducer such as hydrogen (H$_2$) reducer 401 and the aqueous multi-electron oxidant (AMO), for example, bromate (BrO$_3^-$) from the discharge fluid, for example, aqueous solution comprising bromide (Br$^-$), without reliance on fossil fuels, thus resolving the need for a hydrogen source which is injurious to the development of hydrogen economy. Although the gravimetric specific energy of hydrogen is high, the volumetric energy density of hydrogen is low even at the highest practically achievable pressures and hydrogen storage. Both high pressure carbon composite cylinder and metal hydrides tank may satisfy the mass and the volume requirements. In addition, 20% of the required H$_2$ can be regenerated on board from the discharge fluid using metals, which in turn can be regenerated by electrolysis 406 of MBr$_2$ off-board:

M(M=Zn,Sn,Fe,etc.)+2HBr→MBr$_2$+H$_2$

The safety of the H$_2$-aqueous multi-electron oxidant (AMO) discharge system 101 is also considered. Since the two reagents, that is, the AMO and hydrogen do not come in contact under normal operating conditions and only small amounts of H$_2$ and AMO may contact each other without reaction in an accident within the discharge unit 104, the safety of $H_2$ and of the AMO such as 5-20 M aqueous $LiBrO_3$, is individually considered. On-board hydrogen is safer than gasoline systems due to faster escape in an open space. Bromates are moderately toxic, comparable to nitrites, and although suspected carcinogens, are widely used as additives in bread flour in the United States. In an outdoor environment bromates eventually turn into benign bromides. Moreover, bromates are listed as oxidants and are corrosive but not explosive. The intermediate bromic acid, present in the ion exchange reactor 108 and discharge unit 104, is classified as an oxidizer, but not as an explosive. Bromic acid can be safely concentrated 352 by vacuum-distillation at 80° C. up to 50% w/w. From a practical handling viewpoint, $HBrO_3$ is similar to $HNO_3$ although the former does not stain skin. HBr is a well known corrosive agent having a long history of safe use in various applications. The system energy density of the $H_2$-AMO discharge system 101 disclosed herein is about 6 times larger when compared to the Li-ion battery pack of the Tesla Roaster® and hence allows for the incorporation of additional safety features such as a collision and/or spill-proof enclosure without jeopardizing the driving range and power of the electric vehicle. The risk of using such a corrosive oxidant, that is, $HBrO_3$ if it is present on-board only in a small amount in the discharge unit 104 can be mitigated.

The $H_2$-aqueous multi-electron oxidant (AMO) discharge system 101 disclosed herein has the following advantages: high system energy content, for example, about 426 Wh/kg and about 200-400 Wh/L, which is 6 times greater than that of a lithium ion battery (LIB) pack; high power density, for example, of about 690 W/kg, which exceeds the Advanced Research Projects Agency-Energy (ARPA-E) target more than twice; mechanic refill: can be refilled at a pump in less than 5 min; long range, for example, of about 300 miles per refill with about 120 L storage; aqueous chemistry which is intrinsically safer than Li-ion batteries; low materials and manufacturing cost, for example, of about \$120/kWh and about \$115/kW; low total cost of ownership (TOC), for example, of about \$0.15/mile for a 6 year lifetime of the discharge system 101 and the regeneration system 106; simultaneous stoichiometric regeneration of $H_2$ and AMO using electricity as the only input and without irreversibly consuming other chemicals and without generating chemical waste.

FIGS. 5A-5B exemplarily illustrate a table showing different reactions used or considered for electrochemical energy storage and energy conversion. The characteristics of the redox reactions comprise, for example, theoretical charge density in (ampere*hour)/kilogram (A*h/kg), standard equilibrium cell potential (Eeq) in volts (V), the reactants' theoretical energy density in watt-hour per kilogram (Wh/kg), the oxidant's solubility (weight percentage %), maximum practical energy density (ED) in Wh/kg, exchange current in milliampere (mA)/square centimeter ($cm^2$), energy efficiency in %, and practical energy efficiency× energy efficiency in Wh/kg. As exemplarily illustrated in FIGS. 5A-5B, some $H_2$— aqueous multi-electron oxidant (AMO) chemistries can afford four times higher theoretical energy densities than batteries with solid electroactive materials, for example, lithium ion batteries. The practical ratio may be as much as 10 due to a higher packing ratio in a flow battery or in the discharge system 101 exemplarily illustrated in FIG. 1, but not in batteries with solid electroactive materials (SEAM) such as lithium ion batteries. The practical energy density includes water in the concentrated aqueous multi-electron oxidant (AMO). The maximum energy density includes oxidant solubility but not $H_2$ storage and energy efficiency in %. For oxohalic acids, the projected energy efficiency is defined as the ratio of the standard equilibrium potentials of halogen/halide and oxohalate/halide.

Figure 6:
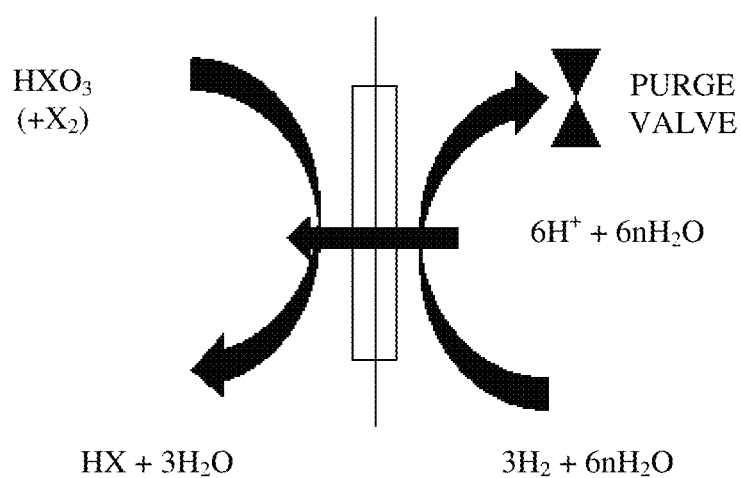
FIG. 6 exemplarily illustrates mass flows in a single electrolytic cell of an electrolytic cell stack of the discharge unit during discharge with $H_2$ as the fuel and $HXO_3$ as the oxidant.

FIG. 6 exemplarily illustrates mass flows in a single electrolytic cell 200 exemplarily illustrated in FIG. 2, of an electrolytic cell stack 105 of the discharge unit 104 exemplarily illustrated in FIG. 1, during discharge with $H_2$ as the fuel and $HXO_3$ as the oxidant. In this example, the reducer is $H_2$. The aqueous multi-electron oxidant (AMO) is $HBrO_3$. The standard equilibrium potential for this combination is 1.42 V and the theoretical energy density is, for example, about 1,705 Wh/kg, which is 4.4 times higher than that of lithium iron phosphate/graphite chemistry. $HBrO_3$ can be used, for example, pumped as an aqueous solution which is stable up to, for example, about 55% w/w concentration (938 Wh/kg). In another embodiment, $HIO_3$ can be used as the AMO. The equilibrium voltage is 1.19V and the energy density is 1,052 Wh/kg and the room temperature solubility is 74% at 20° C. $HIO_3$ has faster kinetics, that is, electrolytic cell power, but the intermediate $I_2$ is solid and reduces at a lower potential thus lowering the efficiency of the energy cycle. The discharge unit 104 is configured similar to a polymer electrolyte fuel cell but with a hydrophilic liquid diffusion layer on the positive electrode 205a. A cation exchange membrane, for example, Nation® of E. I. du Pont de Nemours and Company Corporation is used as the electrolyte 205c. The cation exchange membrane minimizes the crossover or rejects anionic species and assures nearly single or exclusive hydrogen ion conductivity and high power density. The operating temperature of the discharge unit 104 is maintained above the ambient temperature to facilitate heat rejection and electrode kinetics. The negative electrode 205b, for example, the hydrogen side of the electrolyte-electrode assembly 205 has a standard design and prepared by standard methods known to those skilled in the art of polymer electrolyte fuel cells (PEFCs).

The design of the positive electrode 205a is also similar to polymer electrolyte fuel cell (PEFC) electrodes but the positive electrode layer 205a is paired with a liquid diffusion layer on the back since the reagents and products on the positive electrodes 205a are in the liquid phase in contrast to an air-supplied proton exchange membrane fuel cell (PEMFC). In an embodiment, a parallel flow field is used, although numerous other designs, for example, single, multiple, serpentine, meander, inter-digitated, etc., known to those skilled in the art are employed. In an embodiment, the walls of the flow field of the positive electrode 205a are made of a porous carbon and used without a liquid diffusion layer, or the whole flow field can be made of a solid material and a liquid diffusion layer, for example, made of a porous carbon sheet and can be placed between the flow field and the electrolyte-electrode assembly 205. The positive side of the membrane and the positive wall of the bipolar plate 202 exemplarily illustrated in FIGS. 2-3, can be coated with catalytic layers. The intermediate oxidant, for example, $Br_2$ can be regenerated by a direct electrochemical process on the positive electrode 205a. Suitable positive electrodes 205a comprise, for example, one or any combination of carbon, platinum, $PbO_2$, $RuO_2$, dimensionally stable anode (DSA), and other oxides, metals and non-metals, including conductive diamond.

Figure 7:
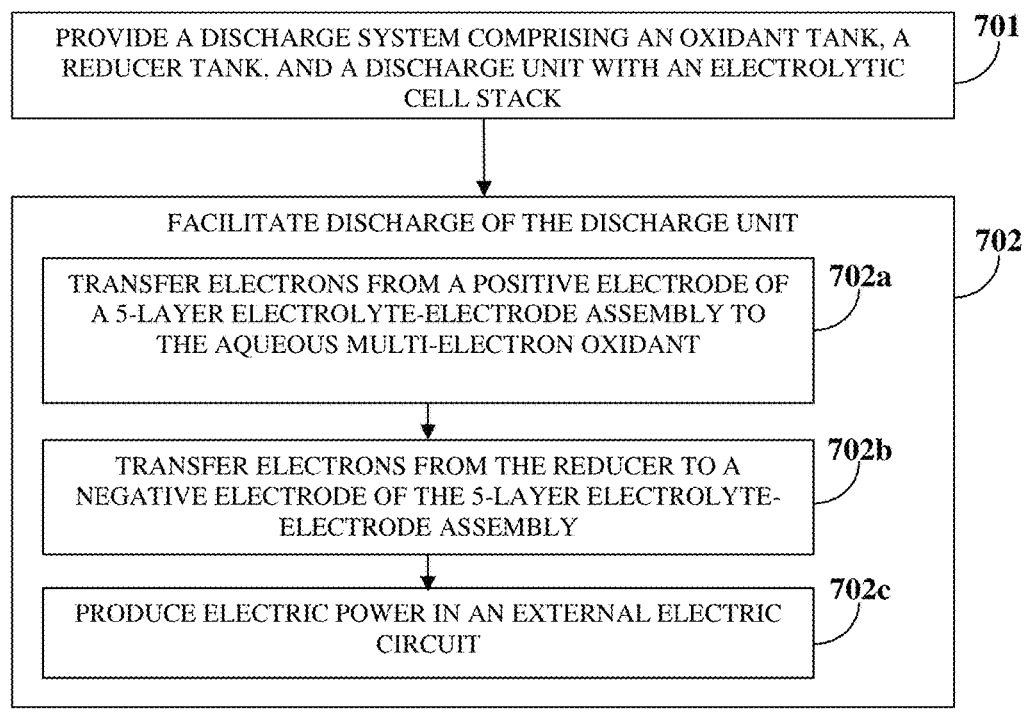
FIG. 7 illustrates a method for producing electric power from an aqueous multi-electron oxidant and a reducer and for simultaneously generating a discharge fluid.

FIG. 7 illustrates a method for producing electric power from an aqueous multi-electron oxidant (AMO) and a reducer and for simultaneously generating a discharge fluid. The method disclosed herein provides 701 the discharge system 101 comprising the oxidant fluid tank 102 comprising the AMO, the reducer fluid tank 103 containing the reducer, and the discharge unit 104 as exemplarily illustrated and disclosed in the detailed description of FIG. 1. The method for producing electric power facilitates 702 discharge of the discharge unit 104. Discharge occurs by transferring 702a electrons from the positive electrode 205a of the 5-layer electrolyte-electrode assembly 206 exemplarily illustrated in FIG. 2, to the AMO and transferring 702b electrons from the reducer to the negative electrode 205b of the 5-layer electrolyte-electrode assembly 206 exemplarily illustrated in FIG. 2, to produce 702c an electric power or (I*U≠0) or a sustainable electric current, that is, a direct current (DC) in an external electric circuit 203 connected to the terminals of the discharge unit 104 and transferring ions between the positive electrodes 205a and the negative electrode 205b of the 5-layer electrolyte-electrode assembly 206, thus conserving the charge. The discharge is facilitated on the positive electrode 205a of the 5-layer electrolyte-electrode assembly 206, for example, by one or more of electrolysis, electrocatalysis, a solution-phase chemical reaction, a solution-phase comproportionation, a solution-phase redox catalysis, an acid-base catalysis, and any combination thereof.

The discharge unit 104 consumes the aqueous multi-electron oxidant (AMO) and the reducer supplied from their respective storage tanks 102 and 103 to generate the discharge fluid stored in a discharge fluid storage tank (not shown) and electric power in the external electric circuit 203. The discharge fluid comprises, for example, one or more of water, an acid form of the buffer, a base form of the buffer, a halogen, a hydrogen halide, a halogen oxoacid, and any combination thereof. Since the discharge fluid coming out of the discharge unit 104 is not water or not only water, the discharge fluid is not disposed into surroundings but collected in a discharge fluid storage tank or container (not shown) to be regenerated later into the reducer and the AMO. The buffer is in the acid form during the discharge with a pH≤7. The acid form of the buffer is, for example, one or more of phosphoric acid, a dihydrogen phosphate of lithium, Good's buffers, and any combination thereof.

Consider an example where the aqueous multi-electron oxidant (AMO) is bromic acid and the reducer is hydrogen. The processes in the discharge unit 104 are: oxidation of hydrogen on the negative electrode 205b, transport of a hydrogen ion with water from the negative electrode 205b to the positive electrode 205a through a cation exchange membrane, comproportionation of bromate with bromide in the fluid near the positive electrode 205a, and reduction of bromine on the positive electrode 205a. Protons or other positive ions are transferred through the cation exchange membrane from the negative electrode 205b to the positive electrode 205a, for example, due to a concentration gradient. Electrons are transferred from the negative electrode 205b to the positive electrode 205a, thus producing electric power, that is, current and voltage in the external electrically conducting connecting circuit, that is, the external electric circuit 203.

Figure 8:
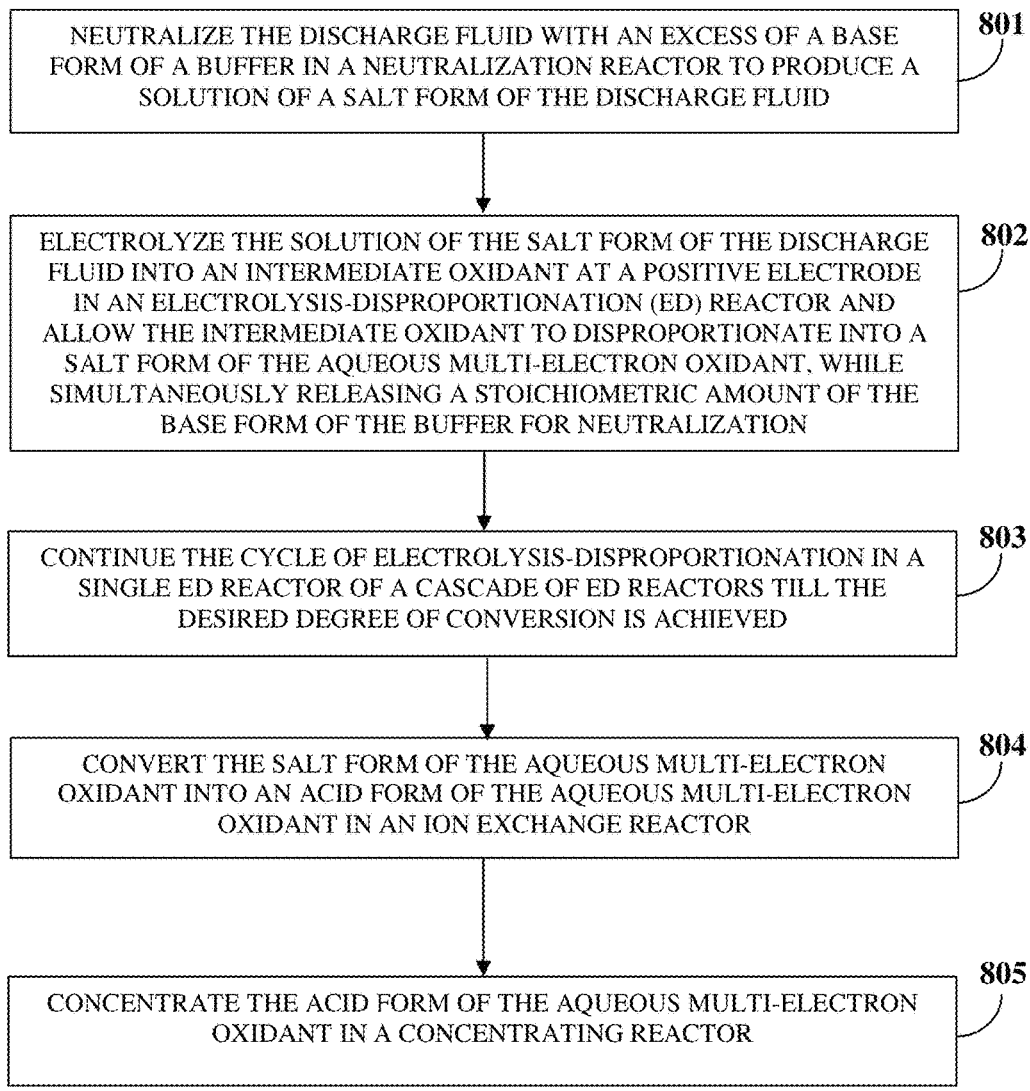
FIG. 8 illustrates a method for regenerating an aqueous multi-electron oxidant and a reducer in stoichiometric amounts from a discharge fluid using electric power.

FIG. 8 illustrates a method for regenerating the aqueous multi-electron oxidant (AMO) and the reducer in stoichiometric amounts from a discharge fluid using electric power. The method disclosed herein provides the regeneration system 106 comprising the neutralization reactor 109, the electrolysis-disproportionation (ED) reactor 107, the ion exchange reactor 108, and the concentrating reactor 112 exemplarily illustrated in FIG. 1. The neutralization reactor 109 neutralizes 801 the discharge fluid, produced by the discharge unit 104 exemplarily illustrated in FIG. 1. The electrolysis-disproportionation proceeds in the ED reactor 107 configured to electrolyze 802 the solution of the salt form of the discharge fluid into an intermediate oxidant, for example, $Br_2$, at a positive electrode in the ED reactor 107. The regeneration system 106 performs electrolytic decomposition of the discharge fluid, for example, HBr into the reducer, for example, $H_2$ and the intermediate oxidant, for example, $Br_2$. The electrolysis process releases the reducer and the base form of the buffer at a negative electrode of the ED reactor 107 while producing a salt form of the AMO at the positive electrode via a series of chemical and electrochemical reactions. The ED reactor 107 is further configured to disproportionate 802 the intermediate oxidant produced at the positive electrode with an excess of the base form of the buffer to produce the salt form of the AMO, while simultaneously releasing a stoichiometric amount of the base form of the buffer for neutralization. The base form of the buffer is, for example, phosphonate, hydrogen phosphate, an amine, a tertiary amine, a morpholine derivative, etc. The cation of the buffer is, for example, lithium, other alkali metal, substituted ammonium, imidazolium, organic cation, etc. Other examples of the buffer components are hydroxide, a lithium cation, a magnesium cation, etc. In an embodiment, the buffer is one or more of the Good's buffers. The regeneration system 106 continues 803 the cycle of electrolysis-disproportionation in a single ED reactor 107 of a cascade of ED reactors till the desired degree of conversion of, for example, bromide into bromate is achieved.

The regeneration system 106 also converts the intermediate oxidant, for example, bromine produced at the positive electrode or electrodes of the electrolysis-disproportionation (ED) reactor 107 into the aqueous multi-electron oxidant (AMO) in the salt form, such as bromate, using a chemical process, for example, a homogeneous chemical reaction such as a disproportionation reaction driven by a pH change, or a homogeneous oxidation by a mediator. The electrolysis-disproportionation (ED) reactor 107 of the regeneration system 106 simultaneously releases on its negative electrode or electrodes a stoichiometric amount of hydrogen and of the base form of the buffer for the disproportionation. In an embodiment, the salt form of the AMO is converted into the acid form of the AMO in an orthogonal ion migration across laminar flow (OIMALF) reactor by recycling the reducer, for example, $H_2$ produced at the negative electrode and consumed at the positive electrode of the OIMALF reactor. Other embodiments for recycling or partially recycling $H_2$ during the regeneration are possible as disclosed in the detailed description of FIGS. 10A-10B. The ion exchange process proceeds in the ion exchange reactor 108 configured to convert 804 the AMO in the salt form, for example, $LiBrO_3$ into the AMO in the acid form, for example, $HBrO_3$. All forms of the AMO is referred herein as the AMO. The conversion of the salt form of the AMO produced at the positive electrode into the acid form of the AMO is performed by an ion exchange process, for example, an electric field driven orthogonal ion migration across laminar flow (OIMALF) method known to those skilled in ion chromatography, in the ion exchange reactor 108. In an embodiment, the conversion of the salt form of the AMO produced at the positive electrode into the acid form of the AMO is accompanied by a conversion of the base form of the buffer into the acid form of the buffer. The AMO and the reducer are stored in the regeneration system 106 until they are transferred to the discharge system 101 exemplarily illustrated in FIG. 1. The acid or salt form of the AMO is concentrated 805 in the concentrating reactor 112 to remove water produced on the positive electrode during the discharge and to remove water introduced with the buffer during electrolysis-disproportionation. The AMO is regenerated via an electron transfer to the positive electrode with or without a combination with a solution-phase process such as disproportionation; and the reducer is regenerated at the negative electrode of the ED reactor 107. The buffer maintains or stabilizes the pH of the discharge fluid at an optimal level or a constant value, for example, between 7 and 11 or at pH 8 for disproportionation in the ED reactor 107. The buffer in the base form is selected from a group comprising, for example, an alkali metal hydroxide, an alkali metal hydrogen phosphate, an alkali metal salt of one of Good's buffers, substituted phosphonic acid, and any combination thereof. The alkali metal is, for example, lithium or sodium. The base form of the buffer, if its structure permits, is converted into an acid form or a neutral form during ion exchange.

In an embodiment, the regeneration of the aqueous multi-electron oxidant (AMO) and/or the reducer is facilitated, for example, by an electrocatalyst, a solution-phase redox mediator such as chlorine/chloride, a pH-dependent solution-phase disproportionation, etc., or any combination thereof. In an embodiment, the conversion of the intermediate oxidant, for example, bromine, into one or more forms of the AMO is facilitated by a buffer in the disproportionation unit 107b. In another embodiment, a chloride mediator facilitates regeneration of the AMO from the discharge fluid. In another embodiment, the regeneration of the AMO and/or the reducer from the discharge fluid is facilitated by adding a base to the discharge fluid. The electrolysis-disproportionation (ED) reactor 107 is configured to operate in one of multiple modes comprising, for example, a batch mode, a cascade flow mode, and a cyclic flow mode. The regeneration system 106 is configured for batch, cyclic or cascade flow modes of operation, or any combination thereof.

The electrolysis-disproportionation (ED) reactor 107 converts a discharged product such as bromide, into a salt form of the aqueous multi-electron oxidant, for example, bromate. The ion exchange reactor 108 converts the aqueous multi-electron oxidant such as bromate from the salt form into the acid form. The ion exchange reactor 108 also converts the discharge fluid from the acid form into a neutral form. The ED reactor 107 adds a base, for example, $HPO_4^{2-}$ to the discharge fluid comprising, for example, bromide as exemplary illustrated for one specific chemistry in the no-aqueous multi-electron oxidant (AMO)-on-negative mode of operation in equation (18) below:

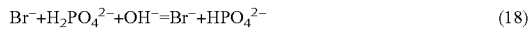

$$Br^- + H_2PO_4^{2-} + OH^- = Br^- + HPO_4^{2-} \quad (18)$$

and electrolyzes the resulting alkaline discharge fluid to produce hydrogen ($H_2$) and the intermediate oxidant such as $Br_2$.

$$\text{anode: } Br^- - e^- = \tfrac{1}{2}Br_2; \quad (19)$$

$$\text{cathode: } H_2O + e^- = OH^- + \tfrac{1}{2}H_2 \quad (20)$$

The counter cation used in the process shown in equations (18)-(19) is one or a combination of an alkali metal, for example, $Na^+$, an alkali earth metal, quaternary nitrogen or phosphorus cations, derivatives of nitrogen heterocycles, and other organic and inorganic cations.

The base is regenerated in the catholyte in the course of the hydrogen evolution reaction. The intermediate oxidant such as bromine further disproportionates via a reaction with the base, for example, as follows:

$$3Br_2 + 6HPO_4^{2-} + 3H_2O = BrO_3^- + 5Br^- + 6H_2PO_4^{2-} \quad (21)$$

The process of electrolysis-disproportionation as shown in equations (18)-(21) above continues in a cyclic flow mode or a cascade flow mode until all or almost all the bromide is converted into bromate. In the next stage, which can be performed either on-board within the discharge system 101 or off-board within the regeneration system 106 or in both systems, the bromate is converted into bromic acid in the ion exchange reactor 108, for example, an orthogonal ion migration across laminar flow (OIMALF) reactor. The salt left over from the disproportionation buffer such as lithium dihydrogen phosphate is, for example, also converted into an acid such as phosphoric acid and for example, and is used in the oxidant fluid with the aqueous multi-electron oxidant without separation.

In an embodiment, the intermediate oxidant, for example, a halogen, is regenerated via an electron transfer at the positive electrode, and the reducer such as hydrogen is regenerated at the negative electrode of the electrolyzer 107a of the electrolysis-disproportionation (ED) reactor 107. In another embodiment, the intermediate oxidant disproportionates during the process of regeneration by consuming a base and provides the final aqueous multi-electron oxidant, for example, a halate in the form of a salt. The base required for the disproportionation of the intermediate oxidant can be supplied externally or can be produced in the course of the cathodic counter reaction, such as hydrogen evolution, in the electrolyzer 107a of the ED reactor 107. A buffer is added to either the catholyte chamber or the anolyte chamber or in both the catholyte chamber and the anolyte chamber of electrolyzer 107a in order to stabilize the pH at the level optimal for the disproportionation. A suitable pH of the buffer is between, for example, 7 and 11 depending on the target aqueous multi-electron oxidant (AMO). A suitable buffer is, for example, a solution of $Na_2HPO_4$ and $NaH_2PO_4$ in various ratios and concentrations. Another suitable buffer is one or more of the Good's buffers, other secondary amine, other amine, substituted phosphonate, and a nitrogen heterocycle. During the disproportionation reaction, in the presence of a buffer or a base containing a cation other than hydrogen, a salt form of the aqueous multi-electron oxidant, for example, $NaBrO_3$ is produced.

The intermediate product, that is, the salt of the aqueous multi-electron oxidant (AMO) is converted into the acid form in the ion exchange reactor 108, for example, the orthogonal ion migration across laminar flow (OIMALF) reactor using one or a combination of electrolysis, ion exchange on solids, ion exchange in a fluid, and an electric-field driven OIMALF process. The ion exchange occurs after the electrolysis-disproportionation (ED) loop or cascade as exemplarily illustrated in FIGS. 10A-10B. The ED loop is a cyclic process involving oxidation of the salt form or other forms of the discharged oxidant, for example, bromide, on the positive electrode of the electrolyzer 107a of the ED reactor 107 into the intermediate oxidant, for example, bromine; a disproportionation reaction that converts the intermediate oxidant such as bromine into the salt form of the AMO such as bromate, and into the salt form of the discharged oxidant such as bromide; oxidation of the salt form of the discharged oxidant on the positive electrode of the electrolyzer 107a into the intermediate oxidant, etc.

In an embodiment, the regeneration of the aqueous multi-electron oxidant from the discharge fluid occurs by reverse transformation of a cathodic discharge product in the discharge fluid and without oxygen consumption or evolution. In another embodiment, the regeneration of the aqueous multi-electron oxidant from the discharge fluid comprises neutralizing an acid of the discharge fluid, for example, via an ion exchange such as orthogonal ion migration across laminar flow (OIMALF). The regeneration system 106 then converts the neutralized discharge solution into an intermediate oxidant and the reducer by means of electrolysis. The intermediate oxidant is further converted into the salt form of the aqueous multi-electron oxidant (AMO) via pH dependent solution phase disproportionation and the salt form of the AMO is converted into to the acid form of the AMO via ion exchange such as orthogonal ion migration across laminar flow process. The regeneration process on the positive electrode of the electrolyzer 107a of the electrolysis-disproportionation (ED) reactor 107 is facilitated by using one or a combination of an electrocatalyst, a solution-phase catalyst, an ion exchange on solids, an ion exchange in a liquid, a pH-dependent disproportionation, and an orthogonal ion migration across laminar flow in one ED reactor 107 or separate reactors in series and/or in parallel. For the $H_2$—$HBrO_3$ regeneration, different embodiments of the methods or routes of electrochemical regeneration of hydrogen and bromic acid from aqueous hydrogen bromide are disclosed herein. Direct electrolysis such as with $PbO_2$ and $RuO_2$— based anodes and mediated electrolysis such as with $Cl_2$-mediator are also implemented.

Figure 9:
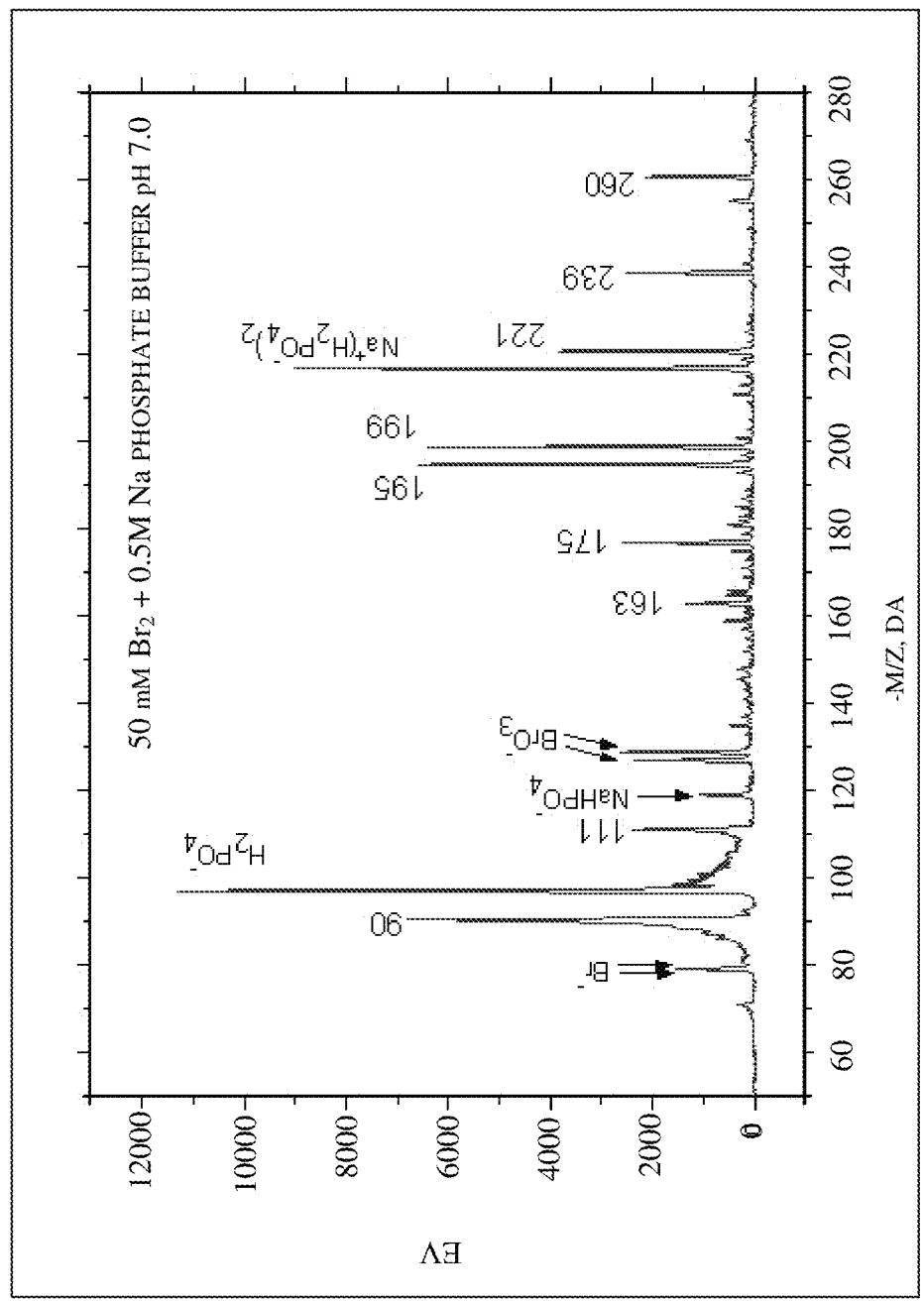
FIG. 9 exemplarily illustrates a negative-ion electrospray ionization-mass spectrometry spectrum of a 0.5M sodium phosphate pH 7.0 buffer solution after addition of 50 mM of $Br_2$.

FIG. 9 exemplarily illustrates a negative-ion electrospray ionization-mass spectrometry spectrum of a 0.5M sodium phosphate pH 7.0 buffer solution after addition of 50 mM of $Br_2$. Bromide and bromate are the only detectable negative Br species with 2 Da 1:1 doublets. These data affirm that bromine disproportionates only into bromide and bromate in a pH 7 buffer. The labeled signals of bromide and bromate prove the occurrence of the regeneration reaction (6) in this buffer. The kinetics of the bromine disproportionation has been studied mostly in near neutral media 4≤pH≤8, where the rates of various steps fall in the range convenient for experimental measurements. The disproportionation of $Br_2$ in water may go all the way to bromate and even to perbromate. The first step occurs at near neutral 4≤pH≤8 via the following pathway:

$$Br_2 + H_2O = HBrO + H^+ + Br^- \qquad (22)$$

$$Br_2 + OH^- = HBrO + Br^- \qquad (23)$$

Herein, bromine disproportionates into bromide and hypobromite in two parallel reactions with water and with another base such as hydroxide, that is, via a general base mechanism. The equilibrium constant at 25° C. for equation (22) at 0.5M ionic strength is $6.1 \times 10^{-9}$ $M^2$. The first order rate constant for the forward reaction for equation (22) is 97 $s^{-1}$, while for the reverse comproportionation reaction with $H^+$ it is $1.6 \times 10^{10}$ $M^{-2}$ $s^{-1}$. The bromine disproportionation has not been studied computationally, but molecular dynamics show that the homologous chlorine reaction in water clusters proceeds as a bimolecular $Cl^+$ transfer between $Cl_2$ and $H_2O$. The chlorine disproportionation in acidic solutions also follows a general acid-base catalysis route, first order in $Cl_2$ and in the general base, while the reverse comproportionation reaction is first order in HOCl, $Cl^-$ and in the general acid.

The hypobromous acid formed in reactions (22) and (23) above undergoes a further disproportionation which is strongly pH dependent. At a low pH bromine and bromate are formed:

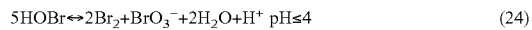
$$5HOBr \leftrightarrow 2Br_2 + BrO_3^- + 2H_2O + H^+ \quad pH \leq 4 \qquad (24)$$

The bimolecular rate constant with respect to the total Br(I) is approximately $2.2 \times 10^{-3}$ $M^{-1}$ $s^{-1}$ when extrapolated to pH 0 and increases at higher pH due to the participation of a deprotonated hypobromite in the rate limiting step. At a higher pH, bromide and bromate are formed:

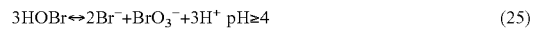
$$3HOBr \leftrightarrow 2Br^- + BrO_3^- + 3H^+ \quad pH \geq 4 \qquad (25)$$

and the rate of the reaction decreases with pH above the $pK_a$ of hypobromous acid of 8.8, although the kinetic equation retains the second order in total Br(I) and the general base catalysis is operative. Both reactions (24) and (25) occur in parallel at the intermediate 4≤pH≤8 where the formal second-order rate constant is the highest. Thus, the optimal pH for the regeneration process

$$3Br_2 + 6OH^- = BrO_3^- + 5Br^- + 3H_2O \qquad (26)$$

is 4-9. For example, the optimal pH for the regeneration process is between 6-8. The reaction is slower at higher pH since an intermediate hypobromite is more stable, and at a lower pH, the equilibrium shifts towards $Br_2$. These considerations based on a literature analysis are confirmed in ESI-MS data, as exemplarily illustrated in FIG. 9 and FIG. 26, which prove the feasibility of the regeneration process as per equation (26).

Figure 10A:
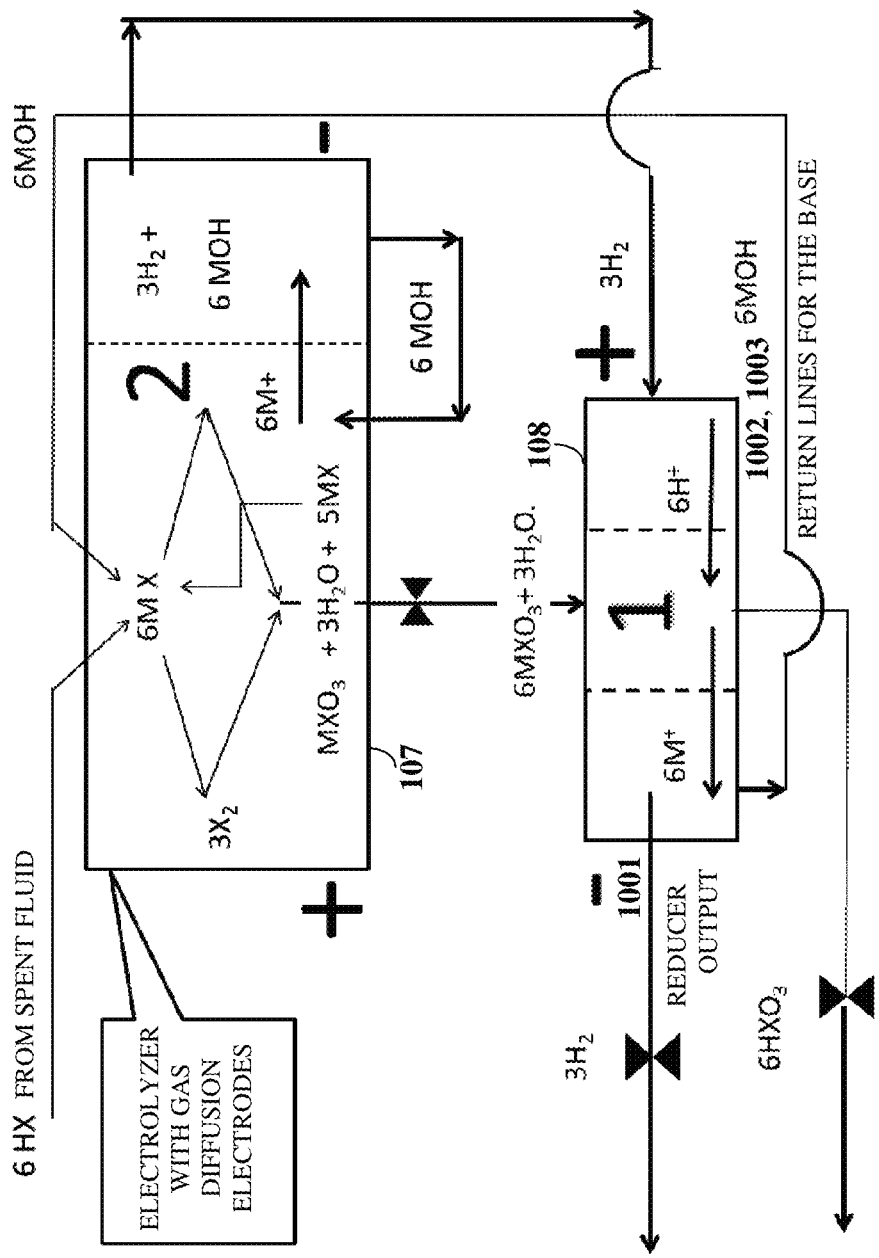
FIGS. 10A-10B exemplary illustrate an electrolysis-disproportionation orthogonal ion migration across laminar flow method for regenerating a reducer ($H_2$) and an oxidant fluid comprising an aqueous multi-electron oxidant ($HXO_3$) from a discharge fluid ($HX+H_2O$) with MOH as a base.

FIGS. 10A-10B exemplary illustrate an electrolysis-disproportionation (ED)-orthogonal ion migration across laminar flow (OIMALF) method for regenerating a reducer ($H_2$) and an oxidant fluid comprising an aqueous multi-electron oxidant ($HXO_3$) from a discharge fluid comprising HX and $H_2O$ with MOH as the base. FIG. 10A illustrates electrolysis-disproportionation in the batch mode with no-aqueous multi-electron oxidant (AMO)-on-negative mode of operation. FIG. 10B illustrates electrolysis-disproportionation in the cyclic flow mode with no-AMO-on-negative mode of operation. FIG. 10A exemplarily illustrates a method for regenerating halic acid and hydrogen from discharged hydrogen halide with a batch ED reactor 107. FIG. 10A exemplary illustrates a regeneration system 106 comprising an electrolysis-disproportionation reactor 107 and an ion exchange reactor 108 in a batch mode of operation for regenerating reducer ($H_2$) and acidic oxidant fluid comprising an aqueous multi-electron oxidant ($HXO_3$) from the discharge fluid ($HX+H_2O$) with MOH as a base configured for the no-AMO-on-negative mode of operation. FIG. 10B exemplarily illustrates a method for regenerating halic acid and hydrogen from discharged hydrogen halide with a flow-through ED reactor 107 in a cyclic flow mode. FIG. 10B exemplary illustrates a regeneration system 106 comprising a flow-type electrolysis-disproportionation reactor 107 configured for the no-AMO-on-negative mode of operation and an ion exchange reactor 108 for regenerating reducer ($H_2$) and the oxidant fluid comprising the aqueous multi-electron oxidant ($HXO_3$) from the discharge fluid ($HX+H_2O$) with MOH as a base. For purposes of illustration and not of limitation, the concentrating reactor 112 is exemplarily illustrated after rather than before the ion exchange reactor 108. The regeneration system 106 is equipped with the ion exchange reactor 108, in addition to the electrolysis-disproportionation (ED) reactor 107, that converts salts into acids, for example, an aqueous solution comprising lithium bromate and a 3-(N-morpholino) propanesulfonic acid (MOPS) anion into an aqueous solution comprising bromic acid and protonated MOPS using a flow-through OIMALF reactor, which is similar to an eluent suppression reactor employed in ion chromatography The OIMALF process of converting salts into acids avoids chemical separation and ion exchanger regeneration steps. The OIMALF reactor can employ hydrogen produced in the ED reactor 107 as exemplarily illustrated in FIGS. 10A and 10B, or hydrogen stored on board as exemplarily illustrated in FIG. 19, or recycle the hydrogen produced on the negative electrode and consumed on the positive electrode of the ED reactor 107.

The regeneration system 106 converts the discharge fluid back into the aqueous multi-electron oxidant (AMO) and the reducer using the ED reactor 107 and depending on the preferred options, the ion exchange reactor 108, a mixing reactor or the neutralization reactor 109, and separation reactors, for example, 1006, 1007, and 1010 as exemplarily illustrated in FIG. 10B, if needed, are not counted as parts of the other devices. In an embodiment, the ED reactor 107 is configured and operated as a batch reactor or a flow-through reactor. In the batch ED reactor, also referred to as a stirred reactor, the liquid in the positive electrode compartment is stirred to achieve a uniform composition. The batch ED reactor operates in the start-stop batch regime till the desired degree of conversion of bromide into bromate is achieved.

A series of a single neutralization reactor 109, a single flow-through ED reactor 107, and a single $H_2$/base separation reactor 1006 can operate in the cyclic regime till the desired degree of conversion of bromide into bromate is achieved. The feedbacks 1009 and 1003 return the base from the $H_2$ separation reactor 1006 and partially regenerated oxidant fluid from the positive loop valve 1004, respectively. The $H_2$ is accumulated in the $H_2$ container during this cycle.

A series of a single neutralization reactor 109, a single flow-through the ED reactor 107, and a single $H_2$/base separation reactor 1006 can operate in the cascade regime, wherein the discharge fluid HX is first neutralized with an excess of a base generated earlier in the ion exchange reactor 108, for example, the orthogonal ion migration across laminar flow (OIMALF) reactor. The first flow-through ED reactor 107 then converts some $Br^-$ into $BrO_3^-$ on the positive electrode while releasing $H_2$ and base on the negative electrode. The $H_2$ goes into an $H_2$ storage container (not shown), and the base from the separation reactors 1006, 1007, and 1010 is returned to the mixing reactor of the neutralization reactor 109 preceding this $H_2$ separation reactor 1006 in the series. The partially regenerated oxidant fluid, for example, comprising LiBr and $LiBrO_3$ in some ratio, instead of going into one preceding mixing reactor of the neutralization reactor 109 as in the cyclic flow mode, goes into the second mixing reactor in the cascade, where $LiBr+LiBrO_3$ is neutralized by the base produced in the second mixing reactor and so on. The number of repeated mixing reactor-ED-separation reactor series in the cascade is, for example, between 5 and 8, and is determined by desired throughput, power, cost, degree of conversion, etc.

The regeneration process comprises the steps of neutralization in the neutralization reactor 109, electrolysis-disproportionation in the ED reactor 107, separation of the reducer, that is, $H_2$ gas from the aqueous multi-electron oxidant (AMO) species in water in the separation reactor 1006, and ion exchange via an orthogonal ion migration across laminar flow (OIMALF) in the ion exchange reactor 108 as disclosed in the detailed description of FIG. 8. The regeneration system 106 takes $HX+3H_2O$ from the discharge fluid and produces $3H_2+HXO_3$, while recycling within itself, water, and the buffer. The separation reactor 1006 separates the liquid solution with the base from the hydrogen gas reducer. The base component of the buffer is represented as $OH^-$.

The ED reactor 107 has an electrolysis unit or an electrolyzer 107a with multilayer electrolyte-electrode assemblies (not shown), a number of bipolar plates, and two endplates. The discharge fluid from the discharge fluid storage tank (not shown) is mixed in the neutralization reactor 109, with the solution of the buffer in the base form coming out of the gas-liquid separation reactors 1006, 1007, and 1010 through the return lines 1009, 1002, and 1003, and then sent to the positive compartment of the ED reactor 107. The neutralized discharge fluid MX is electro-oxidized into the intermediate oxidant $X_2$ at the positive electrode of the ED reactor 107. The intermediate oxidant $X_2$ reacts with the base form of the buffer to produce a salt form of the aqueous multi-electron oxidant (AMO), for example, $LiBrO_3$. On the negative electrode of the ED reactor 107, hydrogen gas is produced upon electrolysis, and a base, for example, an amine, a phosphonate, or a hydroxide is formed in the negative electrode. The base from the negative compartment is mixed with the discharge fluid in the mixing reactor or the neutralization reactor 109 prior to or directly in the positive compartment of the ED reactor 107. On the positive electrode, an intermediate oxidant such as bromine is produced during electrolysis and reacts with the base introduced from the negative compartment yielding, for example, a bromate and a bromide via a disproportionation reaction. The remaining halide is oxidized into halogen on the positive electrode of the ED reactor 107 and disproportionates in a reaction with the base in the next ED cycle.

The electrolysis-disproportionation (ED) process can proceed as a single pass process with a three-way valve 1004 for a sufficiently long ED reactor 107 and sufficiently high amount of the buffer in the base form added in the neutralization reactor 109. In an embodiment, the ED process can run in a cyclic flow mode with two three-way valves 1004 and 1005 in the loop, which is useful for a shorter ED reactor 107, which increases the regeneration time but saves on capital expenses. The three-way valves 1004 and 1005 are exemplarily illustrated in FIG. 10B in positions for the single pass mode of operation of the ED reactor 107. The three-way valves 1004 and 1005 send the aqueous multi-electron oxidant (AMO) in the salt form, that is, $MXO_3$, for ion exchange via an orthogonal ion migration across laminar flow (OIMALF) in the ion exchange reactor 108 to produce the acid form of the AMO, that is, $HXO_3$.

The electrolysis-disproportionation (ED) reactor 107 can be configured and operated in a batch mode or in a flow-through mode. The flow-through mode can be a cycle with one or more units or a cascade with 2 or more units. When a sufficient degree of conversion, that is, ratio of bromate concentration to the total concentration of Br in all forms is achieved in the ED reactor 107, after a certain charge, that is, time or number of cycles passed, the electrolysis is completed. The liquid from the positive electrode chamber of the ED reactor 107 goes into the ion exchange reactor 108 where, in the middle chamber in the exemplary case of the Li-3-(N-morpholino) propanesulfonic acid (MOPS) base form of the buffer, the bromate is converted into bromic acid, Li-MOPS buffer is converted into a protonated MOPS zwitter-ion, and hydrogen is consumed in the positive chamber, and hydrogen is produced in the negative chamber. The base, for example, Li-MOPS or its equivalent is generated in the negative chamber along with hydrogen. The base solution is used to neutralize the acidic discharge fluid, for example, comprising HBr, incoming from the discharge unit 104 exemplarily illustrated in FIG. 1. The separation reactors 1006, 1007, and 1010 are used to separate the gases from the liquids.

Halates are produced by disproportionation of a halogen in the presence of a base. The process of disproportionation of halogens is described by the following equation using hydroxide as an example of a base:

$$3X_2+6MOH=MXO_3+5MX+3H_2O. \tag{27}$$

In the electrolysis-disproportionation (ED) reactor 107, exemplarily illustrated in FIGS. 10A-10B, if the liquid in the positive electrode chamber and the liquid in the negative electrode chamber are allowed to mix, the halogen produced on the positive electrode can react with the base produced on the negative, yielding, for example, a halate and a halide. The halide is oxidized on the anode, thus initiating the new cycle of the loop:

$$MX+H_2O+electrolysis=(0.5H_2+MOH) \text{ negative electrode chamber}+0.5X_2 \text{ positive electrode chamber,} \quad (28)$$

$$3X_2+6MOH=5MX+MXO_3+H_2O \text{ after mixing in the positive electrode chamber,} \quad (29)$$

where the disproportionation described in equation (29) can be performed either in a flow-through process or a batch process with or without assistance of a buffer such as a phosphate buffer. The net equation of the regeneration process, that is, the ED process is:

$$6MX+3H_2O=MXO_3+3H_2 \quad (30)$$

with the electrolysis-disproportionation loop 109 to 1007 as exemplarily illustrated in FIGS. 10A-10B. The reduction of $XO_3^-$ on the negative electrode in the electrolyzer 107a is prevented, for example, by using a negative electrode with a multilayer structure with a cation-selective membrane facing the solution comprising the aqueous multi-electron oxidant (AMO). In an embodiment, a membraneless reactor can also be used if the negative electrode comprises, for example, Ni capable of selective reduction of water into hydrogen without reducing $XO_3^-$, or if the electrolyte layer 205c is not a solid membrane but a laminar flow electrolyte. The optional concentrating reactor 112 removes water introduced with the buffer during electrolysis-disproportionation. A portion of the water is transferred to the neutralization reactor 109 via the water return line 1008 exemplarily illustrated in FIG. 10B.

The choice of the counter-cation in the regeneration schemes of FIG. 8 and FIGS. 10A-10B depends on the solubility of the counter-cation's halide, halate, and buffer salts such as a phosphonate, a Good's buffer, etc., since circulating a small volume of a liquid and minimizing the energy and capital expenses of water removal in making a concentrated aqueous multi-electron oxidant (AMO) solution is beneficial. These considerations are relaxed in the case of an off-board regeneration system 106 as compared to an on-board regeneration system 106 exemplarily illustrated in FIG. 1. Lithium bromide (18.4 m) and bromate (13.3 m) have substantially high solubilities in water at 20° C. and so does lithium hydroxide (5.3 m). Li salts with a suspension of hydroxide or phosphate or with addition of a complexing agent such as 15-crown-5 (15C5), benzo-15-crown-5 (B15C5), dicyclohexano-18-crown-6 (DC18C6), 18-crown-6 (18C6), 12-crown-4 (12C4), dibenzo-18-crown-6 (DB18C6), and their more water-soluble derivatives are also considered. For $K^+$, bromate solubility is low, for example, about 0.35 m at about 20° C. $Na^+$ salts have intermediate solubilities in water, for example, of about 2.4 m for bromate, and about 8.8 m for bromide at about 20° C. The "m" does not have to be a monovalent cation. For example, magnesium bromate has a good solubility in water (2.5 m at 0° C., 5.36 m at 60° C.). Calcium bromate has also a good solubility (1.86 m at 40° C.) that shows only a weak dependence on temperature. Also, Good's buffers have high solubility often above 2 m. The symbol "m" refers to the molal concentration, that is, the moles of solute per kg of solvent.

FIGS. 11A-11B exemplary illustrate a cyclic operation of a flow-through electrolysis-disproportionation (ED) reactor 107 with bromate as an aqueous multi-electron oxidant (AMO), hydrogen phosphate as a base form of a buffer, and sodium as the counter cation configured for no-AMO-on-negative mode of operation. FIGS. 11A-11B exemplarily illustrate a method for regenerating sodium bromate and hydrogen from sodium bromide and water. The charge of one electron per bromide is shown in each cycle for the sake of illustration not of limitation. Theoretically estimated water transfer numbers are shown for the sake of illustration and not of limitation. The balance of water dragged with ions is not shown. A buffer can be used instead of the hydroxide or in addition to the hydroxide. This method allows for minimizing the spatial and temporal variations of pH outside of the range between 7 and 9. For example, a solution comprising $Na^+$ cation and any of the forms of deprotonated phosphoric acid can be used as a component of the buffer. FIGS. 11A-11B exemplarily illustrate a method to execute the electrolysis-disproportionation (ED) regeneration step based on a cyclic operation of the ED reactor 107 with a cation exchange membrane or in a row of, for example, 6 cells connected in series. For purposes of illustration, the detailed description refers to the bromate chemistry, the $Na^+$ cation, and a phosphate buffer; however the scope of the method and the system 100 disclosed herein is not limited to the bromate chemistry, the $Na^+$ cation, and the phosphate buffer but can be extended to include other aqueous multi-electron oxidants (AMOs), cations including $Li^+$, and buffers including Good's buffers.

Figure 12:
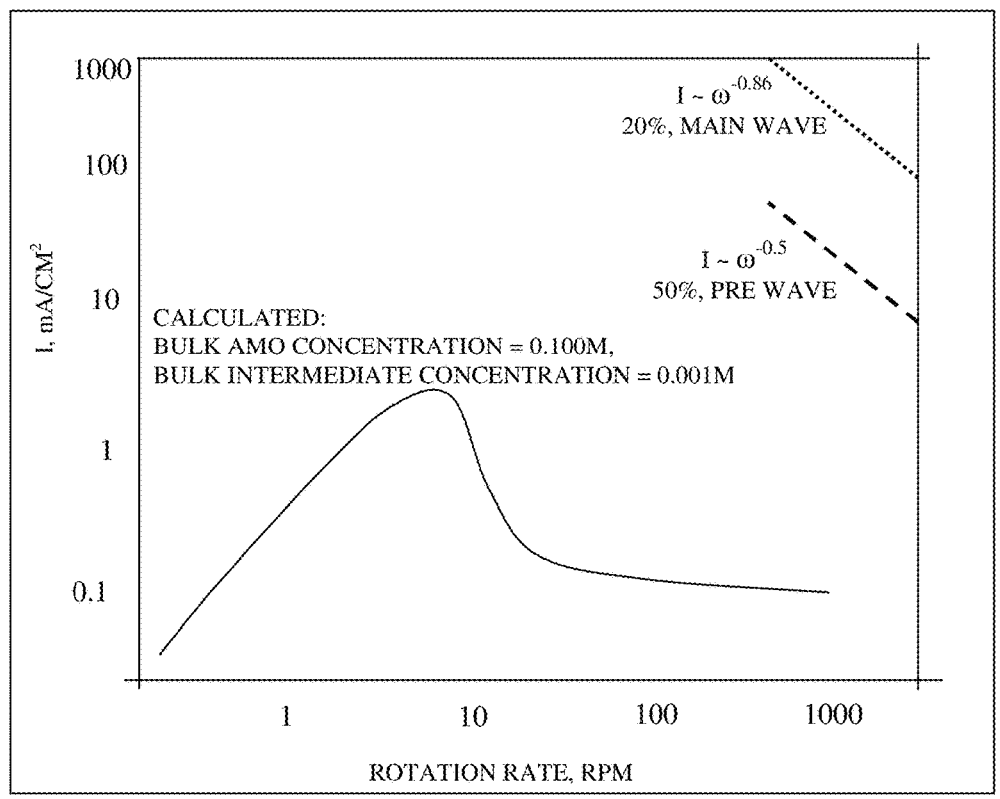
FIG. 12 exemplarily illustrates calculated and experimentally measured limiting currents on a rotating disk electrode in aqueous solutions of bromic acid of various concentrations.

FIG. 12 exemplarily illustrates calculated and experimentally measured limiting currents on a rotating disk electrode in aqueous solutions of bromic acid of various concentrations. FIG. 12 exemplarily illustrates the calculated kinetic limiting current of bromate comproportionation in a 0.1 M $HBrO_3$+1 mM $Br_2$ and experimentally measured limiting currents on a glassy carbon rotating disk electrode for the $1^{st}$ wave in 50% w $HBrO_3$ attributed to the electroreduction of bromine generated via equation (2) and for the $2^{nd}$ wave in 50% w $HBrO_3$ attributed an unidentified intermediate of equation (2) comprising Br in the oxidation state 0<OS<5. The rational for using a diluted acidic aqueous multi-electron oxidant (AMO) solution for the $2^{nd}$ wave measurements was the current range limitation of the potentiostat. The calculated current and experimental current of the first wave is due to the reduction of bromine and its value is determined by the rate of the comproportionation of bromate with electrogenerated bromide near the electrode surface. The current of the second wave is tentatively attributed to an intermediate in the comproportionation reaction, such as $BrO_x^-$ with x=1 or 2. A direct electrochemical reduction of bromate at room temperature occurs with a significant overvoltage on all electrode materials, and a bromate reduction on an electrode can be facilitated via a homogeneous comproportionation with bromide into highly electrochemically active bromine:

$$\text{In the catholyte: } 5HBr+HBrO_3=3H_2O+3Br_2 \quad (31)$$

$$\text{On the cathode: } Br_2+6e^-=6Br^- \quad (32)$$

The cathode refers to the electrode where the electroreduction takes place, that is, the positive electrode in this case.

The comproportionation reaction (31) is known to be first order in $[BrO_3^-]$ and $[Br^-]$ and second order in $[H^+]$ at pH below 2. An additional term with a second order in bromide is apparent at high bromide concentrations. The actual mechanism involves several serial and parallel steps that show general acid catalysis effects, and the mechanism is similar to the homologous chlorine and iodine processes. Chloride accelerates reaction (31). The effect of the addition of chloride species on both the discharge and regeneration processes is also disclosed herein since the intermediate chlorine increases the energy and power densities of the system 100 with $Br_2$ as the intermediate oxidant due to a complex interplay between the aqueous chemistries of the two halogens. The electroreduction of $Br_2$ as per equation (32) is a first order process with a high exchange current even on carbon electrodes which are used in Zn—$Br_z$ and $NaS_x$—$Br_2$ batteries.

The calculated dependence of the limiting current on the rotation rate in a 0.1M aqueous multi-electron oxidant (AMO) solution is represented in FIG. 12 as a solid line, the experimental data on a glassy carbon rotating disk electrode for the main wave in approximately 20% AMO solution is represented as a dotted line, and the prewave in approximately 50% AMO solution is represented as a dashed line. Currents over 0.5 A/cm² are obtained on a smooth carbon electrode. The limiting current shows a decrease with the rotation rate due to the loss of the intermediate bromine into the solution, when the thickness of the diffusion boundary layer is smaller than the thickness of the kinetic boundary layer. The dependence of the limiting current on a log of the rotation rate in $HBrO_3$ solutions is also exemplarily illustrated in FIG. 12.

While the theoretical energy density of the $H_2$/$HBrO_3$ system 100 is, for example, about 1,951 Wh/kg, the limited stability of bromic acid solution with the concentration above 55% w/w, makes 938 Wh/kg, that is, 3.25 times higher than the theoretical value for the lithium iron phosphate (LFP) chemistry, a more realistic estimate Taking into account the 5% w/w $H_2$ content for high-pressure storage and the flow design, about 426 Wh/kg is obtained as a realistic target value at the system level, which is 6 times larger than the corresponding number for the LFP battery pack, for example, in Tesla Roadster® of Tesla Motors, Inc.

Figure 13:
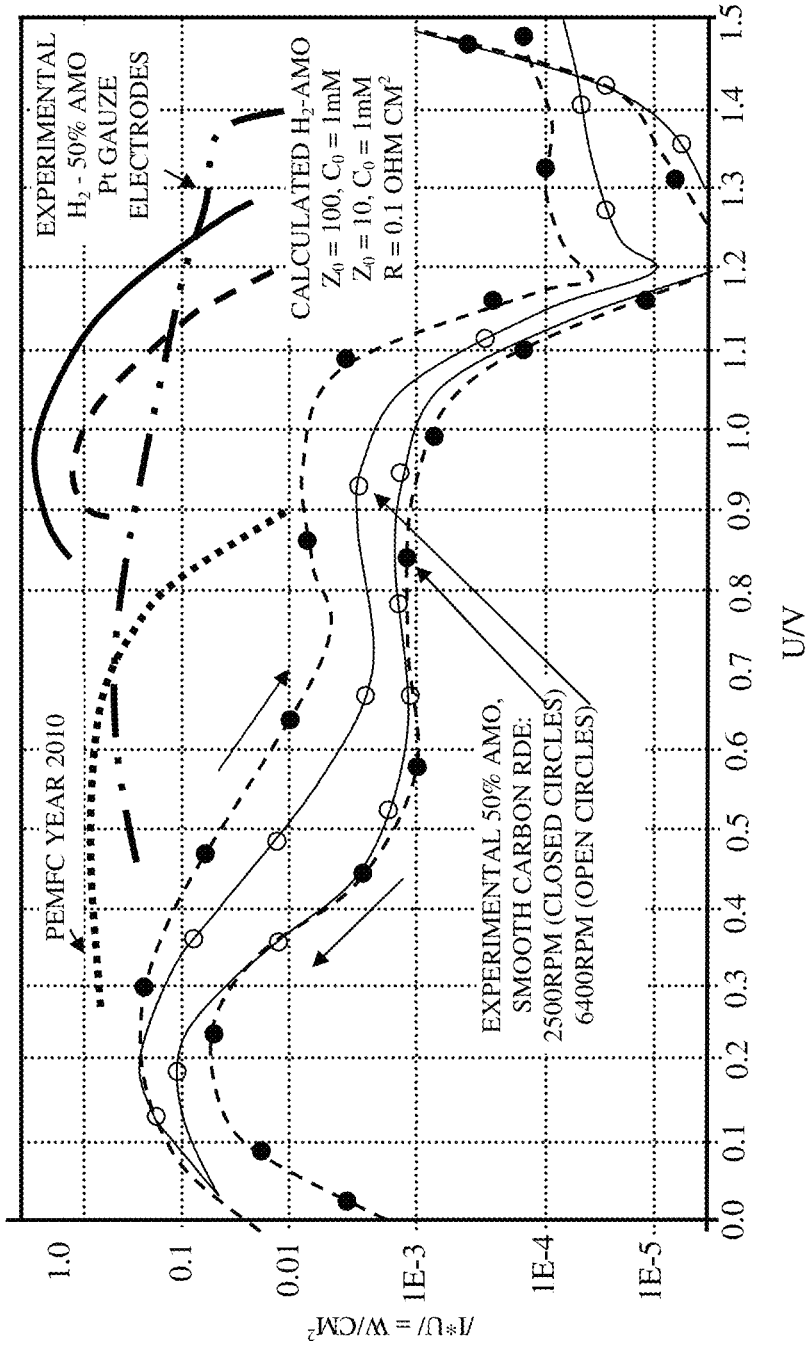
FIG. 13 exemplary illustrates a graphical representation of a power-voltage curve calculated for a $H_2$-50% w/w $HBrO_3$ discharge flow battery and measured with a glassy carbon rotating disk electrode, and with a platinum gauze electrode in a flow cell, and a corresponding curve for a commercial proton exchange membrane fuel cell running on hydrogen and air.

FIG. 13 exemplary illustrates a graphical representation of a power-voltage curve calculated for a $H_2$-50% w/w $HBrO_3$ discharge unit 104 and measured with a glassy carbon rotating disk electrode, and with a platinum gauze electrode in a flow cell and a corresponding curve for a commercial proton exchange membrane fuel cell running on hydrogen and air. The +1.4 V onset of $HBrO_3$ electroreduction on Pt implies a direct process rather than comproportionation-mediated electrode process. The reduction of bromate on the positive electrode is modeled for one dimensional (1D) diffusion normal to the electrode and for constant thicknesses of the kinetic and hydrodynamic boundary layers. As used herein, the term "diffusion" refers to mass transport due to a concentration gradient.

In FIG. 13, which exemplary illustrates the calculated power versus voltage plots for a hydrogen-bromate discharge unit 104, the term "$Z_0$" refers to the ratio of the hydrodynamic boundary layer thickness to the kinetic boundary layer thickness and under the conditions of the experiment, the latter is equal to approximately 1.5 µm. The term "$C_0$" exemplarily illustrated in FIG. 13 refers to the bulk concentration of free intermediate oxidant such as bromine. A typical curve for a $H_2$-air polymer electrolyte membrane fuel cell (PEMFC) is also shown in FIG. 13 for comparison. The membrane resistance for the solid line is equal to 0.1 Ohm/cm² and the membrane resistance for the dotted line is equal to 0.25 Ohm/cm². The lines with circles represent experimental data in 50% $HBrO_3$ aqueous multi-electron oxidant (AMO) solution. The solid lines and the dashed lines represent experimental data with the glassy carbon rotating disk electrode (GCRDE) at different rotation rates, and the dashed-double dotted line represents experimental data in a proton exchange membrane (PEM) type flow cell, for example, a Fuel Cell Store™ #1071025 with Pt gauze electrodes on both sides, powered by $H_2$ and 50% $HBrO_3$.

The experimental data of FIG. 13 with glassy carbon (GC) electrodes in an aqueous solution of $HBrO_3$ shows three regions in the power-voltage curve—a cathodic pre-wave at +1.15 V versus a standard hydrogen electrode (SHE) with a 42 mV/decade Tafel slope, a main cathodic wave at +0.7 V versus SHE with a 208 mV/decade Tafel slope, and an anodic wave. Both cathodic waves show a decrease in the limiting current at higher rotation rates as approximately $i \sim 1/\omega^{-1}$ and at lower aqueous multi-electron oxidant (AMO) concentrations as $i \sim C_{AMO}^3$. The more positive wave, that is, the $1^{st}$ wave on GC is attributed to the predicted reduction of the intermediate $Br_2$ since the positive wave on GC occurs at the appropriate potential and has a low Tafel slope, close to 60 mV/dec that is usually observed, whereas the more negative wave, that is, the $2^{nd}$ wave is likely due to an intermediate with a lower exchange current such as $BrO^-$ or $BrO_2^-$, formed during the comproportionation before $Br_2$. The small but unambiguous anodic wave positive to E° ($Br_2/2Br^-$) with a very high formal Tafel slope of 332 mV/dec is likely due to the oxidation of bromide which is slowly formed via the reversible disproportionation of bromine present in equilibrium with $HBrO_3$. A discharge power of 5 mW/cm² at 70% efficiency with respect to E° of $BrO_3^-$/$Br^-$ is achieved with a smooth carbon electrode and dilute 20% AMO.

The 1 W/cm² target can be achieved by using a high area porous electrode, increasing the concentration of the aqueous multi-electron oxidant (AMO) and by adding additional proton donors such as an extra acid, to the AMO stock. Unlike the case of the glassy carbon rotating disk electrode (GC-RDE), the onset of bromate reduction on Pt, exemplarily illustrated in FIG. 13, occurs at 1.42 V versus reversible hydrogen electrode (RHE) at pH~0, which is more positive than the E° ($Br_2/Br^-$)=1.066 V. This is attributed to the direct electroreduction of bromate on Pt in acid. Despite the possibility of having a higher efficiency discharge unit 104 exemplarily illustrated in FIG. 1, the preliminary economic analysis suggests against the use of Pt at the 0.2 mg/cm² loading in the cathode of the discharge unit 104 in automotive applications due to an increased upfront cost which will not amortize over 3 years, which is the projected Pt cathode durability, by the lower operational cost and energy efficiency. A Pt or another catalyst can be used on the positive electrode 205a exemplarily illustrated in FIG. 2 in other high-end applications such as in military applications and aerospace applications. Oxide catalysts such as $RuO_2$ and its derivates are suitable for the use on the positive electrode 205a of the discharge unit 104.

FIGS. 14A-14G that exemplarily illustrate graphical representations showing comparative performances of three on-board power sources at a nominal power of 130 kW: a gasoline-internal combustion engine, a lithium ion battery, and an $H_2$-aqueous multi-electron oxidant discharge unit as well as the targets of the Advanced Research Projects Agency-Energy are disclosed along with the examples enumerated later in this description.

Figure 15:
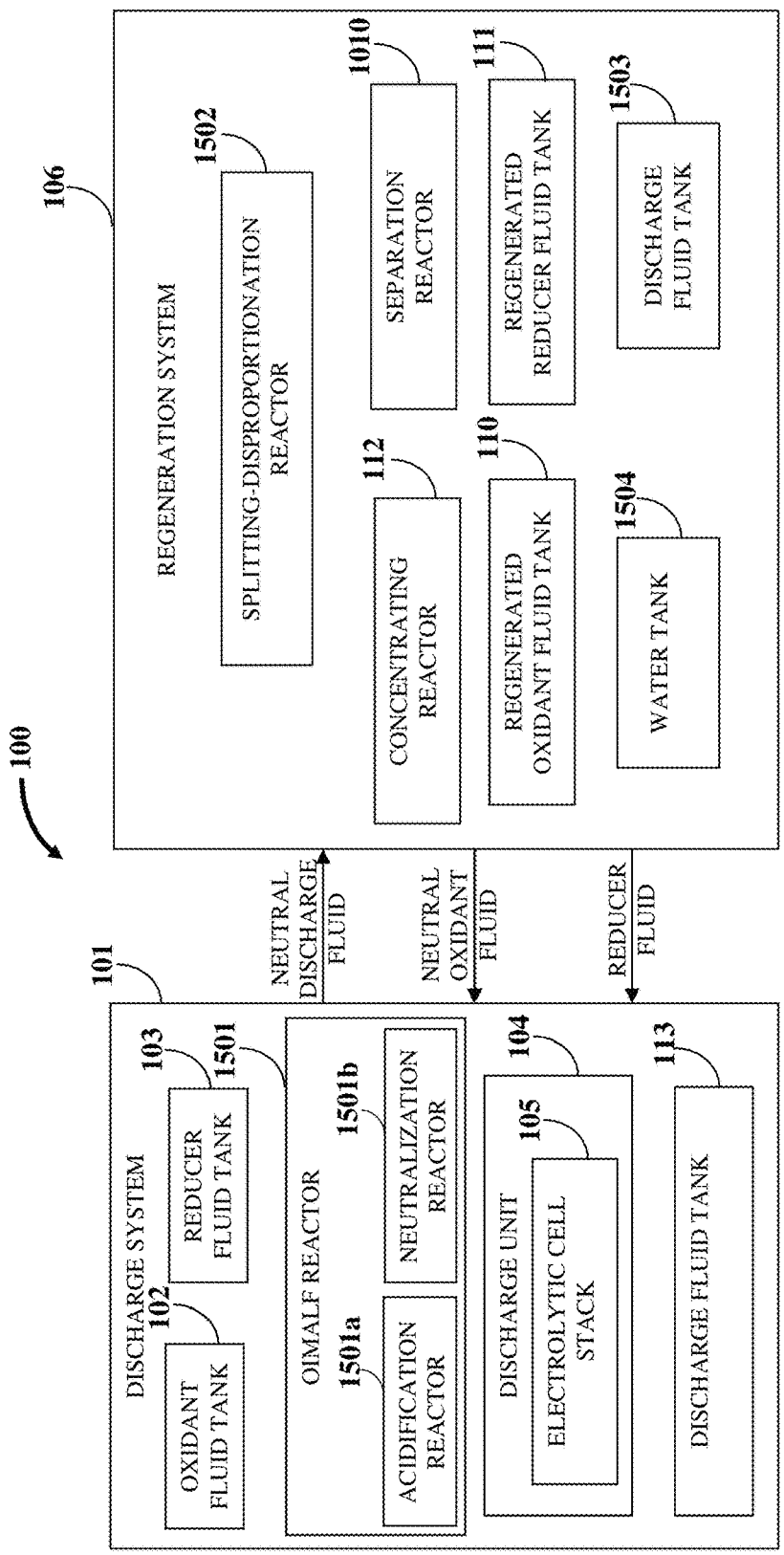
FIG. 15 illustrates an embodiment of the system for generating electric power and a discharge fluid from an oxidant fluid and a reducer fluid using a discharge system comprising an orthogonal ion migration across laminar flow reactor and for regenerating an oxidant and/or a reducer from the discharge fluid using a regeneration system.

FIG. 15 illustrates an embodiment of the system 100 for generating electric power and a discharge fluid from an oxidant fluid and a reducer fluid using a discharge system 101 comprising an orthogonal ion migration across laminar flow (OIMALF) reactor 1501, and for regenerating an oxidant and/or a reducer from the discharge fluid using a regeneration system 106. The system 100 disclosed herein cyclically discharges and recharges or refills the discharge system 101 in an energy storage cycle. In this embodiment, the acidification process such as the ion exchange process is performed within the discharge system 101 rather than within the regeneration system 106 in order to improve the stability and safety of the systems disclosed herein. The discharge system 101 comprises the discharge unit 104, an acidification reactor 1501a, optionally a neutralization reactor 1501b, the oxidant fluid tank 102, the reducer fluid tank 103, and a discharge fluid tank 113. The acidification reactor 1501a comprises one or more of an acid storage tank (not shown) storing $H_2SO_4$, TfOH, etc., and an acid mixing tank (not shown) in the OIMALF reactor 1501. The acidification reactor 1501a converts the neutral oxidant fluid stored in oxidant fluid tank 102 into an acidic oxidant fluid by lowering the pH of the acidic oxidant fluid for facilitating further electroreduction of acidic oxidant fluid at one or more positive electrodes 205a of the discharge unit 104 via a pH-dependent comproportionation.

The acidic oxidant fluid comprises, for example, one or more of water, one or more forms of the aqueous multi-electron oxidant (AMO), for example, an acid or a salt form or as a combination thereof, an extra acid, and one or more of multiple counter cations. The AMO comprises one or a combination of halogens, halogen oxides, halogen oxoanions, and salts and acids of the halogen oxoanions. The extra acid is, for example, one or more of a phosphoric acid, a 3-(N-morpholino)propanesulfonic acid, a 3-(N-morpholino) ethanesulfonic acid, a methanesulfonic acid, a triflic acid, a substituted sulfonic acid, a substituted phosphonic acid, a perchloric acid, a sulfuric acid, a molecule comprising sulfonic moieties and phosphonic moieties, and an acid with a pKa<2. The halogen oxoanions comprise, for example, one or more of hypochlorite, chlorite, chlorate, perchlorate, hypobromite, bromite, perbromate, hypoiodite, iodite, iodate, and periodate. In an embodiment, the halogen oxoanion is bromate. The counter cations comprise alkali metal cations, alkali earth metal cations, and organic cations. In an embodiment, one of the counter cations is lithium. In another embodiment, one of the counter cations is sodium. The acidic oxidant fluid has a sufficient chemical reactivity to cause an ignition regime of electroreduction on the positive electrodes 205a of the discharge unit 104. The neutralization reactor 1501b neutralizes the discharge fluid, for example, hydrogen halide produced by the discharge unit 104 with a base form of a buffer to produce a solution of a salt form of the discharge fluid also referred to herein as a "neutral discharge fluid". In an embodiment, the neutralization reactor 1501b comprises a mixing reactor. The discharge fluid tank 113 is used to collect the discharge fluid for future regeneration or disposal.

In an embodiment, the acidification reactor 1501a and the neutralization reactor 1501b are functionally combined as an orthogonal ion migration across laminar flow (OIMALF) reactor 1501. In another embodiment, the neutralization reactor 1501b is integrated with the acidification reactor 1501a into the OIMALF reactor 1501 as exemplarily illustrated in FIG. 15 and FIG. 19. The OIMALF reactor 1501 comprises an OIMALF cell stack (not shown) which is configured similar to a polymer electrolyte fuel cell (PEFC) stack but with a liquid electrolyte flowing between two ionically conducting membranes. The OIMALF reactor 1501 comprises flow cell assemblies, endplates, and bipolar plates. Each flow cell assembly of the OIMALF reactor 1501 comprises a couple of ion exchange membranes comprising a positive side ion exchange membrane and a negative side ion exchange positioned parallel to each other, an intermembrane flow field interposed between the ion exchange membranes and comprising multiple flow channels, a positive electrode layer and a negative electrode layer flanking outer surfaces of the ion exchange membranes, and porous diffusion layers flanking the outer surfaces of the positive and negative electrode layers. The porous diffusion layers are in electric contact with the adjacent bipolar plates or endplates. The positive electrode layer is configured for hydrogen oxidation reaction and the negative electrode layer is configured for hydrogen evolution reaction. Although, the on-board OIMALF reactor 1501 adds to the weight of the discharge system 101, this addition can be tolerated due to the high power density and low energy consumption of the OIMALF reactor 1501. Moreover, only 10% or less of the electric power generated by the discharge unit 104 is required to support the OIMALF reactor 1501. Also, the estimated weight of the OIMALF reactor 1501 for a 130 kW discharge system 101 is about 54.2 kg which is only about 50% of the weight of the discharge unit 104 and 30% of the weight of the oxidant and the reducer, and thus adds only approximately 14% to the weight of the discharge system 101.

The discharge system 101 disclosed herein is configured to operate in an electric partial recharge mode for facilitating regenerative breaking when the discharge system 101 powers an electric vehicle. During the partial recharge mode, the reactions on the positive and negative electrode reverse their directions, that is, the reducer is produced on the negative electrode 205b of the electrolyte-electrode assembly 205 and an intermediate oxidant is produced on the positive electrode 205a of the electrolyte-electrode assembly 205. For example, $H_2$ is produced on the negative electrode 205b and $Br_2$ is produced on the positive electrode 205a. Since the pH of the oxidant fluid is acidic during the discharge, the disproportionation does not occur and the aqueous multi-electron oxidant (AMO), that is, bromate is not formed. The regeneration stops at the bromine which is the intermediate oxidant and can be easily consumed to provide power when the current direction goes back to the discharge mode.

The discharge unit 104 disclosed herein reduces the crossover of the anionic oxidants and products from the positive cathode to the negative hydrogen anode by employing a cation-exchange membrane between the electrodes. In contrast to a polymer electrolyte fuel cell, the discharge system 101 reduces or completely eliminates platinum from the positive electrode 205a, uses a thicker hydrophilic porous electrode (HPE) instead of a thin catalytic layer and a hydrophobic gas diffusion layer on the positive electrode 205a which assures a higher power per cross-sectional area, reduces the size or completely eliminates the humidification system due to back diffusion of water from the aqueous multi-electron oxidant (AMO) solution to the hydrogen electrode within each electrolytic cell 200, and allows for energy recuperation by oxidation on the positive electrode 205a of bromide in the discharge fluid into bromine with simultaneous hydrogen evolution on the negative electrode 205b.

The regeneration system 106 of the system 100 disclosed herein is configured to regenerate the aqueous multi-electron oxidant (AMO) and the reducer from the discharge fluid produced by the discharge unit 104. The regeneration system 106 comprises, for example, a splitting-disproportionation (SD) reactor 1502, a concentrating reactor 112, multiple separation reactors 1010, and storage tanks such as a regenerated oxidant fluid tank 110, a regenerated reducer fluid tank 111, a discharge fluid tank 1503, and a water tank 1504. An electrolysis-disproportionation reactor 107 is an example of the splitting-disproportionation reactor 1502. In an embodiment, the SD reactor 1502 is configured as the electrolysis-disproportionation (ED) reactor 107, exemplarily illustrated in FIG. 1, comprising sub-reactors, for example, an electrolysis unit or an electrolyzer 107a and a disproportionation unit 107b, exemplarily illustrated in FIG. 1. In an embodiment, the electrolyzer 107a and the disproportionation unit 107b are physically combined in the same hardware.

In an embodiment, the splitting-disproportionation (SD) reactor 1502 uses electrolytic splitting and is configured for flow modes of operation. The SD reactor 1502 comprises a stack of SD flow cells configured similar to a conventional polymer electrolyte fuel cell (PEFC) bipolar stack so that one side of every inner bipolar plate serves the current collector of a negative electrode and the other side serves as the current collector of a positive electrode. Several SD flow cells can be stacked and operated in a cascade flow mode. Each SD flow cell has a structure similar to a polymer electrolyte membrane fuel cell (PEMFC) with a 5-layer membrane-electrode assembly, where the gas diffusion layer on the positive side is replaced with a hydrophilic porous layer. Furthermore, the stack and the negative electrodes of the 5-layer membrane-electrode assembly are configured for either the aqueous multi-electron oxidant (AMO)-on-negative electrode mode of operation also referred to as the "AMO-on-negative mode of operation", or the no-AMO-on-negative electrode mode of operation also referred to as the "no-AMO-on-negative mode of operation". The individual SD flow cells in the bipolar stack are connected electrically in series so that the bipolar stack voltage is the sum of the individual SD flow cell voltages. The individual SD flow cells in the bipolar stack are connected flow-wise in parallel or series, with a parallel connection affording more uniform voltages in different SD flow cells in the bipolar stack. In an embodiment, the SD reactor 1502 is configured for the AMO-on-negative mode of operation using a multi-layer structure on a negative electrode side of the SD reactor 1502. The multilayer structure on the negative electrode side minimizes reduction of a regenerated aqueous multi-electron oxidant in a regenerated oxidant fluid on the negative electrode side while facilitating hydrogen evolution and increase in pH of the regenerated oxidant fluid. In another embodiment, the SD reactor 1502 is configured for the no-AMO-on-negative mode of operation by transferring a base produced on one or more negative electrodes of the SD reactor 1502 to a regenerated oxidant fluid produced at one or more positive electrodes of the SD reactor 1502 and comprising one or more forms of the aqueous multi-electron oxidant and the intermediate oxidant.

The splitting-disproportionation (SD) reactor 1502 or reactors can be configured and operated in a batch mode, in a cyclic flow mode or in a cascade flow mode. An SD reactor 1502 configured for the cyclic flow mode has a lower upfront cost but requires a longer regeneration time. Such an SD reactor 1502 may be utilized for at-home-garage regeneration. The SD reactor 1502 configured for the cascade flow mode has a higher upfront cost but is capable of a faster regeneration. This SD reactor 1502 may be utilized at multi-user charging stations. A combination of cyclic and cascade flow modes in the same regeneration unit allows for an optimization of the capital cost and throughput and it is recommended for most applications.

In an embodiment, the concentrating reactor 112 is placed between the splitting-disproportionation (SD) reactor 1502 and the orthogonal ion migration across laminar flow (OIMALF) reactor 1501 whereby the concentrating reactor 112 produces a concentrated solution of neutral oxidant fluid comprising a salt form of the aqueous multi-electron oxidant (AMO). The concentrating reactor 112 increases the concentrations of one or more forms of the AMO as well as the total AMO concentration in the oxidant fluid produced by the splitting-disproportionation (SD) reactor 1502 before the AMO is stored in the regenerated oxidant fluid tank 110. The concentrating reactor 112 removes water or other solvents from a dilute fluid that enters the concentrating reactor 112 and releases a concentrated fluid and water or another solvent. The concentrating reactor 112 performs concentration, for example, by evaporation, pervaporation, reverse osmosis, and other known methods. The storage tanks, for example, the regenerated oxidant fluid tank 110, the regenerated reducer fluid tank 111, the water tank 1504, and a buffer tank (not shown) are used to store the regenerated neutral oxidant fluid, the regenerated reducer, water, and the buffer respectively. The separation reactors 1010 are gas-liquid separators or separation reactors 1010 and are used to separate gases from the liquids during the regeneration process.

Figure 16:
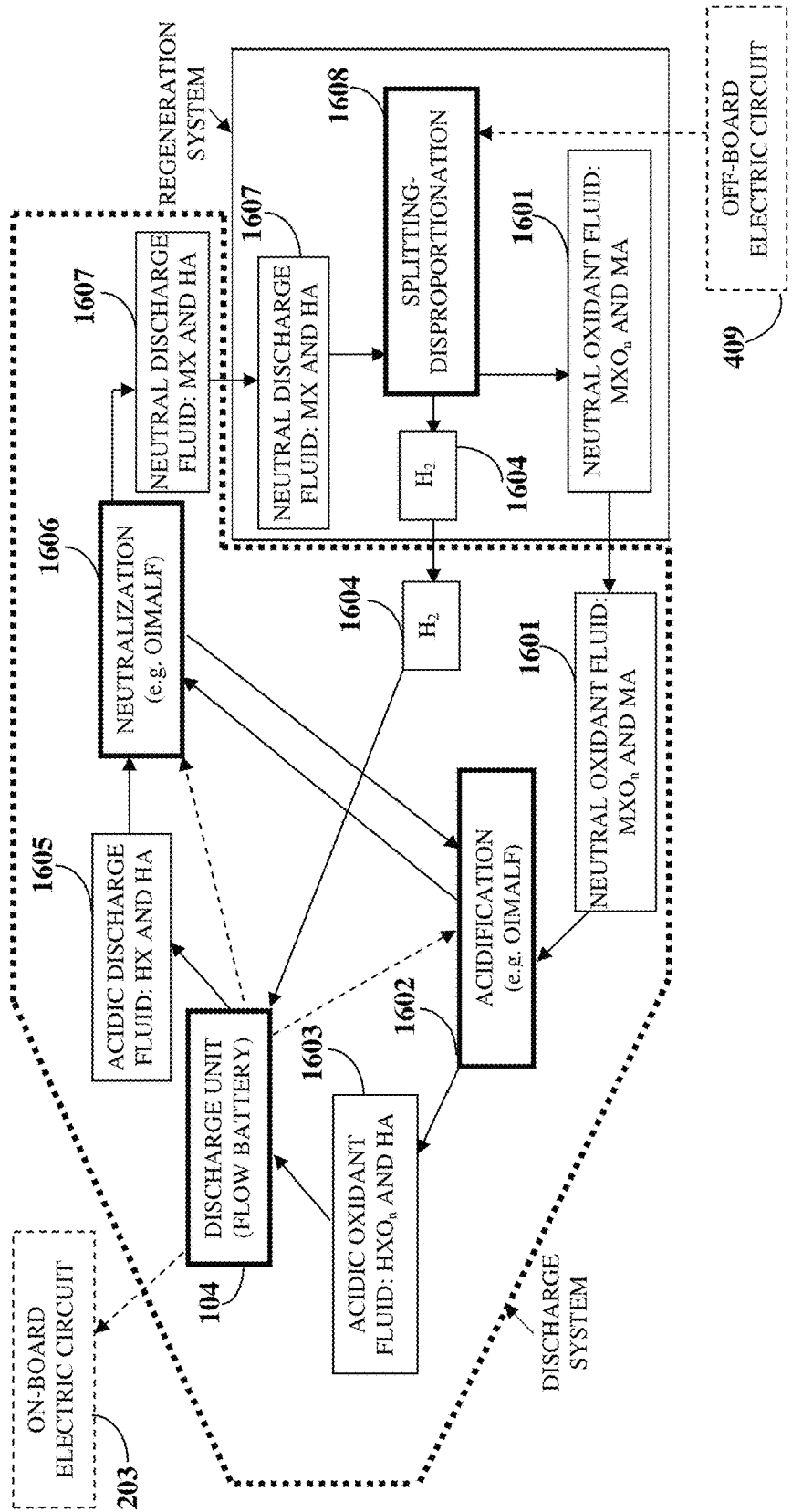
FIG. 16 exemplarily illustrates a process flow diagram showing mass and electricity flows in an energy cycle between the discharge unit, an acidification reactor, and a neutralization reactor of the discharge system.

FIG. 16 exemplarily illustrates a process flow diagram showing mass and electricity flows in an energy cycle between the discharge unit 104, the acidification reactor 1501a, and the neutralization reactor 1501b of the discharge system 101. The on board system is enclosed in a dotted frame with the reducer fluid, oxidant fluid, and discharge fluid shared by both on-board and off-board systems. In an embodiment, the discharge system 101 comprises a single reactor such as an orthogonal ion migration across laminar flow (OIMALF) reactor 1501 which performs both acidification 1602 and neutralization 1606. In FIG. 16, $HXO_n$ refers to the aqueous multi-electron oxidant (AMO) in the acid form, $MXO_n$ refers to the AMO in the salt form, HA refers to the buffer in the acid form, and MA refers to the buffer in the base form. The flow of materials is represented using solid arrows and the flow of electric power is represented using dotted arrows. The aqueous multi-electron oxidant (AMO) may be present at various stages in the discharge and regeneration energy cycle in one or several forms, for example, acid form, salt forms such Li form, etc., differing in composition, concentration, etc. If not specified, the term "aqueous-multi-electron oxidant" or "AMO" refers collectively to all such forms and any combination thereof.

Certain salts of both the aqueous multi-electron oxidant (AMO) and the discharge product of the AMO have high aqueous solubilities as well as high rates of homogeneous disproportionation and comproportionation. Such a combination can be obtained, for example, when the AMO salt is lithium bromate with a solubility of, for example, over 10 molal at 20° C. and over 20 molal at 80° C. and the discharge salt is lithium bromide with the solubility of, for example, over 15 molal at 20° C. and over 25 molal at 80° C. Although a salt form of the AMO can be used directly in a discharge unit 104 to produce electric power, the slow kinetics of the direct electroreduction of the salt form of the AMO requires the use of expensive platinoid catalysts and, even then, occurs with poor energy efficiency. The electroreduction of the salt form of the AMO can process more efficiently, even on a bare carbon electrode, when it is mediated by a soluble mediator. In an embodiment, the electroreduction product, for example, bromide, is utilized as the reduced form of the mediator. In this case, the mediation reaction is a comproportionation reaction. The reduction of the AMO in general and the comproportionation reaction in particular requires proton donors to proceed at a useful rate. Proton donors can be introduced into a stable stock solution of the salt form of the AMO in a process referred herein as acidification. Also, in the method and systems or energy cycle disclosed herein, a pH manipulation and/or change is used to facilitate the conversion between a stable but low-power salt form of the AMO and a high-power but poorly stable acid form of the AMO.

The neutral oxidant fluid 1601 has a high energy density due to the high solubility of the aqueous multi-electron oxidant (AMO) such as $LiBrO_3$ and due to the multi-electron oxidant property of the AMO: 6 electrons are transferred during the reduction of one bromate ion into one bromide ion. Thus, the discharge unit 104 can store a large amount of energy or charge per unit of weight or volume and this storage is safe due to a low reactivity of the AMO at neutral and alkaline pH. However, to achieve a high power, for example during an on-board discharge process, the AMO needs to be present in an acidic form that is at a low pH. This can be achieved by converting the neutral oxidant fluid 1601 into an acidic oxidant fluid 1603 in the acidification reactor 1501a. The process of acidification 1602 can be performed via ion exchange on solids, ion exchange in solution or by any other known acidification method, and by any combination thereof. In an embodiment, the acidification is performed via the orthogonal ion migration across laminar flow (OIMALF) process. The use of the OIMALF process confers an additional benefit of being free of input and output chemicals, as well as the benefits of high power density and of high energy efficiency. In another embodiment, the acidification is performed by adding an extra acid HA such as phosphoric acid $H_3PO_4$, carried over from the regeneration step, sulfuric acid, triflic acid, other strong acid, etc., to the neutral oxidant fluid. Also, the on-board storage of a salt form of the AMO is used over an acid form of the AMO for safety reasons. The use of salts forms rather than of acid forms puts forward additional requirements for high solubilities of the AMO and its discharge product(s) in their salt forms. The complete acidification with 1:1 stoichiometric ratio of acidic protons to the AMO, for example, bromate, is not necessary for the ignition regime of the AMO electroreduction to occur, and a partial acidification suffices. This finding confers the benefits of improved safety, energy efficiency, and reduced size of the discharge system 101, which facilitate application of the discharge system 101 in automotive applications.

In an embodiment, the stability of the acidic oxidant fluid is maintained by performing an ignition regime in the discharge system 101 at low acid concentrations of the acidic oxidant fluid. The concentration of one or more forms of the aqueous multi-electron oxidant in the neutral oxidant fluid or the acidic oxidant fluid supplied to the discharge unit 104 is, for example, above 1M, 2M, 5M, or 10M. The concentration of acidic protons in the acidic oxidant fluid supplied to the discharge unit 104 is, for example, below 0.1M, 0.5M, 1M, 2M, 5M, or 10M. The concentration of acidic protons in the acidic oxidant fluid stored in the discharge system 101 is, for example, below 0.1M, 0.5M, 1M, 2M, or 5M. In an embodiment, the acidification process is performed off-board in the discharge system 101, yielding a weakly acidic solution that is capable of ignition-like electro-reduction yet is sufficiently stable on the week time scale for automotive applications. In the discharge system 101 disclosed herein, the concentration of acid that is required to cause ignition with a practically suitable power in a highly concentrated aqueous multi-electron oxidant [AMO]>10M is very low about 5 mM. The AMO does not decompose for over a week. This allows the acidification process such as orthogonal ion migration across laminar flow (OIMALF) process to be performed off-board and also allows storage of the acidic oxidant fluid on-board in the oxidant fluid tank 102 of the discharge system 101 for almost a week. The stored AMO is a stable solution capable of ignition. The method and the discharge system 101 disclosed herein allow the storage of a more stable form of the AMO on-board which is achieved with an acceptable sacrifice in the system energy density.

The discharge system 101 uses the acidification reactor 1501a to convert the neutral oxidant fluid 1601 into acidic oxidant fluid 1603 which has sufficient chemical reactivity to cause an ignition regime of electroreduction on the positive electrodes 205a of the discharge unit 104. During the acidification process 1602, a stable aqueous multi-electron oxidant (AMO) stock stored on board, such as neutral oxidant fluid 1601 comprising $LiBrO_3$ is converted into a chemically reactive form of the AMO, for example, acidic oxidant fluid 1603 comprising $HBrO_3$. This can be accomplished via a solution-phase cation exchange process in the orthogonal ion migration across laminar flow (OIMALF) reactor 1501 with a simultaneous conversion of the outgoing acidic discharge fluid 1605 into a neutral form 1607, for example, HBr into LiBr. $LiBrO_3$ is converted into $HBrO_3$ using the OIMALF process or another ion exchange process or direct addition of an extra acid. In an embodiment, the OIMALF process generates and consumes $H_2$ within the OIMALF reactor 1501. The OIMALF process of converting, including partially converting, $MXO_n$ into $HXO_n$, for example, $LiBrO_3$ into $HBrO_3$ avoids cumbersome chemical separation and ion exchange regeneration steps. The choice of the acid form of the AMO can be expanded beyond $HBrO_3$ to other AMOs comprising, for example, $HClO_4$, $HClO_3$, $HClO_2$, $HClO$, $HBrO_4$, $HBrO_2$, HBrO, etc. Phosphoric acid will be present in the oxidant fluid if a phosphate buffer is used during regeneration. The net reaction of the ion exchange or the OIMALF process is: $LiBrO_3+HA=HBrO_3+LiA$, where HA is a source of protons comprising, for example, one or more of the following: water, phosphoric acid, dihydrogen phosphate, one or more of Good's buffers, one or more derivatives of sulfonic acid, sulfuric acid, triflic acid, perchloric acid, etc. For on-board operation, the OIMALF reactor 1501 is operably connected to an on-board power source such as discharge unit 104 or a battery (not shown) which provides electric power for the OIMALF process.

During the discharge process, the discharge unit 104 is supplied with the reducer 1604, for example, $H_2$, and the acidic oxidant fluid 1603 comprising the aqueous multi-electron oxidant (AMO) in the acid form, $HXO_n$, for example, $HBrO_3$. The reducer 1604 donates electrons to the negative electrode 205b, and splits into ions. The reaction at the negative electrode 205b is, for example, $3H_2-6e^-=6H^+$. The on-board electric circuit 203 conducts and transfers electrons from the negative electrode 205b to the positive electrode 205a. The reaction at the positive electrode 205a, for example, $3Br_2+6e^-=6\ Br^-$, or when combined with the comproportionation reaction the catholyte, for example, $BrO_3^-+6e^-+6H^+=Br^-+3H_2O$. The aqueous multi-electron oxidant accepts the electrons at the positive electrode 205a for producing the electric current in the on-board electric circuit 203. The discharge unit 104 releases the acidic discharge fluid HX 1605 comprising, for example, HBr and the buffer HA in the acidic form and generates electric current in the on-board electric circuit 203. The cation-selective electrolyte layer 205c provides for a movement of cations, such as hydronium ions, between the negative electrode 205b and the positive electrode 205a.

The generation of electric power using the aqueous multi-electron oxidant (AMO), for example, bromate during the discharge is accompanied by the following chemical transformations.

Negative Electrode: $3H_2+6e^-=6H^+$ (33)

Positive Electrode: $BrO_3^-+6H^+-6e^-=Br^-+3H_2O$ (34)

The latter electrode half-reaction may proceed not by a direct electroreduction of a bromate species on the electrode but via the formation of a $Br_2$ intermediate in a homogeneous comproportionation reaction between bromate and bromide as shown below:

Comproportionation: $BrO_3^-+5Br^-+6H^+=3Br_2+3H_2O$ (35)

Reduction: $3Br_2+6e^-=6Br^-$ (36)

An extra acid, for example a strong acid, HA, such as $H_2SO_4$, $LiHSO_4$, HCl, $HNO_3$, $HClO_4$, $F_3CSO_3H$, $F_3CCOOH$, etc., can be added in a small concentrations compared to the total aqueous multi-electron oxidant (AMO) concentration to accelerate the rate of reaction (20) on discharge. The use of such an extra acid may be more advantageous than an increase in the phosphoric acid ($H_3PO_4$) concentration, which is a weak acid and which is limited by the properties of $Li_2HPO_4$ decomposing in water into a very soluble $LiH_2PO_4$ and a poorly soluble $Li_3PO_4$. In an embodiment, bromic acid itself is used as the extra acid. The use of a higher acid concentration, afforded by adding the extra acid, facilitates the rate of the comproportionation because for a general acid-catalyzed reaction such as $BrO_3^-+5Br^-+6H^+=3Br_2+3H_2O$, the same rate can be obtained with a lower concentration of a strong extra acid such as $HClO_4$ than with a weaker acid such as $H_3PO_4$. A smaller concentration of the extra acid, compared to the concentration of phosphoric acid that shows comparable rate constant for the comproportionation, requires a smaller charge in the orthogonal ion migration across laminar flow (OIMALF) process, thus reducing the energy expenses and the size of the OIMALF reactor 1501. For purposes of illustration, the detailed description is described with reference to an OIMALF process for conversion of the salt form of the AMO into the acid form of the AMO; however the scope of the method and system disclosed herein is not limited to the OIMALF process but can be extended to include other processes such as a ion exchange on resins, a direct addition of the extra acid, and can be justified in other applications.

In an embodiment, aqueous multi-electron oxidant (AMO) in a stable form, for example, $LiBrO_3$ is converted, at least partially, into an active form, for example, $HBrO_3$, using, for example, ion exchange on resins or ion exchange in solution such as an orthogonal ion migration across laminar flow (OIMALF) within the discharge system 101. The resulting acidic oxidant fluid 1603 comprising bromate as the aqueous multi-electron oxidant (AMO) is used in the discharge unit 104. This is followed by discharge of hydrogen on negative electrodes 205b of discharge cells and bromate on the positive electrodes 205a of discharge cells of the electrolytic cell stack 105, with a release of bromide and water on the positive electrodes 205a of discharge cells, provided that the discharge cells are equipped with cation-conductive membranes such as Nafion® or its analogues. In an embodiment, the discharge on the positive electrodes 205a is facilitated by a homogeneous comproportionation of bromide product with bromate oxidant, or in general of a halide with a halogen oxoanion. The discharge process based on the sequence of orthogonal ion migration across laminar flow (OIMALF), comproportionation, and electroreduction process has a reasonably high projected energy efficiency of about 70%. For on-board operation, the OIMALF reactor 1501 is operably connected to an on-board power source such as the discharge unit 104 or a battery (not shown) which provides electric power for the OIMALF process.

The regeneration process is preceded by raising the pH of one or more forms of the discharge fluid 1605 with a base, for example, $Na_2HPO_4$, LiOH or Li-3-(N-morpholino) propanesulfonic acid (MOPS) in the neutralization reactor 1501b of the discharge system 101 exemplarily illustrated in FIG. 15. The acidic discharge fluid comprises one or more of water, a halide, a hydroxonium cation, an extra acid, and a counter cation. Neutralization 1606 is a chemical reaction in which a base and an acid react to form a salt. The neutralization reactor 1501b neutralizes 1606 the acidic discharge fluid 1605 into neutral discharge fluid 1607 which is safe to handle, for example, to transfer to an off-board regeneration system 106. The base generated as a result of the orthogonal ion migration across laminar flow (OIMALF) process is used during the process of neutralization 1606 of the acidic discharge fluid 1605, for example, comprising HBr. The neutralization 1606 can be performed using an OIMALF reactor 1501. In an embodiment, some process steps of the energy cycle, for example, neutralization 1606 and acidification 1602 can be combined in a single reactor such as 1501. In another embodiment, the concentration can precede conversion to acid.

The aqueous multi-electron oxidant (AMO) and the reducer are regenerated in stoichiometric amounts from the discharge fluid in the regeneration system 106. The splitting-disproportionation (SD) 1608 process disclosed herein for the regeneration of the oxidant fluid comprising the AMO, for example, bromate from the neutral discharge fluid 1607 comprising, for example, bromide starts with an optional pH optimization of the discharge fluid for the disproportionation step. The pH optimization can be performed within the discharge system 101 or within the regeneration system 106 or in both by adding acid or base to the discharge fluid in question via electrolysis, ion exchange on solids, ion exchange in solution such as orthogonal ion migration across laminar flow (OIMALF), etc. and any combination thereof. A buffer present in one or more forms of the oxidant fluid and/or the discharge fluid is used to facilitate the pH optimization. During the regeneration of the AMO and the reducer, the splitting-disproportionation (SD) reactor 1502 of the regeneration system 106 splits 1608 the neutral discharge fluid 1607 comprising halide into an intermediate oxidant such as a halogen accompanied by a release of the reducer 1604 such as hydrogen and a base form of the buffer. In the case of splitting being electrolysis, the intermediate oxidant is produced at the positive electrode of the SD reactor 1502, and the reducer and the base are produced at a negative electrode of the SD reactor 1502. In an embodiment, the SD reactor 1502 is configured as an electrolysis-disproportionation reactor 107 and is powered by the off-board electric circuit 409. The neutral discharge fluid 1607 comprising, for example, LiBr and $H_2O$ undergoes electrolysis, photolysis, photoelectrolysis, radiolysis, or thermolysis to the intermediate oxidant such as $Br_2$ at the positive electrode and, for example, $H_2$ and LiOH or $H_2$ and Li-3-(N-morpholino) propanesulfonic acid (MOPS) at the negative electrode. The process of splitting 1608 is accompanied by the release of the reducer 1604, for example, hydrogen in stoichiometric amounts which is used as the reducer 1604 in the discharge unit 104. H$_2$ is produced on the negative electrode, configured for use with a liquid electrolyte, leaving behind an aqueous base solution, for example LiOH:

$$6H_2O+6e^-+6Li^+(aq.)=6LiOH+3H_2 \quad (37)$$

The liquid containing the base, such as LiOH, and the hydrogen gas are separated in separation reactors 1010. The regenerated hydrogen is collected in fuel storage tank or the regenerated reducer fluid tank 111, while the base-containing liquid is pumped into the positive electrode compartment. On the positive electrode, halogen X$_2$ is produced:

$$6X^--6e^-=3X_2(aq.) \quad (38)$$

In the presence of the base, provided that the pH of the liquid in the positive electrode compartment is maintained at a proper level, for example, between 4 and 9, or between 6 and 8, using an appropriate buffer, such as monohydrogen phosphate, a substituted phosphonate, amine, one or more of Good's buffers, or a combination thereof, the halogen disproportionates producing the desired aqueous multi-electron oxidant (AMO) such as a halate. For example, with A$^-$ as the base:

$$3X_2(aq.)+6LiA+3H_2O=LiXO_3+5LiX+6HA \quad (39)$$

In an embodiment, the base form of the buffer is obtained by a reaction of the neutral form of the buffer generated in the disproportionation reaction with the base produced at the negative electrode: 6LiOH+6HA=6LiA. The water necessary to prevent drying and LiOH precipitation on the negative electrode in the no-aqueous multi-electron oxidant (AMO)-on-negative mode of operation is supplied from the positive electrode compartment via electro osmotic drag by Li$^+$ cations, by pressure-driven flow through the membrane, etc., or from a separate water tank 1504. This excess water can be removed from the regenerated fluid using the concentrating reactor 112 using reverse osmosis, evaporation, pervaporation, etc. and stored in water tank 1504.

Figure 17A:
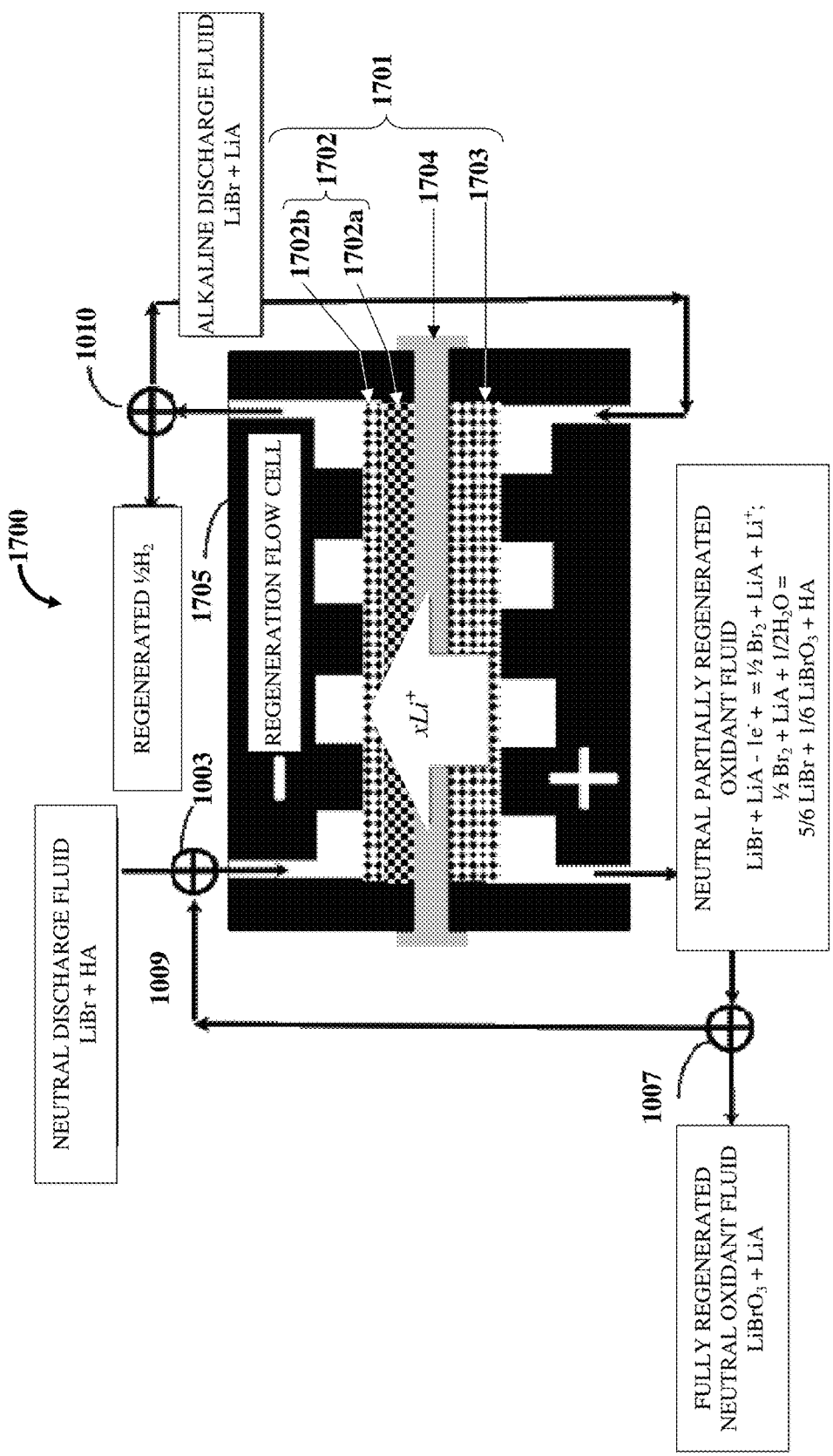
FIGS. 17A-17B exemplarily illustrate mass flows in a single cell of an electrolysis-disproportionation reactor configured for regeneration in an aqueous multi-electron oxidant-on-negative electrode mode of operation.
Figure 17B:
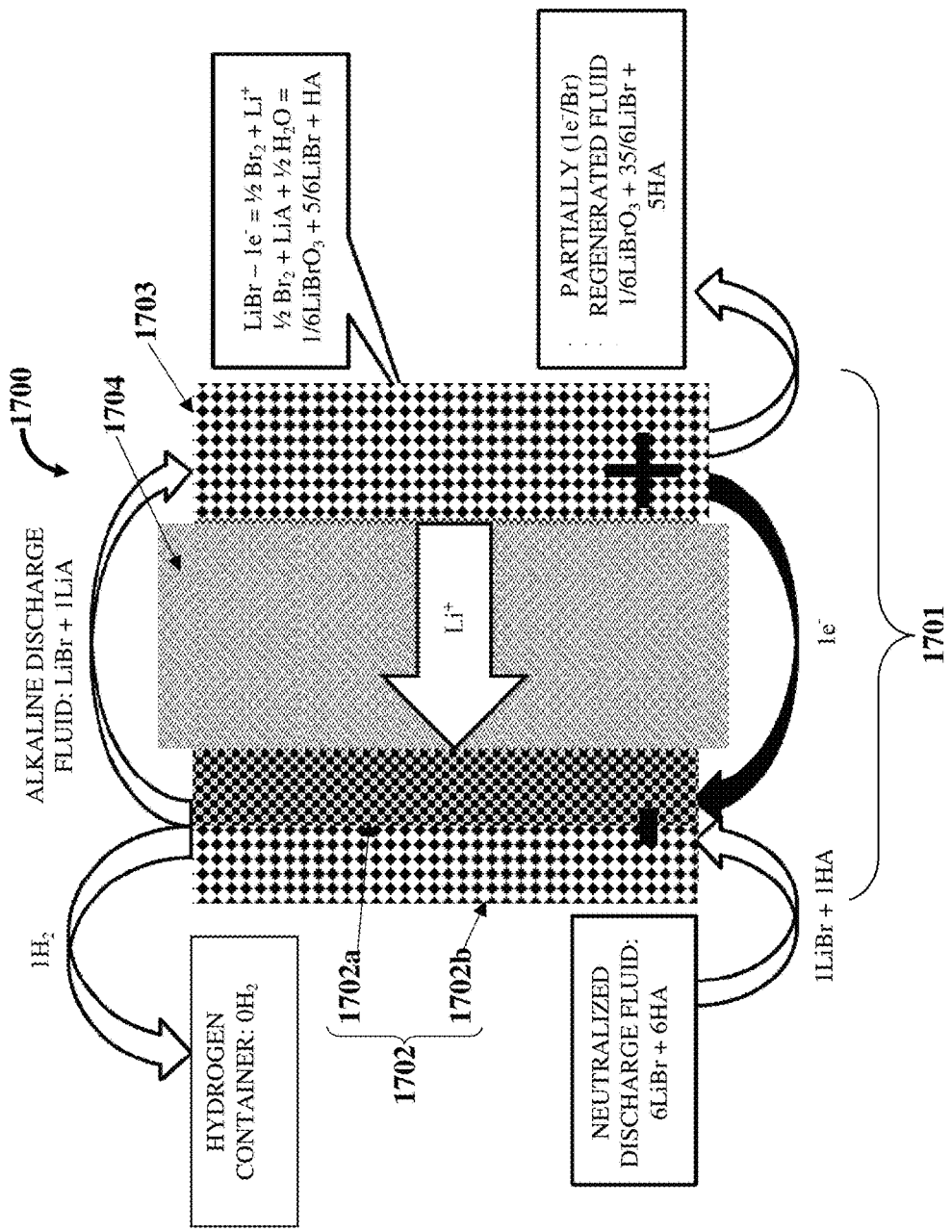
Figure 18:
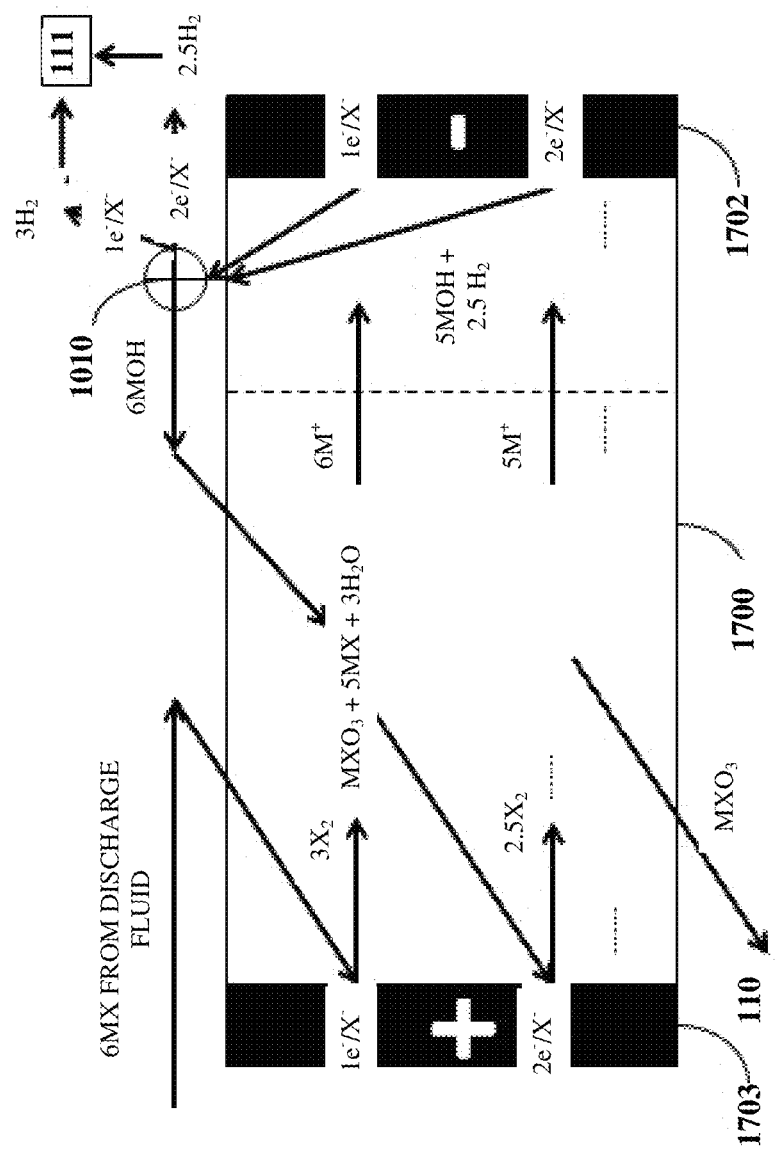
FIG. 18 exemplarily illustrates mass flows in a single cell of an electrolysis-disproportionation reactor configured for regeneration in a no-aqueous multi-electron oxidant-on-negative electrode mode of operation and a batch mode.

In the case of Br$_2$, if the pH of the anolyte is maintained between 6 and 8, or between 4 and 9, a disproportionation 1608 to bromate occurs, for example, with a LiOH base: 3Br$_2$+6LiOH=5LiBr+LiBrO$_3$+3H$_2$O. Splitting 1608 of the LiBr+H$_2$O solution and the disproportionation 1608 reactions proceed in a cyclic fashion or in a cascade, in batches or continuous modes, till most of the LiBr is converted into LiBrO$_3$. The disproportionation of the intermediate oxidant such as halogen into aqueous multi-electron oxidant (AMO) can be implemented in AMO-on-negative mode of operation and in no-AMO-on-negative mode of operation which require different hardware designs. The base required for the disproportion of halogen produced on the positive electrode during regeneration is conveniently produced as a by-product of hydrogen evolution on the negative electrode. There are two possible methods for introducing the base into the regenerated solution, that is, the AMO-on-negative electrode mode of operation and the no-AMO-on-negative electrode mode of operation as well as multiple combinations of the two. These are illustrated in FIGS. 17A-17B and FIG. 18 using XO$_3^-$ or bromate as AMO, M$^+$ or Li$^+$ as the counter-cation, and A$^-$ as the base form of the buffer. The AMO-on-negative mode of operation is exemplarily illustrated in FIGS. 17A-17B for a cyclic flow mode. The multilayer structure of the negative electrode configured for this mode and the operation of the SD reactor 1502 is disclosed in the detailed description of FIGS. 17A-17B. The no-AMO-on-negative mode of operation is exemplarily illustrated in FIG. 18 for a batch mode. Various modes of regeneration namely batch, flow-cycle, flow-cascade can be combined with either the AMO-on-negative and no-AMO-on-negative modes of operation.

Li$^+$ can be used as a counter-cation to achieve high solubilities of the salts involved, such as bromide and bromate. A pH buffer comprising, for example, a dissolved base, LiA, such as a lithium alkylphosphonate or arylphosphonate, an amine or amines such as one or more of Good's buffers is used to prevent spatial and temporal deviations of pH from the range between 4 and 9, for example, between 6 and 8, within the disproportionation reactor. The resulting product, for example, LiBrO$_3$, in the off-board neutral oxidant fluid 1601, if needed or desired, can be concentrated off-board in the neutral oxidant fluid 1601 using the concentrating reactor 112 before the neutral oxidant fluid 1601 is placed on-board. The neutral oxidant fluid is stable, non-corrosive and safe to handle, thus allowing for it transfer between off-board and on-board tanks and on-board storage without undue risk and without extraordinary precautions. Furthermore, the on-board storage of the neutral oxidant fluid 1601 mitigates the risk of spillage of the neutral oxidant fluid 1601 in the case of an accident. The net balanced chemical equation of regeneration for an exemplary combination of the aqueous multi-electron oxidant (AMO) and the buffer is:

$$LiBr+3H_2O=(\text{electricity in two places, LiA recycled})=3H_2+LiBrO_3 \quad (40)$$

The splitting-disproportionation (SD) process converts, for example, concentrated LiBr in the neutral discharge fluid 1607 into a concentrated LiBrO$_3$ in the neutral oxidant fluid 1601. Nevertheless, upon numerous discharge-regeneration cycles the solutions get diluted due to accumulation of water. To keep the energy density of the neutral oxidant fluid 1601 high, a water removal process is performed occasionally, for example, as part of the off-board regeneration before placing the neutral oxidant fluid 1601 on board. The commercial process of concentrating salts uses evaporation, with an estimated energy loss of approximately 10-15% if heat exchangers are used. The reverse osmosis process requires overcoming of the osmotic pressure, for example, of about 536 bars, which is possible in a cascade flow mode with commercial supported ion exchange membranes. The minimal energy expense at an infinitely slow filtration rate is, for example, about 7% of the energy content of the product 10M LiBrO$_3$ and 3H$_2$. Due to a finite flow rate, the regeneration process disclosed herein uses optimization of the unit size, power, and operating pressure in terms of the energy efficiency and capital cost.

The splitting-disproportionation 1608 cycle continues in the same flow or batch SD reactor 1502 till the [bromide]/[bromate] concentration ratio decreases to the desired value, for example, below 0.05. The resulting neutral oxidant fluid 1601, for example, approximately 5-10 M LiBrO$_3$, can be further concentrated, for example, to about 10-20 M, using reverse osmosis, evaporation or other methods known in the art. The use of evaporation for concentrating has an additional advantage of producing a hot solution of LiBrO$_3$ which has almost twice the solubility of a cold solution of LiBrO$_3$. The concentrated solution, for example, approximately 10M LiBrO$_3$ solution, the concentration of which is limited by the solubility of LiBrO$_3$ at the operating temperature, for example, about 20° C., then goes back into the orthogonal ion migration across laminar flow (OIMALF) reactor 1501, where Li$^+$ in LiBrO$_3$ is exchanged for H$^+$ from the incoming HBr, thus producing for example, a solution comprising 0.5M $HBrO_3$ and 9.5M $LiBrO_3$. Further exchange for $Li^+$ for $H^+$ is unnecessary since the ignition regime of electroreduction is already observed at such composition and may be detrimental due to reduced stability of bromate, which decomposes with oxygen evolution in highly acidic solutions.

The hot solution of $LiBrO_3$ can be pumped to an on-board oxidant storage tank 102 where it may be allowed to cool with precipitation of solid $LiBrO_3$, thus increasing the theoretical energy density of the on-board discharge system 101. The heat released during the cooling and precipitation of the hot concentrated solution of $LiBrO_3$ can be used to preheat the neutral discharge fluid 1607 or the neutral oxidant fluid 1601 prior to their use. The neutral oxidant fluid 1601 undergoes acidification 1602 in the acidification reactor 1501a. The precipitated $LiBrO_3$ can be re-dissolved in water or in an acidic discharge fluid and delivered as the acidic oxidant fluid 1603 to the discharge unit 104 for producing electric energy. The hardware components of the hydrogen-bromate energy cycle disclosed herein comprise analytical chemical detectors (not shown) used for process monitoring and control.

In an embodiment, in the first step in the scheme of regeneration, the halogen and a stoichiometric amount of hydrogen are regenerated by sunlight energy harvesting, that is, via photolysis or photoelectrolysis of the spent hydrogen halide. In this embodiment, the splitting-disproportionation reactor 1502 is configured as a photoelectrolysis-disproportionation reactor (not shown). A decomposition into $H_2$ and $X_2$ is induced in the discharge fluid in the photoelectrolysis-disproportionation reactor by irradiating the discharge fluid with sunlight in the presence of a photocatalyst such as a semiconductor. The regeneration system 106 disclosed herein comprising the photoelectrolysis-disproportionation reactor, regenerates the aqueous multi-electron oxidant (AMO) and the reducer during the induced reverse electrochemical process by consuming solar energy and the discharge products.

Since the regeneration system 106 replaces $O_2$ with the aqueous multi-electron oxidant (AMO), the sunlight energy harvesting method acquires a different perspective. A halogen, for example, bromine, the first intermediate in the regeneration process is produced from the spent hydrogen halide photoelectrochemically with a higher efficiency than water splitting achieves since there is no oxygen evolution over-voltage, and at a lower cost than photoelectrochemical water splitting as the Pt catalyst is not required for oxygen evolution. The photolysis process and the photoelectrolysis process involve irradiation of the hydrogen halide solution with light or without the presence of a light adsorbing facilitator, a catalyst, or a combination thereof. The light adsorbing facilitator is, for example, a semiconductor, a dye, a transition metal complex or a combination thereof. A semiconductor is, for example, $TiO_2$ in an anatase or rutile form and preferably in the form of particles suspended in the solution to be oxidized. The particle surface is also coated by one or several catalysts to facilitate evolution of hydrogen and/or halogen.

The projected performance of the $H_2$-aqueous multi-electron oxidant (AMO) discharge system 101 versus a 2012 Toyota RAV4EV lithium ion battery pack and the 2013 ARPA-E targets are shown in Table 2 below.

TABLE 2

| Parameter | Units | Target | Toyota RAV4 EV | $H_2$-AMO System |
|---|---|---|---|---|
| Manufacturing cost | $/kWh | <100-125 | 500 | 120 |
| Effective specific energy, system level | Wh/kg | >150 | 110 | 426 |
| Effective energy density, system level | Wh/L | >230 | <200 | 200-400 |
| Effective specific power on discharge 80% DOD/30 s | W/kg | >300 | 303 | 690 |
| Cycle life at 80% depth of discharge (DOD) | Cycles | >1000 | >1000 | 1000 |
| Calendar life | Years | >10 | <8 years | >10 (6 operational) |
| Operating temperature | ° C. | >−30 | >−30 | >−40 |

In Table 2, the projected low temperature limit refers to a cold-start up and it is limited by the freezing or precipitation point of the neutral oxidant fluid. The cost figures are calculated based on the design of modern proton exchange membrane fuel cells (PEMFCs) minus the cost of Pt catalyst on the cathode. The cost figures do not account for the economy-of-scale discount. The parameters refer to the system 100 with 5% w/w $H_2$ storage and 50% w/w/aqueous multi-electron oxidant (AMO) at 78% discharge efficiency corresponding to 0.5 W/cm² power. The power is calculated for a smooth flow-by carbon cathode on the basis of kinetic parameters reported in the literature and assuming membrane resistance of 0.1 ohm/cm². A five times higher power can be reasonably expected from a flow-through porous electrode. The number shown is the operational not calendar life if the discharge flow battery is limited by the degradation of Pt on the hydrogen anode accounting for the oxidant cross-over at open circuit potential (OCP) on the basis of relevant data for PEFCs. Purging both electrodes with on-board water on shut-downs can increase the projected durability. System energy density increases for $H_2$ storage methods in the order of: 350 bar gas<cryo-liquid<5% metal hydride. Although the gravimetric specific energy of hydrogen is high, the volumetric energy density of hydrogen is low even at the highest practically achievable pressures and hydrogen storage. Both high pressure carbon composite cylinder and metal hydrides tank may satisfy the mass and the volume requirements.

FIGS. 17A-17B exemplarily illustrate mass flows in a single cell 1700 of a splitting-disproportionation reactor 1502, more specifically, an electrolysis-disproportionation (ED) reactor 107 configured for regeneration in an aqueous multi-electron oxidant (AMO)-on-negative electrode mode of operation. FIG. 17A exemplarily illustrates an operation of a single regeneration flow cell 1700. LiA is the buffer in the base form, for example, Li-3-(N-morpholino) propanesulfonic acid (MOPS). In an embodiment, the ED reactor 107 is configured for the AMO-on-negative mode of operation using a modified membrane-electrode assembly (MEA) 1701. The negative electrode layer 1702 of the MEA 1701 of the ED cell 1700 when configured for the AMO-on-negative mode of operation has a graded and/or multilayer structure and/or composition in order to avoid and/or minimize on the negative electrode 1702, the reduction of the AMO regenerated on the positive electrode 1703 while allowing for $H_2$ evolution and for maintaining the pH in the optimal basic range. The side or the negative electrode layer 1702a closer to a cation-conductive polymer electrolyte membrane 1704 which is the inner layer, is a catalytic layer comprising Pt/C embedded into a cation-conducting polymer electrolyte (CCPE) such as Nation®. A Pt catalyst is supplied to facilitate the reduction of $H^+$ into $\frac{1}{2}H_2$. Cations, such as $Li^+$ and $H^+$ and neutral species, such as $H_2$ and $H_2O$ can permeate through the CCPE. Anions, such as halate and halide, permeate the CCPE to a much smaller extent. The outer layer of the MEA catalytic layer comprises CCPE and carbon but not Pt thus allowing for the transport of electrons and cations but preventing the reduction of the AMO species on the negative electrode 1702 during the regeneration.

In the cyclic flow mode under the aqueous multi-electron oxidant (AMO)-on-negative mode of operation for a single cell electrolysis-disproportionation (ED) reactor 107, the solution containing the AMO is cycled between the negative electrode 1702 of the ED reactor 107 where neutralization and/or alkalization occurs and the positive electrode 1703 where electrooxidation and disproportionation occur. In the cascade flow mode under the AMO-on-negative mode of operation, the solution containing the AMO moves between the negative electrode 1702 of one ED flow cell 1700 where neutralization occurs to the positive electrode 1703 of an adjacent ED flow cell 1700 where electrooxidation and disproportionation occur. In the cascade flow mode, the regenerated AMO solution flows through a cascade of functionally identical ED reactors 107 such as positive electrode compartments of individual cells 1700.

An operation of the aqueous multi-electron oxidant (AMO)-on-negative mode of operation is exemplarily illustrated in FIG. 17A with an electrolysis-disproportionation (ED) reactor 107 represented by a single cell 1700 operating in the cyclic flow mode. A neutral discharge fluid, for example, from a car's discharge tank, or a neutral partially regenerated oxidant fluid, for example, from a previous regeneration cycle, passes through a negative compartment and a negative electrode 1702 of the regeneration flow cell or the ED cell 1700 where hydrogen is produced and the pH of the discharge fluid is raised. The AMO-on-negative mode of operation is facilitated via the use of the outer negative electrode layer 1702b to prevent the access of AMO anions to the surface of electrocatalysts in the negative electrode layer 1702a. If the discharge fluid is flushed in the second and subsequent cycles through the negative electrode 1702 to lower the pH, an undesirable electroreduction of bromate on an electrocatalyst may occur:

$$LiBrO_3+6e^-+6H^+=LiBr+3H_2O \quad (35)$$

In this aqueous multi-electron oxidant (AMO)-on-negative mode of operation, the reduction of the AMO anion species on the electrocatalysts such as Pt in the negative electrode 1702 can be minimized or prevented by blocking the surface of Pt by a cation-selective coating, such as Nafion polymer, by using, for example, a two layer electrode 1702, with only the inner layer 1702a containing a catalyst, for example, Pt capable of hydrogen evolution reaction; and the outer layer 1702b exposed to the flowing electrolyte comprising, for example, a Pt-free porous carbon containing an electron-conducting component such as carbon particles and fibers, for providing electronic current between the inner layer 1702a and a current collector 1705, a cation-selective component such as Nafion polymer, which allows for cation transport between the flowing liquid 1009 in the negative electrode compartment and flowing liquid in the positive electrode compartment. The structure of the inner layer 1702b is similar to the modern generation of the catalytic layers of the membrane-electrode assemblies of polymer electrolyte fuel cells. The inner layer 1702b allows for a transport of electrons, protons, and other cations to the Pt electrocatalyst but of anions, thereby selectively allowing hydrogen production and suppressing AMO reduction.

A more detailed illustration of the chemistry aspects of the aqueous multi-electron oxidant (AMO)-on-negative mode of operation at the membrane-electrode assembly 1701 level is exemplarily illustrated in FIG. 17B using the first cycle with the charge of one electron per bromide. FIG. 17B shows an operation of an ED reactor 107 in the flow modes and the AMO-on-negative mode of operation showing neutralization performed at the negative electrode 1702 with a multilayer structure. Water flux through membrane is not shown. 1 electron per cycle is shown as a means of illustration not of limitation. HA is, for example, Li-3-(N-morpholino) propanesulfonic acid (MOPS). The two layer negative electrode 1702 is exemplarily illustrated in FIG. 17B with the inner layer 1702a containing Pt on carbon fibers or particles embedded into a cation-conductive membrane and the outer layer 1702b made of carbon fibers or particles without Pt and embedded into a cation-conductive membrane. The inner layer 1702a with Pt allows for hydrogen evolution reaction to occur while preventing the electroreduction of bromate on Pt.

FIG. 18 exemplarily illustrates mass flows in a single cell 1700 of a splitting-disproportionation reactor 1502, more specifically, an electrolysis-disproportionation (ED) reactor 107 configured for regeneration in a no-aqueous multi-electron oxidant (AMO)-on-negative electrode mode of operation and a batch mode. Only the first two $e^-/X^-$ cycles are shown. There are two modes of operation for proceeding with the ED regeneration cycle: with and without passing AMO through the negative electrode 1702. Furthermore, each of these two modes of operation can be implemented in a batch mode or in a flow mode. The flow mode can be implemented in a cyclic flow mode or in a cascade flow mode. Furthermore, these different modes of operation can be combined within one ED cell 1700, within a single ED reactor 107, and within one regeneration system 106. In an embodiment, the ED reactor 107 is configured for the no-AMO-on-negative mode of operation using an additional mixing reactor (not shown) to add a base produced on the negative electrode 1702 to the AMO containing fluid on the positive electrode 1703. The no-AMO-on-negative mode of operation avoids exposure of the AMO to the negative electrode(s) 1702 in the ED reactor 107 and instead relies on the transfer of a base produced on the negative electrode 1702 during the hydrogen evolution or generation reaction, for example,

$$H_2O+e^-+M^+=\frac{1}{2}H_2+MOH \quad (42)$$

to the disproportionation reactor which can be the positive electrode compartment as exemplarily illustrated in FIG. 18. Only shown are the first two electrolysis-disproportionation (ED) cycles. Water fluxes are not shown.

In this no-aqueous multi-electron oxidant (AMO)-on-negative mode of operation, the electroreduction of the AMO on the negative electrode 1702 of the ED cell 1700 can be prevented by preventing the flow of the AMO-containing fluid through the negative electrode 1702. The base such as MOH shown in FIG. 18, produced on the negative electrode 1702 in reaction (42) and required for the disproportionation can be carried over from the negative electrode 1702 to the positive electrode 1703 with a solvent such as water. During the regeneration ED cycles, this water can be supplied to the negative electrode 1702 from an external source or from the positive electrode 1703 through the cation-conductive polymer electrolyte membrane 1704 by one or a combination of the following: electro osmotic drag with M⁺, by applying pressure to the positive electrode 1703, by other methods known in the art. This excess water may be separated from ionic components in the oxidant fluid, yielding concentrated AMO solution suitable for an on-board use, produced on the positive electrode 1703, using one or more of the following: distillation, reverse osmosis, evaporation, nanofiltration, pervaporation, ion exchange, freezing, other methods known in the art, and by any combination thereof.

The no-aqueous multi-electron oxidant (AMO)-on-negative mode of operation uses a less complicated structure of the positive electrodes 1703 of the ED reactor 107, and when a LiOH base with solubility over 5 molal is used, it can provide a practical and useful system power density which, nevertheless, can be limited by the maximal sustainable pH gradient across the cation-conductive polymer electrolyte membrane 1704. On the other hand, the AMO-on-negative mode of operation does not suffer from poor solubility of the base transferred and it overcomes a potential problem of the instability of aqueous $Li_2HPO_4$ toward decomposition into $Li_3PO_4$ (solid) and $LiH_2PO_4$ (solute) by consuming hydrogen phosphate in the disproportionation before the aqueous $Li_2HPO_4$ decomposes.

Figure 19:
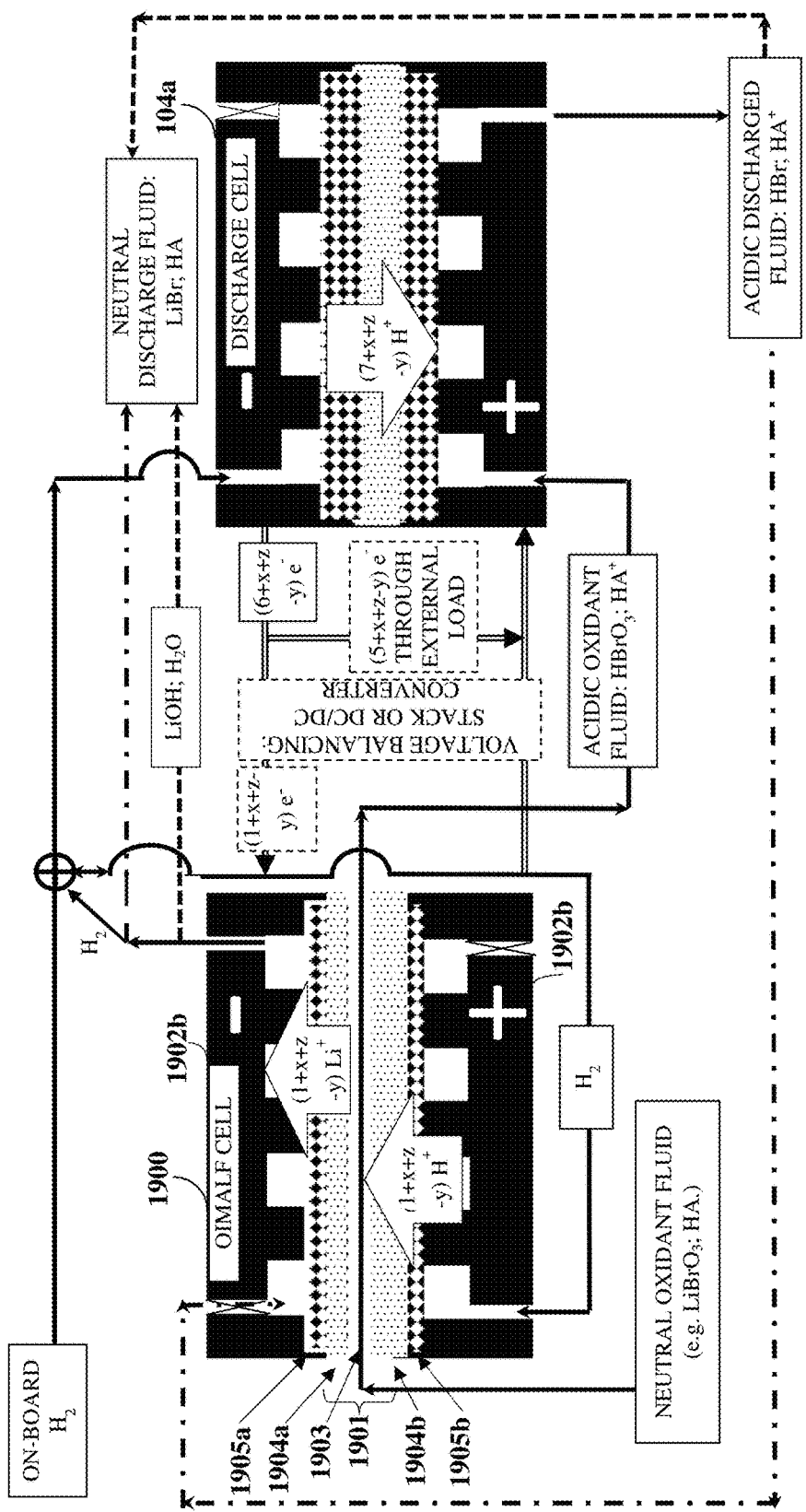
FIG. 19 exemplary illustrates a mass and electricity flow diagram of a discharge system comprising a single cell discharge unit and an orthogonal ion migration across laminar flow reactor.

FIG. 19 exemplary illustrates a mass and electricity flow diagram of a discharge system 101 comprising a single cell discharge unit 104 and an orthogonal ion migration across laminar flow (OIMALF) reactor 1501, exemplarily illustrated in FIG. 1 and FIG. 15. The aqueous multi-electron oxidant (AMO)-on-negative mode of operation is represented using dash-dotted lines and the no-AMO-on-negative mode of operation is represented using dotted lines. $LiBrO_3$, $H_3PO_4$, LiZ chemistry is exemplarily illustrated for the sake of illustration and not as a limitation. The discharge system 101 comprises the OIMALF reactor 1501 represented by a single orthogonal ion migration across laminar flow (OIMALF) cell 1900, the discharge unit 104 represented by a single discharge cell 104a, connecting electric lines, hoses, valves, and an electric management system (not shown). The OIMALF reactor 1501 comprises an OIMALF cell stack (not shown) which is configured similar to a polymer electrolyte fuel cell (PEFC) stack but with a liquid electrolyte flowing between two ionically conducting membranes. The OIMALF reactor 1501 comprises endplates 1902a and 1902b and bipolar plates (not shown), and the OIMALF flow cell assembly 1901 as disclosed in the detailed description of FIG. 15. Each flow cell assembly 1901 of the OIMALF reactor 1501 comprises an intermembrane flow field (not shown) with multiple OIMALF flow channels 1903, two layers of an ion exchange membrane comprising a positive side ion exchange membrane 1904a and a negative side ion exchange membrane 1904b positioned parallel to each other on each side of the intermembrane flow field, a positive electrode layer 1905a and a negative electrode layer 1905b flanking outer surfaces of the ion exchange membranes, and porous diffusion layers 1905a and 1905b flanking the outer surfaces of the ion exchange membranes and in electric contact with the adjacent bipolar plates or endplates 1902a and 1902b. The positive electrode layer 1905a is configured for a hydrogen oxidation reaction and the negative electrode layer 1905b is configured for a hydrogen evolution reaction. Two modes of neutralizing the discharge fluid are exemplarily illustrated in FIG. 19: (i) directly at the negative electrode(s) 1905b in the OIMALF flow cell 1900 which requires graded/multilayer negative electrode layers 1905b in the OIMALF reactor 1501 to prevent the reduction of an AMO anion on the catalyst surface of the negative electrode(s) 1905b, and (ii) indirectly in a neutralization reactor 1501b, using the base such as LiOH produced at the negative electrode(s) 1905b of the OIMALF cell stack.

The orthogonal ion migration across laminar flow (OIMALF) reactor 1501 or the OIMALF cell 1900 converts the salt forms of the aqueous multi-electron oxidant (AMO), for example, aqueous $LiBrO_3$ and of the other components of the neutral oxidant fluid, for example, $LiH_2PO_4$, and of the extra acid, for example, LiZ into acidic oxidant fluid which comprises their acid forms, for example, $HBrO_3$, HA, etc. A complete conversion of the salt form of the AMO into the acidic form is not necessary and a partial conversion is suitable in many applications. An acid concentration, for example, below 1M may cause an ignition regime provided that the total concentration of all forms of the aqueous multi-electron oxidant (AMO) is maintained high, for example, over 1 m and the thickness of the diffusion boundary layer is large, for example, over 1 micron. The buffer, for example, one or more forms of phosphate is present in the acidic oxidant fluid because it is carried over from the splitting-disproportionation (SD) reactor 1502 of the regeneration system 106 where the base form of the buffer is used in the disproportionation reaction such as the one shown below:

$$3Br_2+6LiA+3H_2O=5LiBr+LiBrO_3+6HA \tag{43}$$

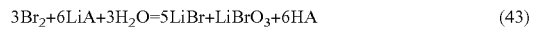

An extra acid, for example, HA, such as $H_2SO_4$, $LiHSO_4$, HCl, $HNO_3$, $HClO_4$, $CF_3SO_3H$, etc., can be added to accelerate the rate of comproportionation as shown in equation (44) below on discharge. The use of such an extra acid may be more advantageous than an increase in the phosphoric acid ($H_3PO_4$) concentration which is a weak acid. The use of a higher acid concentration, afforded by adding the extra acid, facilitates the rate of the comproportionation because for a general acid-catalyzed reaction such as:

$$BrO_3^-+5Br^-+6H^+=3Br_2+3H_2O \tag{44}$$

The same rate can be obtained with a lower concentration of a strong extra acid, such as $HClO_4$ or $F_3CSO_3H$ than with a weaker acid such as $H_3PO_4$. A smaller concentration of the extra acid, compared to the concentration of phosphoric acid that shows comparable rate constant for the comproportionation, requires a smaller charge in the orthogonal ion migration across laminar flow (OIMALF) process, thus reducing the energy expenses and the size of the OIMALF reactor 1501. For purposes of illustration, the detailed description is described with reference to an OIMALF process for conversion of the salt form of the aqueous multi-electron oxidant (AMO) into the acid form of the AMO; however the scope of the method and system disclosed herein is not limited to the OIMALF process but can be extended to include other processes such as a ion exchange on resins and in other applications.

The acidic oxidant fluid travels from a central compartment 1903 of the orthogonal ion migration across laminar flow (OIMALF) cell 1900 to the positive electrode compartment of the discharge cell 104a of the discharge unit 104 where the acidic oxidant fluid undergoes electroreduction and comproportionation as shown below.

$$3Br_2+6e^-=6Br^- \tag{45}$$

$$BrO_3^-+5Br^-+6H^+=3Br_2+3H_2O \tag{46}$$

The reducer, for example, $H_2$, undergoes electrooxidation, represented by: $3H_2-6e^-=6\ 6H^+$, at the negative electrode 205b of the discharge cell 104a. The discharge system 101 produces electric power for the consumer and, if needed, for operating the orthogonal ion migration across laminar flow (OIMALF) reactor 1501.

The final step performed by the discharge system 101 is neutralization of the acidic discharge fluid. For the aqueous multi-electron oxidant (AMO)-on-negative mode of operation to neutralization, the acidic discharge fluid comprises, for example, one or more forms of water, HBr, $H_3PO_4$, and HA such as $H_2SO_4$, $F_3CSO_3H$, etc., in concentrations between, for example, about 1 mM and 20 M. In an embodiment, the acidic discharge fluid comprises, for example, one or more of water, a halide, a hydroxonium cation, and a counter cation. In an embodiment, the acidic discharge fluid produced at the positive electrode compartment of the discharge cell 104 flows through or by the negative electrode 1905b of an orthogonal ion migration across laminar flow (OIMALF) cell 1900 where a hydrogen evolution or production reaction and pH increase occur as shown by the equations below:

$$HA + e^- + Li^+ = LiA + \tfrac{1}{2}H_2 \qquad (47)$$

The negative electrodes 1905b of the orthogonal ion migration across laminar flow (OIMALF) reactor 1501 can take advantage of the Pt-free electron and cation conductive inner layer similar to the negative electrodes 1702 of the regeneration cells or the SD cells 1700 configured for the aqueous multi-electron oxidant (AMO)-on-negative mode of operation, to prevent the electroreduction of residual AMO in the discharge fluid. Such a layer, however, is not necessary if the discharge of the AMO in the discharge unit 104 proceeds to near completion so that little AMO is present in the acidic discharge fluid.

In other words, as exemplarily illustrated in FIG. 19, the acidic discharge fluid is passed over the negative electrode 1905b of the orthogonal ion migration across laminar flow (OIMALF) reactor 1501 where the acidity of the discharge fluid is lowered via a hydrogen evolution or production reaction with a simultaneous replacement of $H^+$ with a cation from the salt of the aqueous multi-electron oxidant (AMO), for example, a $Li^+$ cation. This produces a neutralized discharge fluid and avoids the formation and handling of corrosive and moderately soluble LiOH and is utilized in on-board applications.

Alternatively, if the no-aqueous multi-electron oxidant (AMO)-on-negative mode of operation is implemented in the SD reactor 1502, a base such as LiOH, produced in the negative electrode compartment of the SD reactor 1502 is mixed with the acidic discharge fluid allowing for the following chemical processes to occur:

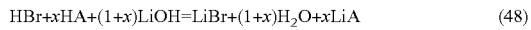

$$HBr + xHA + (1+x)LiOH = LiBr + (1+x)H_2O + xLiA \qquad (48)$$

The neutralized discharge fluid passes first through a negative electrode 1702 of a regeneration flow cell or SD cell 1700, where the neutralized discharge fluid is converted into alkaline regenerated fluid and $H_2$ as shown below. The alkaline regenerated fluid and $H_2$ are separated in the separation reactor 1010, exemplarily illustrated in FIG. 10B and FIG. 17A.

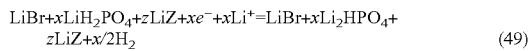

$$LiBr + xLiH_2PO_4 + zLiZ + xe^- + xLi^+ = LiBr + xLi_2HPO_4 + zLiZ + x/2H_2 \qquad (49)$$

During the regeneration process the neutral discharge fluid passes through the positive electrodes 1703 of the SD reactor 1502 or the regeneration system 106. At the positive electrode 1703 of the SD cells 1700 also referred herein as the "regeneration flow cell", bromide is oxidized into bromine and bromine disproportionates into bromide and bromate by reacting with water in the presence of an alkaline form of the buffer, for example, $A^-$

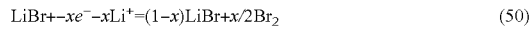

$$LiBr + xe^- = xLi^+ = (1-x)LiBr + x/2Br_2 \qquad (50)$$

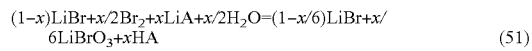

$$(1-x)LiBr + x/2Br_2 + xLiA + x/2H_2O = (1-x/6)LiBr + x/6LiBrO_3 + xHA \qquad (51)$$

A complete regeneration of the aqueous multi-electron oxidant (AMO) may not be necessary and a partially regenerated, that is with LiBrO and LiBr present, neutral or near-neutral oxidant fluid can be loaded on-board. The cycle of electrooxidation-disproportionation (ED) can be continued in a batch mode, cyclic flow mode, cascade flow mode or in any combination thereof using one or more regeneration systems 106 configured for such a mode. The cycle or cascade of regeneration is continued till the desired ratio of $[Br^-]/[BrO_3^-]$ is obtained. The cascade flow mode provides a higher throughput and the cyclic flow mode provides a lower capital cost. The cascade flow mode of regeneration is utilized for multi-user facilities and the cyclic flow mode is utilized for at-home regeneration. Based on the equations (23)-(24), 6 cycles are needed to convert all bromide into bromate. However, a smaller or larger number can be used in practice since a 100% conversion of bromide to bromate is not necessary either in a single SD cycle or in a complete regeneration process for the working of the disclosed energy cycle.

Figure 20A:
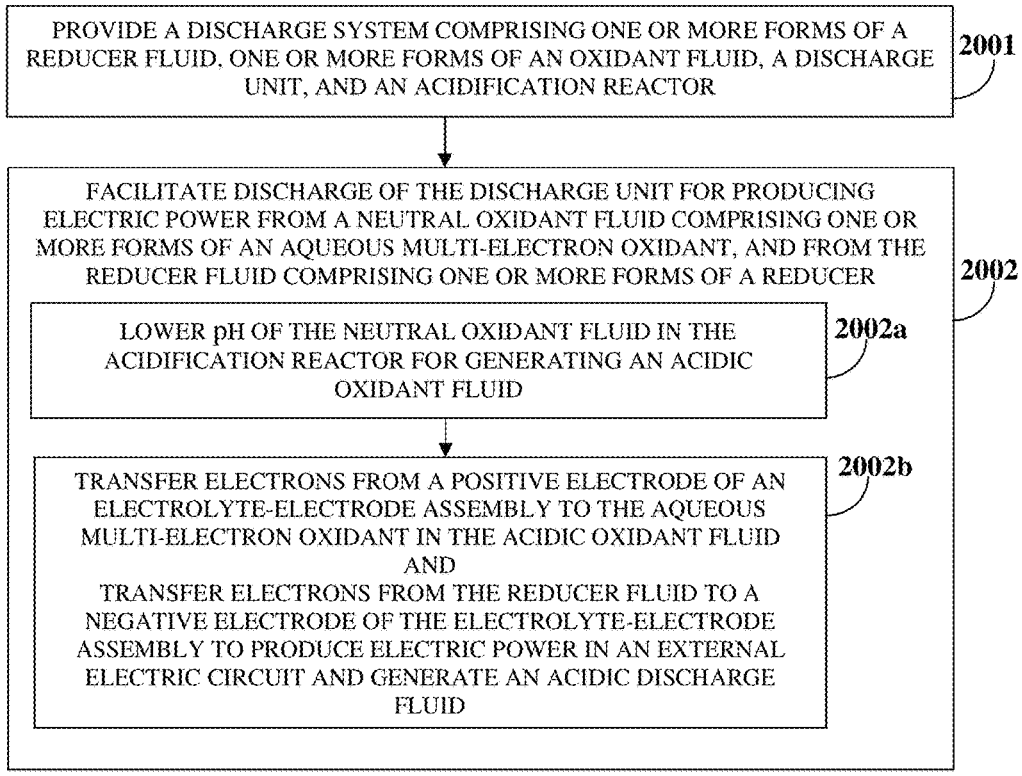
FIG. 20A illustrates a method for producing electric power from an aqueous multi-electron oxidant and a reducer and for simultaneously generating a discharge fluid.

FIG. 20A illustrates a method for producing electric power from an aqueous multi-electron oxidant and a reducer and for simultaneously generating a discharge fluid. The method disclosed herein provides 2001 the discharge system 101 comprising one or more forms of a reducer fluid, one or more forms of an oxidant fluid, the discharge unit 104, and the acidification reactor 1501a exemplarily illustrated in FIG. 15. The method disclosed herein facilitates 2002 discharge of the discharge unit 104 for producing electric power from a neutral oxidant fluid comprising one or more forms of the aqueous multi-electron oxidant, and from the reducer fluid comprising one or more forms of the reducer, for example, hydrogen. In an embodiment, the reducer is selected from a group consisting of ammonia, hydrazine, hydroxylamine, phosphine, methane, a hydrocarbon, an alcohol such as methanol, ethanol, etc., an aldehyde, a carbohydrate, a hydride, an oxide, a sulfide, an organic compound, an inorganic compound, and any combination thereof, with each other, with water, or with another solvent. The facilitation of discharge comprises lowering 2002a pH of the neutral oxidant fluid in the acidification reactor 1501a for generating an acidic oxidant fluid, transferring 2002b electrons from the positive electrode 205a of the electrolyte-electrode assembly 205 to the aqueous multi-electron oxidant in the acidic oxidant fluid, and transferring electrons from the reducer fluid to the negative electrode 205b of the electrolyte-electrode assembly 205 to produce electric power in the external electric circuit operably connected to the terminals of the discharge unit 104 and to generate an acidic discharge fluid on consumption of the acidic oxidant fluid and the reducer fluid. A limiting current of the transfer of the electrons from the positive electrode 205a of the electrolyte-electrode assembly 205 to the aqueous multi-electron oxidant in the acidic oxidant fluid in an ignition regime is limited, for example, by a mass-transport of the aqueous multi-electron oxidant, a mass-transport of acidic protons, and a rate of comproportionation. The transfer of electrons from the positive electrode 205a of the electrolyte-electrode assembly 205 to the aqueous multi-electron oxidant in the acidic oxidant fluid is performed at a high current density and at low flow rates in an ignition mode of operation of the discharge system 101. The acidic discharge fluid comprises, for example, one or more of water, a halide, a hydroxonium cation, an extra acid, and one or more counter cations. In an embodiment, the method disclosed herein further comprises optionally neutralizing the acidic discharge fluid in the neutralization reactor 1501b to produce a neutral discharge fluid. In an embodiment, the method disclosed herein further comprises regenerating a certain amount of an intermediate oxidant and the reducer in the discharge unit 104 from the acidic discharge fluid by applying an electric current of a polarity opposite to the polarity of electric current through the discharge unit 104 during discharge.

In an embodiment, the generation of the acidic oxidant fluid from the neutral oxidant fluid is performed in the acidification reactor 1501a via an electric field driven orthogonal ion migration across laminar flow process. In another embodiment, the generation of the acidic oxidant fluid from the neutral oxidant fluid is performed, for example, by one or more of an ion exchange on solids, an ion exchange in liquids, electrolysis, and adding an extra acid to the neutral oxidant fluid during discharge of the discharge unit 104. In an embodiment, the discharge is facilitated on the positive electrode 205a of the electrolyte-electrode assembly 205, for example, by one or more of electrocatalysis, a solution-phase chemical reaction, a solution-phase comproportionation, a solution-phase redox catalysis, a solution-phase redox mediator, an acid-base catalysis, and any combination thereof. In another embodiment, the discharge process is facilitated via a solution-phase comproportionation of the aqueous multi-electron oxidant with a final product of a reduction of the aqueous multi-electron oxidant. In an embodiment, the solution-phase comproportionation is pH-dependent and the discharge is facilitated in the presence of an acid.

Figure 20B:
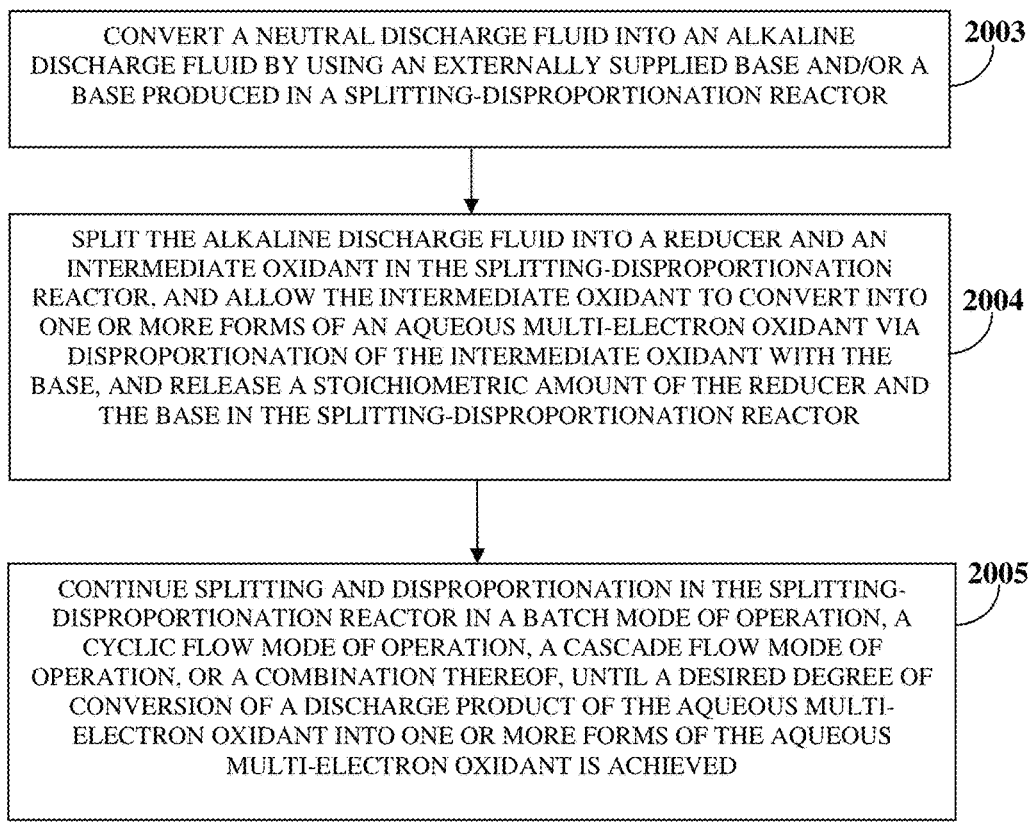
FIG. 20B illustrates a method for regenerating an aqueous multi-electron oxidant and a reducer in stoichiometric amounts from one or more forms of a neutral discharge fluid using external power.

FIG. 20B illustrates a method for regenerating an aqueous multi-electron oxidant and a reducer in stoichiometric amounts from one or more forms of a neutral discharge fluid using external power. The discharge fluid comprises, for example, one or more of water, a halide, a hydroxonium cation, a buffer, and one or more counter cations. In the method disclosed herein, one or more forms of a buffer are present in the oxidant fluid and in the discharge fluid, but the buffer is not essential for the discharge. The method disclosed herein comprises converting 2003 the neutral discharge fluid into an alkaline discharge fluid by using an externally supplied base and/or a base produced in the splitting-disproportionation reactor 1502 exemplarily illustrated in FIG. 15, configured for an aqueous multi-electron oxidant-on-negative mode of operation, a no-aqueous multi-electron oxidant-on-negative mode of operation, or a combination thereof.

The pH of the alkaline discharge fluid is optimized and stabilized in the splitting-disproportionation reactor 1502 using a buffer present in one or more forms of the discharge fluid to facilitate disproportionation of the intermediate oxidant into one or more forms of the aqueous multi-electron oxidant. The pH of the alkaline discharge fluid is maintained between 6 and 10, for example, between 4 and 9. The buffer is configured to maintain the pH of the alkaline discharge fluid between 6 and 10, for example, between 4 and 9. In an embodiment, the base component of the buffer is selected from a group comprising a hydroxide ion, hydrogen phosphate, a phosphate ester, a substituted phosphonate, an alkylphosphonate, an arylphosphonate, a deprotonated form of one or more of Good's buffers, an amine, a nitrogen heterocycle, and any combination thereof. In an embodiment, the cationic component of the buffer comprises a cation of lithium. In another embodiment, the cationic component of the buffer comprises a cation of sodium. In another embodiment, the anionic component of the buffer comprises one or more of ω-(N-morpholino)alkanesulfonate, 2-(N-morpholino)ethanesulfonate, 3-(N-morpholino)propanesulfonate, and 4-(N-morpholino)butanesulfonate. In another embodiment, the anionic component of the buffer is one or more of ω-(N-morpholino)alkanesulfonate, 2-(N-morpholino)ethanesulfonate, 3-(N-morpholino)propanesulfonate, and 4-(N-morpholino)butanesulfonate and the cationic component of the buffer is lithium. In another embodiment, the anionic component of the buffer comprises one or more of an alkylphosphonate and an arylphosphonate. In another embodiment, the anionic component of the buffer comprises one or more of an alkylphosphonate, an arylphosphonate, and a cationic component of the buffer is lithium. In an embodiment, the base component of the buffer is monohydrogen phosphate and a cationic component of the buffer is sodium.

The splitting-disproportionation reactor 1502 splits 2004 the alkaline discharge fluid into a reducer and an intermediate oxidant. The splitting-disproportionation reactor 1502 converts the intermediate oxidant into one or more forms of the aqueous multi-electron oxidant via disproportionation of the intermediate oxidant with the base. The splitting process releases a stoichiometric amount of the reducer and the base in the splitting-disproportionation reactor 1502. The splitting-disproportionation reactor 1502 continues 2005 the splitting process and disproportionation in a batch mode of operation, or a cyclic flow mode of operation, or a cascade flow mode of operation, or a combination thereof, until a desired degree of conversion of a discharge product of the aqueous multi-electron oxidant into one or more forms of the aqueous multi-electron oxidant is achieved. The splitting-disproportionation reactor 1502 splits the alkaline discharge fluid into the reducer and the intermediate oxidant, for example, via electrolysis, photolysis, photoelectrolysis, radiolysis, thermolysis, or any combination thereof. The process of photolysis and photoelectrolysis of the alkaline discharge fluid is performed in the presence or absence of a light adsorbing facilitator, a semiconductor, a catalyst, and any combination thereof.

In an embodiment, the splitting-disproportionation reactor 1502 is configured as an electrolysis-disproportionation reactor 107. The electrolysis-disproportionation reactor 107 converts a neutral discharge fluid into an alkaline discharge fluid by using an externally supplied base and/or a base produced at one or more negative electrodes of the electrolysis-disproportionation reactor 107 in an aqueous multi-electron oxidant-on-negative mode of operation, a no-aqueous multi-electron oxidant-on-negative mode of operation, or a combination thereof. The electrolysis-disproportionation reactor 107 splits or electrolyzes the alkaline discharge fluid into a reducer and an intermediate oxidant via electrolysis. The process of electrolysis releases a stoichiometric amount of the reducer and the base at one or more negative electrodes of the electrolysis-disproportionation reactor 107. The electrolysis-disproportionation reactor 107 converts the intermediate oxidant produced at one or more positive electrodes of the electrolysis-disproportionation reactor 107 into one or more forms of the aqueous multi-electron oxidant via disproportionation of the intermediate oxidant produced at one or more positive electrodes with the base. The electrolysis-disproportionation reactor 107 continues the electrolysis and disproportionation processes in a batch mode of operation, or a cyclic flow mode of operation, or a cascade flow mode of operation, or a combination thereof, until a desired degree of conversion of a discharge product of the aqueous multi-electron oxidant into one or more forms of the aqueous multi-electron oxidant is achieved.

Figure 20C:
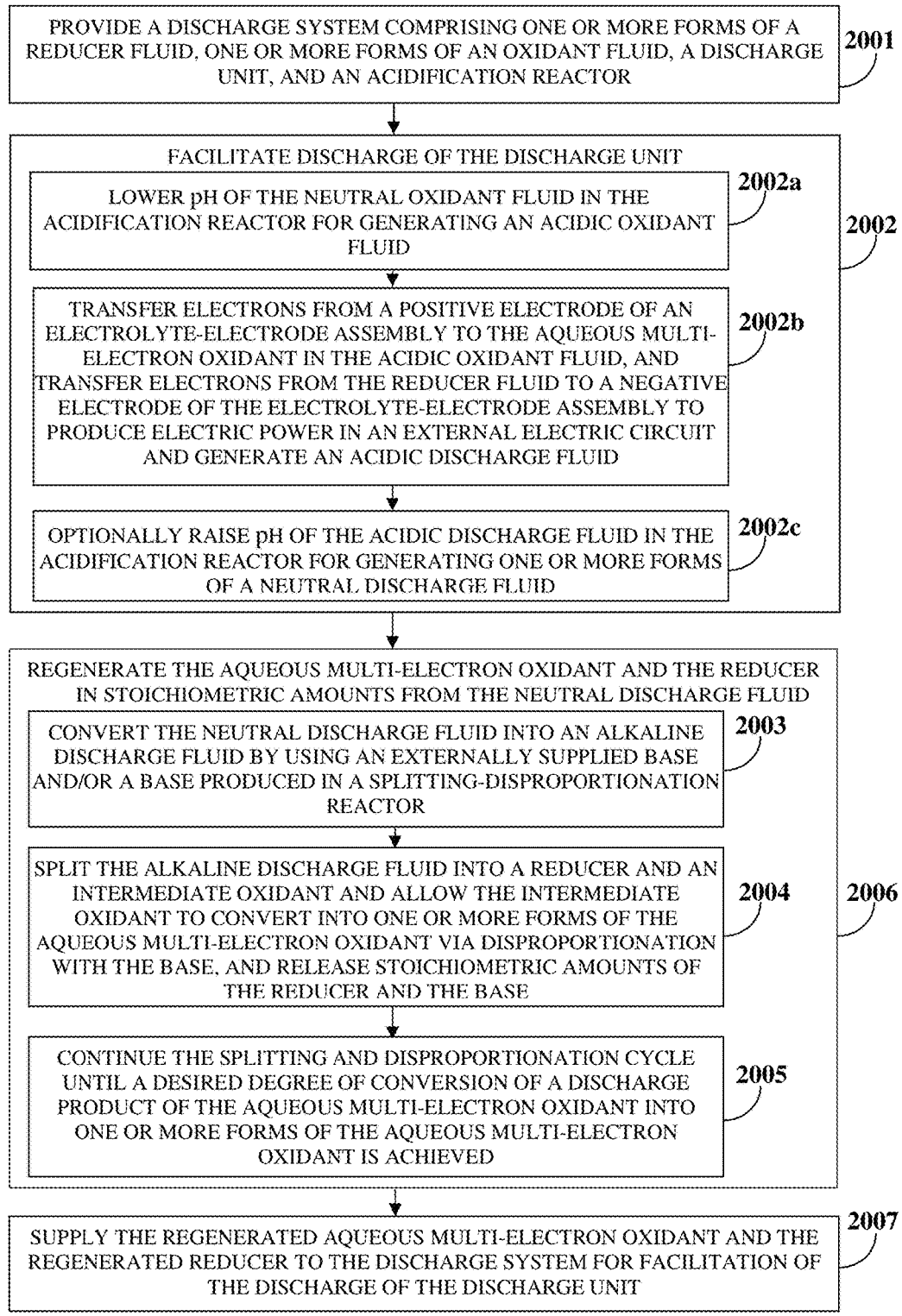
FIG. 20C illustrates a method for producing electric power and regenerating an aqueous multi-electron oxidant and a reducer in an energy storage cycle.

FIG. 20C illustrates a method for producing electric power and regenerating an aqueous multi-electron oxidant and a reducer in an energy storage cycle. The method disclosed herein provides 2001 the discharge system 101 comprising one or more forms of a reducer fluid, one or more forms of an oxidant fluid, the discharge unit 104, the acidification reactor 1501a, and optionally a neutralization reactor 1501b exemplarily illustrated in FIG. 15. The method disclosed herein facilitates 2002 discharge in the discharge unit 104 for producing electric power from a neutral oxidant fluid comprising one or more forms of the aqueous multi-electron oxidant (AMO) and from the reducer fluid comprising one or more forms of the reducer. The pH of the oxidant fluid is lowered 2002a in the acidification reactor 1501a such as the orthogonal ion migration across laminar flow (OIMALF) reactor 1501. The oxidant fluid is converted into an acidic oxidant fluid via an electric field driven OIMALF process. The discharge system 101 converts or partially converts the AMO in the salt form such as $LiBrO_3$ into the AMO in the acid form such as $HBrO_3$ in the acidification reactor 1501a. When OIMALF process is employed in the acidification reactor 1501a and the neutralization reactor(s) 1501b, the conversion of the AMO from the salt form to the acid form is accompanied by a simultaneous release of stoichiometric amount of the base form of the buffer for neutralization of the discharge fluid. The conversion of the salt form of the AMO produced at the positive electrode into the acid form of the AMO is performed via an addition of an acid, ion exchange on resins, ion exchange in solution, for example, an electric field driven orthogonal ion migration across laminar flow (OIMALF) process in the acidification reactor 1501a. The conversion of the salt form of the AMO into the acid form of the AMO in the acidification reactor 1501a is facilitated by an acid, a buffer, electrolysis, ion exchange in solution, ion exchange on surfaces, or any combination thereof. In an embodiment, the choice of the acid form of the AMO can be expanded beyond $HBrO_3$ to other AMOs comprising, for example, $HClO_4$, $HClO_3$, $HClO_2$, $HClO$, $HBrO_4$, $HBrO_2$, $HBrO$, etc. Phosphoric acid will be present in the oxidant fluid if phosphate buffer is used during the regeneration.

In an embodiment, the conversion of the salt form of the aqueous multi-electron oxidant (AMO) into the acid form of the AMO occurs within the acidification reactor 1501a which is used to produce electric power in combination with the discharge unit 104 and located, for example, on-board of a vehicle. If the acidification reactor 1501a is an orthogonal ion migration across laminar flow (OIMALF) reactor, the acidification process occurs by consuming electric power and by recycling the hydrogen released on the negative electrode of the acidification reactor 1501a and electro-oxidized on the positive electrode of the acidification reactor 1501a. In an embodiment, the hydrogen produced at the negative electrode or electrodes 1702 in the SD reactor 1502 is combined with the hydrogen produced at the negative electrode 1905b of one or many OIMALF reactors 1501 either before or after one or many OIMALF reactors 1501 or at the negative electrode or electrodes 1905b of the OIMALF reactor 1501, and the hydrogen is flown through the flow field of the positive electrode 1905a of one or many OIMALF reactors 1501. The method disclosed herein reduces the amount of electric charge utilized by the acidification reactor 1501a for converting the salt form of the AMO into the acid form of the AMO by adding another acid to the AMO during the discharge process. In order to reduce the electric charge required by the acidification reactor 1501a and the degree of conversion required in the OIMALF process to convert the salt form of the AMO into the acid form of the AMO, another acid or its anion, for example, $H_2SO_4$, $HClO_4$, $F_3CSO_3H$, another strong acid, etc., can be co-present with the AMO during the discharge in all stages of the energy cycle.

In another embodiment, the process of on-board acidification does not comprise orthogonal ion migration across laminar flow (OIMALF) but rather an addition on an acid stored within the discharge unit 104. Furthermore, the requirement for storing a stoichiometric amount of $H_2$ in the discharge system 101 can be reduced by up to 20% if an extra $H_2$ is produced from the acidic discharge fluid using metals stored in the discharge system 101 as shown in the reaction below.

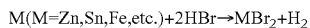
M(M=Zn,Sn,Fe,etc.)+2HBr→MBr$_2$+H$_2$

Such a metal can be used in a complete energy cycle, with regeneration performed by splitting of $MBr_2$ off-board:

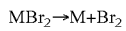
MBr$_2$→M+Br$_2$

The discharge unit 104 facilitates discharge by simultaneously transferring 2002b electrons from a positive electrode 205a of the 5-layer electrolyte-electrode assembly 206 exemplarily illustrated in FIG. 2, to the aqueous multi-electron oxidant (AMO) in the acidic oxidant fluid, and transferring electrons from the reducer fluid to a negative electrode 205b of the 5-layer electrolyte-electrode assembly 206 to produce electric power in an external electric circuit operably connected to the terminals of the discharge unit 104 and to generate an acidic discharge fluid on consumption of the acidic oxidant fluid and the reducer fluid. The pH of the acidic discharge fluid in the acidification reactor 1501a is optionally raised 2002c for generating a neutral discharge fluid. The generation of electric power using the AMO, for example, bromine during the discharge is accompanied by the following half-cell electrochemical reactions:

Negative Electrode: $3H_2+6e^-=6H^+$ (52)

Positive Electrode: $BrO_3^-+6H^+-6e^-=Br^-+3H_2O$ (53)

The positive electrode half-reaction (53) may proceed not only by a direct electroreduction of the aqueous multi-electron oxidant (AMO), for example, bromate species on the electrode but rather facilitated via the formation of an intermediate, for example, bromine in a homogeneous comproportionation reaction, for example, between bromate and bromide (54) as shown below:

Comproportionation: $BrO_3^-+5Br^-+6H^+=3Br_2+3H_2O$ (54)

Electroreduction: $3Br_2+6e^-=6Br^-$ (55)

In an embodiment, the neutralization reactor 1501b neutralizes the acidic discharge fluid, for example, by using the orthogonal ion migration across laminar flow (OIMALF) reactor to raise the pH of the discharge fluid and produce neutral discharge fluid. The discharge fluid is then collected in the discharge fluid tank 113 for subsequent regeneration. The aqueous multi-electron oxidant (AMO) and the reducer are regenerated 2006 in stoichiometric amounts from the discharge fluid in the regeneration system 106. In an embodiment, the pH of the discharge fluid is optimized by adding or generating an acid or a base to the discharge fluid. During the regeneration of the AMO and the reducer, neutral discharge fluid is converted 2003 into an alkaline discharge fluid by using an externally supplied base and/or a base produced in the splitting-disproportionation (SD)

reactor 1502 of the regeneration system 106. The SD reactor 1502 splits 2004 the alkaline discharge fluid at the selected pH into a reducer and an intermediate oxidant in the SD reactor 1502. The intermediate oxidant is converted into one or more forms of the AMO via disproportionation of the intermediate oxidant with the base. The splitting process releases a stoichiometric amount of the reducer and the base in the SD reactor 1502. The intermediate oxidant disproportionates when contacted with a base such as the base form of the buffer produced at the negative electrode 1702. The disproportion reaction produces the desired AMO in a stable salt form, for example, $LiBrO_3$ as well as discharged oxidant, for example, LiBr which undergoes further cycles of splitting-disproportionation until the desired degree of conversion, for example, $[BrO_3^-]/([BrO_3^-]+[BrO^-]+2[Br_2]+[Br^-])>0.95$ is achieved. The cycle of splitting-disproportionation is continued 2005 till the desired degree of conversion of the discharge product of the aqueous multi-electron oxidant into one or more forms of the aqueous multi-electron oxidant is achieved. The regenerated one or more forms of the oxidant fluid comprising the AMO and the regenerated reducer fluid comprising the reducer are then supplied 2007 to the discharge system 101 for facilitating discharge of the discharge unit 104.

The pH of the acidic oxidant fluid in the splitting-disproportionation (SD) reactor 1502 of the regeneration system 106 exemplarily illustrated in FIG. 15, is optimized and stabilized using an extra acid present in the acidic oxidant fluid to facilitate comproportionation of the aqueous multi-electron oxidant with a final product of a reduction of the aqueous multi-electron oxidant into the intermediate oxidant. The extra acid is, for example, one or more of a phosphoric acid, a 3-(N-morpholino)propanesulfonic acid, a 3-(N-morpholino)ethanesulfonic acid, another ω-(N-morpholino)propanesulfonic acid, a methanesulfonic acid, triflic acid, a substituted sulfonic acid, a substituted phosphonic acid, a perchloric acid, a sulfuric acid, a molecule comprising sulfonic moieties and phosphonic acid moieties, and an acid with a pKa<2. The pH of the acidic discharge fluid is, for example, below 0, 1, 2, or 3. The concentration of acidic protons in the acidic discharge fluid is, for example, below one of 0.1M, 0.5M, 1M, 2M, 5M, or 10M.

Figure 20D:
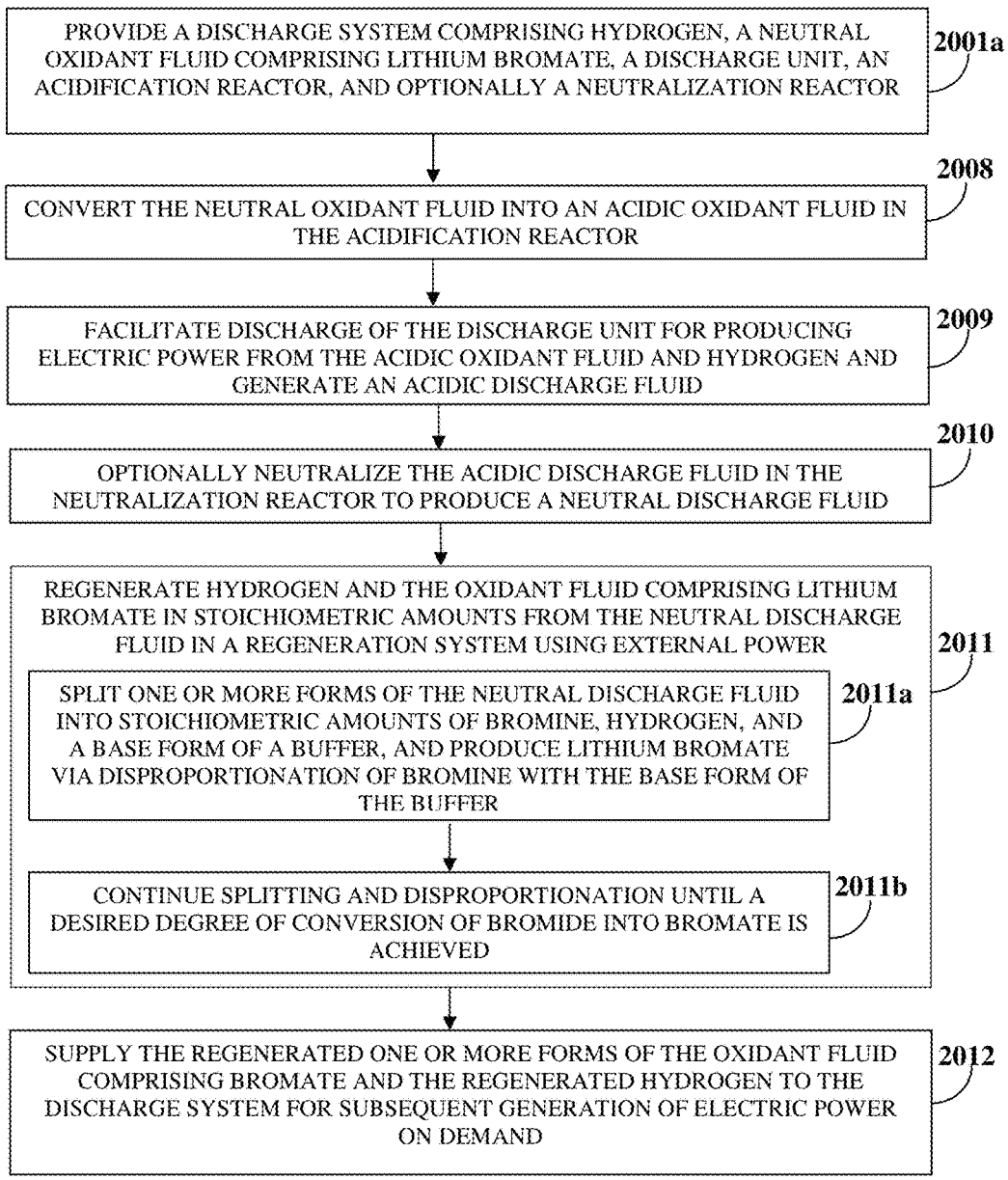
FIG. 20D illustrates a method for producing electric power and regenerating hydrogen and an oxidant fluid comprising lithium bromate in an energy storage cycle.

FIG. 20D illustrates a method for producing electric power and regenerating hydrogen and an oxidant fluid comprising lithium bromate in an energy storage cycle. The method disclosed herein provides 2001a the discharge system 101 comprising the discharge unit 104, the acidification reactor 1501a, and optionally the neutralization reactor 1501b as exemplarily illustrated in FIG. 15. The discharge system 101 comprises a neutral oxidant fluid comprising lithium bromate, and hydrogen. In an embodiment, the discharge system 101 comprises one or more forms of a buffer. In another embodiment, the discharge system 101 further comprises one or more forms of a base. In an embodiment, the cationic component of the buffer is lithium and the anionic component of the buffer is, for example, one or more of ω-(N-morpholino)alkanesulfonate, 3-(N-morpholino)methanesulfonate, 3-(N-morpholino)ethanesulfonate, 3-(N-morpholino)propanesulfonate, 3-(N-morpholino)butanesulfonate, other amines, monohydrogen phosphate, methylphosphonate, an alkylphosphonate, an arylphosphonate, and a molecule comprising phosphonate moieties and sulfonate moieties. In another embodiment, the cationic component of the buffer is sodium, and the anionic component of the buffer is, for example, one or more of ω-(N-morpholino)alkanesulfonate, methylphosphonate, 3-(N-morpholino)ethanesulfonate, 3-(N-morpholino)propanesulfonate, an alkylphosphonate, an arylphosphonate, and a molecule comprising phosphonate moieties and sulfonate moieties. In the discharge process only the extra acid is relevant not the buffer. Some molecules can function as both the buffer and the extra acid. Those comprising both phosphonic and sulfonic moieties are utilized here. The discharge system 101 further comprises a deprotonated form of an extra acid. The extra acid comprises, for example, one or more of bromic acid, sulfuric acid, perchloric acid, triflic acid, a sulfonic acid, molecules comprising phosphonate moieties and sulfonate moieties, and an acid with a pKa≤2. The buffer is in an acid form during discharge with a pH≤4 and the acid form of the buffer comprises one or more of a phosphoric acid derivative, substituted phosphonic acids, 2-(N-morpholino) alkanesulfonic acid(s), molecules comprising both phosphonate and sulfonate moieties, amines and buffers capable of maintaining pH between 4 and 9. The base form of the buffer is, for example, one or more of ω-(N-morpholino)alkanesulfonate, 2-(N-morpholino)ethanesulfonate, 3-(N-morpholino)propanesulfonate, 4-(N-morpholino)butanesulfonate, a phosphoric acid derivative, an alkylphosphonate, an arylphosphonate, a molecule comprising phosphonate moieties and sulfonate moieties, an amine, a nitrogen heterocycle, and a base with a pKa between 4 and 9.

The concentration of lithium bromate dissolved in the neutral oxidant fluid is, for example, above 1M, 2M, 5M, or 10M. The acidification reactor 1501a converts 2008 the neutral oxidant fluid into an acidic oxidant fluid. The concentration of acidic protons in the acidic oxidant fluid is, for example, below 0.1M, 0.5M, 1M, 2M, 5M, or 10M. The method disclosed herein facilitates 2009 discharge of the discharge unit 104 for producing electric power from the acidic oxidant fluid and from hydrogen and generates an acidic discharge fluid on consumption of the acidic oxidant fluid comprising lithium bromate and hydrogen. The discharge is facilitated via a pH-dependent solution-phase comproportionation of bromate with bromide formed via electroreduction of intermediate bromine. In an embodiment, the neutralization reactor 1501b neutralizes 2010 the acidic discharge fluid to produce one or more forms of a neutral discharge fluid.

The method disclosed herein further comprises optimizing and stabilizing the pH of the acidic oxidant fluid in the splitting-disproportionation reactor 1502 using an extra acid present in the acidic oxidant fluid to facilitate comproportionation of the aqueous multi-electron oxidant with a final product of a reduction of the aqueous multi-electron oxidant into an intermediate oxidant. The pH of the acidic discharge fluid is below 3, 2, 1 or 0. The extra acid is one or a combination of bromic acid, another aqueous multi-electron oxidant (AMO) acid, phosphoric acid, 3-(N-morpholino)propanesulfonic acid, 3-(N-morpholino)ethanesulfonic acid, other ω-(N-morpholino)propanesulfonic acid, methanesulfonic acid, triflic acid, substituted sulfonic acid, substituted phosphonic acid, perchloric acid, sulfuric acid, a molecule comprising sulfonic moieties and phosphonic acid moieties, and an acid with a pKa<2.

The regeneration system 106 regenerates 2011 hydrogen and one or more forms of the oxidant fluid comprising lithium bromate in stoichiometric amounts from one or more forms of the neutral discharge using external power. The regeneration is performed by splitting 2011a one or more forms of the neutral discharge fluid into stoichiometric amounts of bromine, hydrogen, and a base form of a buffer using external power in the splitting-disproportionation reactor 1502, and producing lithium bromate via disproportionation of bromine with the base form of the buffer. The splitting process is performed via electrolysis, photolysis, photoelectrolysis, radiolysis, or thermolysis. In the case of splitting being electrolysis, bromine is produced on a positive electrode of the electrolysis-disproportionation reactor 107 and hydrogen and a base are produced at a negative electrode of the electrolysis-disproportionation reactor 107. The disproportionation reaction is facilitated by a buffer capable of maintaining a solution pH between 4 and 9 or between 6 and 8. The splitting-disproportionation reactor 1502 continues 2011b splitting and disproportionation in a cyclic manner in the no-aqueous multi-electron oxidant-on-negative mode of operation or the aqueous multi-electron oxidant-on-negative mode of operation in one of multiple modes until a desired degree of conversion of bromide into bromate is achieved. The modes comprise, for example, a batch mode, a cyclic flow mode, a cascade flow mode, and any combination thereof. The regeneration system 106 supplies 2012 the regenerated one or more forms of the oxidant fluid comprising bromate and the regenerated hydrogen to the discharge system 101 for subsequent generation of electric power on demand.

Figure 21A:
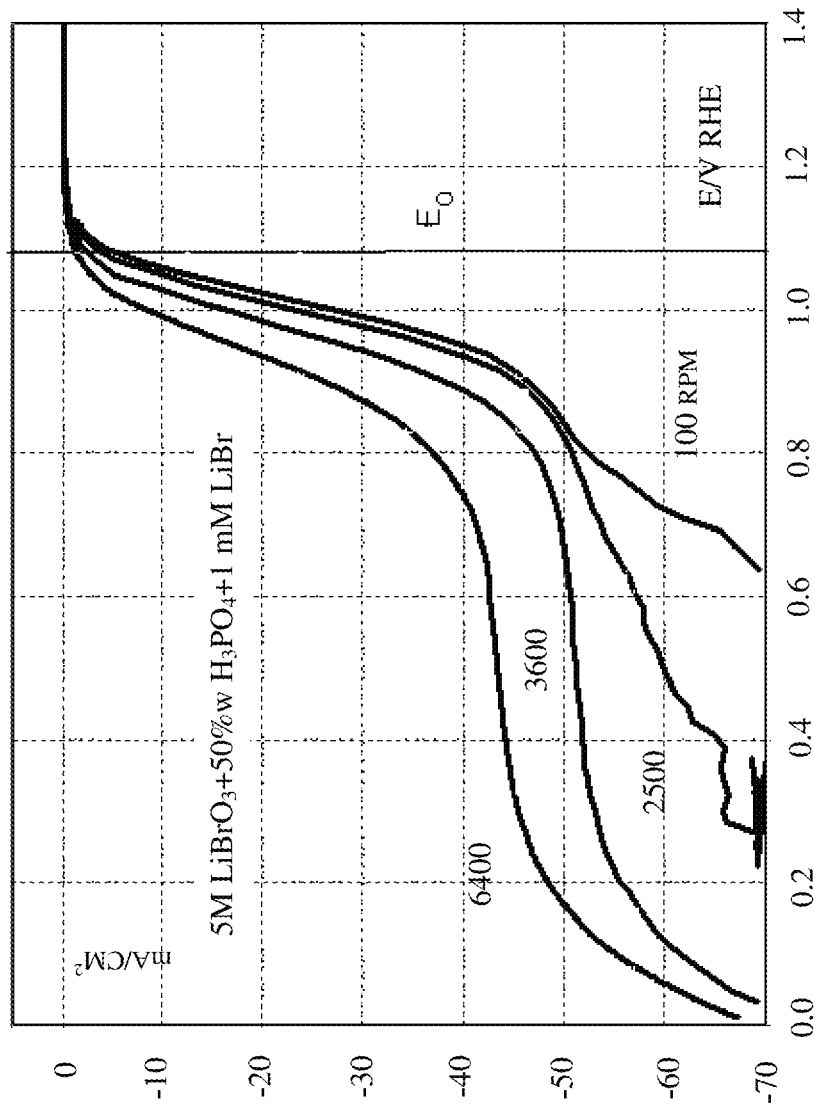
FIG. 21A exemplary illustrates polarization curves of a glassy carbon rotating disk electrode in solutions comprising 5M $LiBrO_3$+50% w $H_3PO_4$+1 mM LiBr at different rotation rates and 20° C.

FIG. 21A exemplary illustrates polarization curves of a glassy carbon rotating disk electrode in solutions comprising 5M $LiBrO_3$+50% w $H_3PO_4$+1 mM LiBr at different rotation rates in rpm and 20° C. The decrease of the limiting current at higher rotation rates is noticeable as exemplarily illustrated in FIG. 12. Such a regime is observed when the concentration of acid is sufficiently high so that the limiting current is controlled by the kinetics of the comproportionation rather than by the mass-transport of protons. As the concentration and the dissociation constant of the acids such as $H_3PO_4$, $H_2SO_4$, $F_3CSO_3H$, etc., in the oxidant fluid is increased, the limiting current on discharge also increases. However, the lifetime of the aqueous multi-electron oxidant (AMO) stock solution decreases. For example, a limiting current of about 50 mA/cm² for a 50% w $H_3PO_4$ in combination with 5M $LiBrO_3$ on a smooth carbon electrode is produced while the lifetime of this AMO stock or acidic oxidant fluid is about 10 days at 20° C. A shorter lifetime is obtained with 30% w $H_2SO_4$. Therefore, when the orthogonal ion migration across laminar flow (OIMALF) process is performed on-board rather than off-board, a TRIZ contradiction between the power and stability of the acidic oxidant fluid can be resolved with an additional benefit of improved safety of the on-board discharge system 101. This way only safe and stable AMO salt solution, for example, $LiBrO_3$ with a high energy density and room temperature solubility of about 13.27 molal and charge density of ca. 660 Ah/kg is stored on-board and off-board, and the reactive acid form of the AMO (H-AMO) is generated on-board just before it is consumed by the discharge unit 104. One feature that enables a practical use of an on-board acidification system is that the ignition regime of bromate electroreduction can be observed under low ratios of proton to bromate concentrations, about $[H^+]/[BrO_3^-]<0.1$, if the total concentration of bromate is high, about over 10 molal which is possible with $LiBrO_3$. Also, the base, for example, LiOH, Li-3-(N-morpholino) propanesulfonic acid (MOPS), etc., produced at the negative electrode during the on-board OIMALF process is used to neutralize the acid, for example, HBr produced in the discharge unit 104, so that the amount of dangerous materials, for example, $HBrO_3$, HBr, LiOH, etc., present on board at any time is minimized.

Figure 21B:
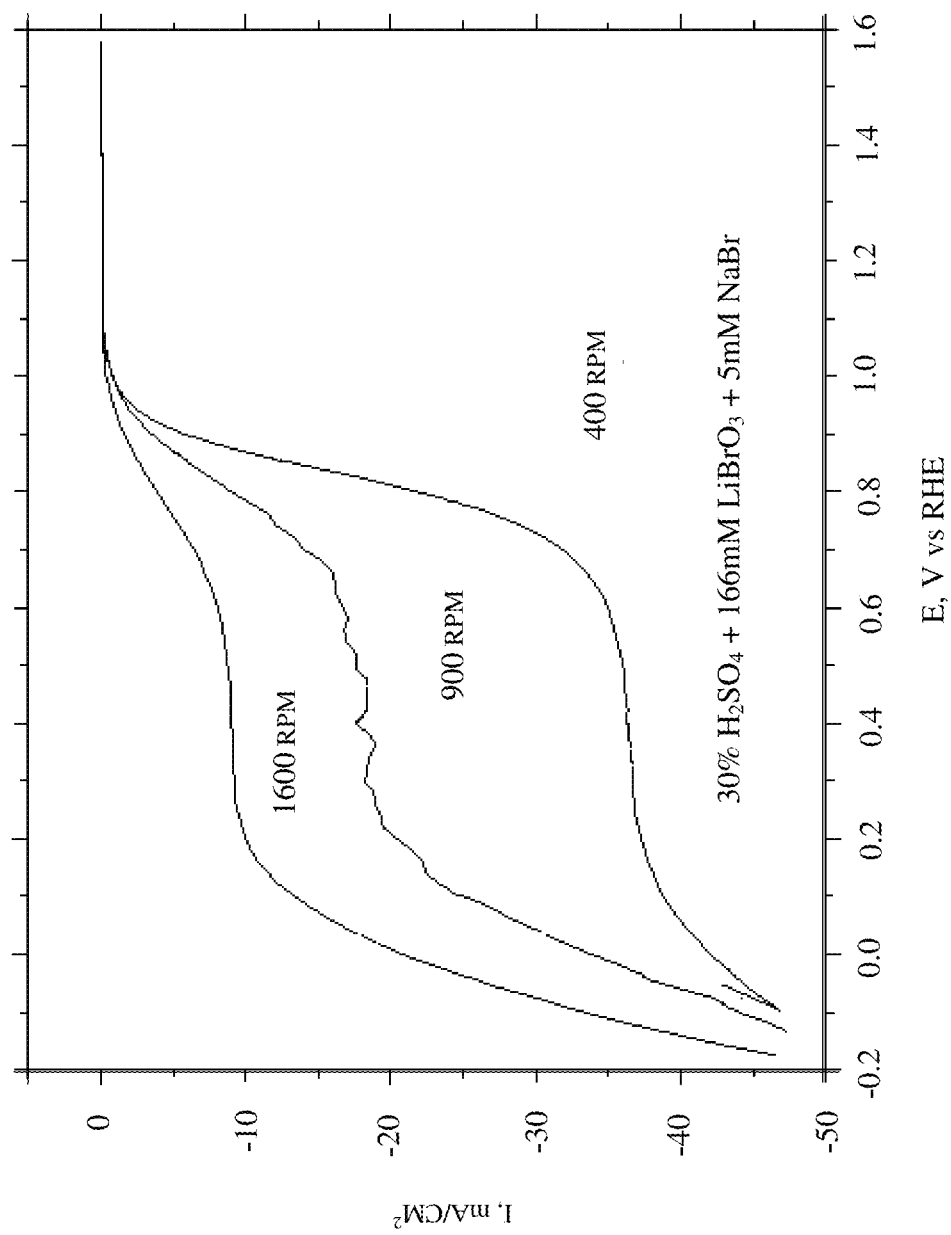
FIG. 21B exemplary illustrates polarization curves of a glassy carbon rotating disk electrode in a solution comprising 30% $H_2SO_4$+166 mM $LiBrO_3$+5 mM NaBr.

FIG. 21B exemplary illustrates polarization curves of a glassy carbon rotating disk electrode in a solution comprising 30% $H_2SO_4$+166 mM $LiBrO_3$+5 mM NaBr. Limiting current similar to that found in phosphoric acid at a much higher bromate concentration exemplarily illustrated in FIG. 21A, is observed which is interpreted as evidence of a higher disproportionation rate constant when a stronger sulfuric acid is used rather than when a weaker phosphoric acid is used. In both cases, the limiting current decreases with the rotation rate suggesting that the limiting current is controlled by the rate of the disproportionation rather than by mass transport or, for example, acidic protons.

Figure 22:
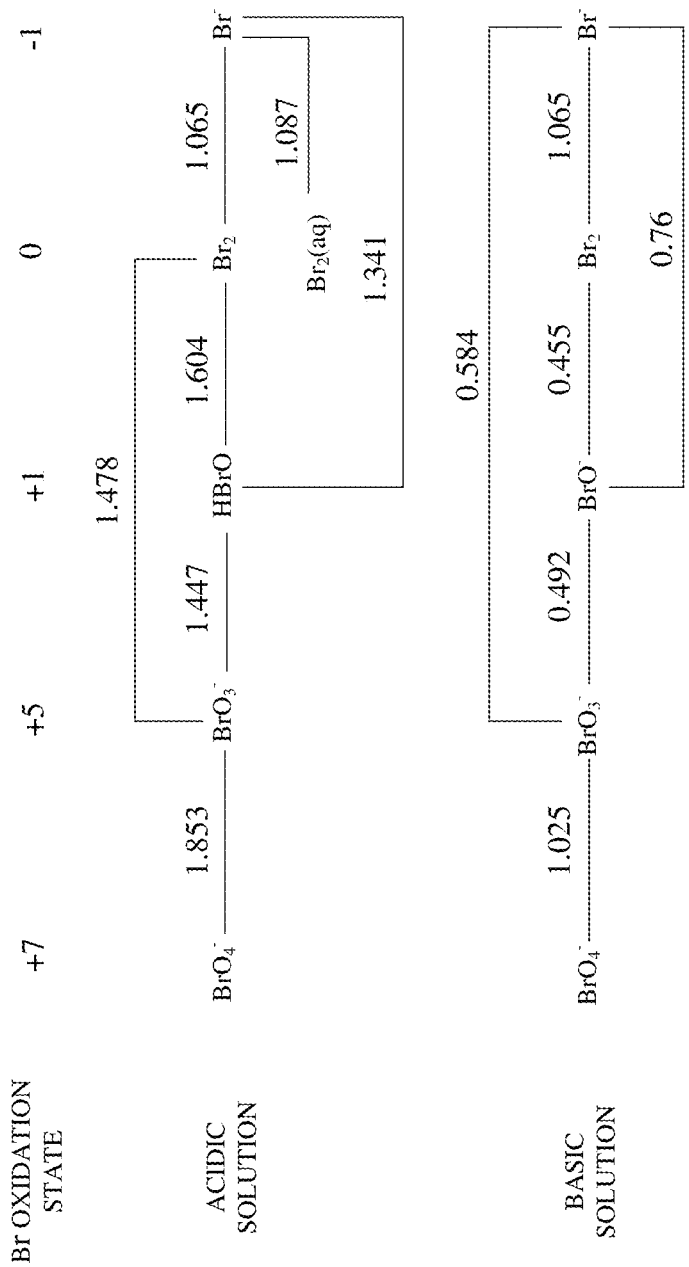
FIG. 22 exemplarily illustrates Pourbaix diagrams for bromine in aqueous media at pH 0 and pH 14.

FIG. 22 exemplarily illustrates Pourbaix diagrams for bromine in aqueous media at pH 0 and pH 14. FIG. 22 exemplarily illustrates the concept of the possibility of shifting from disproportionation to comproportionation by changing the pH of the oxidant fluid. The numbers near the lines denote the standard potentials of the corresponding electrochemical reactions. When the potential to the left is lower than the potential to the right, the species is stable, for example, $Br_2$ in acid. When the potential to the left is higher than the potential to the right, the species disproportionates, for example, HBrO in acid or $Br_2$ in alkali.

Figure 23A:
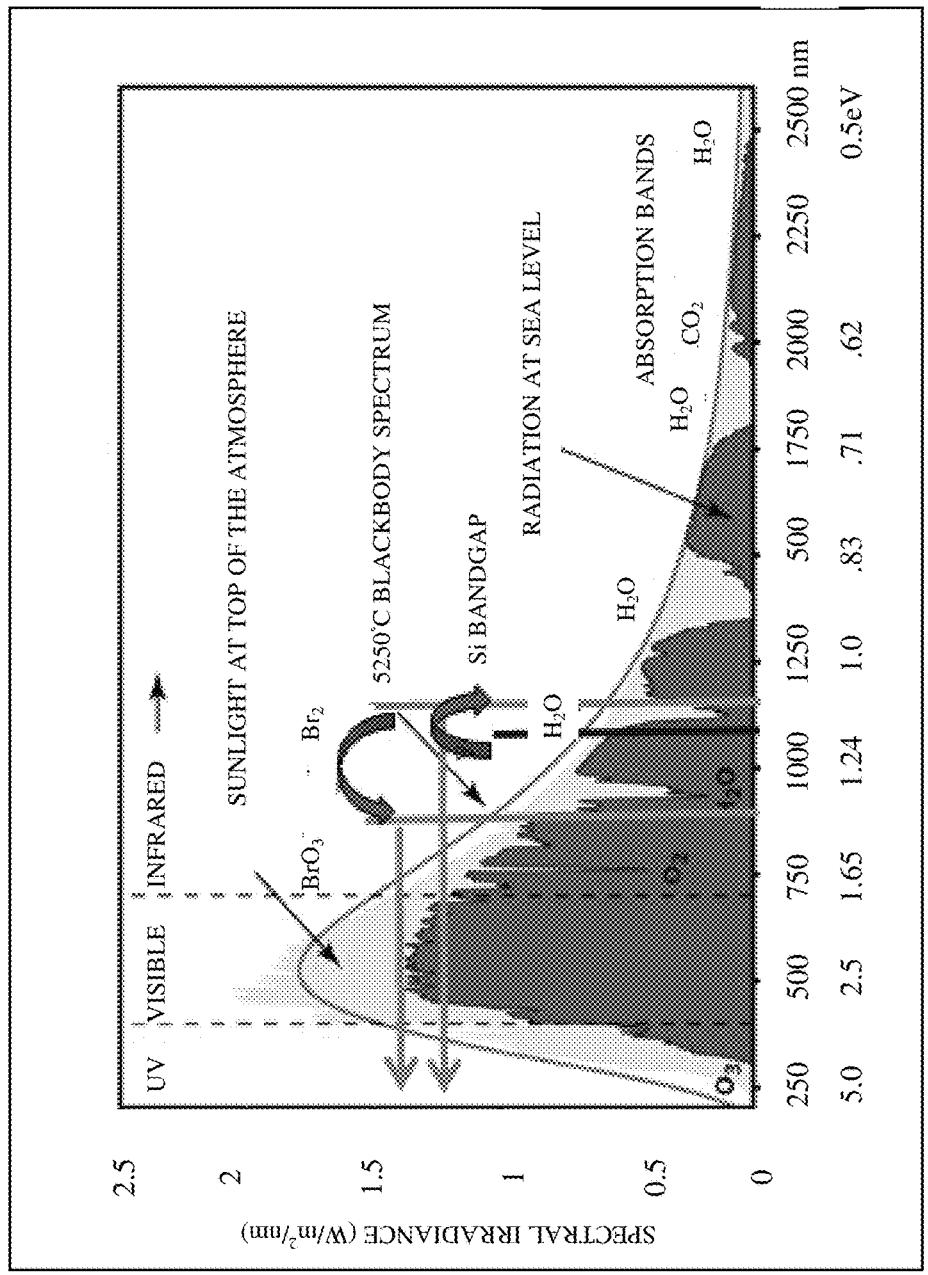
FIG. 23A exemplarily illustrates a solar radiation spectrum at sea level and the positions of the silicon (Si) band-gap, bromine and/or bromide, and bromate and/or bromide standard electrode potentials.

FIG. 23A exemplarily illustrates a solar radiation spectrum at sea level and the positions of a silicon (Si) band-gap, bromine and/or bromide, and bromate and/or bromide standard electrode potentials. The solar photo electrochemical regeneration of $H_2$ and $Br_2$ from HBr followed by a conversion of $Br_2$ into $HBrO_3$ enables the use of sunlight at a cost similar to the cost involved in traditional methods such as natural gas combustion and uranium fission. An open-circuit potential photoelectrolysis of aqueous HBr on semiconductor particles can be performed with a lower cost and higher efficiency than the photoelectrolysis of water advocated by the proponents of hydrogen economy. FIG. 23A exemplarily illustrates that while the Si band-gap cannot provide enough energy to convert $HBr+3H_2O$ into $3H_2+HBrO_3$ directly, the reaction $2HBr=H_2+Br_2$ can be driven by the Si band-gap energy. The further uphill conversion of bromine into bromate is performed via disproportionation driven by a pH change, for example, $3Br_2+3OH^-=5Br^-+BrO_3^-$ with hydroxide as a base. The uphill pH change, in turn, is driven electrochemically by the hydrogen evolution or production reaction of the negative electrode(s) in an electrolyzer (not shown) of the photoelectrolysis-disproportionation (ED) reactor.

Figure 23B:
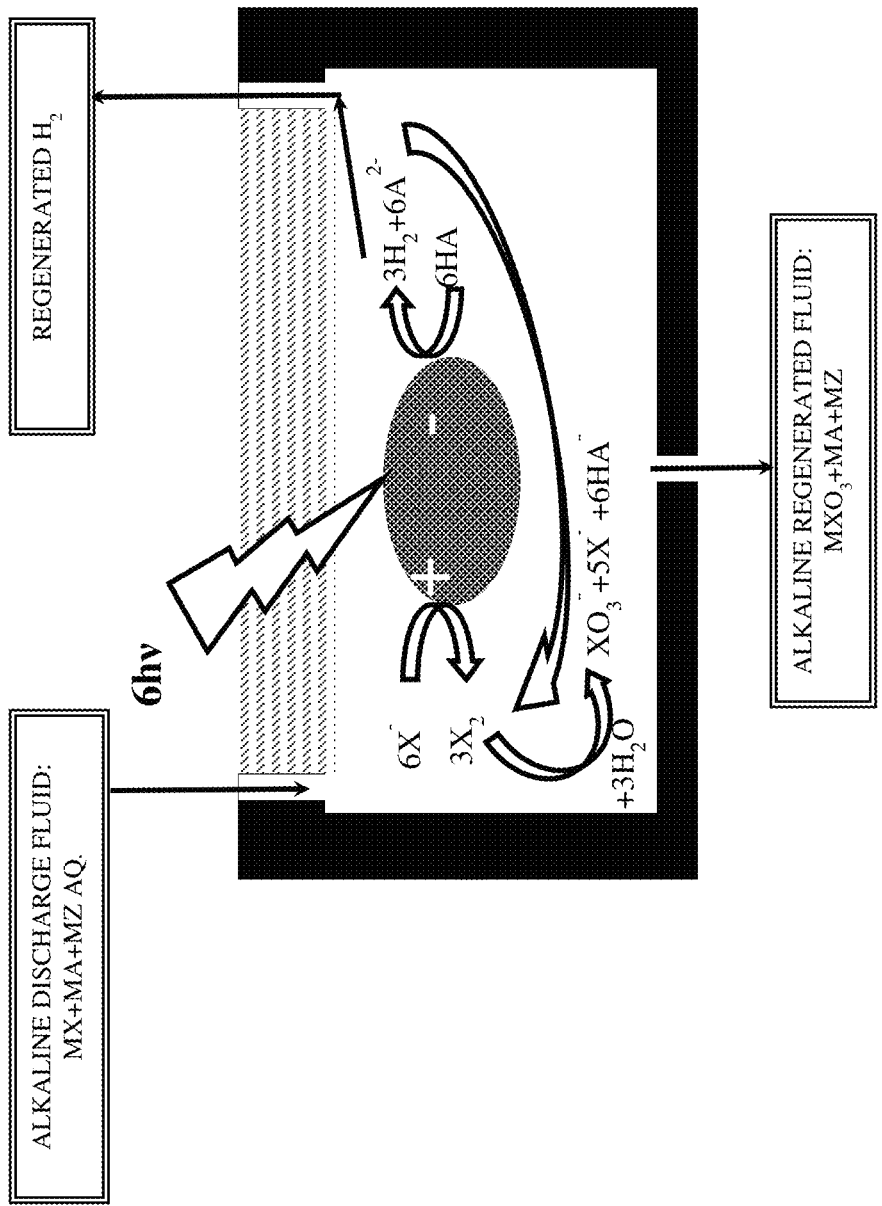
FIG. 23B exemplarily illustrates a batch mode of a photoelectrolysis-disproportionation method for regenerating a halate from a halide.

FIG. 23B exemplarily illustrates a batch mode of a photoelectrolysis-disproportionation method for regenerating a halate from a halide.

Example 1

FIGS. 14A-14G exemplarily illustrate graphical representations showing comparative performances of three on-board power sources at a nominal power of 130 kW: a gasoline-internal combustion engine, a lithium ion battery (LIB), and an $H_2$-aqueous multi-electron oxidant (AMO) discharge unit 104 or flow battery exemplarily illustrated in FIG. 1, as well as the targets of the Advanced Research Projects Agency-Energy (ARPA-E). Table 2 exemplarily compares the projected performance of an $H_2$-AMO discharge system 101 at a nominal power of 130 kW with the performance of 2012 Toyota RAV4EV and with 2013 ARPA-E goals for a battery for a Fully Electric Vehicle. The AMO is 50% w/w aqueous $HBrO_3$. The Toyota RAV4® EV of Toyota Jidosha Kabushiki Kaisha TA Toyota Motor Corporation is chosen as an example of a sport utility vehicle, which is or was available in gasoline and in lithium-ion battery (LIB) versions, to illustrate the capabilities of the discharge unit 104. A sport utility vehicle (SUV) is selected because it is a large vehicle that presents a greater challenge for electrification than a small urban vehicle. The data are available for Toyota RAV4® in both gasoline and electric vehicle lithium ion battery (LIB) versions. All calculations are based on the rated power of about 130 kW=174 hp. The size of the storage unit in the vehicle using the discharge unit 104 of the discharge system 101 exemplarily illustrated in FIG. 1, is adjusted to give the same driving range as the gasoline power system, rather than the electric version. $H_2$ is stored in the vehicle using the discharge system 101 as a metal hydride to minimize the $H_2$ tank volume.

In the vehicle using the discharge system 101 disclosed herein, both the reagent, for example, bromate and the product such as bromide of the discharge are anions, which minimizes their cross-over through a cation-exchange membrane such as Nafion® and other poly perfluorosulfonic acid (pPFSA) membranes and prevents a parasitic self-discharge. Also, the electrode reaction of bromine/bromide does not require an expensive catalyst and the electrode reaction occurs with an acceptable rate even on carbon electrodes. It is also estimated that the capital cost of the discharge unit 104 can be as low as 120 $/kW which is less than a half of the lithium-ion battery cost in the Nissan Leaf® of Nissan Jidosha Kabushiki Kaisha DBA Nissan Motor Co. Ltd., and the Toyota RAV4®. The lithium ion battery (LIB) takes up about 20% of the vehicle weight while the discharge system 101, takes about 10% of the vehicle weight, similar to, for example, the internal combustion engine (ICE)-gas system as exemplarily illustrated in FIG. 14A. In the Advanced Research Projects Agency-Energy (ARPA-E) metrics, the energy density of the on-board discharge unit 101 is, for example, about 426 Wh/kg, which is about 2.8 times larger than the ARPA-E target of 150 Wh/kg.

Figure 14A:
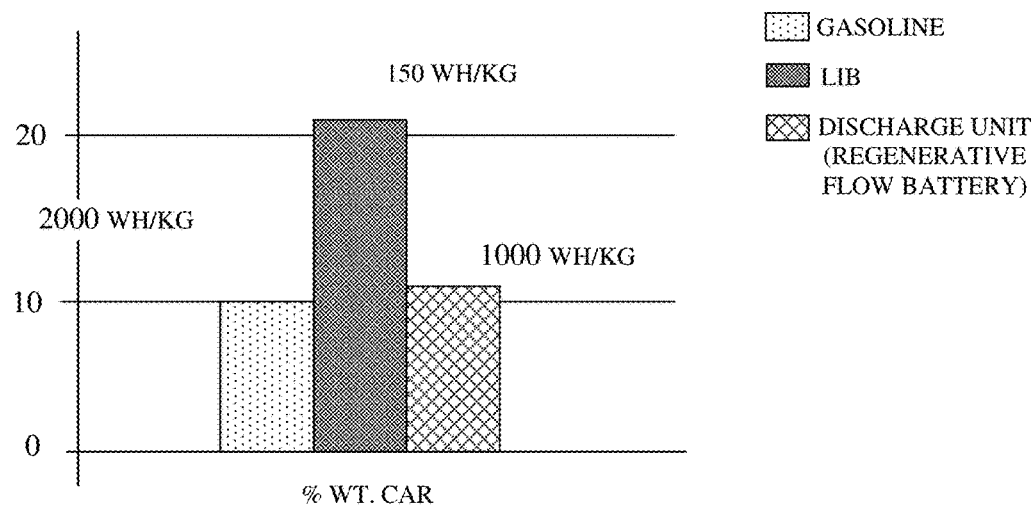
FIGS. 14A-14G exemplarily illustrate graphical representations showing comparative performances of three on-board power sources at a nominal power of 130 kW: a gasoline-internal combustion engine, a lithium ion battery, and an $H_2$-aqueous multi-electron oxidant discharge unit as well as the targets of the Advanced Research Projects Agency-Energy.
Figure 14B:
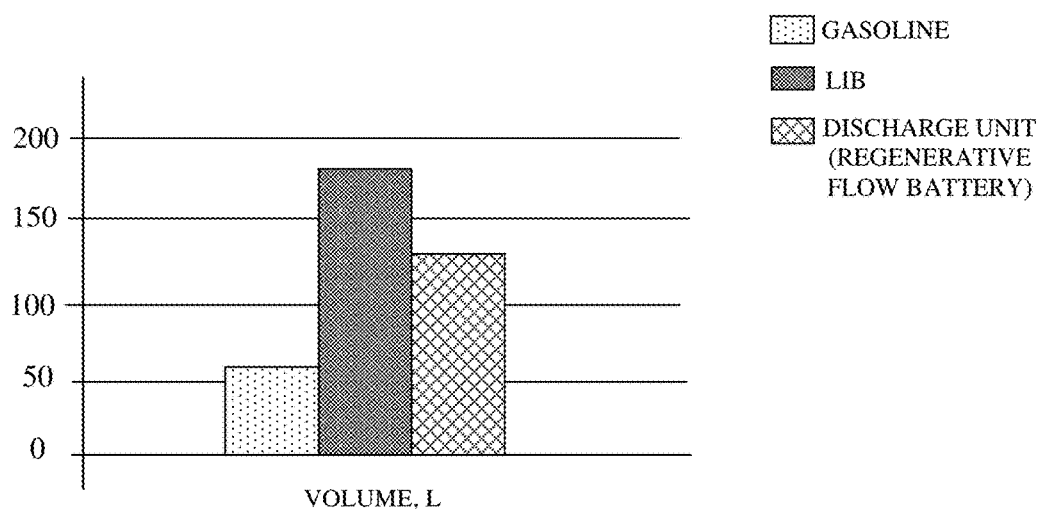
Figure 14C:
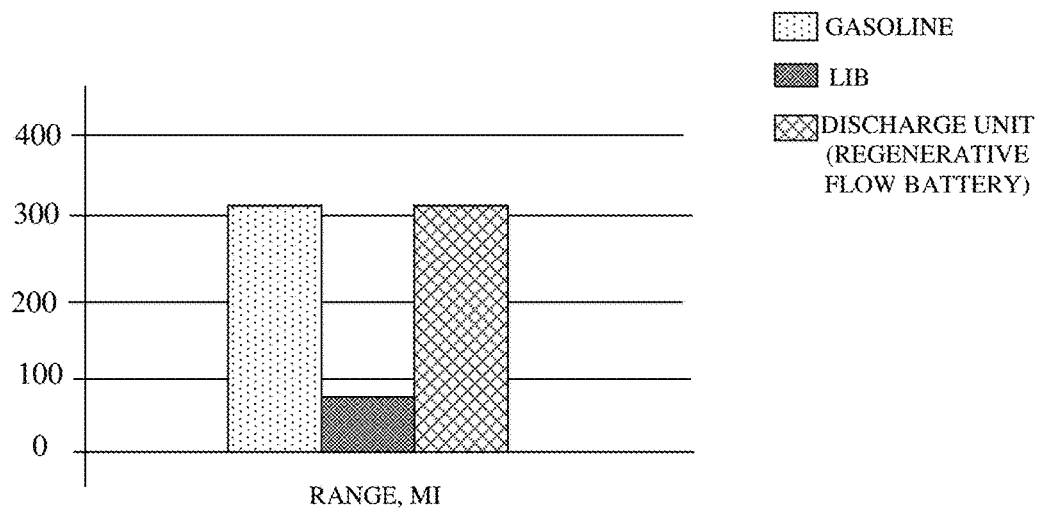
Figure 14D:
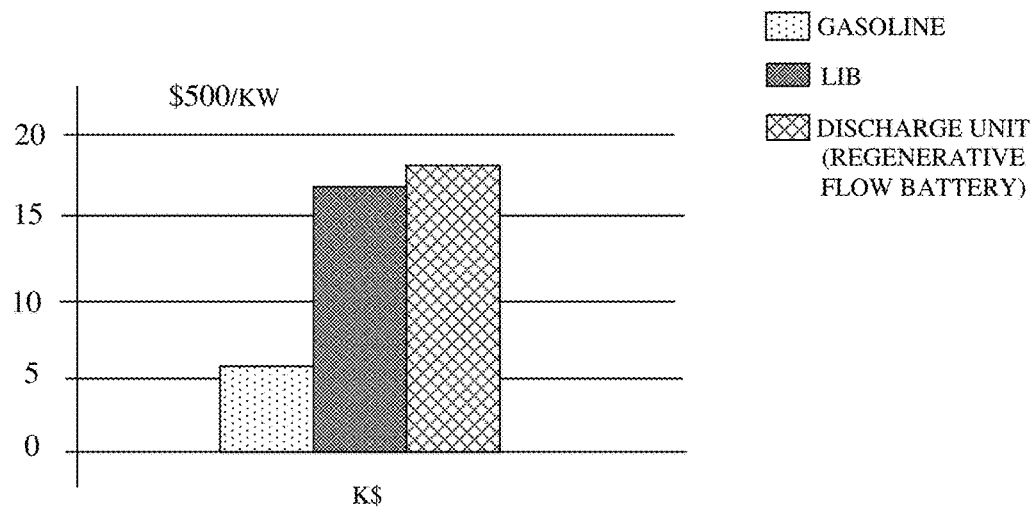
Figure 14E:
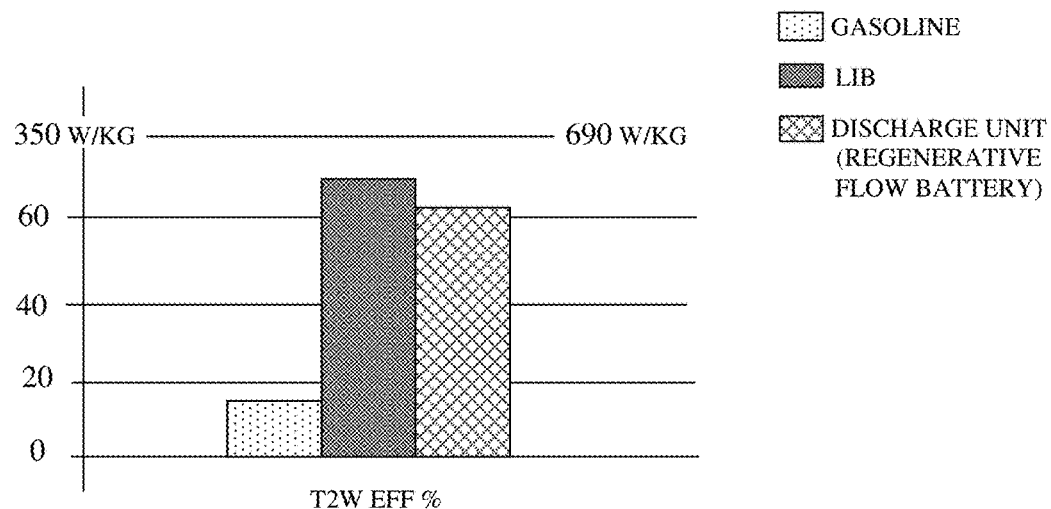
Figure 14F:
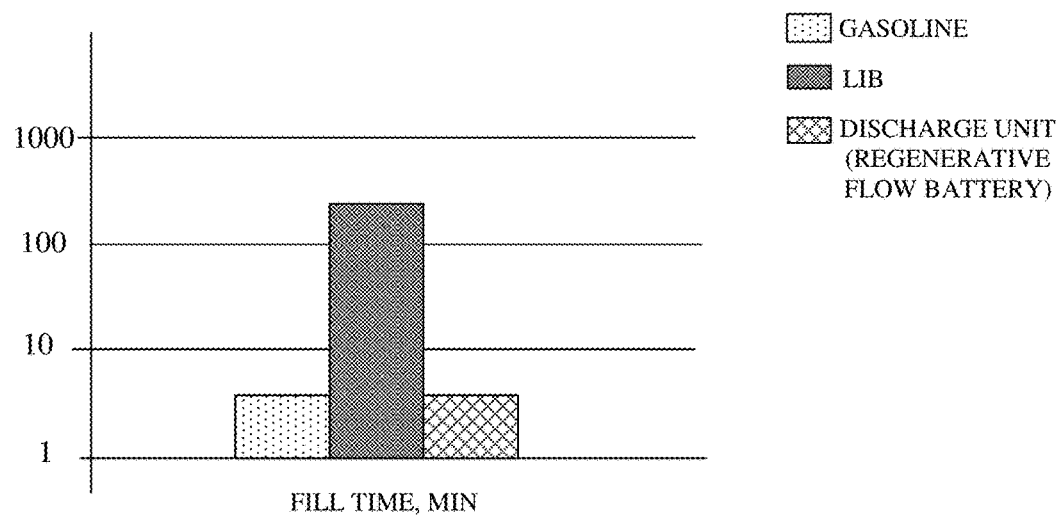

The volume of the discharge system 101 is, for example, twice the volume of the gas tank including the internal combustion engine (ICE) and half of the lithium-ion battery (LIB) and the electric engine as exemplarily illustrated in FIG. 14B. The energy density of the discharge unit 104 depends on the method of hydrogen storage and it is, for example, 200-400 Wh/L, which exceeds the Advanced Research Projects Agency-Energy (ARPA-E) target of 230 Wh/L. Both the gasoline power system and the discharge unit 104 can provide a driving range of about 300 miles as exemplarily illustrated in FIG. 14C, while Toyota RAV4 EV has a range of about 92 miles, according to the Environment Protection Agency (EPA) criteria, which comes from its low battery stack energy of about 35.8 kWh. The manufacturing cost of the discharge unit 104 is about $15,000 based on the current prices proton exchange membrane fuel cells (PEMFCs) produced in low volumes accounting for the absence of Pt on the positive electrode 205a in the $H_2$-aqueous multi-electron oxidant (AMO) system, or about 120$/kWh and 115 $/kW as exemplarily illustrated in FIG. 14D, and is more than the manufacturing cost for the ICE, which is about $5,000, but is close to the Advanced Research Projects Agency-Energy (ARPA-E) target of <140/kWh, and is three times lower than the cost per mile drive of the LIB system. The projected tank-to-wheel efficiency of the discharge unit 104 under realistic operating conditions is slightly lower than that of lithium ion batteries (LIBs) but much higher than that of internal combustion engines (ICEs) as exemplarily illustrated in FIG. 14E. Both the gasoline power system and the discharge unit 104 can be refilled mechanically within minutes, while Toyota RAV4® EV needs about 5 hours for electric recharge as exemplarily illustrated in FIG. 14F. The standard discharge efficiency of the discharge unit 104 is about 78% and such efficiency can be a practical target at about 0.5 W/cm². For the power of about 1 W/cm², the finite rate of the comproportionation and the non-negligible membrane resistance make 65% a more realistic target.

Figure 14G:
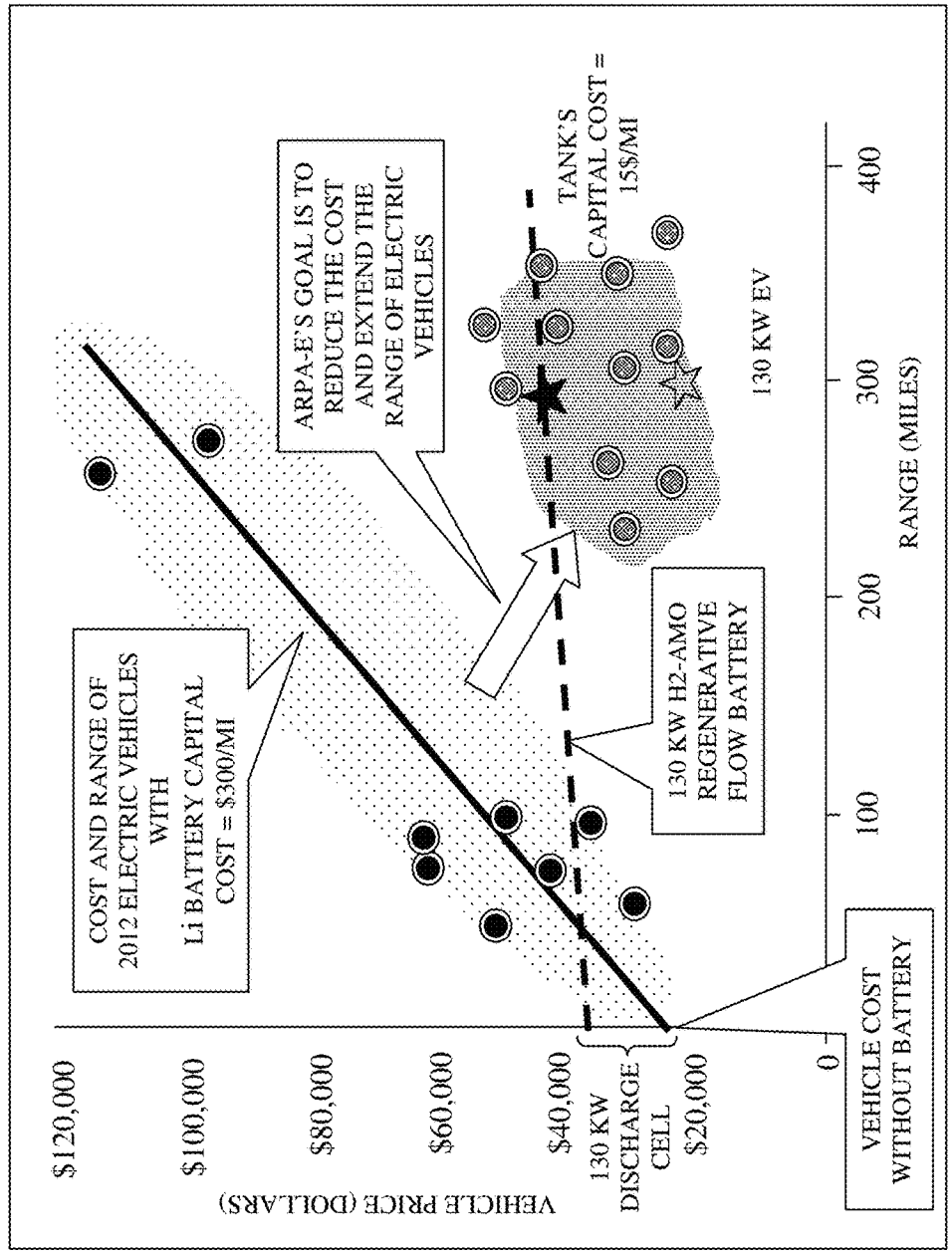

Platinum on the $H_2$ electrode is used at the same loading as the PEMFC but the loading is between 1/10 and 1/20 of what is used on the air electrode in the PEMFCs, and the loading has been shown to be sustainable economically, and is not a large contributor to the cost. FIG. 14G exemplarily illustrates the projected competitive positions of the $H_2$-aqueous multi-electron oxidant (AMO) discharge unit 104 on the Advanced Research Projects Agency-Energy (ARPA-E) price-range plot for different vehicle power sources. The discharge system 101 disclosed herein can meet the range, cost, cost and safety targets for fully electric vehicles (FEVs) defined by the ARPA-E's Robust Affordable Next Generation Electric Vehicle (RANGE) program as exemplarily illustrated in FIG. 14G.

Example 2

The comparison of a gasoline engine, a lithium ion battery, and two hydrogen-bromate batteries with different methods of hydrogen storage, that is, 700 bar compressed and 9% w/w metal hydride is provided in the table below.

|  |  | $H_2$ storage | | | 50% aqueous multi-electron |
| --- | --- | --- | --- | --- | --- |
|  |  | 350 bar | liquid | 5% MH | oxidant (AMO) 5.74M |
| theoretical limit | g/L | 25 | 70 | 125 | 1.48 |
| 100 kg, 300 kW real systems | g/L | 10 | 26 | 20 |  |
| theoretical limit | Ah/L | 670 | 1,875 | 3,350 | 923 |
| charge per mass of pure $H_2$ | Ah/kg | 26,800 | 26,786 | 26800 | 623.7 |
| real system | w % | 5 | 5 | 5 |  |
| real system | Ah/kg | 1,340 | 1,340 | 1,340 | 623.7 |
| real system | Ah/L | 268 | 697 | 536 | 923 |
| vol. % for storage system | H2 | 77.45 | 57.0 | 63.3 |  |
| wt. % for storage system | H2 | 2.28 | 2.28 | 2.27 |  |
| volume/charge | mL/Ah | 3.73 | 1.44 | 1.87 | 1.08 |
| mass/charge | g/Ah | 0.0373 | 0.0373 | 0.0373 | 1.60 |
| 4 h drive RAV4 = 520 kWh | kg | 388 | 388 | 388 | 834 |

-continued

|  |  | H$_2$ storage | | | 50% aqueous multi-electron |
|---|---|---|---|---|---|
|  |  | 350 bar | liquid | 5% MH | oxidant (AMO) 5.74M |
| 4 h drive RAV4 = 520 kWh | L | 1,940 | 746 | 970 | 563 |
| system energy density | Wh/L | 208 | 397 | 339 |  |
| specific energy 5% w/w H$_2$ | Wh/kg | 426 | 426 | 426 |  |

The parameters used for lithium ion batteries (LIBs) are 230 Wh/L, 128 Wh/kg, and $0.47/Wh. The parameters used for H$_2$ storage are 50 g/L compressed 125 g/L MH. The LiBrO$_3$ solution density is assumed as 1.49 g/cm3, the same as for 48% w/w aqueous HBr. The cost of 50% HBr=$2000/ton=$2/kg.

Example 3

Reactions at a positive electrode during discharge of bromate using a vanadium redox mediator are provided below:

$HBrO_3^+ + 5VO^{+2} + 5H^+ = \frac{1}{2}Br_2 + 5VO_2^+ + 3H_2O$ in solution $5VO_2^+ + 5e^- + 10OH^+ = 5VO^{+2} + 5H_2O$ on the positive electrode $\frac{1}{2}Br_2 + 1e^- = Br^-$ on the positive electrode Example 4

A bromine/bromide couple is used as a mediator for a bromate reduction "r" on discharge as shown below:

$HBrO_3 + 5Br^- + 5H^+ = 3Br_2 + 3H_2O$; in solution;

$3Br_2 + 6e^- = 6Br^-$; on the positive electrode.

Example 5

A chlorine/chloride couple is used as the mediator for bromide/bromate on charge as shown below:

$Cl^- - 1e^- = \frac{1}{2}Cl_2$; on the positive electrode; (56)

$\frac{1}{2}Br_2 + 2.5Cl_2 + 3H_2O = HBrO_3 + 5HCl$ in solution. (57)

Example 6

The conversion of hydrobromic acid to bromic acid using a resin-type ion exchange reactor is shown below, where M refers to a cation such as an alkali, an alkali earth metal, or organic cation, and "solid" refers to an ion exchanging material such as a resin:

$M^+(solid) + HBr(spent) = H^+(solid) + MBr$ resin regeneration $MBr + 6MOH - 6e^- = MBrO_3 + 3H_2O + 6M^+$ positive electrode $3H_2O + 6e^- + 6M^+ = 3H_2 + 6MOH$ negative electrode $MBrO_3 + H^+(solid) = HBrO_3 + M^+(solid)$ ion exchange on the resin The above method for regenerating the aqueous multi-electron oxidant from the spent discharge fluid may result in the incomplete exchange of M$^+$ for H$^+$ under stoichiometric conditions, which results in an overuse of the acid regenerant and of the energy needed to produce the acid regenerant. However, a complete exchange of M$^+$ for H$^+$ is not required for the ignition to occur.

Example 7

H$_2$-aqueous multi-electron oxidant (AMO) discharge redox flow battery: In an embodiment, in H$_2$—LiBrO$_3$ discharge flow batteries, modified single and multiple stack type proton exchange membrane fuel cells (PEMFCs) are employed. The electrolyte-electrode assemblies are fabricated using a polyperfluorosulfonic acid (pPFSA) membrane, with a conventional negative electrode layer 205b exemplarily illustrated in FIG. 2, comprising Pt, C, and pPFSA, and a conventional gas diffusion layer (GDL) used for H$_2$ oxidation on the negative anode side. The positive cathode design, however, is different from the proton exchange membrane (PEM) air cathode, since neither bromate nor bromide are soluble in the pPFSA, which completely surrounds the Pt/C electrocatalyst in modern thin-film PEMFC catalytic layers. A porous flow-through or flow-by media, for example, porous hydrophilic carbon or carbon cloth, is used for the positive electrode 205a in a H$_2$—HBrO$_3$ discharge flow battery.

Under operating conditions at a high acid concentration, a slower yet above stoichiometric flow rate of the aqueous multi-electron oxidant (AMO)-containing acidic oxidant fluid leads to a higher cell power in contrast with fuel cells and conventional redox flow batteries. This is due to a larger fraction of the intermediate such as bromine escaping the kinetic boundary layer into the solution bulk as the diffusion boundary layer gets thinner. This finding suggests that the cell operation at high power does not require significant energy expenses on pumping and that, in contrast to fuel cells, a near stoichiometric supply of the aqueous multi-electron oxidant may provide an optimal performance in terms of the power, energy efficiency, and system size. Also, a quick depletion of bromate in the ignition regime and the higher viscosity of the aqueous multi-electron oxidant (AMO) compared to air implies a preference for short channels, which, in combination with a parallel-channel flow field and slow flow rates, also leads to a lower pressure drop. Also, the absence of the gas phase in the cathode stream, the large heat capacity, and the high water content of the AMO supply simplify the design, manufacture, and operation of the cathode side as well as of the discharge unit 104 and of the whole discharge system 101.

Example 8

Power and efficiency of the hydrogen-bromate discharge unit 104: In order to estimate the power and voltage of the hydrogen-bromate discharge unit 104 during discharge, the following model is used: The discharge unit 104 comprises a single electrolyte-electrode assembly 205 exemplarily illustrated in FIG. 2. Pure humidified hydrogen is supplied to the anode or the negative electrode 205b. The anode polarization losses and reagent cross-over are ignored. The cell or membrane ohmic resistance is, for example, set to 0.1 Ohm/cm$^2$. The cathode or the positive electrode 205a is smooth and is supplied with 50 w/w/HBrO$_3$ containing a few mM of Br$_2$, Co=[Br$_2$]$_o$, to initiate the electroreduction cycle. Electrochemical polarization of the cathode is ignored, that is, bromine/bromide exchange current is large compared to the applied currents.

The homogeneous kinetics of the comproportionation is incorporated through the use of kinetic boundary layer thickness, $L_0=(D_{bromide}/5\ k_{con}\ C_{bromate})^{1/2}=1.5$ μm, where $k_{con}$ is the appropriate rate constant for the homogeneous comproportionation. At currents above 1 A/cm$^2$, further correction becomes important, i.e. $L=Lo/(1-(iz_o/5D_{bromate^-}C_{bromate}))^{1/2}$. The effect of convection is incorporated through the use of the diffusion boundary layer thickness, $z_o$ $Z_o=z_o/L$. Its value is selected on the basis of common values of the respective quantities for the rotating disk and channel electrodes in aqueous electrolytes, that is, 15 μm and 150 μm. Diffusion coefficients for bromide and bromine are set to $1.5\times10^{-5}$ cm$^2$/s and $1.0\times10^{-5}$ cm$^2$/s, respectively. Activity coefficients of all species are set to 1.

A more detailed analysis leads to the following formula for a polarization curve for bromate comproportionation-electroreduction on a smooth electrode:

$$\text{Exp}\{2(E-E°F/RT\}=\{[Br_2]_o+(iL/FD_{bromine})(0.1Z_o-0.6thZ_o)\}(FD_{bromide}/iLthZ_o)^2$$

The corresponding plots for power are exemplarily illustrated in FIG. 13. Although the experimental data that is reported in FIG. 13 are for much higher rotation rates (low $Z_0$), the data in FIGS. 21A-21B for lower rotation rates support the conclusion that the comproportionation reaction can sustain large currents in the discharge unit 104. The hydrogen-bromate discharge unit 104 can achieve under very realistic conditions, even with a smooth carbon electrode, a power, for example, about 1 W/cm$^2$ at around 1.0 V, which corresponds to the energy efficiency, for example, of about 68% with respect to the standard electrode potential of bromate/bromide, that is, about 1.48 V. Such performance compares favorably with the performance of state-of-the-art hydrogen-air fuel cell, yet it can be achieved with about a 10 times smaller Pt loading and with electric or solar regeneration of the reducer and the aqueous multi-electron oxidant. Under operating conditions at a high acid concentration, the concentration of free bromine has little effect on the cell performance, whereas a stronger convection decreases the cell power in contrast with conventional fuel cells. This is due to a faster escape of intermediate Br$_2$, homogeneously produced in the vicinity of the electrode, into the bulk of the solution at smaller hydrodynamic boundary layer thicknesses. Such an effect is not observed in conventional fuel cells and flow batteries since the electroactive reagent is delivered from the bulk of the solution rather than formed near the electrode. Also, the kinetic layer thickness, which determines the minimal meaningful pore diameter in the porous electrode, is $L=1.5$ μm in 50% w/w HBrO$_3$, and a thicker 6 $L=9$ μm hydrodynamic boundary layer is needed for the ignition to occur.

The 1D model disclosed herein assumes a constant solution composition outside the hydrodynamic boundary. The model disclosed herein shows that a low near-stoichiometric flow rate is appropriate for the operation of the discharge unit 104 with reduced energy losses entailed. The parallel flow field with a channel length longer than the ignition length but shorter than the depletion length with a flow rate slightly above the stoichiometric can provide maximal power while simultaneously reducing pumping losses.

Example 9

In an embodiment, the regeneration system 106 produces a dilute aqueous multi-electron oxidant (AMO) solution, for example 0.5M, which needs to be concentrated, for example, to about 3.88M. Water evaporation, vacuum distillation, pervaporation are suitable means of concentrating the AMO solution. Heat exchangers are used to transfer heat from the concentrated product to dilute input solution if the water removal is performed at an elevated temperature. The energy expenses of concentrating dilute AMO produced in the orthogonal ion migration across laminar flow (OIMALF) step should be compared with the energy of a H$_2$-AMO battery. In the case of bromic acid, the stored electric power is:

$$1{,}705\ Wh/kg * 0.135\ kg/mol = 230\ Wh/mol = (1\ Wh = 3.6\ kJ) = 829\ kJ/mol$$

The evaporation of excess water is also possible, more efficiently with heat exchangers, but it leads to the loss of volatile bromine species. In the case of reverse osmosis (RO) process of concentrating the aqueous multi-electron oxidant (AMO) solution, the osmotic pressure difference between the dilute and concentrated solutions of the AMO such as bromic acid can be estimated via the Morse equation. Molality is assumed the same as molarity and dissociation is complete:

$$\Pi = iMRT = 2*(3.88-0.5)\text{mol/L}*10^3\ \text{L/m}^3*300K*8.3145\ JK^{-1}\ mol^{-1} = 16.8\ MPa = 168\ bar$$

This pressure falls within the range of commercial cascade reverse osmosis units, thus, such a process is technically feasible. The minimal energy expense for reverse osmosis (RO) concentrating can be estimated as 1.742 kg of water per 1 mole of HBrO$_3$ needs to be removed. This corresponds to $1.742\ 10^{-3}\ m^3 * 16.8\ 10^6\ Pa = 2.93\ 10^4\ J = 29.3$ kJ/mol HBrO$_3$. This is only 3.3% of the battery energy per 1 mole of bromic acid. This number is the lower limit at the infinitely slow rate of water permeation and the number will be higher in practice. For example, sea water desalination requires usually 5 times more energy than the theoretical value. Using the factor of 5, about 16.5% battery energy is obtained which is acceptable in practice.

Example 10

The molal solubilities, that is, moles of solute per kg of water of some compounds of interest in the electrolysis-disproportionation (ED)-orthogonal ion migration across laminar flow (OIMALF) process at 20° C. and 60° C. are provided in the table below:

| | moles of solute per kg of solvent, m | | | | | |
|---|---|---|---|---|---|---|
| cation | bromide 20° C. | bromide 60° C. | bromate 20° C. | bromate 60° C. | Hydroxide 20° C. | Hydroxide 60° C. |
| Li$^+$ | 18.4 | 25.7 | 13.3 | 19.9 | 5.3 | 5.8 |
| Na$^+$ | 8.8 | 11.5 | 2.4 | 4.1 | 27.3 | 43.5 |

-continued

| | moles of solute per kg of solvent, m | | | | | |
|---|---|---|---|---|---|---|
| cation | bromide 20° C. | bromide 60° C. | bromate 20° C. | bromate 60° C. | Hydroxide 20° C. | Hydroxide 60° C. |
| $K^+$ | 5.5 | 7.2 | 0.4 | 1.4 | 20 | 27.4 |
| $NMe_4^+$ | 7.79E−03 | n/a | n/a | n/a | Mp 67C, 50% = 5H$_2$O | |
| $Ba^{2+}$ | 3.7 | 4.1 | 1.65E−02 | 5.77E−02 | 2.27E−01 | 1.2 |
| $Sr^{2+}$ | 4.1 | 6.1 | 0.9 | 01.05 | 1.46E−01 | 0.7 |
| $Ca^{2+}$ | 7.2 | 13.9 | 7.8 | n/a | 2.33E−02 | n/a |
| $Mg^{2+}$ | 5.5 | 6.1 | 20.7 | n/a | 1.71E−03 | n/a |

The data in the table above suggests that $Li^+$ cation provides a high molal solubility for bromide and bromate. The limited solubility of LiOH is irrelevant since it does not appear in the laminar flow of the orthogonal ion migration across laminar flow (OIMALF) reactor 1501 where solids can disrupt the process. Also, if a buffer such as 3-(N-morpholino) propanesulfonic acid (MOPS) is used, LiOH will react with the buffer.

Example 11

In an embodiment, in the case of a redox couple with both components being anions, for example, halate and halide, the cross-over of the oxidant couple to the negative electrode 205b exemplarily illustrated in FIG. 2, can be prevented with a cation exchange membrane. In the case of lithium bromate, the discharge process on the positive electrode 205a is as shown below:

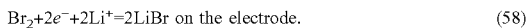

$$Br_2 + 2e^- + 2Li^+ = 2LiBr \text{ on the electrode.} \quad (58)$$

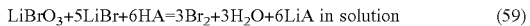

$$LiBrO_3 + 5LiBr + 6HA = 3Br_2 + 3H_2O + 6LiA \text{ in solution} \quad (59)$$

where HA represents the acid present in the acidic oxidant fluid such as bromic acid, phosphoric acid, and/or the extra acid.

The concentration of the neutral intermediate $Br_2$ is maintained sufficiently low, so that its cross-over to the negative electrode 205b makes a negligible contribution compared to the current of the electrolytic cell 200. The ratio of the standard redox potentials of bromate/bromide and bromine/bromide suggests, for example, only about 25% loss of efficiency when performing comproportionation mediated rather than direct discharge of bromic acid at the equilibrium potential. The regeneration of bromate and hydrogen from bromide and water or, in general, oxidant fluid from discharge fluid can be performed off-board. Direct electrolytic regeneration can be performed with an anode such as $PbO_2$ or a dimensionally stable anode (DSA).

In an embodiment, a solution-phase mediator, for example, a redox couple is used to expedite the rates of an otherwise slow electrode reaction and thus to increase the system power and efficiency. A redox couple that undergoes electron exchange with both an electrode and a reduced or an oxidized form of the aqueous multi-electron oxidant can be used to accelerate the rates of charge or discharge, thereby improving efficiency. Different redox mediators can be employed in the charge and discharge processes. In an embodiment, $Cl_2/2Cl^-$ can be used as a solution-phase mediator in the electrochemical regeneration process. Since oxidations, for example, electro-oxidation of a halide to a halate, are more facile in alkaline solutions, performing regeneration at high pH and then, for usage in the discharge unit 104, converting the salt into acid, for example, by means of the orthogonal ion migration across laminar flow (OIMALF) process are considered.

In an embodiment, pH-dependent disproportionation and pH-dependent comproportionation reactions involving halogens and their compounds are used to facilitate the discharge and regeneration of the aqueous multi-electron oxidants. The rate(s) and the equilibrium constant(s) of the disproportionation reaction(s) in some cases may show a dependence of the solution pH. The rate(s) and the equilibrium constant(s) of the comproportionation reaction(s) in some cases may show dependence of the solution pH.

In an embodiment, the aqueous multi-electron oxidant (AMO) can be regenerated by reacting the halide with ozone or by photolytic oxidation on a suitable semiconductor such as $TiO_2$. In another embodiment, a mediator is used for oxidation at the positive electrode during regeneration. The preferences for a suitable mediator in the halide oxidation are a standard redox potential of about 0.1V-0.4V more positive than the standard redox potential of the halate, the electrode reaction of the mediator having a high exchange current, the homogeneous reaction between the mediator and the halide being fast, the mediator couple not involving cationic species capable of crossing the membrane, etc. Chlorine is, for example, a mediator for iodate or iodide at all pH levels but chlorine evolution requires an electrocatalyst, for example, dimensionally stable anode (DSA) which can make this process more expensive than electro-oxidation-disproportionation. Chlorine is a mediator for bromide oxidation into bromate only in neural and alkaline media.

Ozone is a suitable mediator for oxidation or a charge reaction, though with less than 50% energy efficiency for oxidizing halides into halates and perhalates or corresponding acids. This regeneration process can be performed in acidic media by electrolysis using a proton exchange membrane (PEM) electrolyzer or a similar device. The co-produced $H_2$ can be used later as a reducer in the discharge unit 104 exemplarily illustrated in FIG. 1, while the ozone reacts with the spent hydrogen halide in a separate vessel to yield the halic acid oxidant. In an embodiment, the ozone for regeneration can be produced by a gas discharge according to commercialized methods. Other suitable mediators comprise, for example, transition metal ion and their compounds such as negatively charged polyoxometallates to prevent their cross-over through the cation exchange membrane. In an embodiment, a direct electrolytic oxidation of halides, for example, bromide to bromate is performed, for example, with a $PbO_2$, $RuO_2$, dimensionally stable anode (DSA) or a conductive diamond electrode.

Example 12

In an embodiment, the discharge unit 104 is a modified version of a polymer electrolyte fuel cell. A membrane electrode assembly (MEA) uncoated on the positive side is used in the discharge unit 104. The diffusion layer on the positive side is replaced with a hydrophilic porous carbon cloth. The flow field on the positive side of a carbon bipolar plate 202 exemplarily illustrated in FIG. 2, is of a double serpentine type but other types known in the arts of fuel cells and flow batteries are also employed. In another embodiment, the discharge unit 104 is equipped with an MEA coated on the positive side with a Pt-free and perfluorosulfonic acid (PFSA) free carbon fiber layer replacing a catalyst layer in the conventional polymer electrolyte membrane fuel cell (PEMFC), thereby reducing the ohmic resistance between the points where the bromate reduction occurs and the hydrogen electrode. In an embodiment, a grid with interdigitated millimeter deep channels in one direction and with thinner channels in the perpendicular direction can be used for the positive electrode flow field.

In another embodiment, for the positive electrode 205a exemplarily illustrated in FIG. 2, a hydrophilic porous electrode (HPE) replacing the hydrophobic gas diffusion layer in the conventional 5-layer proton exchange membrane (PEM)-membrane electrode assembly (MEA) design with or without a carbon-ionomer layer (CIL) coating on the positive side of the membrane is designed. Such an HPE can either be used as a flow-through with an inter-digitated or with a flow-by or with a parallel channel flow field. A pore diameter above 12 L that is 18 μm is beneficial, and the layer thickness or pore length does not need to be much larger. A suitable channel width can be larger than the inter-channel spacing, and a parallel channel flow field with relatively short channels is longer than the ignition length, and shorter than the depletion length with a low pressure drop and a near stoichiometric flow rate. As used herein, the term "ignition length" refers to the distance from the opening of the channel where the current density on the positive electrode reaches ½ of its maximal value. In the case of bromate as the aqueous multi-electron oxidant (AMO), the current increase along the channel is due to accumulation of bromide and bromine and the resulting increase in the rate of the disproportionation. Also, as used herein, the term "depletion length" refers to the distance along the channel past the maximum current density point, where the current density decreases to ½ of its maximal value. This decrease is due to the depletion of the AMO in the bulk of the solution as well as due to an increase in the diffusion boundary layer thickness.

Suitable carbonaceous materials for the porous electrode are available commercially. One suitable carbon cloth is, for example, pyrolysed PAN AvCarb 1071 HCB 80045-001 with about 350 μm thickness, about 7.5 μm fiber diameter, about 19.3/cm warp, about 18.5/cm weft, and about $10^{-3}$ ohm·cm conductivity. A thinner unidirectional carbon fabric, for example, about 152 μm thickness is available from Fibre Glast Developments Corporation. Some suitable carbon cloth are, for example, potential hydrophilic carbon cloth with approximately 18 μm diameter for the hydrophilic porous electrode (HPE), commercial carbon cloth as thin as 700 μm, cloth made of electrospun carbon fibers as thin as 20 nm, Zoflex® of Xilor, Inc., weaved carbon down to 400 um, etc. Surface modification such as sulfonation of carbon can be used to improve the hydrophilicity.

A conventional bipolar stack polymer electrolyte membrane fuel cell (PEMFC) with a hydrophilic porous layer modification on the positive side of the membrane electrode assembly (MEA) and a Pt-free positive electrode layer is used. Since the aqueous multi-electron oxidant (AMO), in contrast to air, is ionically conducting, shunt currents in a bipolar stack have to be considered. Methods for minimizing shunt currents are known and include: increasing ionic resistance between the electrolytic cells 200 in a stack 300 exemplarily illustrated in FIG. 3, for example, by increasing the length and decreasing the width of the flow channels within the bipolar plates connecting the electrolytic cells 200, reducing the number of single electrolytic cells 200 in series, decreasing the resistances of manifold and channel, increasing the power of single electrolytic cell 200, placing shunt resistors in the electrolyte paths, and any combination thereof. The operating temperature of the discharge unit 104 is between 0° C. and 100° C., for example, between 10° C. and 60° C.

Example 13

A steady-state one-dimensional model was developed for a comproportionation-mediated discharge of bromate with a Nernstian hydrodynamic boundary layer of a fixed thickness. Such a model is an adequate first-order approximation for the discharge at the rotating disk and at channel flow electrodes. For a sufficiently high rate of the comproportionation reaction ensured by high concentrations of bromate and protons in bulk solution, there are three different regimes determined by the ratio diffusion to kinetic boundary layer thicknesses as exemplarily illustrated in FIG. 12. The latter decreases as the disproportionation rate gets larger, for example, at lower pH and higher bulk aqueous multi-electron oxidant (AMO) concentration and it is equal to 1.5 μm in 50% w/w $HBrO_3$.

$$Lo = (D_{bromide}/5k_{con}C_{bromate})^{1/2} = 1.5 \text{ μm} \quad (60)$$

During electroreduction of the aqueous multi-electron oxidant (AMO) such as bromate mediated by homogeneous comproportionation when the diffusion boundary layer is thin compared to the kinetic boundary layer, that is, at high flow or stirring rates, the intermediate bromide formed via electroreduction of the initial bromine escapes the hydrodynamic boundary layer before the intermediate bromide comproportionates with bromate to form more bromine near the electrode. In this non-ignition (normal) regime (not shown), the limiting current is the same as it would be in a solution with only bromine and no bromate present. When the diffusion boundary layer is thick compared to the kinetic boundary layer, that is, at low flow and/or rotation rates, the intermediate bromide has enough time to react with bromate near the electrode producing more bromine as exemplarily illustrated in FIG. 12, resulting in an ignition regime with the limiting current significantly exceeding the bromine limiting current found in the non-ignition regime. The limiting current in the ignition regime can be limited by the rate of comproportionation as exemplarily illustrated in FIG. 12, 21A-21B or by the mass-transport of protons as exemplary illustrated in FIG. 25. The nature of the limiting current depends on the relative concentrations of acidic protons and bromate. The behaviour when the limiting current abnormally decreases with the rotation flow rate as exemplarily illustrated in FIGS. 12, 21A-21B contrasts that of other flow batteries and fuel cells which show a higher current and power upon increased flow rate, and such a regime is useful for practical applications since the regime allows for a high power at low pumping rates.

An additional confirmation of the comproportionation mechanism disclosed herein is obtained through a direct observation of a brown colored bromine in a layer near the rotating disk electrode (RDE). The brown cloud (not shown) attached to the electrode is the intermediate bromine formed during the comproportionation of bromate with electro-generated bromide as in equation (2). The current is negative that is cathodic. The visible thickness of the colored layer and the measured current at constant potential decreases with the electrode rotation rate (not shown).

In the intermediate regime, the limiting current decreases with flow and/or rotation rate as exemplarily illustrated in FIG. 12, due to the escape of the intermediate bromine. The ignition regime observed at low mass-transport rates is particularly interesting for practical applications as it affords a high generated peak electric power even on a smooth carbon electrode, that is, over 0.1 $A/cm^2$ and 0.1 $W/cm^2$, as exemplarily illustrated in FIG. 13, at low consumed pumping power in contrast to other fuel cells and redox flow batteries. The fast kinetics of the bromine/bromide electrode reaction assures that the energy efficiency of the discharge unit 104 at high power is over 60%.

Example 14

The power required for an on-board orthogonal ion migration across laminar flow (OIMALF) is calculated. The balance of charge in the OIMALF reactor 1501 and the discharge unit 104 is exemplarily illustrated in FIG. 19. The matching ratio of currents in charges per unit time through the OIMALF reactor 1501 and the discharge unit 104 are $(1+x+z+y-w)/(6+x+z-y)=1$. In the simplest case, $x=y=z=w=1$, thus the charge ratio is 1:6. Assuming the single cell voltage produced in the discharge unit 104 as 1.0 V, the current density in the OIMALF reactor 1501 as 0.5 A/cm², and the areal cell resistance as 0.15 Ωcm², which is three times the areal resistance of 60 μm thick Nation® 112, we obtain 0.5×0.195/1.0=10%, justifying a small sacrifice in energy efficiency while making a significant improvement in the safety on the on-board system and the complete energy cycle.

Example 15

The energy and power density of the of the on-board orthogonal ion migration across laminar flow (OIMALF) discharge system 101: The Toyota RAV4® EV of Toyota Jidosha Kabushiki Kaisha TA Toyota Motor Corporation is chosen as an example of a sport utility vehicle to illustrate the capabilities of the discharge unit 104 with the on-board OIMALF reactor 1501. In order to compare $H_2$—Li aqueous multi-electron oxidant (AMO) on-board discharge unit 104 with a lithium-ion battery system, the Toyota RAV4® with rated power of 174 hp, that is about 130 kW and target driving range of 311 miles or 500 Km is selected. Considering an experimental value of 40 mA/cm² at 0.9V for a smooth carbon electrode in about 5M $LiBrO_3$+50% w $H_3PO_4$+1 mM LiBr, and multiplying it by a roughness factor of 25 for a porous carbon electrode and a factor of 2 for a near-saturated $LiBrO_3$ solution and without considering additional acceleration due to a high proton concentration in the on-board OIMALF reactor 1501, a current of 2 A/cm² for a smooth carbon electrode in case of 10M bromate and >0.5M acid, a cell voltage with an IR drop of 0.8 V and 0.05 Ωcm² areal resistance, a cell power of 1.6 W/cm², and discharge energy efficiency of 61% with respect to standard electrode potential bromate/bromide, that is, 1.48 V are obtained for the discharge unit 104 with the on-board OIMALF reactor 1501. Using the same area-to-volume conversion factor as the fuel cell stack in Ballard's HD6 0.5 W/cm2 to 371 W/kg, a power density of 1.2 kW/kg and a weight of 108 kg is obtained to ensure the needed 130 kW of the rated power for the on-board discharge unit 104.

Since automotive fuel cell stacks are usually designed for 130 V, the required number of cells in the discharge unit 104 is equal to 130 V/0.9V=144 cells. This translates for the 130 kW/130V=1 kA current into 1 kA/2 A/cm²=500 cm² total area of all electrodes in the fuel cell stack and to 500 cm²/144=3.46 cm²≈2×2 cm² membrane electrode assembly (MEA), which is reasonable considering the slower diffusion and the shorter depletion length expected for an aqueous multi-electron oxidant (AMO) compared to $O_2$ in gaseous air.

The weight of the on-board orthogonal ion migration across laminar flow (OIMALF) reactor 1501 can be estimated as follows. The stoichiometry of the OIMALF process requires about ⅙ of the current produced in the discharge unit 104 which is 1 kA/6=167 A. Assuming that the OIMALF reactor 1501 has one third of the current-to-weight ratio, for example, ⅓×1000 A/108 kg=3.08 A/kg as the discharge flow battery, we obtain 167 A/3.08 A/kg=54.2 kg for the weight of the on-board OIMALF reactor 1501. The weight of discharge system 101 obtained by combining the weights of the discharge unit 104 and the OIMALF reactor 1501 is 108+54.2=162.2 kg and the power-to-weight ratio is 130 kW/162.2 kg=800 W/kg which compares favorably with Li ion battery with power density, for example, 100 W/kg at 1C rate and polymer electrolyte membrane fuel cell (PEMFC) stack with power density, for example, 100 W/kg at 50% efficiency. The weight of the power-generating discharge system 101 needs to be combined with the weight of the reagents that determine the on-board energy, for example, the driving range.

Using the data for Toyota RAV4® EV with 166 km driving range and 35.8 kWh battery, a 500 km driving range would require 126 kWh of energy. For a single cell voltage of 0.9V, this translates into 140 kAh or 5.22 kmoles of electrons. This in turn requires 2.61 kmole=5.22 kg of $H_2$ or 104.4 kg of 5% w $H_2$ storage system. The equivalent amount of $LiBrO_3$ required is 870 moles or 90.8 kg of solid or 181.6 kg or 50% w solution, that is 78% of saturated solution at 20° C. The combined weight of the oxidants and the discharge system 101 for 500 km is 181.6+104.4+162.2=448 kg, that is 0.896 km/kg which compares favorably at 2.05 times higher at the system level with 380 kg of Toyota RAV4® EV's battery pack that provides only 166 km range, that is 0.437 km/kg at a significantly higher upfront cost.

The high solubility of $LiBrO_3$ at 64% w at 20° C. and the multi-electron oxidizing nature lead to equivalent molal concentration of electrons of 13.27M*6≈80 N which is more than 3 times higher than that of solid $LiFePO_4$ used in a flow suspension battery under development by 24M, a Massachusetts based start-up. At the tank level, the combination of 5% w/w $H_2$ with 64% $LiBrO_3$ gives 487 Ah/kg, that is 521 Wh/kg whereas the $LiFePO_4$+$C_6$ battery gives 117 Ah/kg, that is 384 Wh/kg at the reagent level and 31 Ah/kg, that is 100 Wh/kg at the cell level. The discharge system 101 with the on-board orthogonal ion migration across laminar flow (OIMALF) reactor 1501 reduces the energy density of the discharge system 101 by approximately 10% and the efficiency of the discharge system 101 to 80% from 90%. However, in many automotive applications, this new performance metrics is acceptable and the improved safety fully justifies a small decrease in the system energy density. Furthermore, the possibility to use higher acid concentrations during discharge allows for the discharge flow battery to produce a higher power thus reducing the system power density dilution and lowering the system cost.

Example 16

Lithium bromate chemistry with a 3-(N-morpholino) propanesulfonic acid (MOPS) buffer: In this example, lithium bromate chemistry that follows a cyclic or cascade rather than a batch mode is illustrated. In an embodiment, that is, in the aqueous multi-electron oxidant (AMO)-on-negative mode of operation, the regenerated solution or the discharge fluid is cycled between a negative compartment and a negative electrode 1702 of the SD flow cell 1700 where hydrogen evolution occurs with a resulting increase in the pH of the regenerated solution.

$$Li\text{-}MOPS+Br_2+H_2O=\tfrac{5}{3}LiBr+\tfrac{1}{3}LiBrO_3+H\text{-}MOPS \qquad (61)$$

Figure 26:
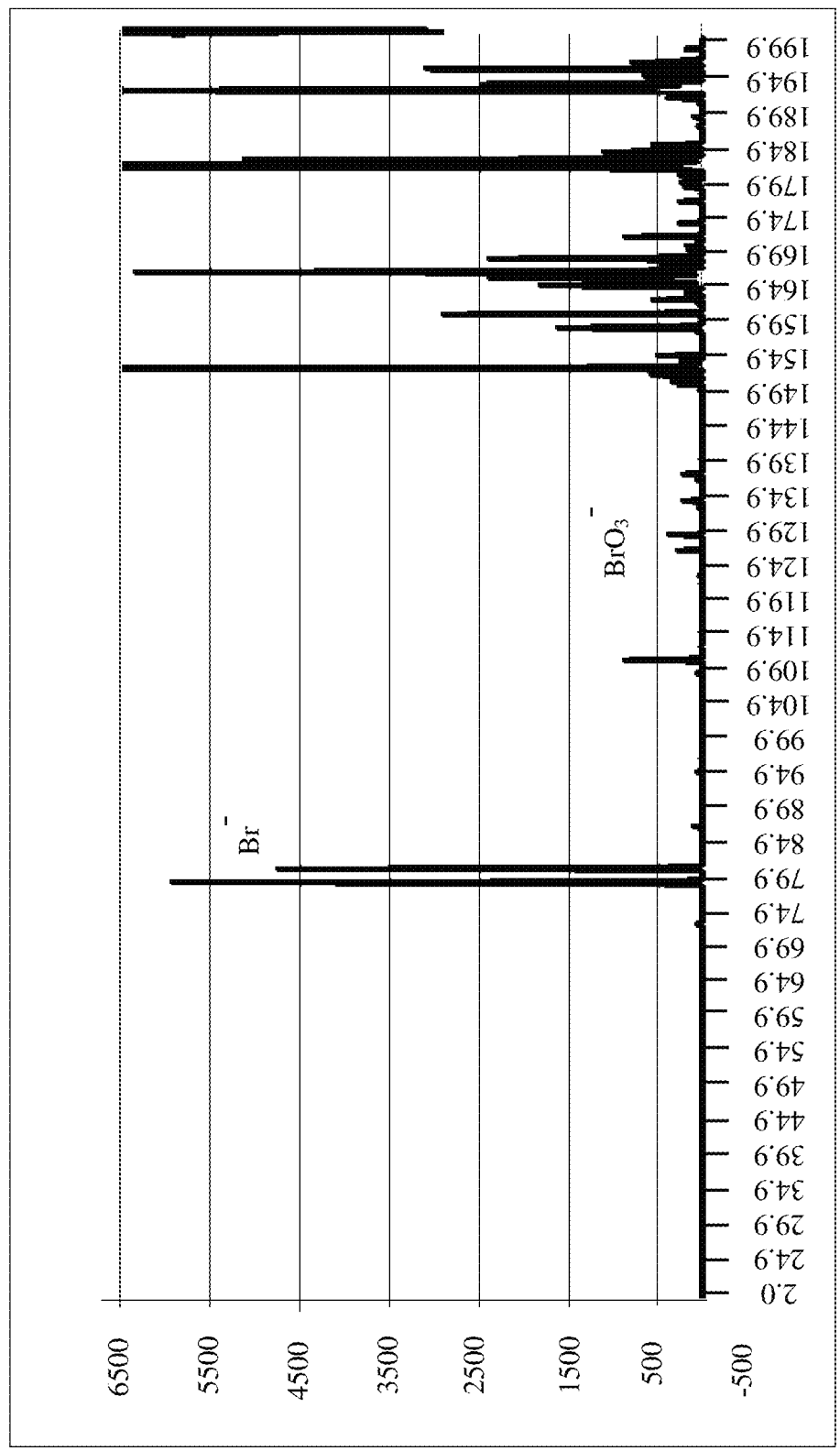
FIG. 26 exemplarily illustrates an electrospray ionization-mass spectrometry (MS) spectrum, showing experimental data demonstrating the feasibility of a regeneration process.

Experimental data demonstrating the feasibility of reaction (61) is exemplarily illustrated in FIG. 26.

The negative electrode 1702 is configured to support the hydrogen evolution reaction by employing a hydrogen-evolution catalyst, for example Pt or other platinoid, using porous carbon flow-through or flow-by support or any combination thereof, etc. At the same time the negative electrode 1702 is configured to prevent the electroreduction of bromate, if the aqueous multi-electron oxidant (AMO)-on-negative mode of operation is used. The hydrogen gas produced in (27) is separated from the liquid oxidant solution in the separation reactor 1010 and collected for future use, for example, in a discharge system 101. The liquid comprising LiBr and LiA is further carried over to the positive electrode 1703 where electrooxidation of bromide followed by bromine disproportionation occurs:

$$LiBr+e^-=\tfrac{1}{2}Br_2+Li^+ \tag{62}$$

$$\tfrac{1}{2}Br_2+LiA+\tfrac{1}{2}H_2O=\tfrac{5}{6}LiBr+\tfrac{1}{6}LiBrO_3+HA \tag{63}$$

Upon the completion of the first SD cycle only up to ⅙ of the original bromide can be converted to bromate. Thus, further cycles or cascade of splitting-disproportionation (SD) is used.

Example 17

Electric energy cycle with a LiBrO$_3$ regeneration using an anionic buffer base and the aqueous multi-electron oxidant (AMO)-on-negative mode of operation. Lithium bromate and bromide are well suited for the energy cycle disclosed herein due to their high aqueous solubilities. Phosphate buffer is utilized due to the appropriate pH and chemical compatibility with other ingredients. However, the intermediate acid form of the phosphate buffer H$_2$PO$_4^-$ produced in the disproportionation is not the final acid form H$_3$PO$_4$ used in the discharge unit 104. The conversion of the intermediate acid form of phosphate into the final acid form requires extra expenses of chemical or energy which may not be the preferred mode under on-board acidification scenarios. Also, the possibility of the formation of a poorly soluble Li$_3$PO$_4$ in the case of phosphate buffer, limits the flexibility of the design of the regeneration system 106. For these reasons other buffers are considered.

For purposes of illustration, this example refers to a Good's buffer HA, for example, Me$_2$NCH$_2$CH$_2$SO$_3$H or 3-(N-morpholino) propanesulfonic acid (MOPS) with pKa=7.2 or 4-(N-morpholino) butanesulfonic acid (MOBS) with pKa=7.6 available from Sigma-Aldrich. One advantage of such buffers is that in their acidic form $^+$HMe$_2$N—R—SO$_3$H, they can perform the function of the strong extra acid in the ignition mode of discharge, eliminating the need for an additional chemical component. Another advantage is their anionic state which reduced their cross-over through a cation-exchange membrane. Two commercially available compounds are of particular interest. The propyl version, MOPS, is inexpensive at about 390 $/kg since MOPS is easily produced by reaction of morpholine and propane sultone, both being readily available, but MOPS has a pKa of 7.2 which is within the suitable range. The use of Li-MOPS for bromine disproportionation is exemplarily illustrated in FIG. 26. The butane version, MOBS has a higher pKa=7.6, requiring a shorter regeneration time, but has a significantly higher cost of about 16,000 $/kg due to the higher cost and/or difficult synthesis of the butane sultone precursor.

The energy and matter cycle starting with neutral discharge fluid comprising LiBr and the buffer acid HA is disclosed herein. In the regeneration system 106, the neutral discharge fluid is first converted into alkaline discharge by passing thru the negative electrode compartment of the SD reactor 1502 configured for the aqueous multi-electron oxidant (AMO)-on-negative mode of operation, producing H$_2$ and alkaline discharge fluid comprising LiBr and LiA.

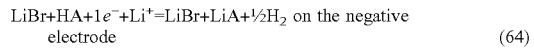

$$LiBr+HA+1e^-+Li^+=LiBr+LiA+\tfrac{1}{2}H_2 \text{ on the negative electrode} \tag{64}$$

In the separation reactor 1010 the H$_2$ is separated from the alkaline discharge fluid and the latter is pumped into the positive electrode compartment wherein bromide electrooxidation (65) and disproportionation (66) take place:

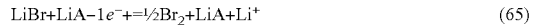

$$LiBr+LiA-1e^-+=\tfrac{1}{2}Br_2+LiA+Li^+ \tag{65}$$

$$\tfrac{1}{2}Br_2+LiA+\tfrac{1}{2}H_2O=\tfrac{5}{6}LiBr+\tfrac{1}{6}LiBrO_3+HA \tag{66}$$

while the counter cation such as Li$^+$ released at the positive electrode 1703 in (65) moves through the cation-exchange membrane to the negative electrode 1702, wherein electroreduction and neutralization shown in (64) take place.

The partially regenerated neutral oxidant fluid formed in (66) at the positive electrode 1703 is transferred again to the negative electrode compartment where the partially regenerated neutral oxidant fluid enters a new cycle of alkalization (64), splitting (65), and disproportionation (66). In this example, the negative electrode 1702 is configured for the aqueous multi-electron oxidant (AMO)-on-negative mode of operation using a cation conductive layer and an electron conductive layer 1702b which prevents the electroreduction of the AMO such as bromate on the negative electrode 1702. The cycle is continued until the desired ratio of bromate to all bromine species in the neutral oxidant fluid reaches a predetermined value, for example 0.95. This regenerated neutral oxidant fluid and hydrogen are stored in the regeneration system 106 until they are transferred into a discharge system 101 such as in an electric vehicle.

In the discharge system 101, the neutral oxidant fluid is converted first into acidic oxidant fluid using, for example, an orthogonal ion migration across laminar flow (OIMALF) reactor 1501. The chemical transformations in the OIMALF reactor 1501 can be illustrated by the following examples:

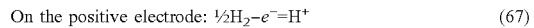

$$\text{On the positive electrode: } \tfrac{1}{2}H_2-e^-=H^+ \tag{67}$$

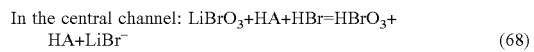

$$\text{In the central channel: } LiBrO_3+HA+HBr=HBrO_3+HA+LiBr^- \tag{68}$$

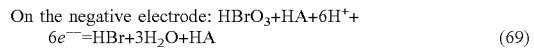

$$\text{On the negative electrode: } HBrO_3+HA+6H^++6e^-=HBr+3H_2O+HA \tag{69}$$

wherein reaction (68) represents the ion exchange process such as the orthogonal ion migration across laminar flow (OIMALF). In an embodiment, the H$_2$ produced on the negative electrode 205b in (68) is consumed on the positive electrode 205a in (67).

The acidic oxidant fluid produced in reaction (68) is supplied to the positive electrode 205a of the discharge cell 104a wherein the discharge proceeds via the electroreduction (70)-comproportionation (71) cycle:

$$2.5Br_2+e^-=5Br^- \tag{70}$$

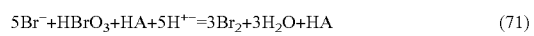

$$5Br^-+HBrO_3+HA+5H^+=3Br_2+3H_2O+HA \tag{71}$$

while hydrogen electrooxidation on the negative electrode 205b supplies the protons consumed in (71):

$$2.5H_2-e^-=5H^+ \tag{72}$$

The reaction (71) produces more Br$_2$ than reaction (70) consumes for the same amount of bromide. This feature leads to the possibility of the ignition regime where the electrode current increases as the convection rate decreases. A useful feature of the ED-cycle (70)-(71) is that the use of high acid concentration is not necessary for the cycle to proceed in the ignition mode. In the case of highly soluble $LiBrO_3$, the ratio $[H^+]/[BrO_3]$ as low as 0.05 may suffice. The low acid concentration in the acidic discharge fluid is critical for the practical applications of the disclosed technology since it assures a low rate of the decomposition reaction (73) which competes with the desired comproportionation reaction (71):

$$2HBrO_3 = Br_2 + 2.5O_2 + H_2O \tag{73}$$

The gross equation for the chemical process in the discharge unit 104 is:

$$HBrO_3 + 3H_2 + HA = HBr + 3H_2O + HA \tag{74}$$

and the gross equation for the chemical process in the discharge system 101 is:

$$LiBrO_3 + HA + 3H_2 = LiBr + HA + 3H_2O \tag{75}$$

The neutral discharge fluid produced in (74) is used to start a new energy cycle with process (64) in the regeneration system 106.

Example 18

Solar regeneration of $LiBrO_3$ from LiBr using an anionic buffer base and the aqueous multi-electron oxidant (AMO)-on-negative mode of operation: Unlike the hydrogen economy scenario, where the poor efficiency of solar water splitting, either photoelectrochemically, photothermally or some other way, prevents a large-scale use of sunlight as the primary energy source, the energy cycle disclosed herein employs splitting of a hydrogen halide, for example, HBr as the main input step for external energy. Energy and cost efficient routes to the reaction $2HBr = H_2 + Br_2$ using solar power, particularly, photoelectrolysis, have been reported or are known in the art. For example, a method for decomposing a solution of HBr using a platinum cathode and platinum-coated n-type amorphous silicon photo-anode and a red light and approximately 0.5% conversion efficiency is known in the art. Also, a system with a higher efficiency, for example, approximately 8%, that utilizes a p-GaInP2(Pt)/GaAs photoelectrochemical/photovoltaic device is also known in the art.

In the solar regeneration example disclosed herein, splitting of one or more forms of the discharge fluid into hydrogen and bromine is performed via photoelectrolysis. In an embodiment, the neutral discharge fluid comprising LiBr and the buffer acid HA is first converted into alkaline discharge fluid by passing the neutral discharge fluid through the negative electrode compartment of a photoelectrolysis-disproportionation reactor (not shown) configured for the aqueous multi-electron oxidant (AMO) on-negative mode of operation, producing $H_2$ and alkaline discharge fluid comprising LiBr and LiA.

$$LiBr + HA + 1e^- + Li^+ = LiBr + LiA + \tfrac{1}{2}H_2 \text{ on the negative electrode} \tag{76}$$

In the separation reactor 1010 $H_2$ is separated from the alkaline discharge fluid and the latter is pumped into the positive electrode compartment wherein bromide electrooxidation (77) and disproportionation (78) take place:

$$LiBr + LiA - 1e^- + = \tfrac{1}{2}Br_2 + LiA + Li^+ \tag{77}$$

$$\tfrac{1}{2}Br_2 + LiA + \tfrac{1}{2}H_2O = \tfrac{5}{6}LiBr + \tfrac{1}{6}LiBrO_3 + HA \tag{78}$$

while the counter cation such as $Li^+$ released at the positive electrode 1703 in (77) moves through the cation-exchange membrane 1704 to the negative electrode 1702, wherein electroreduction and neutralization shown in (76) take place.

The partially regenerated neutral oxidant fluid formed in (78) at the positive electrode 1703 goes again to the negative electrode compartment where it enters a new cycle of alkalization (76), splitting (77), and disproportionation (78). In this example, the negative electrode 1702 is configured for the aqueous multi-electron oxidant (AMO)-on-negative mode of operation using a cation- and electron-conductive layer which prevents the electroreduction of the AMO such as bromate on the negative electrode 1902. The cycle is continued until the desired ratio of bromate to all bromine species in the neutral oxidant fluid reaches a predetermined value, for example 0.95. This regenerated neutral oxidant fluid and hydrogen are stored in the regeneration system 106 until they are transferred into a discharge system 101 such as in an electric vehicle.

Example 19

Decomposition of bromate in acid: The discharge process disclosed herein faces a TRIZ contradiction between the discharge cell power and the stability of the acidic aqueous multi-electron oxidant (AMO) solution, that is, upon increasing the acid concentration in the acidic oxidant fluid, the electroreduction of the AMO is facilitated while the stability of the AMO deteriorates. The existence of a composition meeting both requirements for a high discharge power and stability cannot be predicted theoretically. Experimental studies were conducted to find a composition of acidic discharge fluid which meets both requirements for stability and for discharge power. Solutions of sulfuric acids of various compositions were prepared by mixing 98% w/w $H_2SO_4$ and water to 5 mL volumes. Noticeable heating was observed in all cases. While the solutions were still hot an excess of solid $LiBrO_3$ was added to each of the solutions. The experimental observations of decomposition of bromate introduced as an excess of solid $LiBrO_3$ in various acidic solutions are summarized in Table 3 below:

TABLE 3

| $H_2O$:$H_2SO_4$ v/v | $H_2SO_4$ w% | $H_2SO_4$ density | $H_2SO_4$ M | $O_2$ evolution | $Br_2$ evolution | Final color | discharge |
|---|---|---|---|---|---|---|---|
| 5:5 | 65 | 1.55 | 10.3 | noticeable | vigorous | dark brown | |
| 6:4 | 55 | 1.45 | 8.1 | starts first | starts later | light brown | |
| 6.25:3.75 | 52 | 1.355 | 7.5 | noticeable | slow | dark yellow | |
| 7:3 | 44 | 1.34 | 6.0 | noticeable | slower | medium yellow | |
| 8:2 | 31.5 | 1.22 | 4.0 | slow | limited | light yellow | |
| 9:1 | 17 | 1.17 | 1.9 | not observed | very limited | light yellow | |

Two parallel decomposition pathways were observed: one leading to oxygen evolution or production and the other leading to bromine evolution or production. The oxygen evolution pathway dominates at the lower acidities which are of interest to the disclosed technology. The data disclosed in Table 3 suggest that acidic bromate solutions are sufficiently stable to be used in a discharge system 101 when the concentration of a strong acid is below 4M. Furthermore, as exemplarily illustrated in FIGS. 12-13, FIGS. 21A-21B, and FIG. 25 a 2M concentration of acidic protons is sufficient to provide a practically useful discharge power when bromate is used as the aqueous multi-electron oxidant (AMO) as disclosed in Example 13. Hence, the acidification process can be performed off-board and a week's supply of the acidic oxidant fluid can be stored on-board. The concentrated $HBrO_3$ stored on-board is a stable solution yet still capable of discharge with a high power.

Example 20

Figure 24:
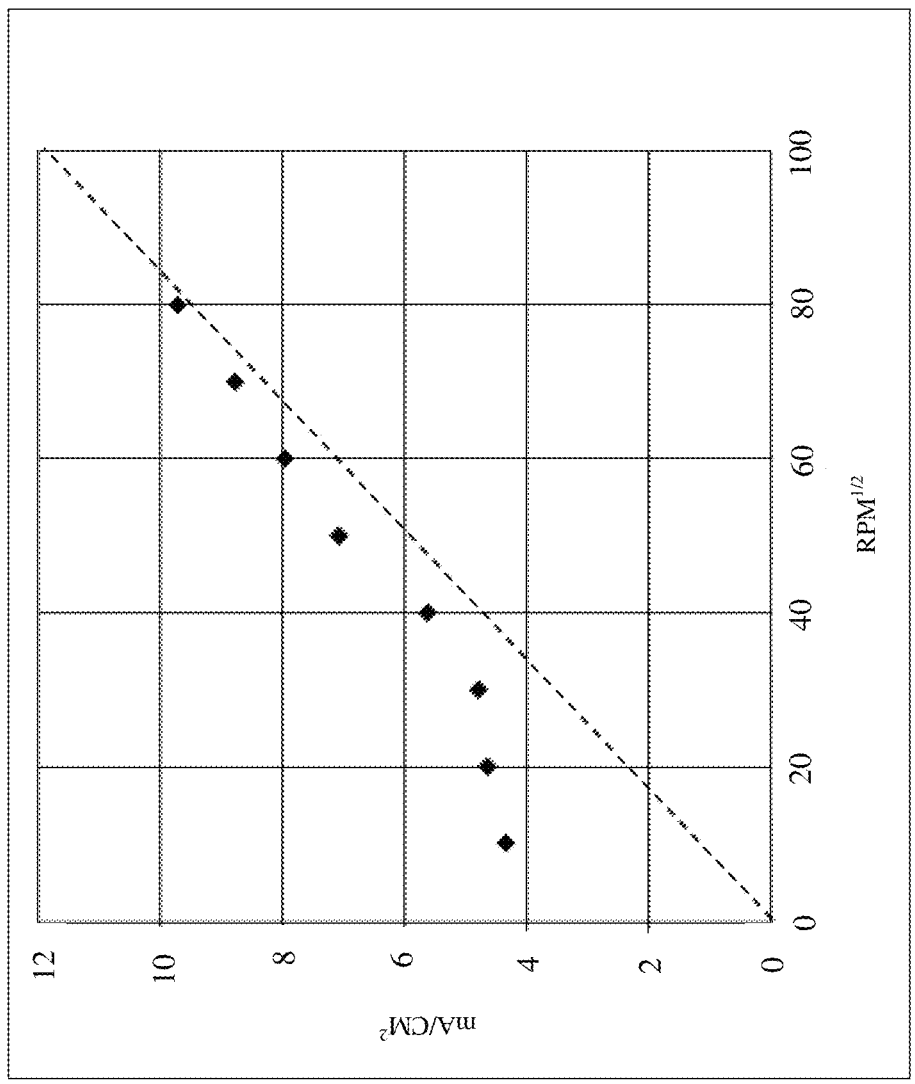
FIG. 24 exemplarily illustrates a graphical representation showing background-subtracted limiting currents of bromide electrooxidation-disproportionation on a glassy carbon rotating disk electrode in a 0.5M sodium phosphate buffer at various rotation rates.

FIG. 24 exemplarily illustrates a graphical representation showing background-subtracted limiting currents in $mA/cm^2$ of bromide electrooxidation-disproportionation on a glassy carbon rotating disk electrode in a 0.5M sodium phosphate buffer at various rotation rates in rpm. The sodium phosphate buffer has a pH of 8.0 and comprises about 5 mM NaBr. The dotted line in FIG. 24 represents the calculated Levich plot for the diffusion limited current of bromide.

Electrooxidation-disproportionation of bromide on a glassy carbon rotating disk electrode: An experiment to demonstrate the feasibility of the electrooxidation-disproportionation step in the regeneration process using a phosphate buffer which has a suitable pH and to determine the time scale of this process was conducted. In this experiment, a 3-compartment glass cell equipped with a glassy carbon rotating disk electrode of Pine Instruments with about 5.0 mm diameter, a Ag/AgCl reference electrode in 3.0 M NaCl connected via a Luggin capillary, and a Pt counter electrode were used. The background electrolyte was 0.5M sodium phosphate buffer with a Ph of about 8.0 procured from Teknova to which about 5 mM NaBr was added. The background-subtracted limiting currents at +1.30 Vv Ag/AgCl obtained in this experiment are exemplarily illustrated in FIG. 24. At high rotation rates, the limiting current follows the Levich behavior that is, the limiting current increases linearly with the square root of the rotation rate, as expected for a diffusion-limited process. At low rotation rates a positive deviation from the Levich behavior is observed which agrees with the occurrence of the disproportionation (16). The time scale of the disproportionation in this buffer can be estimated as the diffusion time across the diffusion boundary layer at 900 rpm which is a characteristic point of deviation. According to the Levich equation, the thickness of the diffusion boundary layer at this rotation rate in water is ca. 20 μm, which translates via Fick's $2^{nd}$ Law into the diffusion time of 0.5 s. Thus, 0.5 s is the characteristic time of the disproportionation of bromine in 0.5 M sodium phosphate buffer. This time-scale is well-suited for a commercial regeneration process.

Example 21

Figure 25:
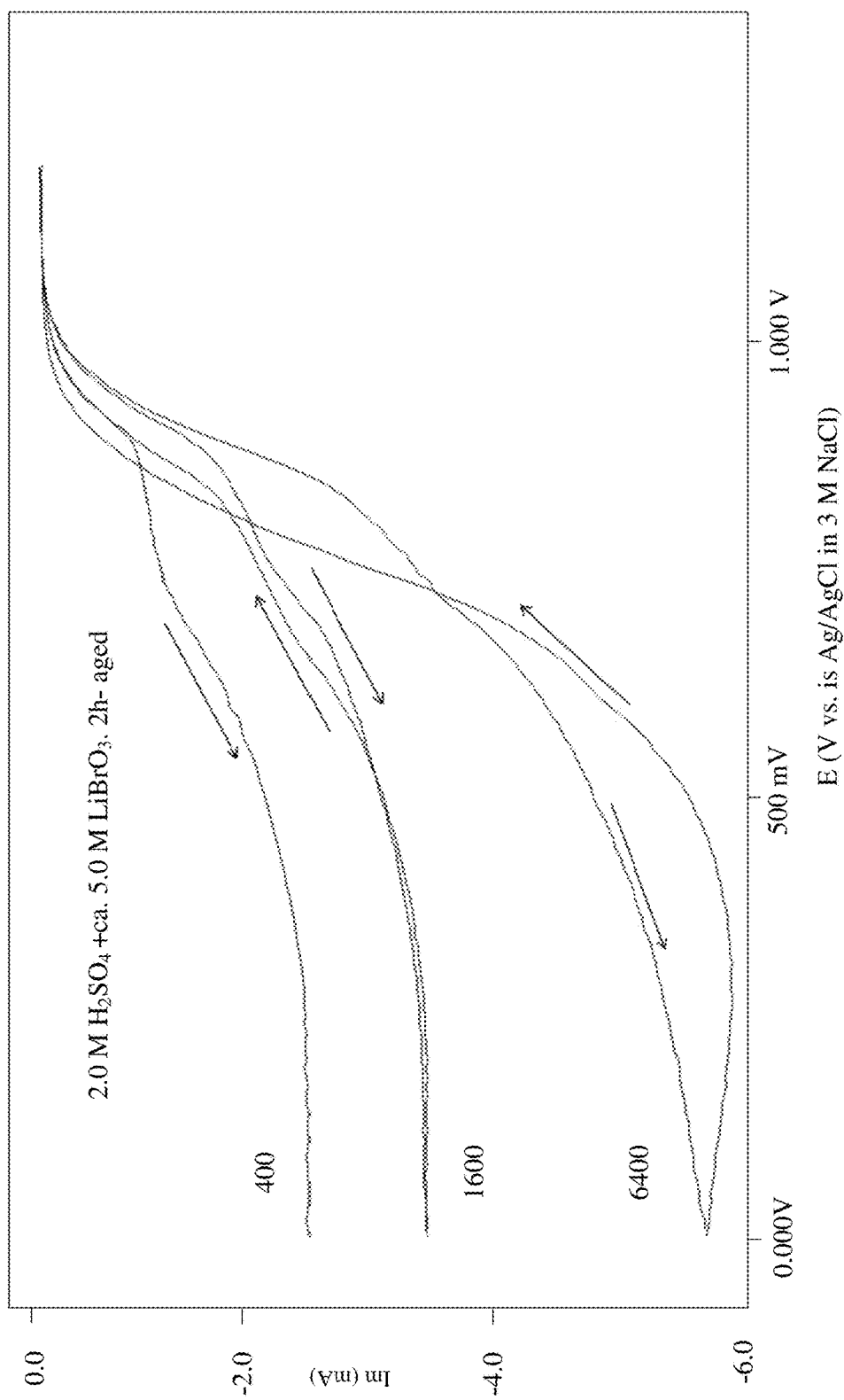
FIG. 25 exemplarily illustrates a staircase cyclic voltammetry on a glassy carbon rotating disk electrode in a 2 hour aged solution containing 2.0 M $H_2SO_4$ and approximately 5M $LiBrO_3$ at various rotation rates.

FIG. 25 exemplarily illustrates a staircase cyclic voltammetry on a glassy carbon rotating disk electrode of about 0.283 $cm^2$ area in a 2 hour aged solution containing 2.0 M $H_2SO_4$ and approximately 5M $LiBrO_3$. The electrode rotation rates and scan directions are exemplarily illustrated near the curves. The reference electrode is Ag/AgCl in 3 M NaCl.

Electroreduction of bromate in acid on a carbon rotating disk electrode: An experiment was conducted to determine practically achievable limits of power per electrode area upon discharge imposed by the aforementioned TRIZ contradiction between the stability and the limiting current in the acidic oxidant fluid. Although numerous compositions were tested, only the data for a 2.0 M $H_2SO_4$ solution are shown in FIG. 25 since this acid concentration was found to be near-optimal. In order to minimize the decomposition of the aqueous multi-electron oxidant (AMO) before the measurements, a solid $LiBrO_3$ was added to the acid solution in the electrochemical cell. As noticed in previous experiments, in this aged solution the more positive wave attributed to the electroreduction of bromine produced via the comproportionation is followed by a more negative wave attributed to the electroreduction of a bromate decomposition intermediate tentatively, hypobromite. Only the more positive wave is observed in fresh solutions. The limiting currents of both waves seem to be controlled by the concentration of acidic protons rather than that of bromate since the latter is present in a large stoichiometric excess. This also explains why the decrease in the limiting current with the rotation rate similar to the one shown in FIG. 25 is not observed. The solutions become yellow during such experiments in a batch cell due to the comproportionation of product bromide with bromate. As Example 11 shows, in the absence of bromide the stability of bromate in acids is better. The problem of the parasitic bromate comproportionation with bromide is not present in the discharge flow cells disclosed herein elsewhere.

Example 22

Disproportionation of bromine in Li-3-(N-morpholino) propanesulfonic acid (MOPS) buffer: 1.0 M Li-MOPS solution was prepared from H-MOPS and $LiOHxH_2O$. The pH of the resulting solution is 7.2 and the density is 1.11 g/mL. 2 moles of this solution (2 mL) was mixed with 1 mmole of $Br_2$ which is about 160 mg and about 52 μL. One week later, the solution composition was analyzed using negative mode electrospray ionization (ESI)-mass spectrometry (MS). A sample of unreacted Li-MOPS was used as a control. The expected chemical reaction is given by:

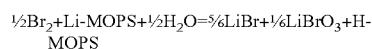

FIG. 26 exemplarily illustrates an electrospray ionization (ESI)-mass spectrometry (MS) spectrum, showing experimental data demonstrating the feasibility of a regeneration process. The ESI-MS spectrum exemplarily illustrated in FIG. 26 confirms the formation of bromate and bromide.

| Sample # | Composition |
|---|---|
| 1 | ½ $Br_2$ + Li-MOPS + ½$H_2O$ = ⅚ LiBr + ⅙ $LiBrO_3$ + H-MOPS |
| 2 | Li-MOPS only |
| 3 | Li-MOPS + NaBr |
| 4 | Li-MOPS + Br2 in excess, red liquid |

Similar experiments were carried out using a lithium-phosphate buffer. 0.2 mole of $LiOHxH_2O$ (8.392 g) was dissolved in 100 mL of water to which 0.1 mole of $H_3PO_4$ of about 6.22 mL of 80% w was added. A white precipitate was formed due to the following reaction:

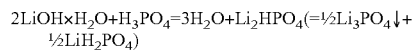

10 mL, that is, 0.010 moles of $Li_2HPO_4$ equivalent of the resulting white slurry was sampled into a separate vial and treated with 0.0050 of bromine of about 0.25 mL. The following reaction:

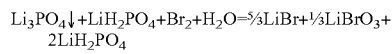

proceeds even at 60° C. which is too slow for practical applications.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A system for producing, converting and storing energy, comprising:

a discharge system, said discharge system comprising one or more electrolytic cell stacks, each electrolytic cell stack comprising a plurality of electrolytic cells, wherein each of said electrolytic cells comprises an electrolyte-electrode assembly, wherein chemical energy of an oxidant fluid and a reducer fluid are stored in an oxidant fluid tank and a reducer fluid tank, respectively, wherein said discharge system facilitates producing electric power by converting chemical energy of said oxidant fluid and said reducer fluid into electrical energy by means of a comproportionation reaction, wherein said producing electric power is accompanied by generation of a discharge fluid, wherein said oxidant fluid comprises one or more forms of one or more aqueous multi-electron oxidants, wherein said reducer fluid comprises a reducer, and wherein each aqueous multi-electron oxidant is selected from a group consisting of a perchlorate, a chlorate, a chlorite, a hypochlorite, a perbromate, a bromate, a bromite, a hypobromite, a periodate, an iodate, an iodite, and a hypoiodite; and a regeneration system, said regeneration system comprising one or more splitting-disproportionation reactors, wherein said one or more splitting-disproportionation reactors facilitate conversion of said discharge fluid into said aqueous multi-electron oxidant and said reducer by splitting said discharge fluid into a said reducer and an intermediate oxidant followed by disproportionation of said intermediate oxidant into said aqueous multi-electron oxidant, and wherein chemical energy in said aqueous multi-electron oxidant regenerated by said conversion and said reducer regenerated by said conversion is stored in an oxidant fluid tank and a reducer fluid tank, respectively.

2. The system of claim 1, wherein said reducer is hydrogen.

3. The system of claim 1, wherein said comproportionation reaction proceeds in an ignition regime.

4. The system of claim 3, wherein said comproportionation reaction is facilitated by a pH change.

5. The system of claim 4, wherein said pH change is facilitated by an orthogonal ion migration across laminar flow.

6. The system of claim 1, wherein said splitting comprises one or more of electrolysis, photolysis, photoelectrolysis, radiolysis, and thermolysis.

7. The system of claim 1, wherein said disproportionation is facilitated by a pH change.

8. The system of claim 7, wherein said pH change is facilitated by an orthogonal ion migration across laminar flow.

9. The system of claim 1, wherein said electrolyte-electrode assembly comprises a cation-exchange membrane.

10. A system for converting a discharge fluid into an aqueous multi-electron oxidant and a reducer and for storing energy, comprising:

a regeneration system, said regeneration system comprising one or more splitting-disproportionation reactors, wherein said one or more splitting-disproportionation reactors facilitate said converting said discharge fluid into said aqueous multi-electron oxidant and said reducer by splitting said discharge fluid into said reducer and an intermediate oxidant followed by disproportionation of said intermediate oxidant into said aqueous multi-electron oxidant, wherein chemical energy in said aqueous multi-electron oxidant and said reducer is stored in an oxidant fluid tank and a reducer fluid tank, respectively, and wherein said aqueous multi-electron oxidant regenerated by said conversion process comprises a perchlorate, a chlorate, a chlorite, a hypochlorite, a perbromate, a bromate, a bromite, a hypobromite, a periodate, an iodate, an iodite, and a hypoiodite.

11. The system of claim 5, wherein said reducer is hydrogen.

12. The system of claim 10, wherein said splitting comprises one or more of electrolysis, photolysis, photoelectrolysis, radiolysis, and thermolysis.

13. The system of claim 10, wherein said disproportionation is facilitated by a pH change.

14. The system of claim 13, wherein said pH change is facilitated by an orthogonal ion migration across laminar flow.

* * * * *